(12) United States Patent
de Graaff et al.

(10) Patent No.: US 9,277,838 B2
(45) Date of Patent: Mar. 8, 2016

(54) COFFEE BEVERAGE SYSTEM USING A COFFEE BEAN CARTRIDGE

(75) Inventors: Gerbrand Kristiaan de Graaff, Hillegom (NL); Ivo van Os, Utrecht (NL); Christiaan Johannes Maria Moorman, Moergestel (NL); Joseph Theodoor Knitel, De Meern (NL)

(73) Assignees: Koninklijke Douwe Egberts B.V., Utrecht (NL); Koninklijke Philips Electronics N.V., Eindhoven (NL)

( * ) Notice: Subject to any disclaimer, the term of this patent is extended or adjusted under 35 U.S.C. 154(b) by 70 days.

(21) Appl. No.: 13/587,730

(22) Filed: Aug. 16, 2012

(65) Prior Publication Data

US 2013/0095219 A1  Apr. 18, 2013

Related U.S. Application Data

(63) Continuation of application No. PCT/NL2011/050114, filed on Feb. 17, 2011.

(51) Int. Cl.
*A47J 31/057* (2006.01)
*A47J 31/46* (2006.01)
(Continued)

(52) U.S. Cl.
CPC . *A47J 31/42* (2013.01); *A23F 5/26* (2013.01); *A47J 42/50* (2013.01); *B65B 1/12* (2013.01)

(58) Field of Classification Search
CPC ...... A47J 31/057; A47J 31/46; A47J 31/4478
USPC ................ 99/300, 275–323.3; 219/687–689; 426/431, 433, 435
See application file for complete search history.

(56) References Cited

U.S. PATENT DOCUMENTS

| 1,604,058 A | 10/1926 | Mager |
| 3,981,234 A | 9/1976 | Nelson et al. |

(Continued)

FOREIGN PATENT DOCUMENTS

| CN | 1413340 | 4/2003 |
| CN | 2684712 | 3/2005 |

(Continued)

OTHER PUBLICATIONS

International Search Report for PCT/NL2011/050114, mailed Oct. 25, 2011, 6 pages.

(Continued)

*Primary Examiner* — Tu B Hoang
*Assistant Examiner* — Thomas Ward
(74) *Attorney, Agent, or Firm* — Foley & Lardner LLP

(57) ABSTRACT

A coffee beverage system is described including a coffee bean packaging cartridge and a coffee brewing apparatus. The packaging cartridge includes a container holding coffee beans and transportation component for transporting coffee beans towards an exit opening of the cartridge. The coffee apparatus comprises a grinder for grinding the coffee beans from the cartridge and a brewing device for brewing coffee from ground coffee obtained by the grinder. A metering chamber holds a predetermined amount of coffee beans and comprises a bottom portion which forms a part of the grinder, said bottom portion rotates around an axis extending in a vertical direction. A second coffee bean packaging cartridge includes a second dosing device separate from the first dosing device for preparing and/or supplying a dose of coffee beans to the entrance opening of the coffee brewing apparatus independent of the coffee brewing apparatus.

176 Claims, 70 Drawing Sheets

(51) Int. Cl.
*A47J 31/42* (2006.01)
*A23F 5/26* (2006.01)
*B65B 1/12* (2006.01)
*A47J 42/50* (2006.01)

(56) References Cited

U.S. PATENT DOCUMENTS

| | | | |
|---|---|---|---|
| 4,326,114 A | 4/1982 | Gerling et al. | |
| 4,555,984 A * | 12/1985 | Yamashita | 99/286 |
| 4,644,856 A | 2/1987 | Borgmann | |
| 4,843,956 A | 7/1989 | Lashlee | |
| 4,876,953 A | 10/1989 | Imamura et al. | |
| 4,936,515 A | 6/1990 | Poag et al. | |
| 5,094,153 A | 3/1992 | Helbling | |
| 5,217,108 A | 6/1993 | Newnan | |
| 5,241,898 A | 9/1993 | Newnan | |
| 5,267,507 A * | 12/1993 | Enomoto | 99/286 |
| 5,338,409 A * | 8/1994 | Heierli | 202/205 |
| 5,386,944 A | 2/1995 | Knepler et al. | |
| 5,632,449 A | 5/1997 | Sandolo | |
| 5,632,499 A | 5/1997 | Hutcherson et al. | |
| 6,067,894 A | 5/2000 | Eugster | |
| 6,339,985 B1 * | 1/2002 | Whitney | 99/286 |
| 7,013,796 B2 | 3/2006 | Smit | |
| 7,051,646 B2 | 5/2006 | Della Pietra et al. | |
| 8,047,124 B2 | 11/2011 | Lin | |
| 8,382,017 B2 | 2/2013 | Bich | |
| 8,383,180 B2 * | 2/2013 | Vastardis | 426/433 |
| 8,439,235 B2 | 5/2013 | Mih et al. | |
| 8,776,671 B2 | 7/2014 | Van Os et al. | |
| 2002/0092941 A1 | 7/2002 | Henderson et al. | |
| 2002/0129712 A1 | 9/2002 | Westbrook et al. | |
| 2002/0153438 A1 | 10/2002 | Glucksman et al. | |
| 2003/0025012 A1 | 2/2003 | Lassota | |
| 2004/0025703 A1 * | 2/2004 | Ming | 99/286 |
| 2004/0173101 A1 | 9/2004 | Steckhan | |
| 2005/0258287 A1 | 11/2005 | Rohde | |
| 2007/0062378 A1 | 3/2007 | Glucksman et al. | |
| 2007/0137495 A1 | 6/2007 | Talbert | |
| 2007/0295752 A1 | 12/2007 | Morin et al. | |
| 2008/0098901 A1 | 5/2008 | Lee | |
| 2009/0127363 A1 | 5/2009 | Malykke | |
| 2009/0145302 A1 | 6/2009 | Dutertre et al. | |
| 2009/0165655 A1 * | 7/2009 | Aonuma | 99/290 |
| 2010/0080886 A1 | 4/2010 | Hourizadeh | |
| 2010/0308141 A1 | 12/2010 | Bich | |
| 2013/0095218 A1 | 4/2013 | De Graaff et al. | |
| 2013/0095219 A1 | 4/2013 | De Graaff et al. | |
| 2013/0101717 A1 | 4/2013 | De Graaff et al. | |
| 2013/0115351 A1 | 5/2013 | Van Os et al. | |

FOREIGN PATENT DOCUMENTS

| | | |
|---|---|---|
| CN | 2684713 | 3/2005 |
| CN | 1830369 | 9/2006 |
| CN | 201005518 | 1/2008 |
| DE | 29 26 389 | 1/1981 |
| DE | 203 00 928 | 5/2004 |
| DE | 203 00 93 3 | 5/2004 |
| DE | 10 2007 008898 | 8/2008 |
| DE | 102007008 90 0 | 10/2008 |
| EP | 0 182 137 | 5/1986 |
| EP | 0 452 214 | 10/1991 |
| EP | 0 543 591 | 5/1993 |
| EP | 0 766 943 A1 | 4/1997 |
| EP | 0 804 894 | 11/1997 |
| EP | 1 700 549 | 9/2006 |
| EP | 2 067 421 | 6/2009 |
| EP | 2 403 386 | 1/2012 |
| FR | 2565088 | 12/1985 |
| GB | 2 447 678 | 9/2008 |
| JP | 07-505328 | 6/1995 |
| JP | 2003-518676 | 6/2003 |
| WO | WO-94/07401 | 4/1994 |
| WO | WO-01/48711 | 7/2001 |
| WO | WO-2009/046771 | 4/2009 |

OTHER PUBLICATIONS

International Search Report for PCT/NL2010/050077, mailed Aug. 5, 2010, 6 pages.
Communication for European Application No. 11154887.1, mail date Nov. 29, 2013, 3 pages.
Notification of the First Office Action for Chinese Application No. 201180019429, issue date Aug. 8, 2014, 30 pages.
Official Action for Russian Application No. 2011138190, mail date Jul. 7, 2014, 9 pages.
Official Action for Russian Application No. 2012139427, mail date Apr. 11, 2014, 9 pages.
European Search Report for European Application No. 11154887.1, dated Jan. 2, 2012, 8 pages.

* cited by examiner

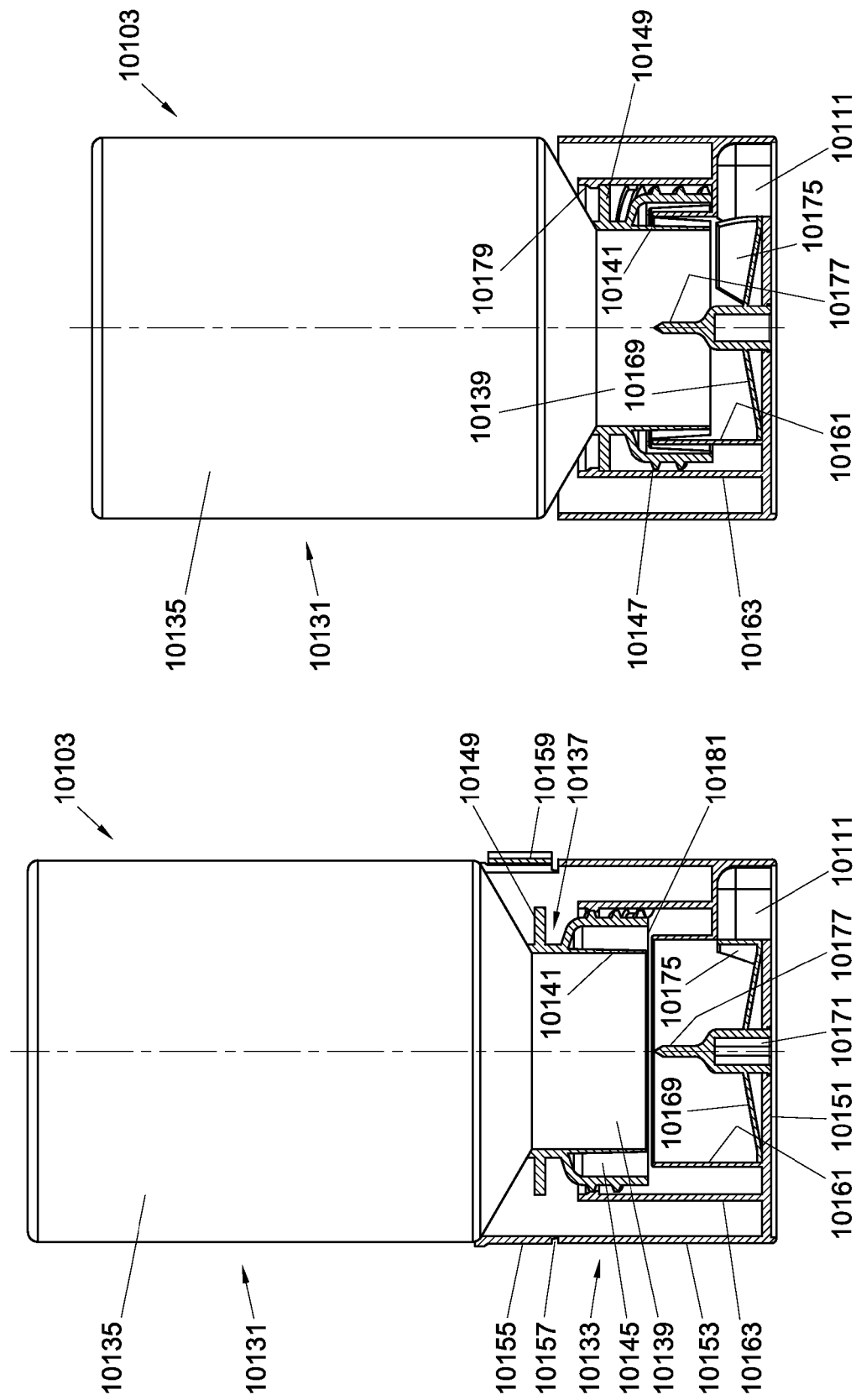

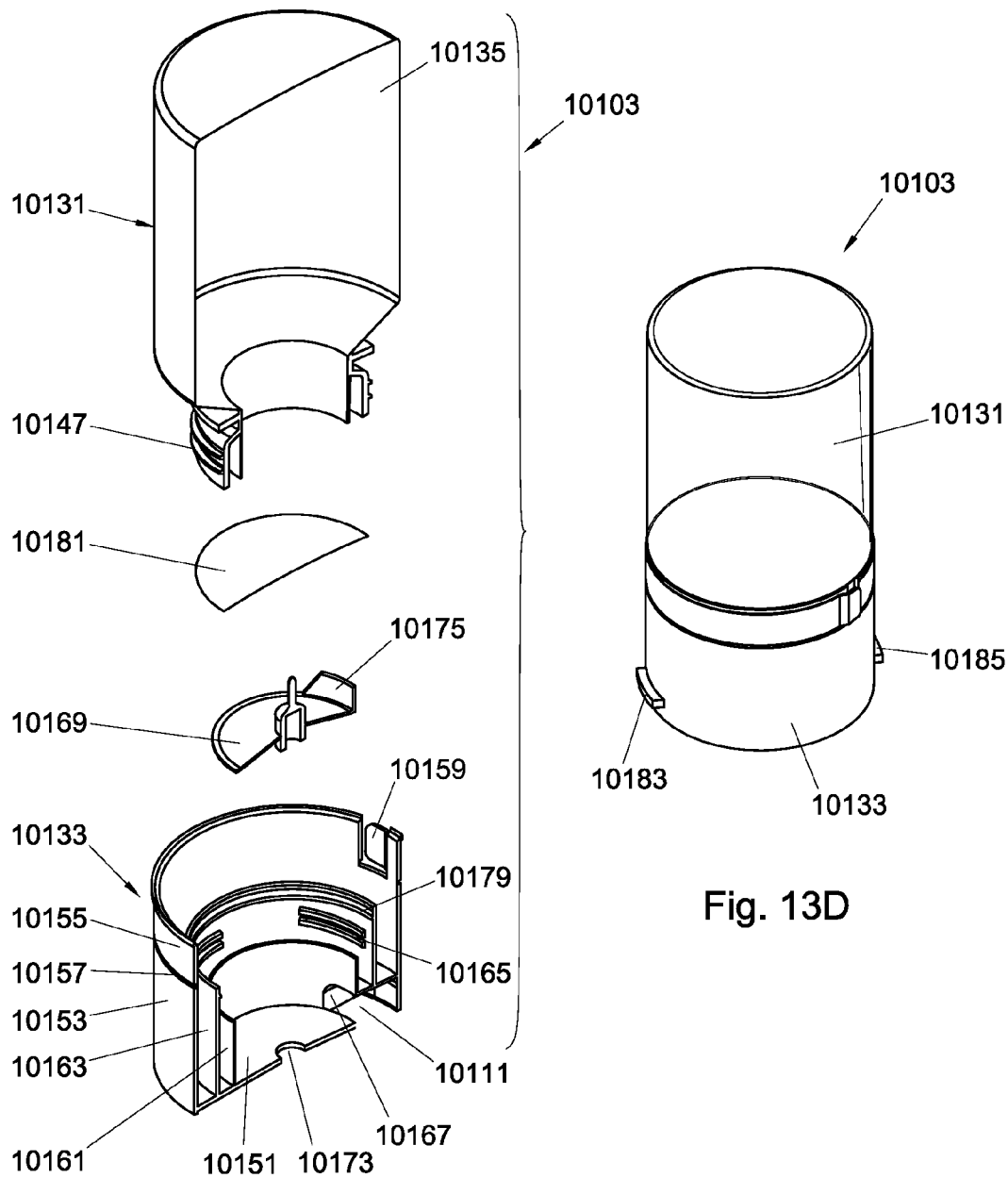

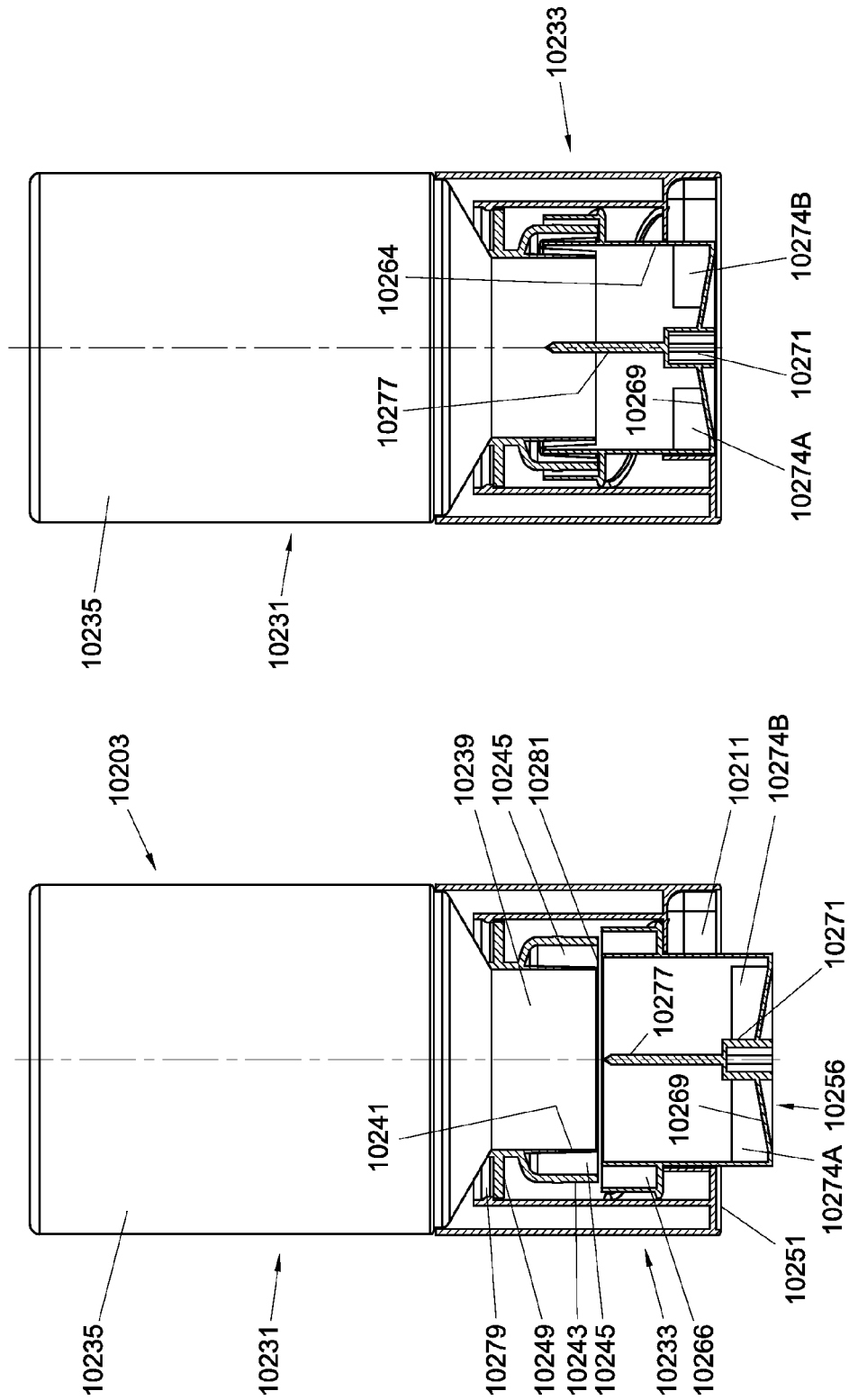

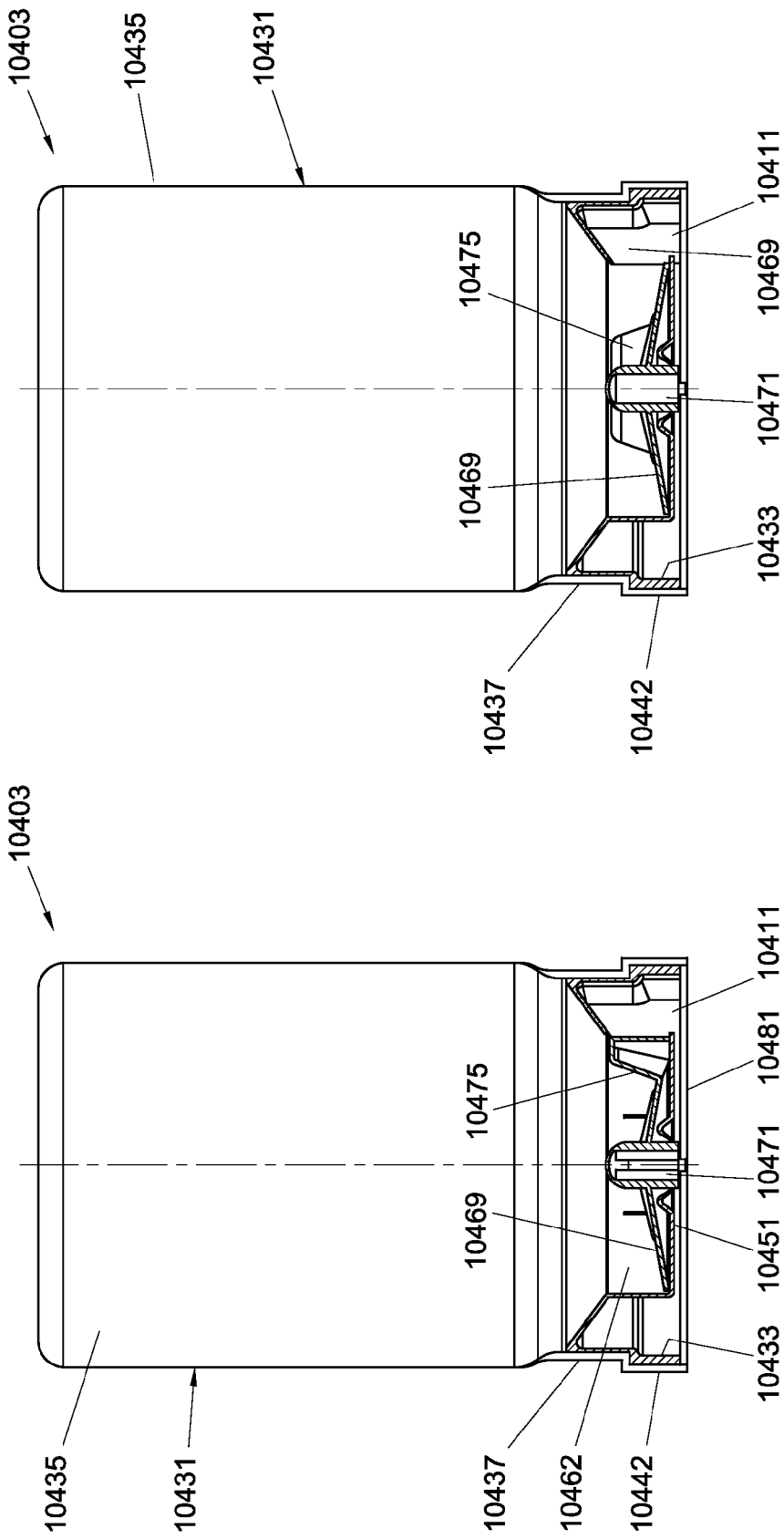

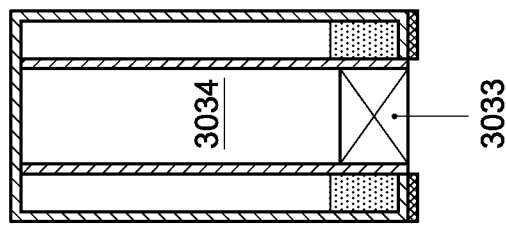
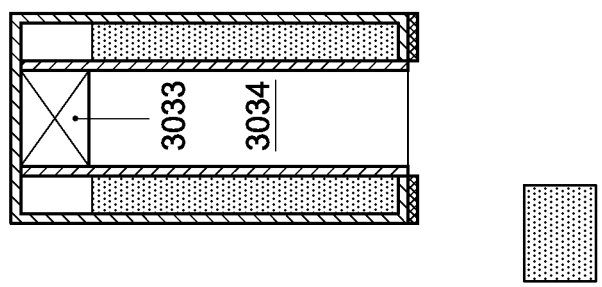
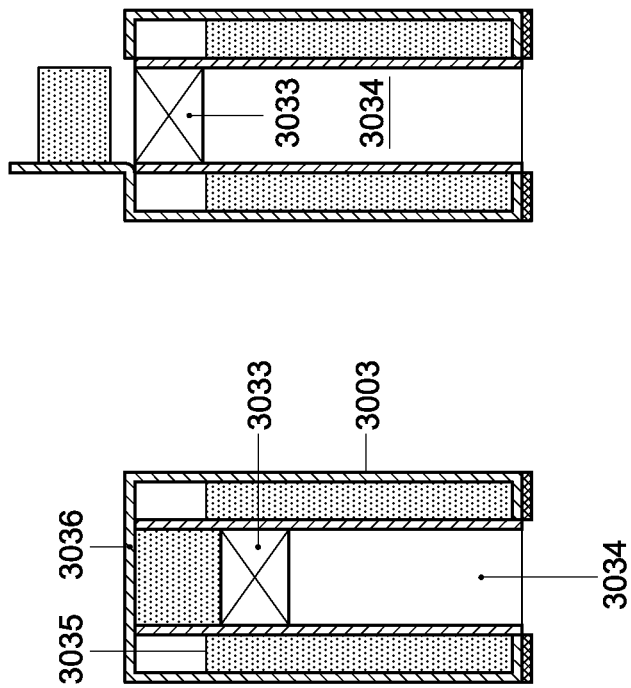
Fig. 46P
Fig. 46O
Fig. 46N
Fig. 46M

COFFEE BEVERAGE SYSTEM USING A COFFEE BEAN CARTRIDGE

CROSS-REFERENCE TO RELATED APPLICATIONS

The present application is a continuation of International Patent Application Serial No. PCT/NL2011/050114 filed on Feb. 17, 2011 which claims priority to International Patent Application Serial No. PCT/NL2010/050077 filed on Feb. 17, 2010 and Netherlands Application Nos. NL2004274 filed on Feb. 22, 2010, NL2005238 filed on Aug. 17, 2010, NL2005278 filed on Aug. 26, 2010, and NL2005280 filed on Aug. 26, 2010—the full disclosures of all applications listed above are hereby incorporated herein by reference in their entireties.

BACKGROUND

The invention relates to a coffee beverage system according to the preamble of claim 1. In such a known system roasted coffee beans in packaging cartridges can be connected to the coffee brewing apparatus that includes a grinding mechanism.

In view of the above-mentioned problem the present invention is concerned with a system for in a versatile way preparing a coffee beverage that allows for preparing beverages according to the particular taste (especially strength) of the consumer. In addition it is an object of the present invention to propose a system for preparing coffee beverages of the above referred to kind, which may be more compact. In a more general sense it is thereby an object of the invention to overcome or ameliorate at least one of the disadvantages of the prior art. It is also an object of the present invention to provide alternative structures which may be less cumbersome in assembly and operation and which moreover can be made relatively inexpensively. Furthermore it is an object of the present invention to provide an improved system with a device for holding and supplying coffee beans, which enables controlling the supply of coffee beans. Alternatively it is an object of the invention to at least provide the public with a useful choice in obtaining coffee bean supply devices for holding and supplying coffee beans.

Unless stated otherwise, in the description and claims coffee beans are understood to be burnt/roasted coffee beans. Coffee beans in the description and claims may be understood to cover also fragmented coffee beans, that is, coffee bean fragments, which coffee bean fragments are still to be ground for extracting desired coffee beverage. The coffee beans are for instance broken, before they are packaged. In an embodiment, at least a part of the coffee beans in the coffee bean package is divided into about thirty or less, in particular about fifteen or less, more particularly about ten fragments or less. One coffee bean fragment then comprises for instance one-thirtieth part, in particular one-fifteenth part, more particularly one-tenth part or more of a coffee bean. For instance, the coffee bean fragments comprise a half or a quarter of a coffee bean. An advantage of the use of coffee bean fragments compared with whole coffee beans can be that coffee bean fragments can be supplied to the grinder relatively simply and/or that the package can be closed off relatively simply. This is because the coffee bean fragments are relatively small and hence can slide relatively easily through openings in the package and the apparatus and/or will block the coffee bean outlet and/or closing means less easily. As the coffee beans may beforehand have been divided into fragments, though not ground, in the meantime comparatively more bean surface can come into contact with any ambient air than would be case with whole coffee beans. On the other hand, less bean surface will come into contact with air than would be the case with ground coffee, so that coffee bean fragments can be preserved better than ground coffee beans. Only just before preparation of the coffee beverage are the coffee bean fragments ground for obtaining coffee beverage. In this description, therefore, coffee bean may also be understood to include a fragmented coffee bean, that is, which is still to be ground for preparing the desired coffee beverage.

To this end according to one preferred aspect of the invention there is provided a coffee beverage system according to claim 1. The coffee been packaging cartridge is removable connected to the coffee brewing apparatus and it is arranged for holding and supplying multiple servings of coffee beans. It includes a container comprising an interior volume and at least one exit opening defining a coffee bean outlet, the interior volume holding coffee beans and transportation means adapted for enabling transportation of the coffee beans from the interior volume towards the exit opening of the cartridge. The coffee apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder. The system is further provided with a metering chamber for receiving coffee beans which are transported with the aid of the transportation means into the metering chamber. Preferably after being filled the metering chamber will hold a dosed amount of coffee beans. The metering chamber comprises a bottom portion which forms a part of the grinder. The bottom portion is arranged in the coffee apparatus for rotating around an axis extending in a vertical direction. The system is arranged such that upon activation of the grinder the bottom portion is rotating around the vertical axis for transporting the coffee beans from the metering chamber into the grinder and for grinding the coffee beans. The use of a bottom portion of the metering chamber, which is part of the grinder and which rotates for emptying the metering chamber also results in a decreased height of the system compared to the alternative option of providing a separate bottom plate of the metering chamber and a separate grinder. The coffee brewing apparatus and the first coffee bean packaging cartridge comprise a first dosing device for providing and supplying a predetermined dose of coffee beans from the first coffee bean packaging cartridge to the grinder. This first dosing device comprises the metering chamber of the brewing apparatus when the first coffee bean packaging cartridge is or has been connected to the coffee brewing apparatus. The system is further provided with a second coffee bean packaging cartridge. This second coffee bean packaging cartridge is arranged for holding and supplying coffee beans and is also removably connectable to the coffee brewing apparatus. The second coffee bean packaging cartridge includes a second dosing device separate from the first dosing device of the brewing apparatus and the first coffee bean packaging cartridge for independently of the coffee brewing apparatus preparing and/or supplying a dose of coffee beans to the entrance opening of the coffee brewing apparatus. In this way a versatile coffee beverage system is provided which is compact, and with which a consumer can choose to let the coffee brewing apparatus define the dose of coffee beans to be used for preparing a single serving of coffee beverage or that the consumer prepares a dose of coffee beans independently from the coffee brewing apparatus.

The metering chamber may be divided in a first chamber portion which is part of the cartridge and a second chamber portion which is part of the coffee brewing apparatus. The division of the metering chamber over the cartridge and the brewing apparatus enables to provide an even more compact coffee beverage system.

In this regard it can be advantageous for emptying the metering chamber that the bottom portion has a conical shape such that the bottom portion extends downwardly in a direction extending perpendicular to and away from the vertical axis.

It is further advantageous for the coffee beverage system according to the invention that the first chamber portion comprises the exit opening and the second chamber portion comprises the entrance opening and that the exit opening extends above the entrance opening. This provides a metering chamber which can be made relatively inexpensive.

The metering chamber may be arranged for receiving a portion of coffee beans corresponding to a dosed amount of coffee beans which is preferably necessary for preparing a single serving of coffee beverage. The transportation means may comprise a part which is movable relative to the metering chamber for effectively transporting the coffee beans towards the metering chamber upon driving of said transportation means. The coffee brewing apparatus may be provided with a first motor and a vertically extending drive shaft wherein said drive shaft may be releasable connected with the transportation means of the cartridge for driving and thereby moving the transportation means upon rotation of the drive shaft by means of the first motor. The movable part may comprise a bottom and/or a plurality of vanes, which rotates around a further vertical axis upon driving the transportation means.

Furthermore, the transportation means may comprise a downwardly extending bottom wall for transporting the coffee beans towards the metering chamber under the influence of gravity. Alternatively, the transportation means may comprise a downwardly extending bottom wall for transporting the coffee beans towards the metering chamber under the influence of gravity only.

The first chamber portion may be provided with a top wall which limits the volume of the metering chamber in an upwardly vertical direction wherein the bottom portion of the second chamber portion limits the volume of the metering chamber in a downwardly vertical direction.

Alternatively or additionally, the first chamber portion may be provided with an upstanding side wall comprising an inlet opening for entering the coffee beans by means of the transportation means into the metering chamber.

It is further advantageous for the coffee beverage system according to the invention, when the transportation means are arranged for transporting the coffee beans at least in a horizontal direction for transporting the coffee beans into the metering chamber and/or towards the inlet opening of the metering chamber.

The grinder may be positioned centrically with respect to the second chamber portion. It may comprise a conical part lying in the direction of the vertical axis, wherein the conical part rotates around the vertical axis upon driving the grinder. The grinder may be driven by a motor. The drive shaft and the grinder may be driven by different motors.

The coffee brewing apparatus may comprise connection means for the removable connection to the coffee bean packaging cartridge. The connection means may comprise a recess at an upper side of the coffee brewing apparatus, the recess being surrounded by a side wall and being configured for receiving a corresponding part protruding from a lower side of the coffee bean packaging cartridge. The side wall may protrude from the upper side of the coffee brewing apparatus and be covered by a housing.

According to an embodiment of the present invention, the side wall comprises openings for receiving bayonet elements of the coffee bean packaging cartridge. The coffee bean packaging cartridge should be inserted into the recess such that the bayonet elements are inserted in the openings and then rotated in order to be connected to the coffee brewing apparatus. The side wall may comprise blocking elements for impeding a further rotation of the coffee bean packaging cartridge, when it has reached its final position. In this way, the user can easily and reliably mount the cartridge on the coffee brewing apparatus. Preferably, the coffee bean packaging cartridge should be rotated approximately 50 degrees in order to reach its final position. The connection between the cartridge and the coffee brewing apparatus may be a snap connection.

Furthermore, the recess may comprise rotatable protruding edges at its center, which are fixed at the end of the driving shaft.

The vertical axis around which the bottom portion of the second chamber portion is rotatable may run centrally through the bottom portion of the second chamber portion. The bottom portion may extend downwardly in a direction extending perpendicular to and away from the vertical axis all around the vertical axis.

The coffee bean packaging cartridge may comprise closing means for closing the coffee bean outlet when the coffee bean packaging cartridge is not connected to the coffee brewing apparatus. In this way it is avoided that coffee beans fall out of the coffee bean packaging cartridge when it is not connected to the coffee brewing apparatus.

The closing means may be configured for opening the coffee bean outlet when the coffee bean packaging cartridge is connected to the coffee brewing apparatus.

The closing means comprises a closure member at the bottom side of the container comprising the coffee bean outlet and a rotatable closing disk having an opening. In order to connect the coffee bean packaging cartridge to the coffee brewing apparatus the opening of the rotatable closing disk may be brought in a position aligned with the coffee bean outlet.

The closure member may comprise a pair of fletching arms and the closure disk comprises a detent, which in the closed position is caught behind the fletching arms.

The exit opening may be associated with a removable sealing element sealing the interior volume prior to activation of the cartridge wherein preferably said sealing element prevents gasses to escape from the cartridge. The beverage system may comprise means for disrupting and displacing the sealing element, preferably when the cartridge is connected to the brewing apparatus for the first time. The sealing element may be a sealing membrane.

The system may be arranged such that, in use, the grinding device is activated for emptying the metering chamber and for grinding the coffee beans collected and/or held in the metering chamber. The grinding device may be activated longer than is required for emptying or at least substantially completely emptying the metering chamber and for grinding all the coffee beans collected in the metering chamber. In this way, the emptying of the metering chamber is reliably performed. Previous to the emptying of the metering chamber and the grinding of the coffee beans, in a first step the transportation means may be driven for filling the metering chamber with coffee beans. The transportation means may be driven longer than is required for completely filling or at least substantially completely filling the metering chamber with coffee beans. In this way, the dosing of the metering chamber with coffee beans is reliably performed.

The coffee brewing apparatus may be provided with a control device for controlling the first motor and/or the grinder for performing these steps. The control device may control the brewing device wherein the control device may be arranged such that, in use, in a step which follows after that the emptying and grinding step is completed the brewing device is brewing coffee based on the ground coffee and heated water heated by a heating device of the coffee brewing apparatus. The volume of the metering chamber may be such that if it is completely filled with coffee beans the amount of beans corresponds with one dose of coffee beans for preparing a cup of coffee. The one dose of coffee beans may comprise 5-11, preferably 6-8 grams of coffee beans. The coffee brewing apparatus can be arranged such that the control device controls the brewing device wherein the control device is arranged such that, in use, in a third step which follows after that the second step is completed the brewing device is brewing coffee based on the ground coffee and heated water heated by a heating device of the coffee brewing apparatus.

According to the invention the coffee bean packaging cartridge can also be designed to be (re)fillable with coffee beans by the consumer. Preferably the coffee bean packaging cartridge is filled with coffee beans and is not designed to be refillable with coffee beans. In that case the cartridge is a packaging for the coffee beans to be sold in a shop.

According to a further embodiment, the system further comprises a sensor arranged for detecting if a coffee bean packaging cartridge is connected to the coffee brewing apparatus. The sensor is configured to signal a result of the detection to the controller. The sensor may be a switch, for example a micro switch. The coffee bean packaging cartridge comprises a protruding part for activating the switch when it is connected to the coffee brewing apparatus. The protruding part may be located below or above one of the bayonet elements and may activate the switch when the coffee bean packaging cartridge reaches its final position. The switch may be located in an opening in the sidewall surrounding the recess at the upper side of the coffee brewing apparatus, the protruding part activating the switch through the opening. The switch may be hidden behind horizontal wall segments in the side wall and the opening may be a slit between the horizontal wall segments, the protruding part fitting in the slit. The controller may be arranged for controlling the first motor and the grinder so that they can be activated only if it has been detected that the first coffee bean packaging cartridge is present. In this way, it is ensured that the system works with coffee bean packaging cartridges especially designed thereto. These cartridges may be sold by the manufacturer of the system filled with coffee beans of an elevated quality, thereby guaranteeing the end consumer a good flavor coffee beverage.

In an embodiment the second dosing device is arranged for holding and supplying a predetermined dose of coffee beans which dose amounts to an amount of a single serving of coffee beans which is intended for preparing a magnitude of one cup of coffee beverage. Alternatively the second dosing device can comprise multiple compartments each of the multiple compartments being filled with a predetermined dose of coffee beans. It is then advantageous that each compartment is arranged for holding a dose of coffee beans which dose amounts to an amount of a single serving of coffee beans which is intended for preparing a magnitude of one cup of coffee beverage. In particular each dose has a weight of approximately 50 grams or less, in particular 20 grams of less, more particularly 15 grams or less.

According to the invention the second dosing device of the second coffee bean packaging cartridge includes a housing comprising an interior volume and at least one exit opening defining a coffee bean outlet, the interior volume being arranged for holding a predetermined dose of coffee beans, wherein said coffee bean outlet can be placed in communication with the entrance opening of the coffee brewing apparatus when the second coffee bean packaging cartridge is connected to the coffee brewing apparatus. When the second coffee bean packaging cartridge comprises more compartments, each compartment then preferably has at least one exit opening defining a coffee bean outlet.

In an embodiment the connection of the second coffee bean packaging cartridge to the coffee brewing apparatus is such that the housing is rotatable with respect to the entrance opening of the coffee brewing apparatus. Furthermore, the coffee beverage system is arranged such that coffee beans are transported from the second coffee bean packaging cartridge to the coffee brewing apparatus by gravity.

In accordance with the invention the second dosing device of the second coffee bean packaging cartridge may comprise transportation means arranged for enabling transportation of a predetermined dose of coffee beans from the interior volume towards the at least one exit opening of the second dosing device. Such transportation means form a displaceable dosing element.

The second coffee bean packaging cartridge may be adapted to the coffee brewing apparatus so that, if the second coffee bean packaging cartridge is connected to the coffee brewing apparatus, coffee beans which are transported with the aid of the transportation means of the second dosing device towards the exit opening of the second dosing device can be received by the coffee brewing apparatus via the entrance opening for preparing coffee. In this way the consumer need not perform additional operations for supplying a dose of coffee beans from the second coffee bean packaging into the brewing apparatus. A consumer can define his or her own amount of coffee beans to be used in preparing a coffee beverage in an easy way when the transportation means of the second dosing device are configured to be actuated independently from the coffee brewing apparatus. In particular the transportation means are configured to be actuated manually.

In an embodiment the transportation means of the second dosing device include a moveable structure that is, at least partly, present in the interior volume for contacting the coffee beans, and wherein the transportation means further include manually operable actuation means that are, at least partly, provided outside of the interior volume for manually actuating the moveable structure. Since in accordance with the invention the transportation means of the second coffee bean packaging cartridge are configured to be actuated manually, the user is enabled to control the amount of beans that is supplied in an easy way, by manually actuating the transportation means until the desired amount is reached. By means of the manually operable actuation means, the moveable structure can be moved from outside the interior volume. In this way a force can be applied to the coffee beans, e.g. for forcing the coffee beans to the outlet. Alternatively a blockage for movement of the coffee beans by another force, such as gravity, to the outlet can be removed by moving the moveable structure. In these ways, a user can control the supply of coffee beans to the coffee brewing apparatus.

In an embodiment the transportation means of the second coffee bean packaging cartridge include a rotatable element, such as a rotatable axle, that is at least partly located inside the interior volume. Such a rotatable element offers the possibility to provide a compact structure inside the container, thus substantially preventing an unnecessary increase of a volume occupied by the second coffee bean packaging cartridge.

In an embodiment the actuation means are arranged for rotating the rotatable element. Preferably the actuation means include a crank handle connected to the rotatable element.

In an embodiment the rotatable element is at least partly formed as a conveyor screw. Preferably the moveable structure includes a threaded bore through which the conveyor screw is engaged. Such a structure may be compact while at the same time providing the possibility for rather accurate control of the supply of coffee bean material to the outlet.

In an embodiment the moveable structure is rigidly connected to the rotatable element, and wherein the moveable structure is provided with at least one first aperture for letting the coffee beans pass there through, wherein the second coffee bean packaging cartridge is provided with at least one second aperture that is positioned, in use, above or below the at least one first aperture and that offers entrance to the outlet, wherein, as a result of rotating the rotatable element, the at least one aperture can be aligned with the at least one second aperture. Preferably the second aperture is formed by the outlet. As a result, the moveable element in use rotates together with the rotatable element. As a result of aligning the at least one aperture with the at least one second aperture, a certain amount of coffee beans may move, e.g. fall, towards the outlet and out of the interior volume. Thus, by repeatedly aligning the at least one aperture with the at least one second outlet, the supply of coffee beans can be controlled. It may thus be clear that, in this or other embodiments, the outlet may comprise a plurality of apertures, e.g. comprising the at least one second aperture. The plurality of apertures that may form the outlet may or may not be mutually interconnected.

In an embodiment the moveable structure includes a plunger.

Preferably the second coffee bean packaging cartridge is further provided with a barrier in the interior volume arranged for hindering passage of the coffee beans towards the outlet. Such a barrier may substantially prevent uncontrolled movement of coffee beans towards the outlet.

Preferably the barrier includes a valve for hindering passage of the coffee beans towards the outlet. Such a valve may substantially prevent uncontrolled movement of coffee beans towards the outlet. Preferably, the valve includes a flexible element that is deformed when the valve is opened.

In an embodiment the barrier includes an internal wall spaced apart from, in use, a top part of the container, wherein the transportation means are arranged for moving the coffee beans through a space between the, in use, top part of the container and the internal wall. The internal wall may, in use, form a barrier for coffee beans to reach the outlet. By moving the coffee beans upwards by means of the moveable structure, the coffee beans may be transported over the internal wall. In this way, the coffee beans may reach the outlet.

Preferably the internal wall separates a first part of the interior volume from a second part of the interior volume, wherein the moveable structure is arranged in the first part of the interior volume, and wherein the outlet can be reached via the second part of the interior volume.

In an embodiment the moveable structure of the second coffee bean packaging cartridge is resiliently attached to the second coffee bean packaging cartridge by means of a resilient member, so that the moveable structure is moveable by means of the manually operable actuation means repeatedly between a first position and a second position while deforming the resilient member, e.g. from the first position to the second position while deforming the resilient member and vice versa. In use, deformation of the resilient member may e.g. occur during movement from the first position to the second position. During movement back from the second position to the first position, i.e. "vice versa", the deformation of the resilient member may be decreased or may even be completely cancelled. As a result, the resilient member promotes movement of the moveable structure from the second position back to the first position. As a result, it is sufficient to apply a force on the actuation means substantially in only one direction. This facilitates relatively easy operation of the actuation means.

Preferably the second coffee bean packaging cartridge is provided in the interior volume with a passage for the coffee beans towards the outlet, wherein in the second position the passage is at least partly obstructed by the moveable structure and in the first position the passage is obstructed less by the moveable structure than in the second position and optionally is not obstructed by the moveable structure. However, alternatively, in the first position the passage is at least partly obstructed by the moveable structure and in the second position the passage is obstructed less by the moveable structure than in the first position and optionally is not obstructed by the moveable structure.

Preferably, the first position is located, in use, above or below the second position. Preferably, at least part of the coffee beans is located, in use, above the moveable structure of the second coffee bean packaging cartridge. If the first position is located above the second position, and at least part of the coffee beans is located above the moveable structure, moving the moveable structure repeatedly between the first position to the second position, may result in a shaking motion of the coffee beans. During movement from the second position to the first position, the coffee beans may move, in use, upwards, driven by the resiliently deformable member. During movement from the first position to the second position, the coffee beans may move, in use, downwards, driven by gravity. Such a shaking motion is considered advantageous, as it may promote movement of the coffee beans through the interior volume towards the first position.

In an embodiment, the second bean packaging cartridge is provided with a recess in the container or housing for receiving the drive shaft of the coffee brewing apparatus. In this way, the second bean packaging cartridge, although being manually operable, can be used in combination with a coffee brewing apparatus provided with a drive member, such as a motor. Such a drive shaft may be arranged for driving transportation means of an alternative coffee bean packaging cartridge. Preferably the container is closed in the recess.

Alternatively the recess may e.g. be arranged for preventing mechanical contact between the drive shaft and the cartridge. In this way it is enabled that the cartridge may be used in combination with the brewing apparatus or in addition another external apparatus that is provided with the drive member, while the cartridge can also be used in combination with another external apparatus that is not provided with an external drive member.

Preferably, the transportation means are positioned for preventing, in use, driving of the transportation means by means of the drive shaft of the coffee brewing apparatus.

In an embodiment the second coffee bean packaging cartridge comprises a scooper for holding and supplying the coffee beans, the scooper, when connected to the coffee brewing apparatus, being aligned with the entrance opening thereof, the scooper being configured to work also as transportation means by turning around its axis, thereby emptying the coffee beans into the entrance opening. The dosing of the amount of coffee beans to be supplied to the coffee brewing apparatus is very simple here; it is done by filling the scooper.

Preferably the second coffee bean packaging cartridge comprises a handle for manually turning the scooper.

According to an alternative embodiment the second coffee bean packaging cartridge comprises a hopper for holding the coffee beans. The hopper preferably has an outlet, which is aligned with the entrance opening of the coffee brewing apparatus, when the second coffee bean packaging cartridge is connected thereto. The transportation means advantageously comprise a closure plate, which in a first position at least to a large extent and preferably entirely closes the outlet, thereby hindering passage of the coffee beans towards the entrance opening and in a second position does not obstruct or not substantially obstruct the outlet and wherein the transportation means further include manually operable actuation means for actuating the closure plate from the first to the second position and vice versa. The amount of coffee beans supplied to the coffee brewing apparatus may be dosed by moving the closure plate of the transportation means between the first position, wherein coffee beans are supplied to the coffee brewing apparatus and the second position, wherein this is not the case.

Preferably the closure plate in the second position at least substantially delimits a first part of the interior volume of the hopper from a second part of the interior volume of the hopper, thereby hindering the passage of coffee beans from the first part to the second part. The amount in the second part corresponds to a single dose, which when the closure plate is in the first position, is provided to the coffee brewing apparatus.

Preferably the closure plate forms the first part of a virtual cylinder, the other part of the cylinder being open, wherein the manually operable actuation means are configured for rotating the closure plate to the first and second position, respectively. With each rotation, a dose of coffee beans corresponding to the second part of the interior volume of the hopper is supplied to the coffee brewing apparatus.

At least one of the first and second coffee bean packaging cartridges may comprise a funnel shaped holder for holding the coffee beans and an outlet for releasing the coffee beans from the holder. The outlet is positioned at an upper end of the funnel shaped holder and, when the coffee bean packaging cartridge is connected to the coffee brewing apparatus is aligned with the entrance opening thereof, wherein the transportation means are spiral shaped transportation means and, in use, rotatably actuated for driving the coffee beans out of the funnel shaped holder towards the outlet The amount of coffee beans supplied to the coffee brewing apparatus is in this case dependent on the time period that the spiral shaped conveyor means are rotated with coffee beans in the funnel shaped holder.

Preferably the spiral shaped conveyor means are formed by a spiral shaped trajectory for the coffee beans on the inner wall of the funnel, obtained by a spiral shaped protruding edge on the inner wall. The spiral shaped conveyor means may comprise a non-moving block element, impeding the coffee beans to continue rotating on the inner wall, thereby driving the coffee beans to follow the spiral shaped trajectory upwards towards the outlet. As a result, the coffee beans in the funnel shaped holder are driven steadily and reliably towards the outlet thereof.

According to a still further embodiment, at least one of the first and second coffee bean packaging devices is configured for shaking or vibrating the coffee beans to encourage flow thereof towards an outlet of the coffee bean packaging cartridge for releasing the coffee beans. In this way, an alternative manner of providing the coffee beans to the coffee brewing apparatus is obtained. Preferably the coffee bean packaging cartridge comprises a first module, which is a coffee bean package and a second module, which comprises a motor, the first module being removably connectable to the coffee brewing apparatus and the second module being removably connectable to the first module, when the first module is connected to the coffee brewing apparatus. As a result of this modular structure, the coffee beans of the first module may either be supplied to the coffee brewing apparatus due to the operation of the motor in the second module or, in case that the second module is not connected to the first module, due to operation of the transportation means present in the coffee brewing apparatus.

Still further, wherein the outlet of the coffee bean packaging cartridge is open when it is connected to the coffee brewing apparatus and closed when it is disconnected, and wherein the second module, preferably in a coffee bean refill mode, is connectable to the first module in lieu of the coffee brewing apparatus. Preferably, in the coffee bean refill mode, the second module is connected in a same or similar way to the first module as the coffee brewing apparatus, resulting in the outlet of the first module being open. As a result, the first module, i.e. the coffee bean package, may be refilled with coffee beans in a user friendly way.

The system may further comprise an insert piece that is removable connectable to the coffee brewing apparatus in lieu of the coffee bean packaging cartridge, preferably in a same or similar way as the coffee bean packaging cartridge by using means for connecting the insert piece to the coffee brewing apparatus, which are the same or similar as the means used for connecting the coffee bean packaging cartridge to the coffee brewing apparatus. In this case, the insert piece comprises bayonet elements and a protruding part, preferably located below or above one of the bayonet elements, for activating the switch when the insert piece is connected to the coffee brewing apparatus. Since the detection of the connected coffee bean packaging cartridge and the insert piece is executed in the same way, the controller of the coffee brewing apparatus does not see any difference between these two situations. This means that the functionality of the coffee brewing apparatus is also the same.

The purpose of connecting an insert piece to the coffee brewing apparatus may be twofold. It is usable for unlocking the coffee brewing apparatus, so that the motor and the grinder(s) may be activated, also if no coffee bean packaging cartridge is connected thereto. This is useful for service and maintenance.

Alternatively, the insert piece may be used for supplying the coffee brewing apparatus with coffee beans, because the coffee bean packaging cartridges are designed not to be refillable. A favorable embodiment of an insert device for this purpose comprises a cavity having an interior volume and at least one exit opening defining a coffee bean outlet, the interior volume being arranged for receiving coffee beans. The insert piece further comprises closing means for closing the coffee bean outlet when the insert piece is not connected to the coffee brewing apparatus or not connected to the coffee brewing apparatus in its final position. The closing means are configured for opening the coffee bean outlet when the insert piece is connected to the coffee brewing apparatus in its final position. A user fills the cavity with coffee beans when the insert piece is connected to the coffee brewing apparatus in an entry position and then rotates the insert piece to its final position, resulting in the coffee beans to enter the coffee brewing apparatus to be ground.

Advantageously, the system may be arranged such that upon activation of the grinder the bottom portion is rotating around the vertical axis for transporting the dose of coffee beans from the metering chamber into the grinder and for grinding the coffee beans. The bottom part with the conical shape may lie in the direction of the first vertical axis, wherein the conical part rotates around the first vertical axis upon driving the grinder. The grinder may comprise a lower grinding disk extending around the bottom portion and an upper grinding disk extending above the lower grinding disk. The grinder may be rotationally driven by a second motor, resulting in the rotation of the bottom part with the conical shape and the lower grinding disk. Upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

The grinder may be a no contamination grinder, wherein after grinding the coffee beans and supplying the ground coffee to the coffee brewing device, substantially no ground coffee remains. As a result, when the cartridge is replaced by one with a different blend, the coffee of the new blend is not contaminated by the previously used blend.

The second chamber portion may comprise about 100-X % of the volume of the metering chamber and the first chamber portion may comprise about X % of the volume of the metering chamber wherein X is in the range of 2-50, preferably in the range of 5-40, more preferably in the range of 15-30. By placing a larger part of the metering chamber in the brewing apparatus a further decrease in the height of the beverage system may be obtained. This may be an issue, for example in case that the beverage system is to be placed on a kitchen sink under a cupboard.

According to a further aspect of the invention a second coffee bean packaging cartridge for use with the inventive system is provided, wherein said second coffee bean packaging cartridge being arranged for holding and supplying coffee beans, said second coffee bean packaging cartridge including a second dosing device for supplying a dose of coffee beans. Preferred embodiments are described in the respective dependent claims.

According to a further aspect of the invention a method is provided for preparing a beverage by means of a coffee brewing apparatus as described herein above. In an emptying and grinding step the grinding device is activated for emptying the metering chamber and for grinding coffee beans collected in the metering chamber. The grinding device may be activated longer than is required for emptying or at least substantially completely emptying the metering chamber and for grinding all the coffee beans collected in the metering chamber. The method comprises the following steps: In a filling step the metering chamber may be filled with coffee beans for collecting coffee beans in the metering chamber. The metering chamber may be completely filled with coffee beans or at least substantially completely filled with coffee beans.

According to still a further aspect of the invention a method for preparing a beverage by means of the inventive system is provided, wherein the method comprises the following steps: in a first step the transportation means is driven longer than is required for filling the metering chamber with coffee beans; and in a second step which follows after the completion of the first step the grinding device is activated longer than is required for emptying the metering chamber and for grinding all the coffee beans which were collected in the metering chamber during the first step.

According to another aspect of the invention a method for brewing coffee is provided, wherein a cartridge filled with coffee beans is coupled to a coffee brewing apparatus, wherein by means of the coupling between the cartridge and the coffee brewing apparatus a metering chamber is formed, wherein subsequently the metering chamber is filled with coffee beans from the cartridge, the metering chamber subsequently is emptied by means of activation of a grinder, wherein the coffee beans of the metering chamber are ground by the activation of the grinder and subsequently coffee is brewed with the coffee brewing apparatus based on the ground beans and heated water.

According to still another aspect of the invention a method for preparing a beverage by means of the inventive system is provided wherein the method comprises the following steps:
in a first step the metering chamber is filled with coffee beans; and
in a second step which follows after the completion of the first step the grinding device is activated for emptying the metering chamber and for grinding coffee beans which were collected in the metering chamber during the first step.

According to a further aspect of the invention a method of preparing a beverage by means of the inventive coffee beverage system is provided comprising the following steps:
connecting the first coffee bean packaging cartridge to the coffee brewing apparatus,
rotating the vertically extending drive shaft with the motor means thereby driving and moving the transportation means of the first coffee bean packaging cartridge for preparing and transporting a dose the coffee beans towards the exit opening of the first coffee bean packaging cartridge;
grinding coffee beans which have entered the coffee brewing apparatus via the entrance opening thereof to produce ground coffee;
brewing coffee on the basis of ground coffee;
connecting the second coffee bean packaging cartridge to the coffee brewing apparatus,
actuating the second dosing device of the second coffee bean cartridge for preparing and transporting a dose of coffee beans towards the exit opening of the second coffee bean packaging cartridge independently from the coffee brewing apparatus;
grinding coffee beans which have entered the coffee brewing apparatus via the entrance opening thereof to produce ground coffee;
brewing coffee on the basis of ground coffee. Preferably the step of actuating the second dosing device of the second coffee bean cartridge for preparing and transporting a dose of coffee beans towards the exit opening of the second coffee bean packaging cartridge is carried out prior to the step of connecting the second coffee bean packaging cartridge to the coffee brewing apparatus.

Furthermore the invention relates to a method of supplying coffee beans from the inventive second coffee bean packaging cartridge to an external apparatus, the method comprising the following steps:
holding the coffee beans in a housing that encloses an interior volume of the second coffee bean packaging cartridge,
manually activating the second dosing device for providing a dose of coffee beans,
releasing the coffee beans from the interior volume through the outlet of the housing,
transporting the coffee beans by means of the transportation means towards the outlet, wherein transporting the coffee beans includes contacting the coffee beans by means of the moveable structure of the transportation means,
actuating the moveable structure by means of manually operable actuation means of the transportation means.

Further advantageous aspects of the invention will become clear from the appended description of preferred embodiments.

BRIEF DESCRIPTION OF THE DRAWINGS

The invention will now be described in reference to the accompanying drawings, in which:

FIG. 13A shows in cross-section a further embodiment of a coffee bean packaging cartridge in its not yet activated position;

FIG. 13B shows the coffee bean cartridge of FIG. 2A in its activated position;

FIG. 13C shows the component of the coffee bean cartridge of FIGS. 13A and 13B in half and in an exploded arrangement, FIG. 13D is a perspective view of the coffee bean cartridge of FIG. 13A in a condition prior to use;

FIG. 14A is a cross-section of a further embodiment of the coffee bean packaging cartridge in its condition prior to use;

FIG. 14B is a cross-section similar to FIG. 14A, but with the coffee bean cartridge having been activated for use;

FIG. 16A is a cross-section showing another embodiment of the coffee bean packaging cartridge in its closed position prior to use;

FIG. 16B is a cross-section similar to FIG. 16A but with the bean cartridge in an opened condition ready for use;

DESCRIPTION OF EXEMPLARY EMBODIMENTS

Figure 1:
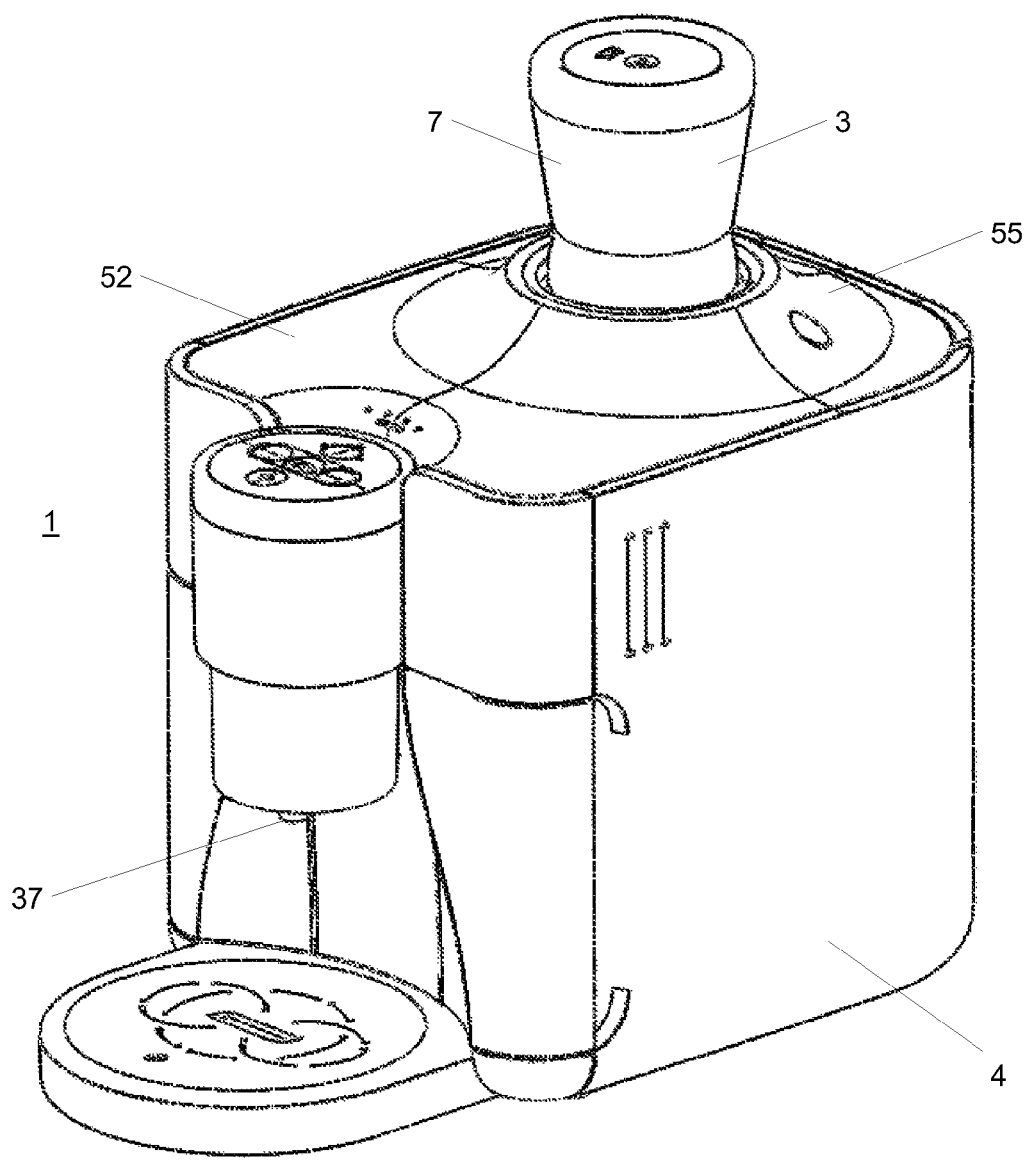
FIG. 1 shows a perspective view of an embodiment of the coffee brewing system according to the present invention with the coffee bean packaging cartridge mounted to the coffee brewing apparatus.
Figure 2:
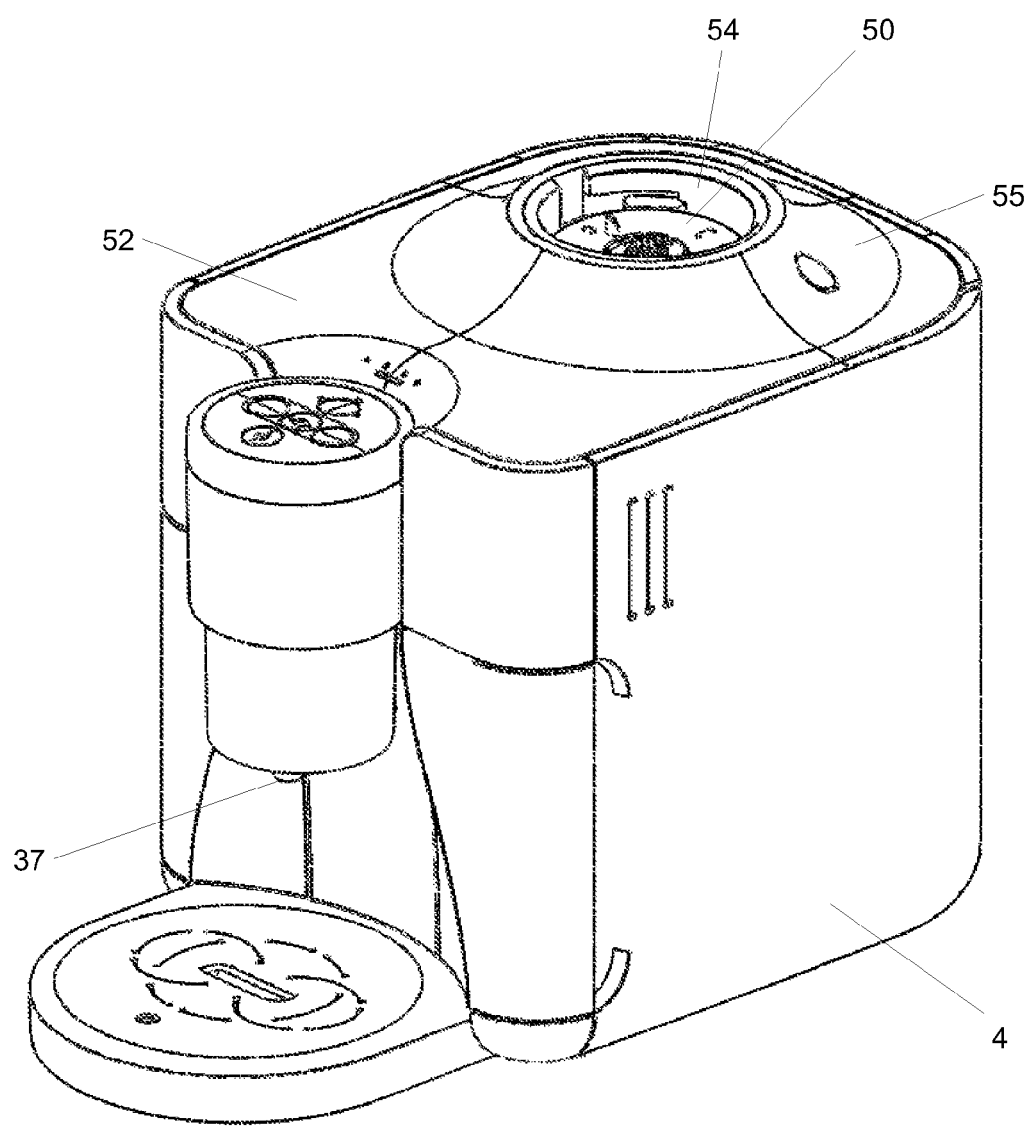
FIG. 2 shows a perspective view of an embodiment of the coffee brewing system according to the present invention without the coffee bean packaging cartridge mounted to the coffee brewing apparatus.

In FIG. 1 a system 1 for preparing coffee beverages is shown. The system 1 includes a first coffee bean packaging cartridge 3 and a coffee brewing apparatus 4. The first coffee bean packaging cartridge 3 is removably connected to the coffee brewing apparatus 4. FIG. 2 shows the coffee brewing apparatus without the first coffee bean packaging cartridge 3 mounted thereon. The first coffee bean packaging cartridge 3 comprises a container 7 comprising an interior volume for containing coffee beans and an exit opening. These coffee beans are roasted and include generally roasted half beans. Preferably the first coffee beans packaging cartridge 3 is closed airtight and/or under vacuum before it is placed on the coffee brewing apparatus 4. Also the first coffee bean packaging cartridge 3 can be in the form of a disposable packaging, so that it can be thrown away after it has been emptied.

Figure 3A:
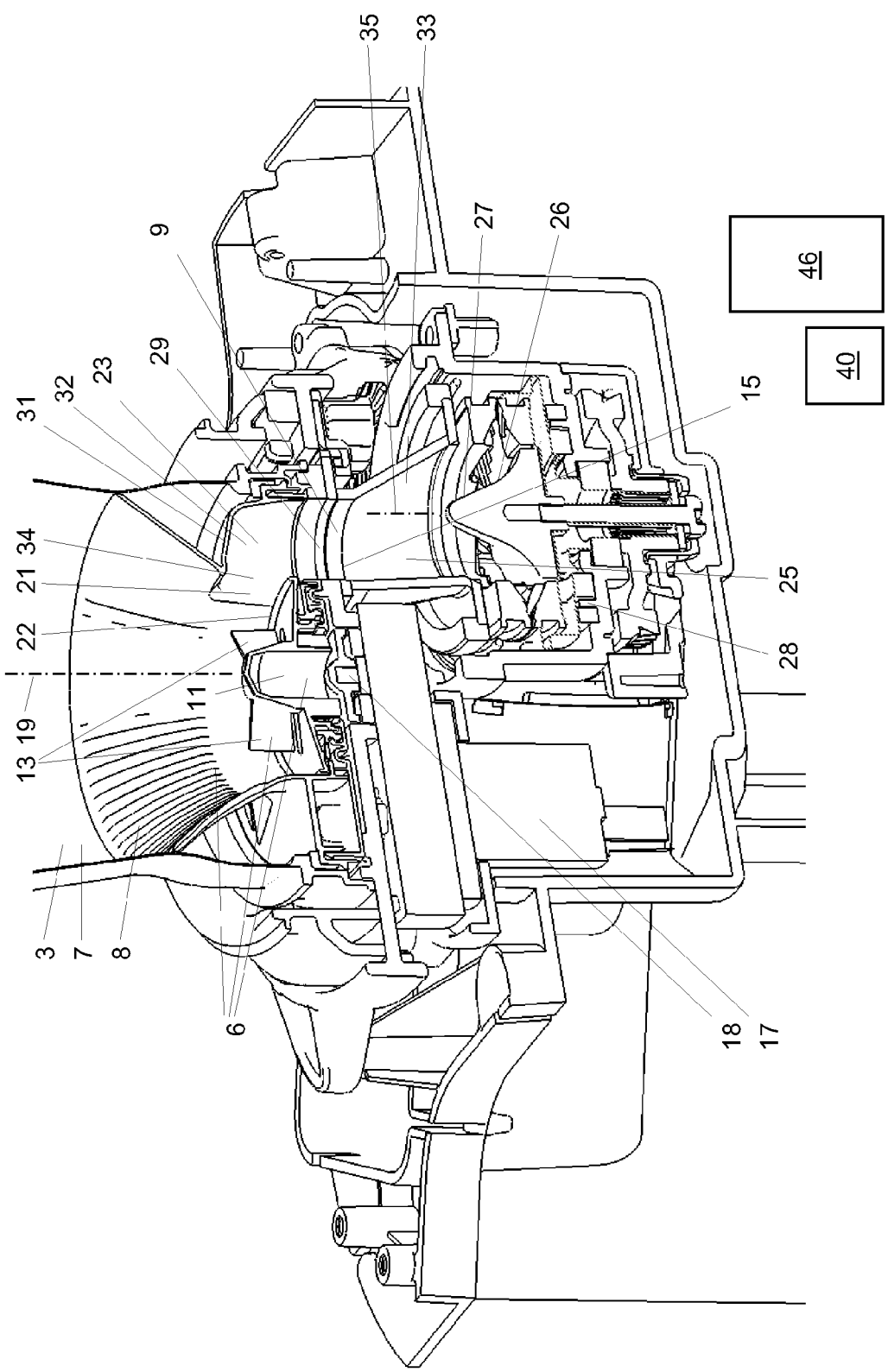
FIG. 3A shows a cross sectional view of a part of the coffee brewing system according to FIG. 1 in perspective.

Referring now to FIG. 3A, the coffee beverage system 1 will be described in more detail. The first cartridge comprises transportation means 6 for enabling transportation of the coffee beans from the interior volume of the container 7 (only partially visible in FIG. 3) towards the exit opening 29 of the first cartridge 3. The coffee apparatus is provided with an entrance opening 9 for receiving coffee beans which are transported by means of the transportation means towards the exit opening 29. The exit opening 29 extends above the coffee bean entrance opening 9 of the coffee brewing apparatus 4.

A lower part of the container 7 comprises a funnel 8 which forms part of the transportation means 6. The beans of the first coffee bean packaging cartridge 3 are guided by means of the funnel 8 towards the exit opening 29 of the cartridge. The transportation means further comprise an impellor 11 having several flexible vanes 13. Upon driving the transportation means, in this example by rotating the impellor around a second axes 19 extending in a vertical direction the coffee beans are transported towards the exit opening 29.

The system further comprises a first dosing device which is for preferably driven by the motor for providing and supplying a predetermined dose of coffee beans from the first coffee bean packaging cartridge to the grinder and a metering chamber 15. The metering chamber is divided in a first chamber portion 23 which is part of the first cartridge and a second chamber portion 25 which is part of the coffee brewing apparatus. The first chamber portion is located above the second chamber portion. The first chamber portion comprises the exit opening 29 of the cartridge and the second chamber portion comprises the entrance opening of the coffee apparatus. The first chamber portion is provided with an upstanding side wall 32 comprising an inlet opening 21 for letting pass coffee beans into the metering chamber which coffee beans are transported by means of the transportations means towards the exit opening of the first cartridge. The transportation means are thus configured for transporting the coffee beans towards and into the metering chamber 15 of the coffee beverage system 1 upon driving of the transportation means. This driving is performed by means of a first motor 17 of the coffee apparatus, driving a drive shaft 18 of the coffee apparatus extending along a vertical axis 19. Due to the driving, the impellor 11 and the vanes 13 rotate around the second vertical axis 19. In this way, the coffee beans are driven in a horizontal direction to the inlet opening 21 of the metering chamber 15. The first cartridge comprises a small trickle through edge 22 to avoid the uncontrolled entering of coffee beans in the metering chamber 15 when the impeller 11 is not rotating. The metering chamber 15 comprises the first chamber portion 23 in the first cartridge 3 and the second chamber portion 25 in the brewing apparatus 4. The bottom 26 of the metering chamber at least comprises a bottom portion 27 which is part of a grinder 28 for grinding coffee beans. The coffee beans leave the first chamber portion 23 and thereby the first cartridge 3 via the exit opening 29 of the first cartridge 3 and enter the second chamber portion 25 and thereby the coffee brewing apparatus via the entrance opening 9. The size of the metering chamber is limited by a top wall 31, the bottom 26 and an upstanding side wall 32. The upstanding side wall 32 comprises the upstanding side wall 34 of the first chamber portion and an upstanding side wall 33 of the second chamber portion. The second chamber portion comprises about 100-X % of the volume of the metering chamber and the first chamber portion comprises about X % of the volume of the metering chamber wherein X is in the range of 2-50, preferably in the range of 5-40, more preferably in the range of 15-30. Thus the first dosing device in this embodiment is provided by a combination of the relevant parts of the first coffee bean packaging cartridge (such as the transportation means) and the brewing apparatus (e.g. (part) of the metering chamber thereof) described above. Alternatively the first dosing device may be completely formed by parts of the coffee brewing apparatus.

The bottom part 27 of the metering chamber has a conical shape such that the bottom portion extends downwardly in a direction extending perpendicular to and away from a vertical axis 35. The grinder 28 in this embodiment is positioned centrically with respect to the second chamber portion 25.

Figure 3B:
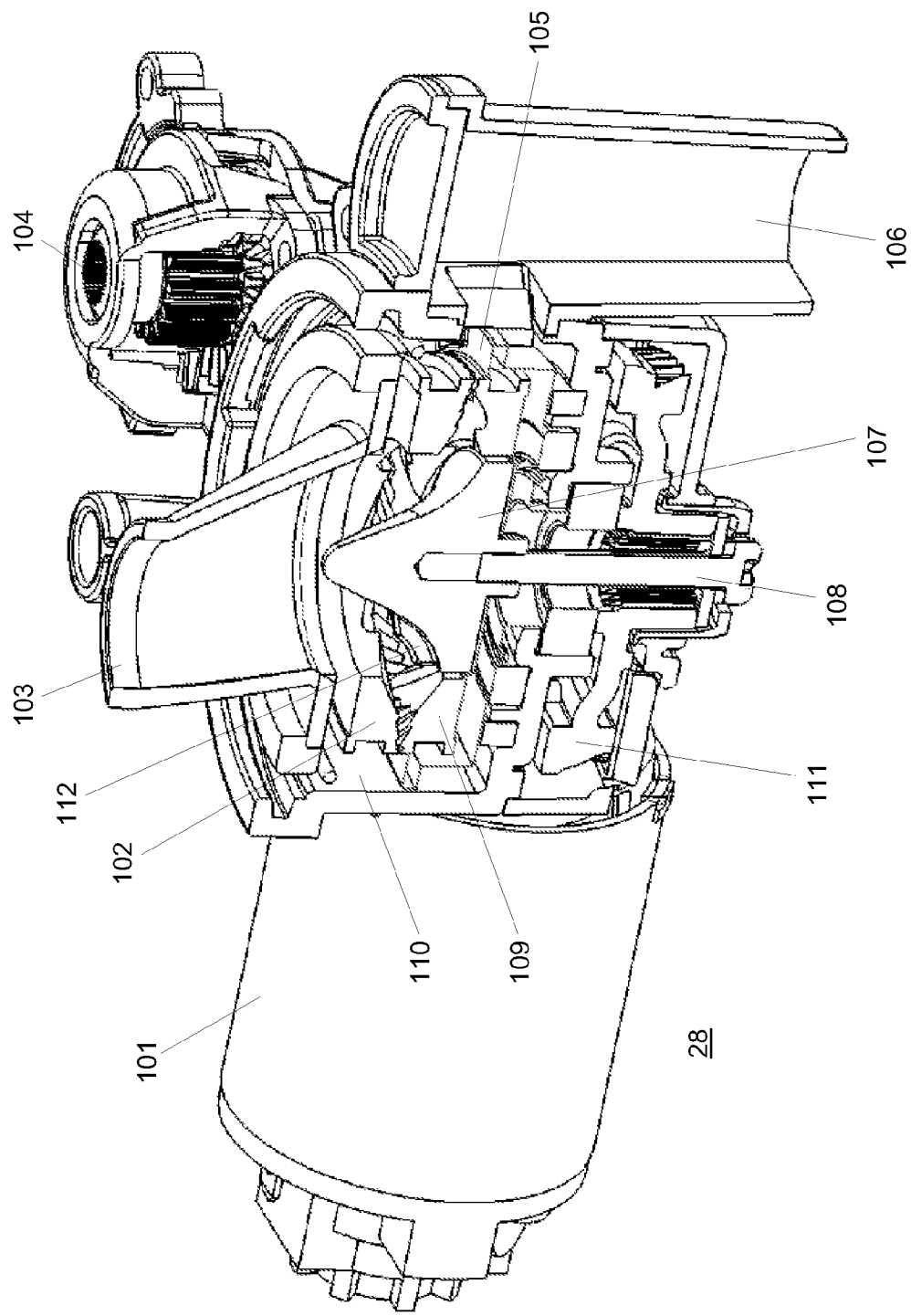
FIG. 3B shows a cross sectional view of the grinder used in the coffee brewing system according to FIG. 1 in perspective.
Figure 3C:
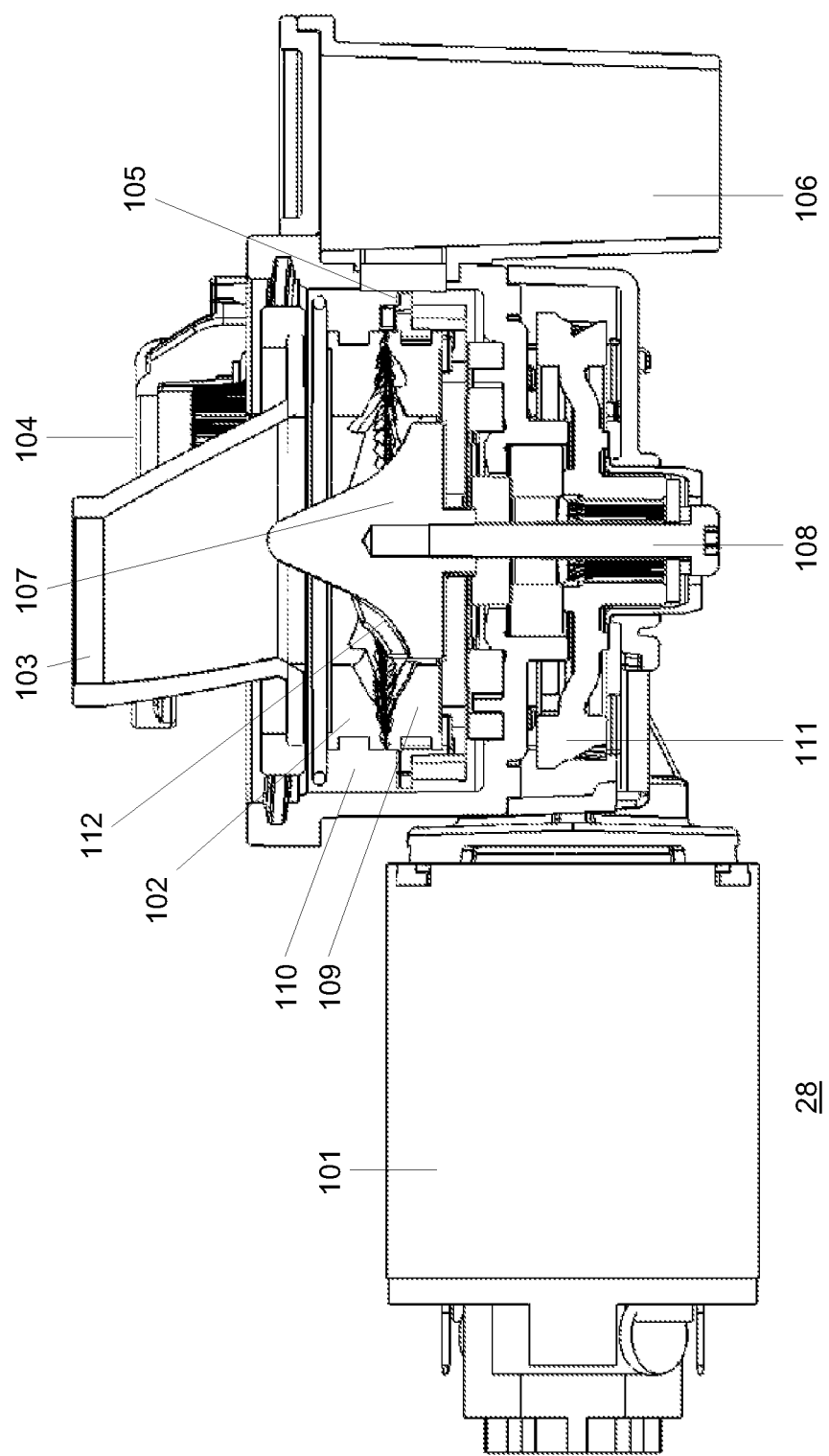
FIG. 3C shows a cross sectional view of the grinder used in the coffee brewing system according to FIG. 1.

Referring now to FIGS. 3B and 3C, the grinder will be described in more detail. The grinder comprises a second motor (grinder drive motor) 101 and an upper grinding disk/wheel 102, which may be ceramic or steel. The upper grinding disk/wheel is rotationally fixed in its position. Furthermore, the second chamber 103 of the metering chamber is shown (referred to by reference 25 in FIG. 3A), which works as dosing funnel. The grinder furthermore comprises a manual adjustment lock 104 to adjust the grind fineness setting by the consumer. The upper grinding disk 102 is moved up or down in respect to the lower grinding disk/wheel 109 when this key is turned. When the adjustment lock is operated, the upper grinding disk moves up and down and the lower grinding disk stays in place. In this way the size of the grind at the exit of the grinding disks, i.e. where they almost touch the outside of the grinder, is determined. The grinder furthermore comprises an exit location 105 for ground coffee out of the circular transport channel 110 into the ground coffee chute 106. The ground coffee chute is a funnel pointing downwards into the brewing device 46 of the coffee brewing apparatus, which is open on the top and placed exactly below this chute when grinding. A rotating drive cone 107 (referred to as bottom part with conical shape 27 of the metering chamber in FIG. 3) is fixed on the main drive shaft 108. This cone ensures the movement and guidance of the beans out of the metering chamber into the grinding section consisting of the upper grinding disk 102 and the lower grinding disk 109, which may be ceramic or steel. The upper grinding disk 102 and the lower grinding disk 109 have a suitable milled shape for grinding the coffee beans, as is well known in the art. The main drive shaft drives the lower grinding disk 109 and the rotating drive cone 107. There is formed a circular transport channel 110, which transports the ground coffee exiting out of the slit between upper and lower grinding disk to the exit location 105. The shape of the channel results in a "no contamination" grinder, wherein virtually no coffee beans/ground coffee remains after finishing the grinding. Furthermore, the grinder comprises a motor transmission/gear 111 and a cone protrusion 112 to force the beans between the grinder disks.

The lower grinding disk 109 extends around rotating drive cone 107 and the upper grinding disk 102 extends above the lower grinder disk 109. The grinder is rotationally driven by motor 101 resulting in the rotation of the drive cone 107 and the lower grinding disk 109. Due to the shape of the cone protrusion 112 upon driving the drive cone 107 and the lower grinding disk coffee beans are moved in an outwardly extending radial direction between the lower grinding disk 109 and the upper grinding disk 102. Because a vertical distance between the lower grinding disk 109 and the upper grinding disk 102 decreases in the outwardly extending radial direction the beans are crunched and cut into ground coffee.

As explained, grinder 28 supplies ground coffee to a coffee brewing device 46 (schematically shown in FIG. 3) of the coffee brewing apparatus. The coffee brewing device is arranged to receive a supply of water to extract a coffee beverage from the ground coffee. The coffee beverage is discharged from a coffee beverage exit 37 from the coffee brewing apparatus into a cup or like household receptacle. A water supply can be arranged to supply water to the coffee brewing device under pressure for espresso type coffee beverages or may provide a drip feed to the extraction system formed by coffee brewing device.

Before operating the coffee beverage system, the user has to connect the first coffee bean package cartridge 3 to the coffee brewing apparatus 4. FIGS. 4-9 show an embodiment of the connection means of the coffee beverage system, which are used for this purpose.

Figure 4A:
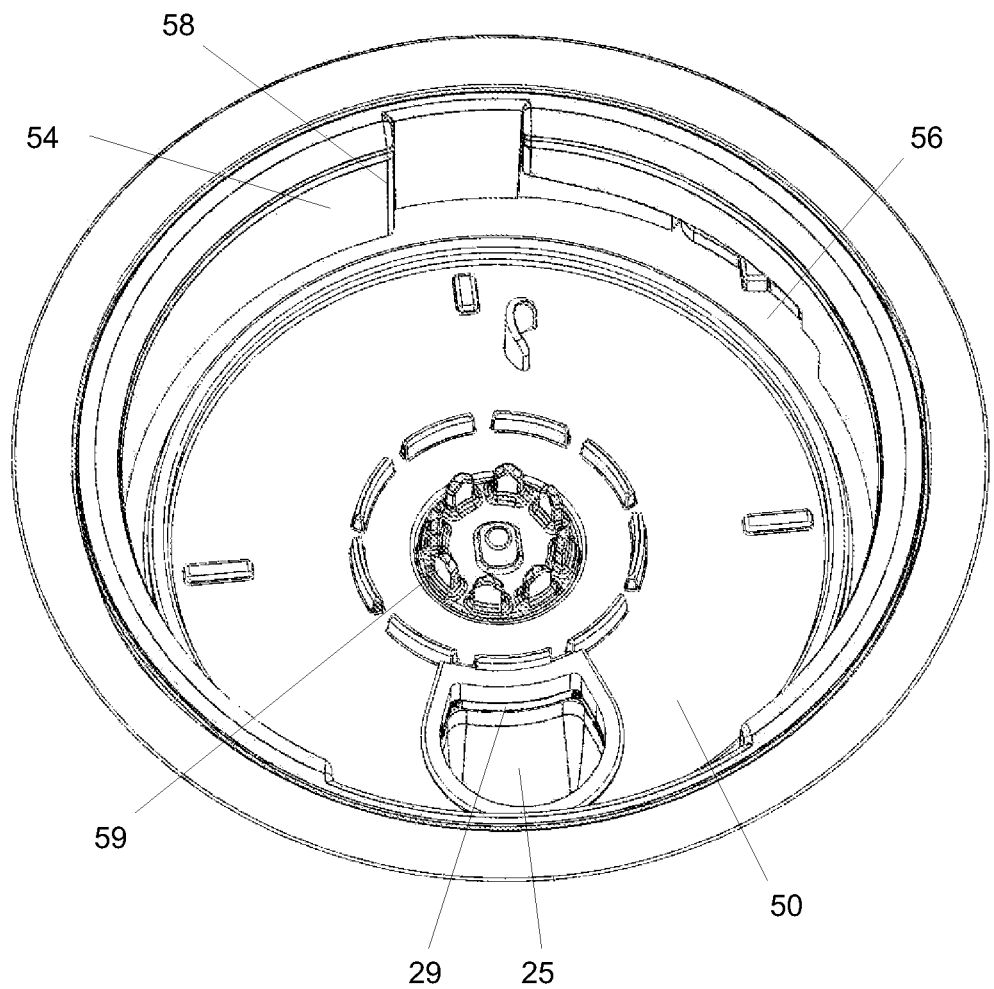
FIG. 4A shows a perspective detail view of the upper part of the coffee brewing apparatus of FIG. 2.
Figure 4B:
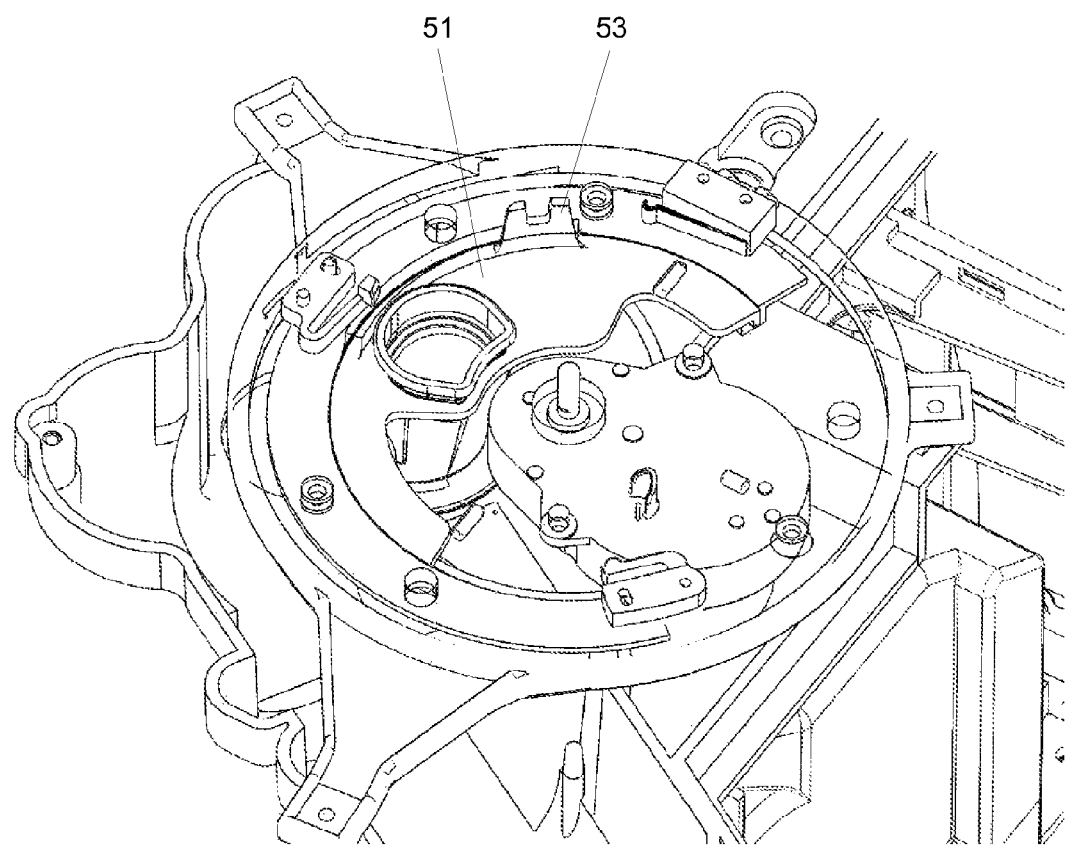
FIG. 4B shows a perspective detail view of the upper part of the coffee brewing apparatus of FIG. 2 with a closing plate in open position.

Referring now to FIG. 4, the connection means comprise a recess 50 at an upper side 52 of the coffee brewing apparatus 4. The recess 50 is surrounded by a side wall 54 protruding from the upper side of the coffee brewing apparatus 4. The user should place the corresponding part, shown in FIGS. 5A, 5B, 6, 6B, 6C, 7A, 7B, 7C, 8 and 9, at a lower side of the coffee bean packaging cartridge into the recess. The bayonet elements to be described later of the first coffee bean packaging cartridge should be placed in the corresponding openings 58 in the side wall 54 of the recess 50. The user should then rotate the first cartridge over 50 degrees until reaching the blocking elements 56 for impeding a further rotation of first the coffee bean packaging cartridge. At this position the exit opening 29 of the first chamber portion 23 is aligned with the coffee inlet 9 of the second chamber portion 25. When the first cartridge 3 is removed from the coffee brewing apparatus, the second chamber portion 25 in the appliance is closed by means of an appliance closing plate 51 (FIG. 4B) The appliance closing plate is being driven by a protrusion 1686 (FIG. 6C) on the neck of the first cartridge which slots into a keyhole 53 on the appliance closing plate as the first cartridge is being placed into the openings 58 in the side wall 54 of the recess 50. As the user rotates the first cartridge over a 50 degrees angle during placement the closing disk in the consumable and the closing plate in the appliance are opened, simultaneously.

Figure 5A:
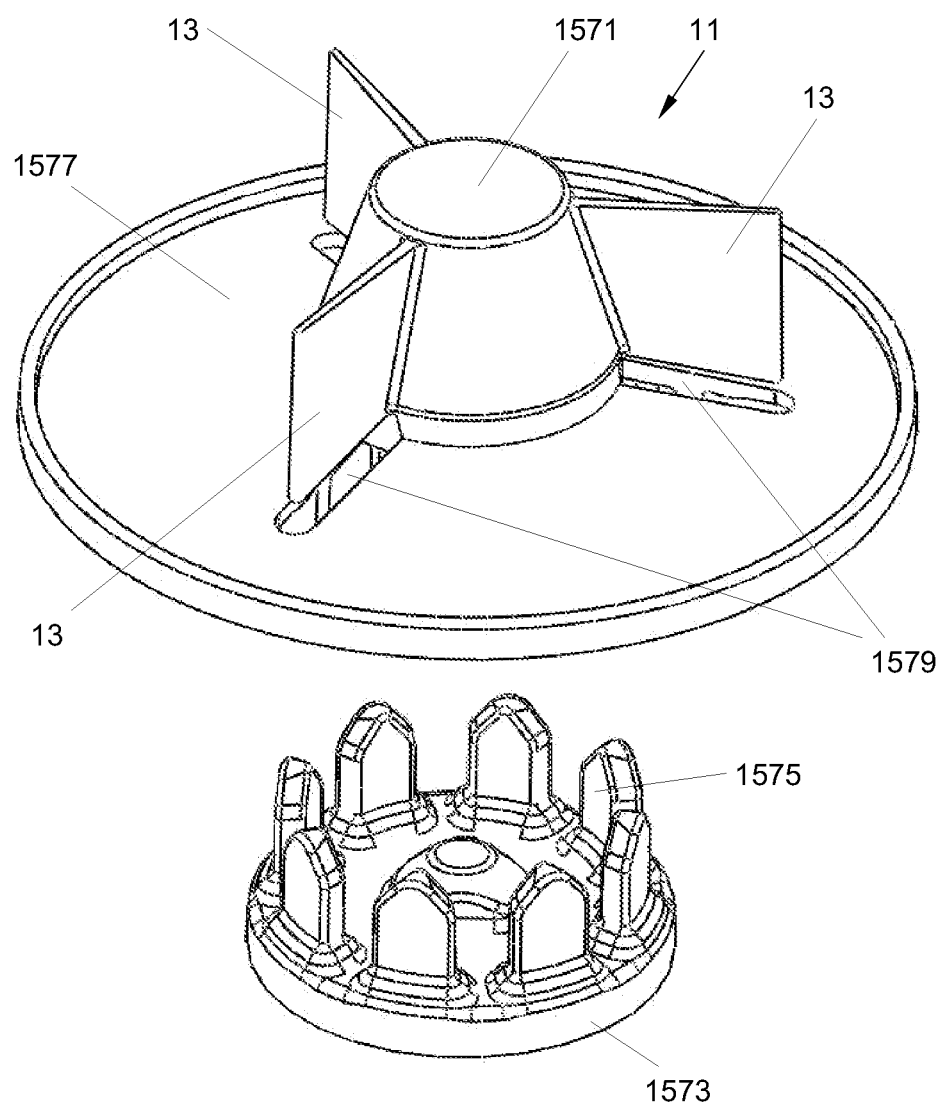
FIGS. 5A and 5B are two isometric exploded views of an impellor used in the coffee bean packaging cartridge together with a drive shaft coupling end.
Figure 5B:
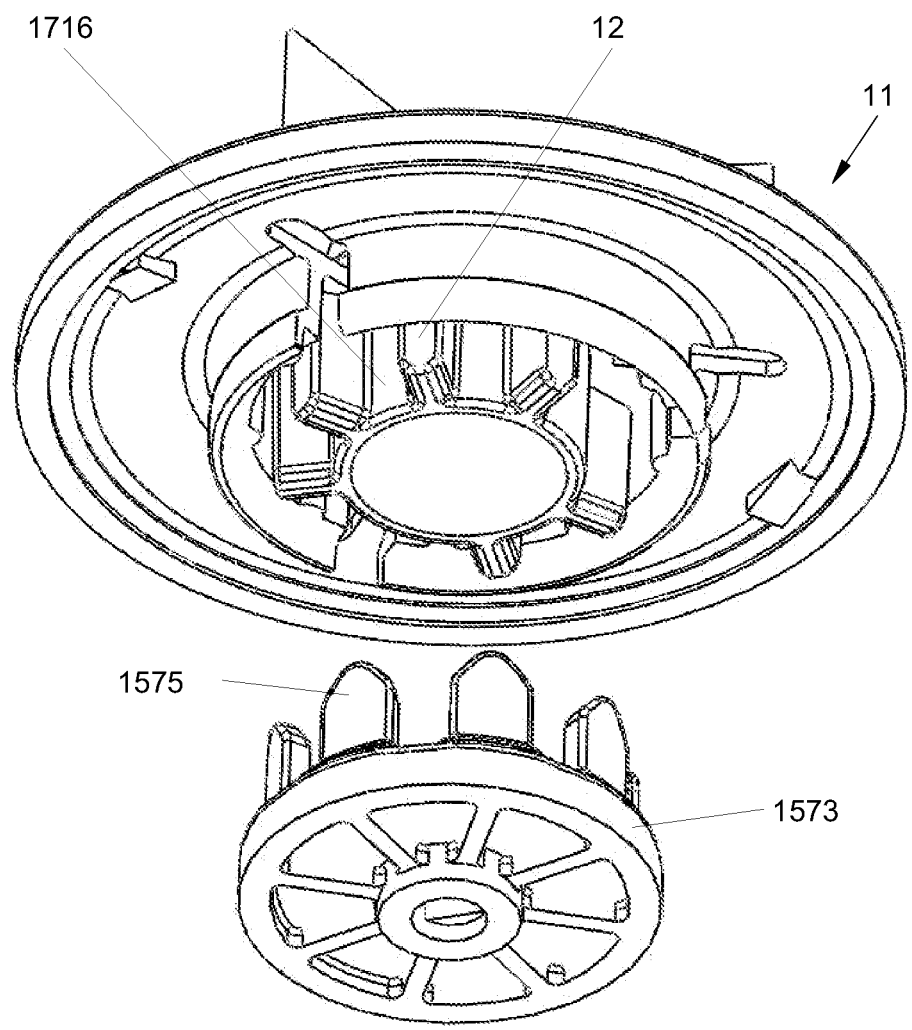

One suitable form of impellor 11 is shown in somewhat more detail in FIGS. 5A and 5B. To prevent the impellor 11 to get jammed by coffee beans that become locked between the perimeter aperture and radially extending vanes 13, such vanes 13 are preferably made from a resilient material. It is also possible to make the entire impellor 11 from a yieldable resilient material. The impellor 11 has a hollow hub portion engageable by a drive shaft end 1573 of a coffee preparing appliance. The drive shaft end 1573 may have a number of keys 1575 (preferably 4, 6 or 8) for engagement with corresponding protrusions, or keys in the interior of hollow hub 1571. To facilitate engagement of the impeller 11 and the drive shaft end upon placing of the first cartridge on the appliance the number of keys may differ between the drive shaft end 1573 and the hollow hub 1571. As illustrated in FIG. 5A the vanes 13 do not extend to the perimeter edge of the impeller 11, which may prevent beans from becoming jammed between the vanes 13 and the perimeter aperture. As indicated hereinabove the vanes may also be of a flexible material and to provide more flexibility to the vanes the vanes are conveniently also unattached to the impellor base 1577, by leaving a gap 1579. To fill the metering chamber some fifteen revolutions of the impeller 11 will normally suffice. However, to ensure filling under even adverse conditions, it may be convenient to allow for some extra revolution such as thirty or twenty-five in total. For filling of the dosing volume the conveying impeller 11 including both the impellor base 1577 (bottom) and the vanes 13 is rotated with a rotational speed in the range of 100 to 500 rpm, and preferably between 250 and 300 rpm. Due to the centrifugal force created by the rotation of the impellor base 1577 and the rotation of the vanes the coffee beans are driven in an outward direction towards the inlet opening 21 of the metering chamber. Once the filling of the dosing volume has been accomplished, the appliance will switch from driving the impeller 11 to driving its grinder. With the impeller 11 immobilised the metering chamber will gradually empty into the grinder. Because the impeller 11 is inactive, no beans will escape from container 7, also because of the presence of the trickle through edge 22. Thus the first dosing device is completely controlled by the brewing apparatus to provide a predetermined dose of coffee beans to the grinder.

Figure 6A:
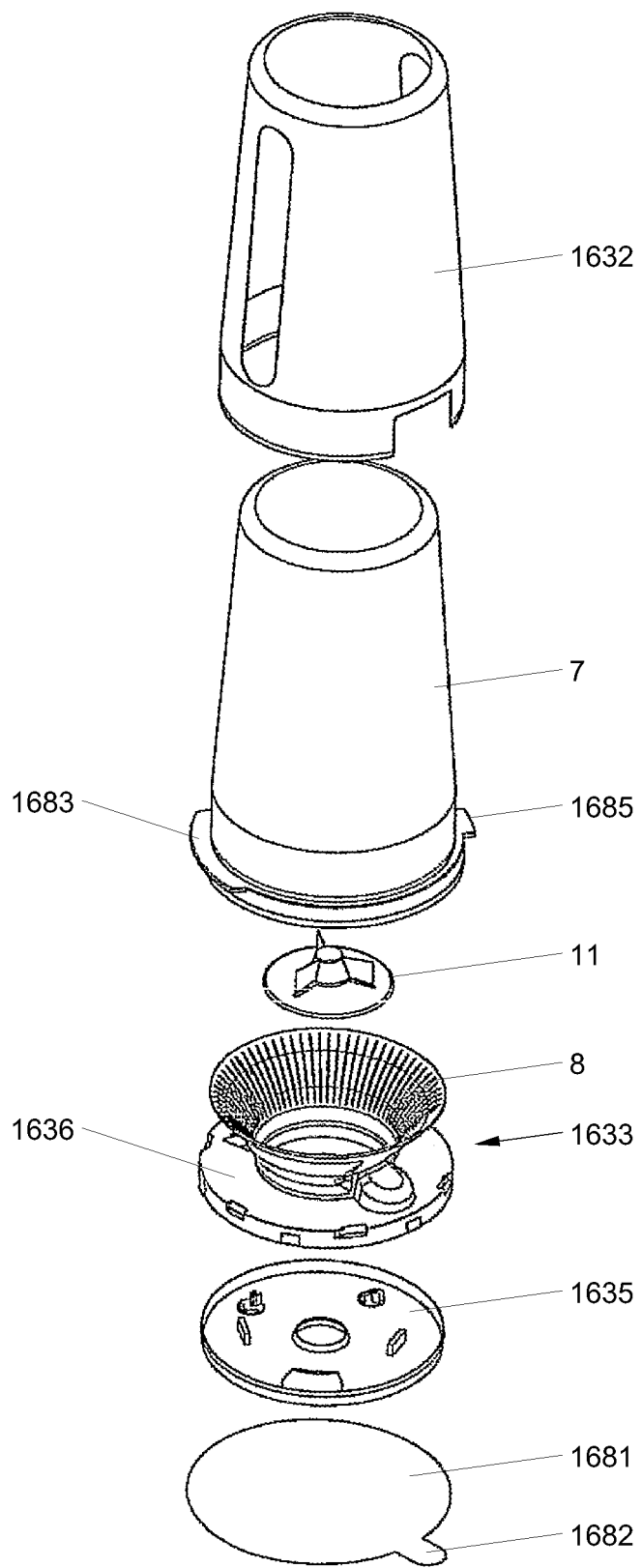
FIG. 6A is an exploded isometric view of a coffee bean packaging cartridge according to an embodiment of the invention.
Figure 6B:
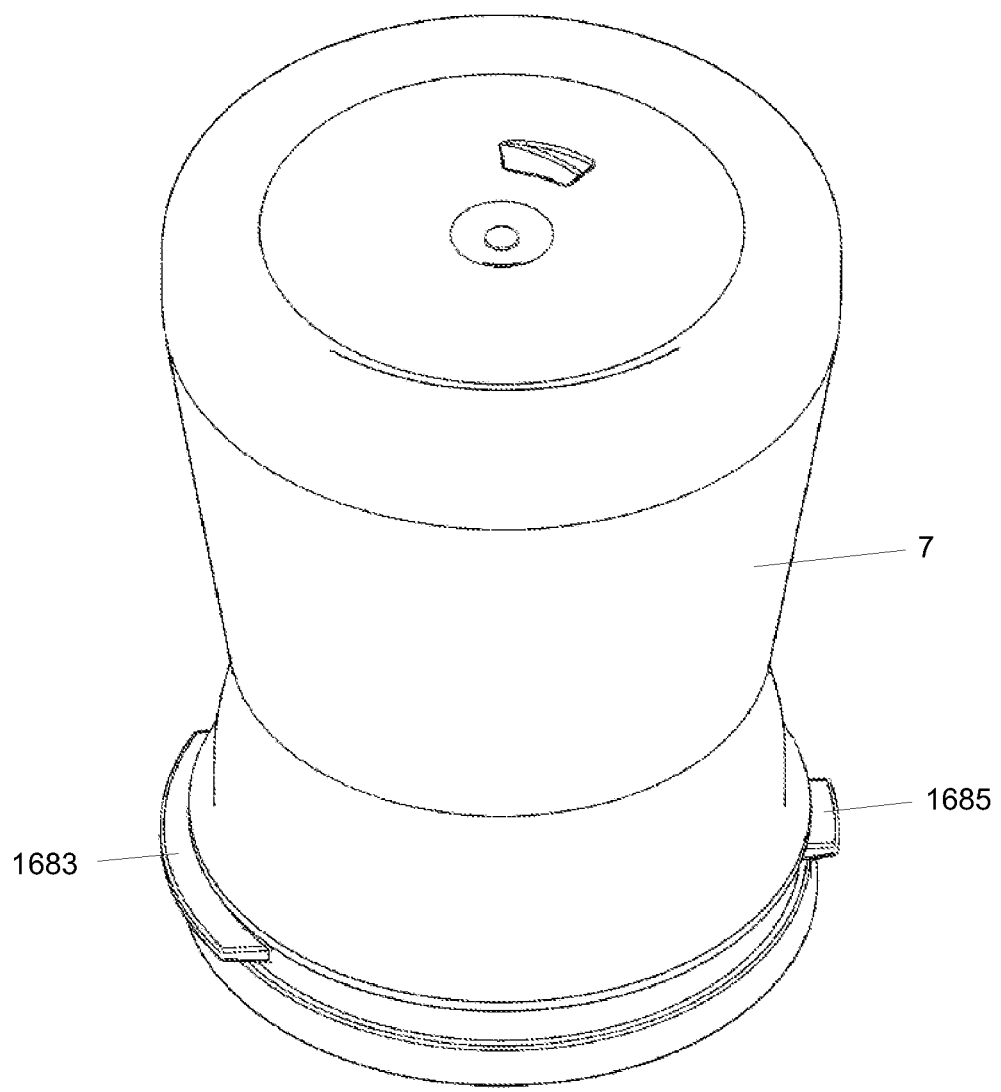
FIGS. 6B, 6C and 6D show two different perspective views of the coffee bean packaging cartridge shown in FIG. 6.
Figure 6C:
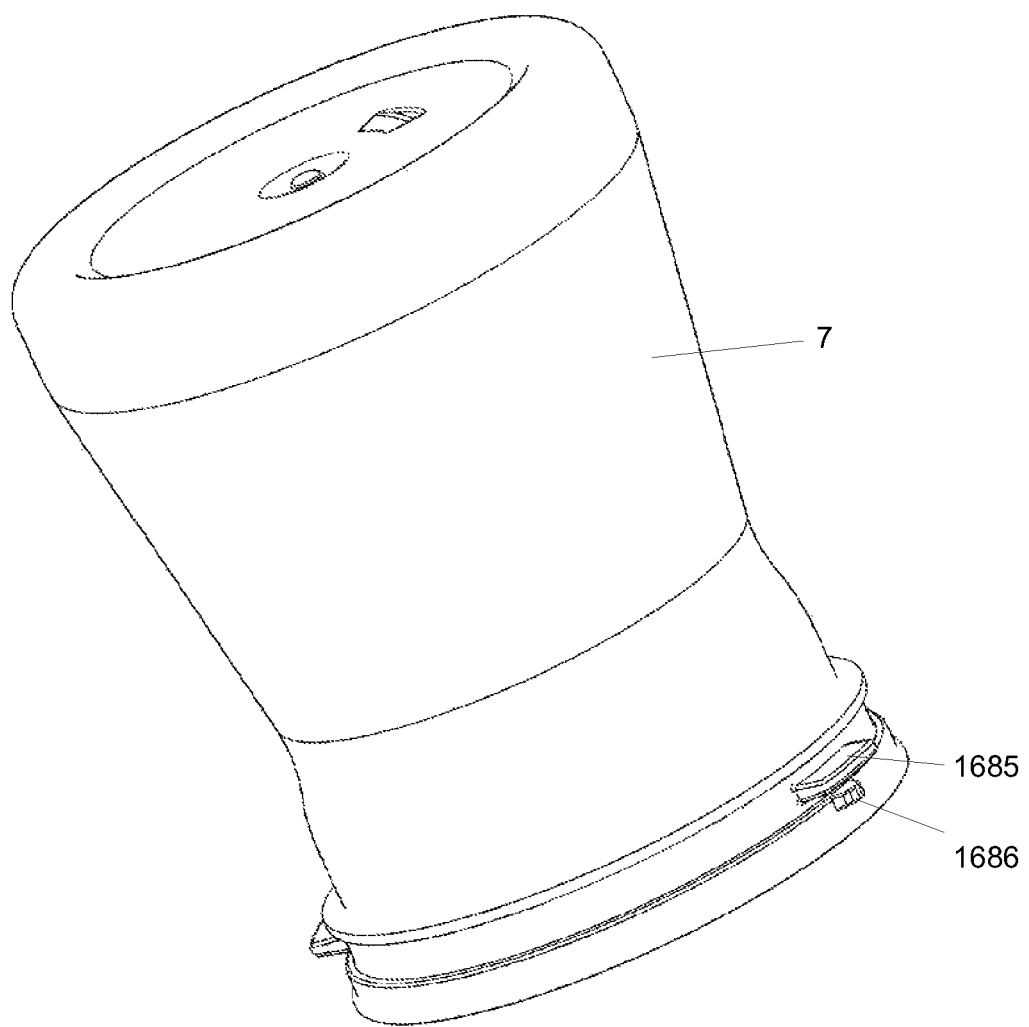

Referring to FIGS. 6A, 6B and 6C an embodiment of the first coffee bean packaging cartridge 3 is shown in an exploded arrangement and perspective views. This first packaging cartridge includes the container 7 defining an interior volume for coffee beans. The container 7 is preferably made from a transparent material so that its contents can be seen. Optionally, the container 7 may be partially covered by an outer sleeve 1632 which may be printed with a description of the kind of coffee beans inside and may also be apertured or provided with a window to reveal a translucent portion of the container 7. The container 7 is also provided at a lower end thereof with bayonet formation 1683, 1685 for coupling with the openings 56 in the side wall 54 of the recess 50 of the coffee brewing apparatus 3. Inserted into an open bottom end of container 7 is a closure member 1633. The closure member 1633 has the ribbed funnel 8 for guiding coffee beans towards the impellor 11 and a base flange 1636. A rotatable closure disk 1635 is rotatably connectable with respect to the base flange 1636 of the closure member 1633. The closure member 1633 and the rotatable closure disk together form an interface between the first cartridge and a coffee brewing apparatus. The assembled first cartridge can be sealed against deterioration from the ambient air by a sealing membrane 1681 that attaches to the perimeter edge of the container 7. The sealing membrane and barrier foil 1681 may again be equipped with a conventional one-way pressure relief valve for venting excess pressure from gases emanated from freshly roasted beans to the exterior of the first packaging cartridge. Preferably such a venting valve should open at a pressure of between 0.1 bar and 0.5 bar to prevent deformation of the container by inflation. To facilitate removal of the sealing membrane 1681 before placing the first cartridge on a brewing apparatus, a pulling tab 1682 may be provided.

Figure 7A:
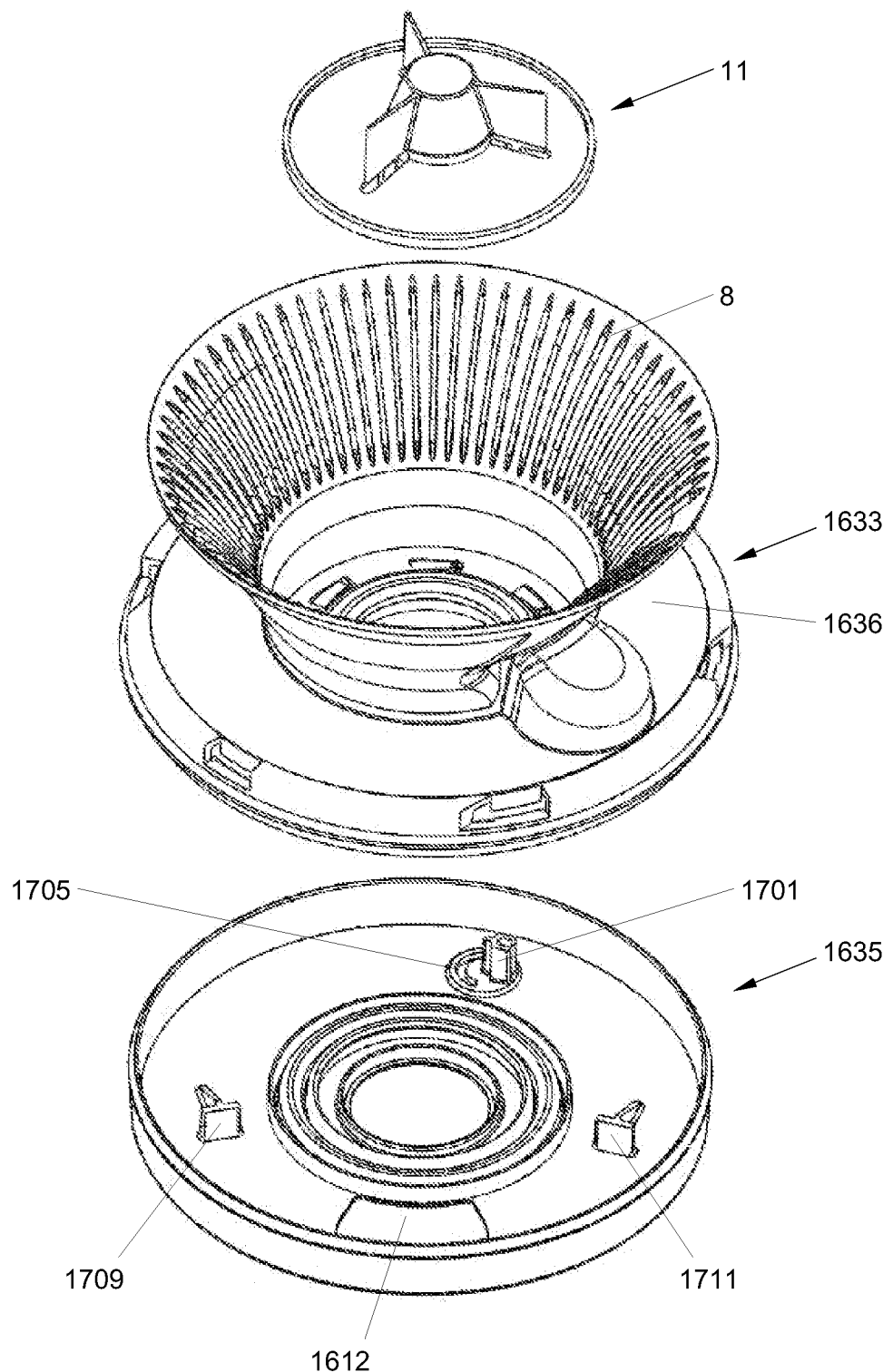
FIG. 7A is a detailed exploded isometric view of the bottom part of the coffee bean packaging cartridge of FIG. 6.
Figure 7B:
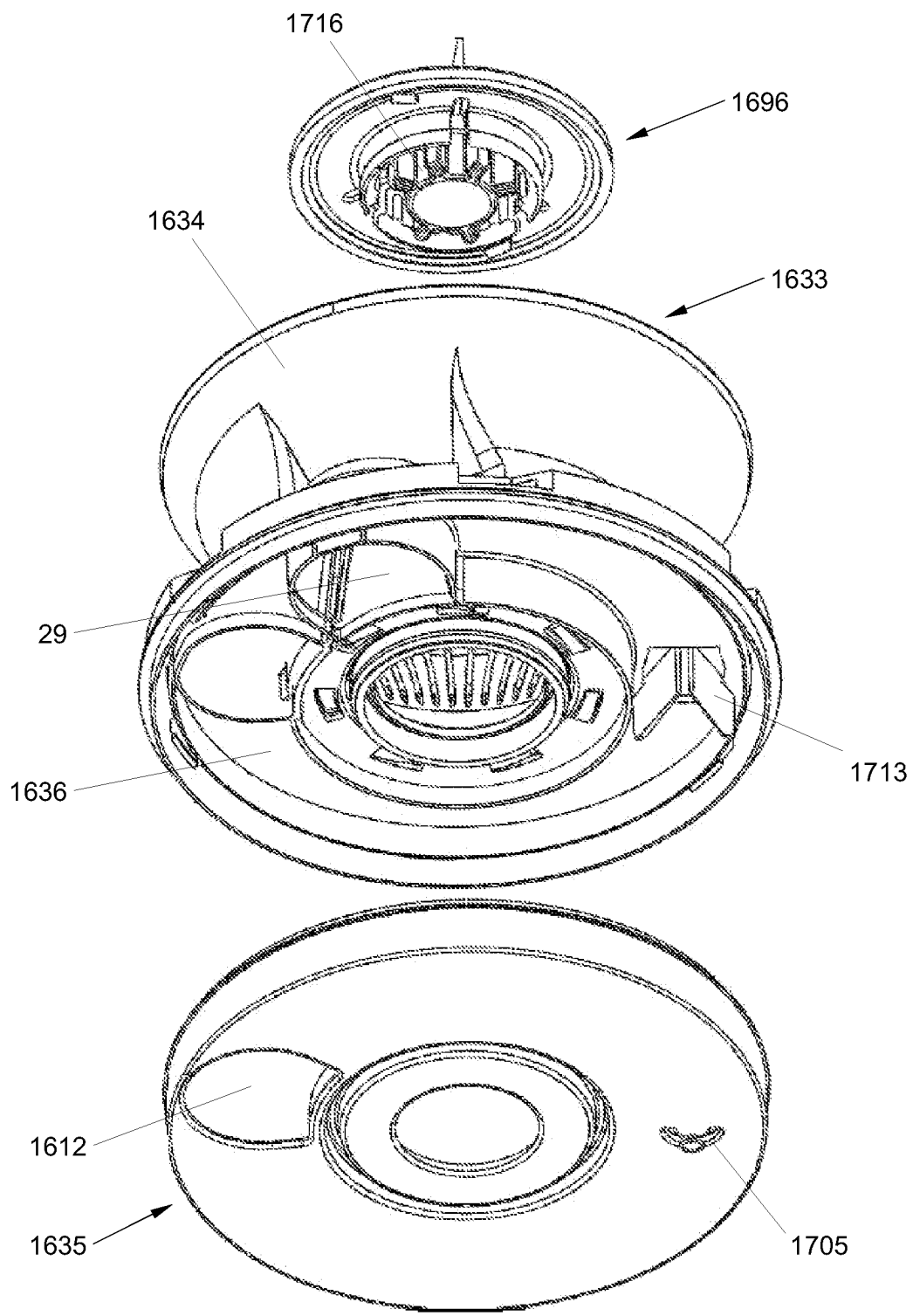
FIG. 7B is a detailed exploded view of the bottom part of FIG. 7A as seen in an opposite direction.
Figure 7C:
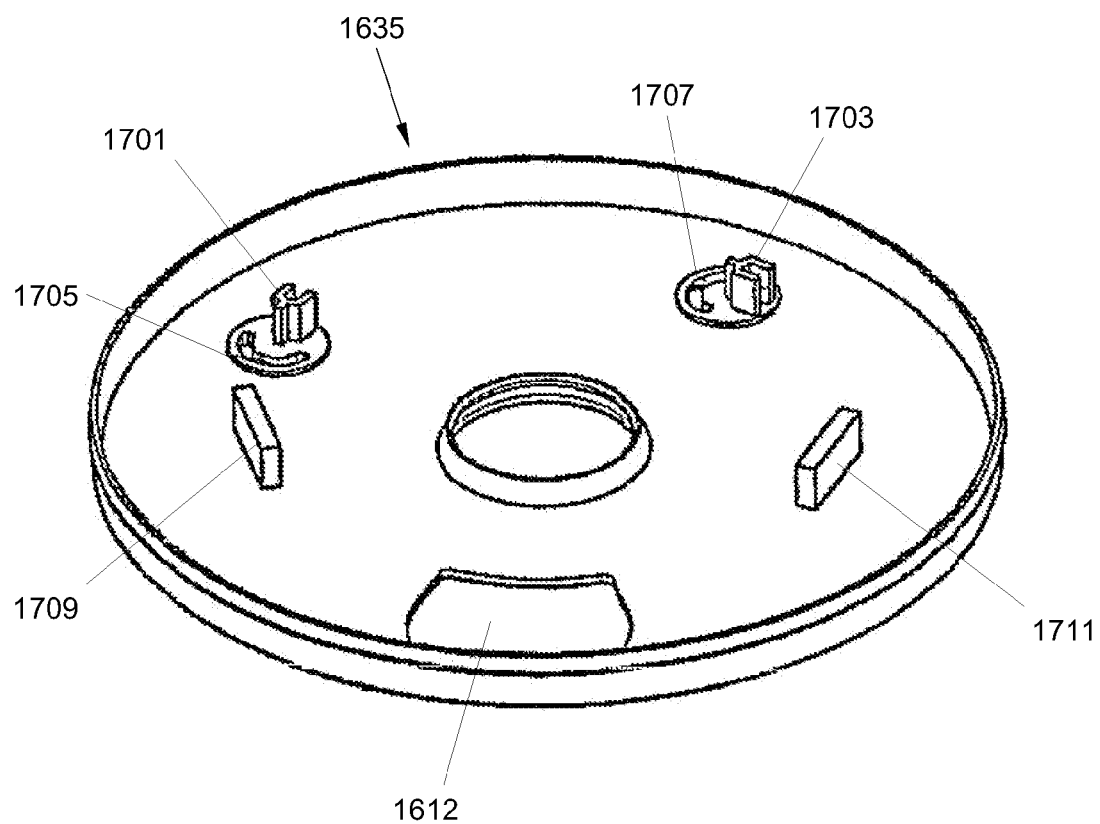
FIG. 7C is a perspective view of a closing plate of the bottom part shown in FIGS. 7A and 7B.

The interface forming bottom parts of the first cartridge are separately shown in more detail in FIGS. 7A, 7B and 7C. The ribbing on funnel 8 as further seen in the exploded view of FIG. 7A is useful in preventing sticking of coffee beans to the surface of the funnel 8.

By appropriate spacing between the successive ribs on funnel 8 it is possible to minimise the contact surface between the beans and the funnel surface. As the skilled person will recognise, such ribbing is merely one of various ways to reduce the contact surface and protruding bulges may be equally effective. Also the inclination given to the funnel may be subject to variation, but an angle in excess of 30 degrees, up to 90 degrees has been found effective.

The rotatable closing disk 1635 has an aperture 1612, which upon appropriate rotation can register with exit opening 29 of the closure member 1633 (see FIG. 7B). The closing disk 1635 on its upper surface has protruding there from a first detent 1701 and a second detent 1703 (see FIG. 7C). The first abutment is bordered by semi-circular slots 1705 and 1707, respectively. Additionally, protruding from the upper surface of the rotatable closing disk 1635 is a first abutment 1709 and a second abutment 1711 for limiting rotational movement in respect of the exit opening 29. Further provided on a bottom face of the base flange 1636 of the closure member 1633 is a first pair of latching arms 1713 and a second pair of latching arms (not shown). The first pair of flexible latching arms 1713 is positioned to cooperate with the first detent 1701 in the closed position of the rotatable closure disk 1635. The second detent 1703 and the second pair of flexible latching arms also cooperate together in the closed position of the closure disk 1635 and are optional.

Figure 8:
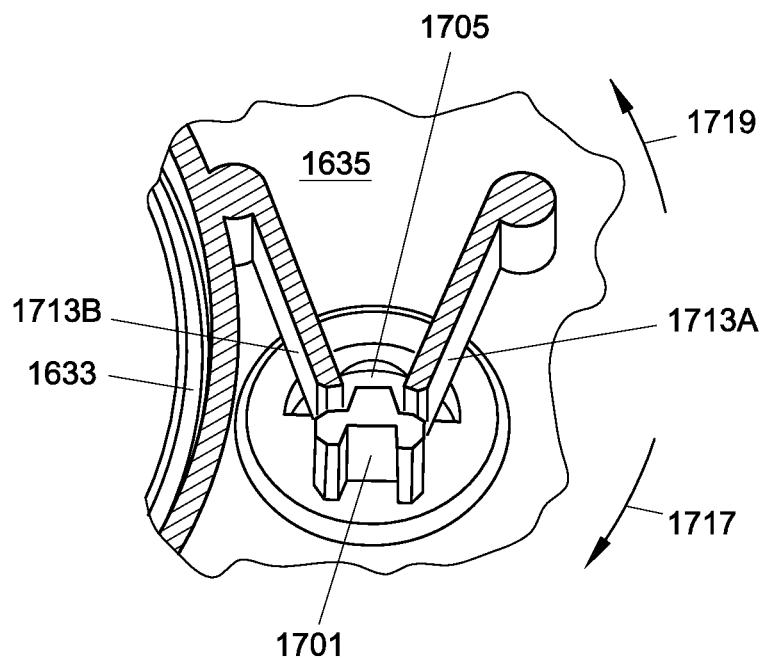
FIG. 8 is a cross-sectional detail of the assembled bottom part.

In reference to FIG. 8 it is shown how the first detent 1701 has been caught behind the converging flexible arms 1713A and 1713B of the first part of flexible arms. The position of the detent 1701, as shown in FIG. 8, has resulted from rotation of the closure disk 1635 in respect of the closure member 1633 in the direction of arrow 1717. Rotation in the opposite direction of arrow 1719 is effectively prevented by the flexible arms 1713A and 1713B engaging the first detent 1701. Accordingly when the first cartridge is in the closed position as determined in the partial cross-section of FIG. 8 it may be removed from the apparatus without any risk of spilling beans. Also this latching arrangement ensures that the cartridge is not accidentally opened by rotation of the closure disk 1635.

Figure 9:
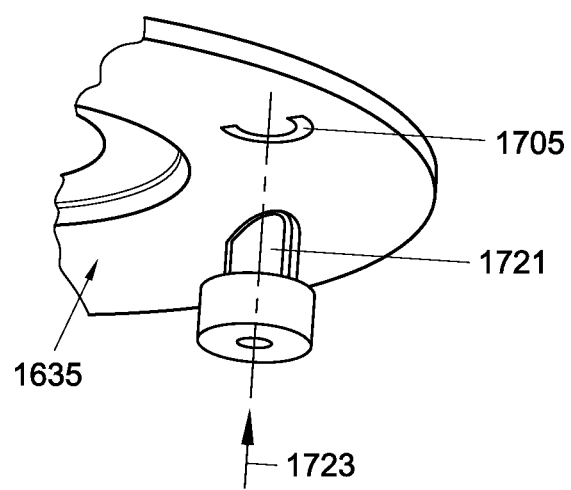
FIG. 9 is a bottom perspective detail of the bottom part of FIG. 7B with a delatching protrusion of the coffee brewing apparatus.

As shown in FIG. 9 an unlocking element 1721, which is part of a coffee brewing appliance, can engage through the semi-circular slot 1705 in the direction of arrow 1723 when the first cartridge is placed on the appliance. The unlocking element 1721 has a V-shaped upper contour that forces apart the flexible arms 1713A and 1713B of the first pair of flexible arms 1713. This will then allow rotation of the closure disk 1635 in the direction of arrow 1719 by allowing the first detent 1701 to pass between the spread apart flexible arms 1713A and 1713B. This rotating movement is obtained by manually rotating the first cartridge with respect to the appliance to engage the bayonet means 1683, 1685 on the container 7 with the counter bayonet formations 56 on the brewing apparatus.

The operation of the second detent 1703 in respect of the second pair of flexible latching arms is identical and when optionally provided will give additional protection against accidental opening, when not engaged on a coffee brewing apparatus.

Referring to FIG. 4 again, the recess 52 comprises rotatable protruding edges 59 at its center, which are positioned at the end of the driving shaft 18 which is driven by the first motor 17. On these edges the corresponding openings 1716 at the bottom side of the first cartridge 3 should be placed. These openings 1716 are formed by a series of protrusions 12 (see FIG. 5B) on the bottom side of the impeller 11. The openings 1716 receive the edges 59 if the first cartridge is connected with the coffee brewing apparatus. Thus by rotating the edges 59 the impellor 11 is rotating too.

The upstanding side wall 54 of the recess 52 may be surrounded by a housing 55, as shown in FIGS. 1-2.

The coffee brewing apparatus comprises a control device unit 40 schematically shown in FIG. 3, preferably a microprocessor for controlling the dosing (in case the first coffee bean packaging cartridge is connected), grinding and brewing process. Thereto, the controller may be connected to a sensor acting as a detection means for detecting an identification element such as a barcode or a RFID label of the coffee bean packaging cartridge 3. Thereby the control device unit cannot only detect the presence or removal of the first coffee bean cartridge 3, but also receive information about its contents and/or an identifier which identifies the first cartridge 3. Preferably the control unit controls the dosing (in case the first coffee bean packaging cartridge is connected), the grinding and the brewing (including water supply) in dependence on the identifier that was is read by means of the sensor. It thus becomes possible for the control device unit to adjust the dosing, grinding and brewing process in accordance with the particular coffee bean product offered by the first cartridge 3. Such information can be supplied to the control unit by the identification element on the first cartridge.

Figure 4C:
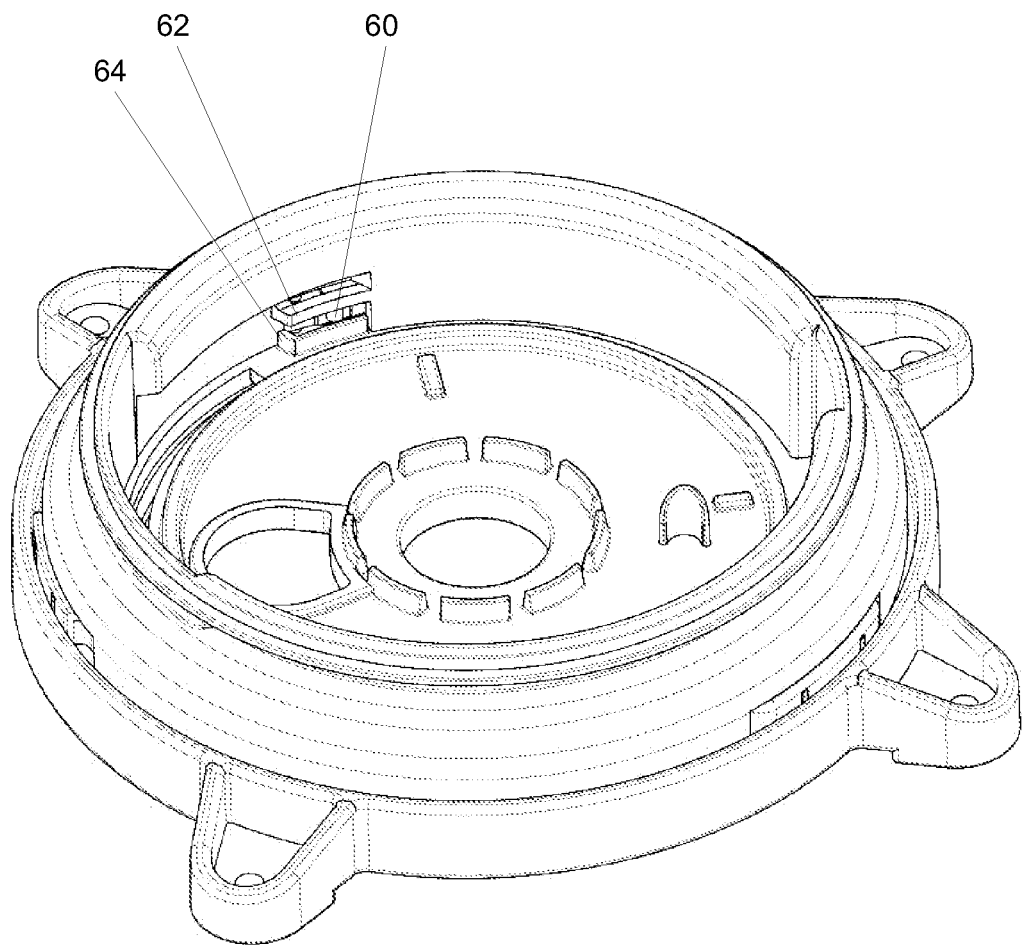
FIG. 4C shows a further perspective detail view of the upper part of the coffee brewing apparatus of FIG. 2.
Figure 6D:
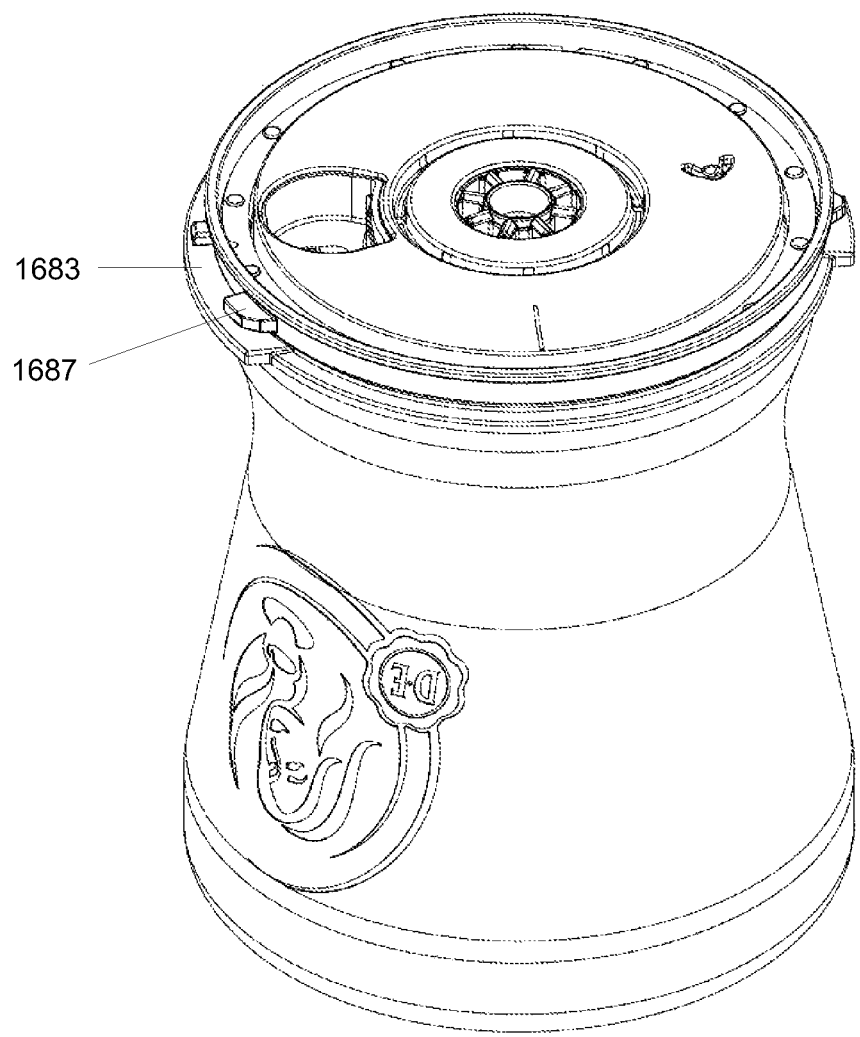
Figure 10:
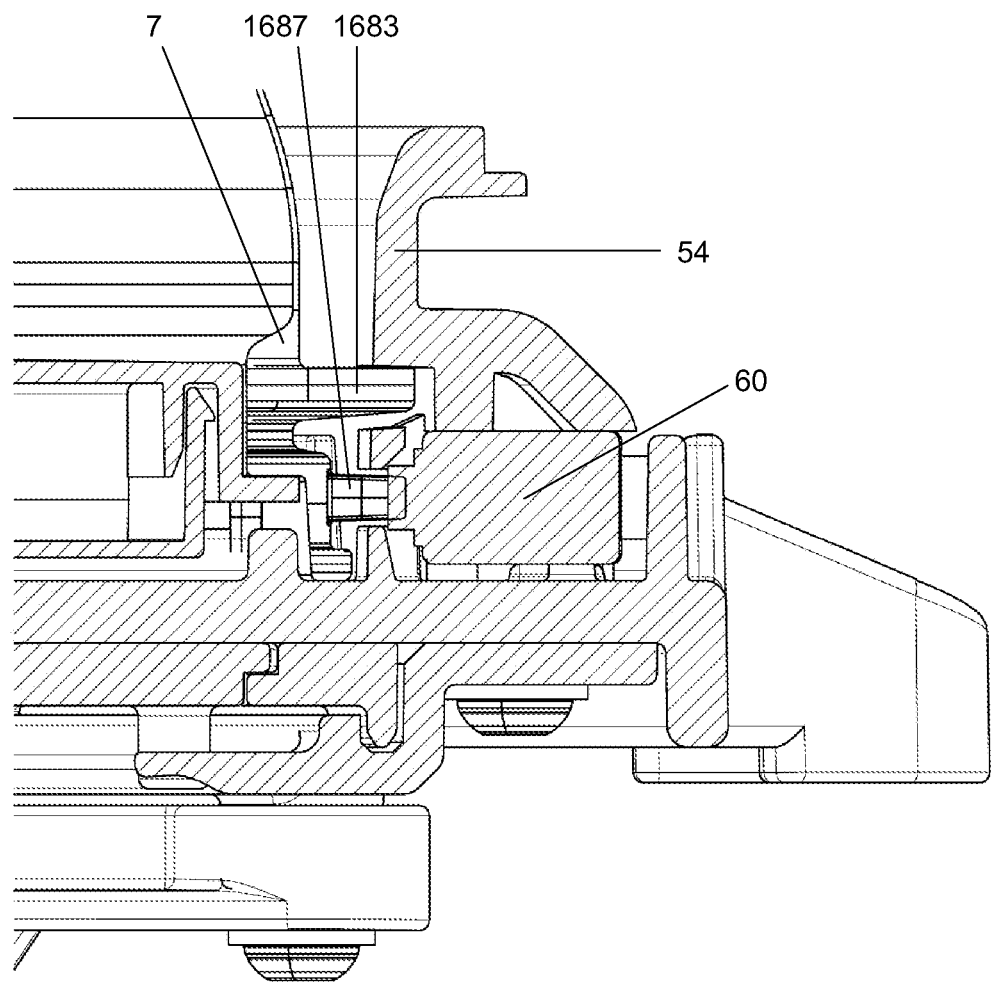
FIG. 10 shows a cross sectional view of the coffee bean packaging cartridge connected to the coffee brewing apparatus.

Alternatively, as shown in FIGS. 4C, 6D and 10, the sensor is arranged to merely detect the presence and removal of a first coffee bean packaging cartridge to the coffee brewing apparatus. The sensor used for this purpose may be a micro switch 60 hidden behind a first horizontal segment 62 and a second horizontal segment 64 in the side wall 54 protruding from the upper side of the coffee brewing apparatus 4. This is to prevent the activation of the micro switch with finger or other object. A protruding part 1687 (see FIG. 4C) below the large bayonet element 1683 of the first cartridge 3 activates the micro switch, when the first cartridge is connected to the coffee brewing apparatus by rotating it to its final position. The protruding part 1687 exactly fits in the slit between the horizontal wall segments 62, 64. This signals the controller that a first cartridge is correctly connected to the coffee brewing apparatus. The controller may activate the dosing, grinding and brewing processes only when it has been detected that the first cartridge 3 has correctly been connected to the coffee brewing apparatus 4.

According to an embodiment, the control device or controller controls these processes as follows. In a first step the metering chamber is completely filled with coffee beans. Thereto, the controller controls the first motor 17 to drive the transportation means. The transportation means is driven longer than is required for filling the metering chamber with coffee beans. In this example in the first step the transportation means is driven longer than is required for completely filling or at least substantially completely filling the metering chamber (at least substantially means for example for more than 90%). This is possible, because of the use of the flexible vanes 13. The metering chamber is arranged for receiving a portion of coffee beans corresponding to a dosed amount of coffee beans which is preferably necessary for preparing a single serving of coffee beverage, such as a single cup coffee comprising 80-160 ml of coffee. A filled metering chamber comprises in this example one dose of coffee beans. One dose of coffee beans comprises 5-11, preferably 6-8 grams of coffee beans.

Then, in a second step which follows after the completion of the first step, the controller activates the grinder by activating the second motor 101. The grinder is activated longer than is required for emptying the metering chamber and for grinding all the coffee beans which were collected in the metering chamber during the first step. In this example in the second step the grinder is activated longer than required for completely emptying or at least substantially completely emptying the metering chamber (at least substantially completely emptying means for example for more than 90%).

Finally, in a third step which follows after that the second step is completed the controller controls the brewing device to brew coffee based on the ground coffee and on heated water.

Figure 11A:
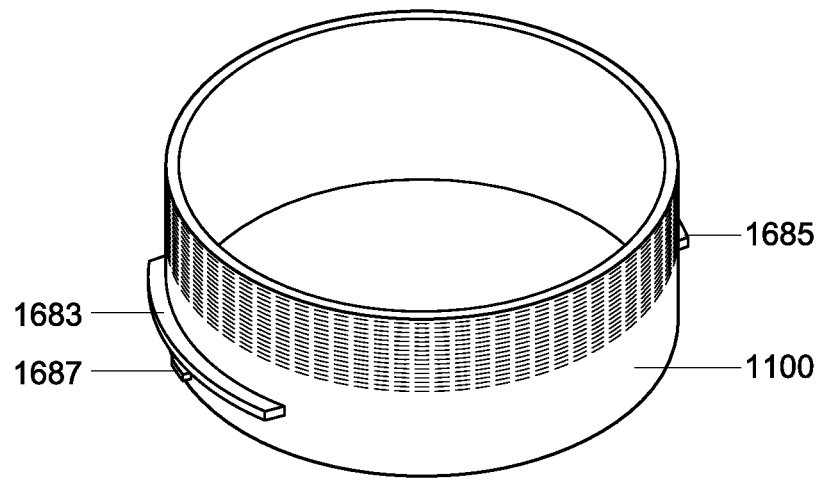
FIG. 11A shows an insert piece of a first type.
Figure 11B:
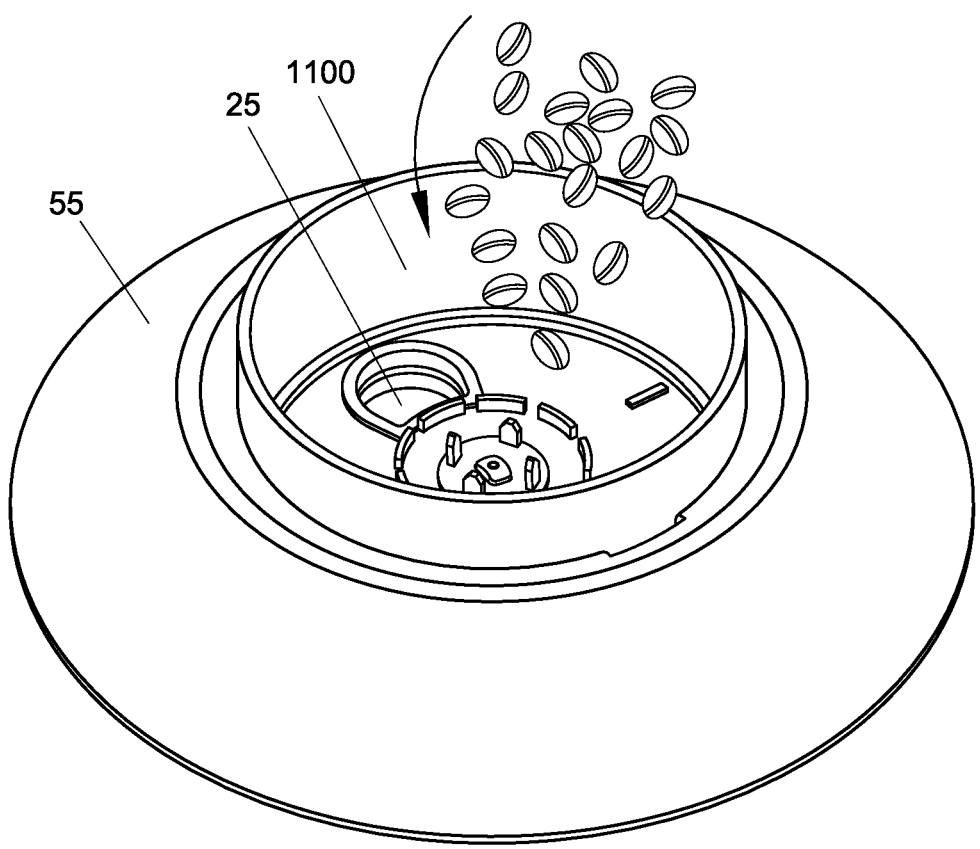
FIG. 11B shows the insert piece of FIG. 11A connected to the coffee brewing apparatus.

The system may further be provided with one or more insert pieces that can be connected to the coffee brewing apparatus in lieu of a coffee bean packaging cartridge. A first type of insert piece 1100 is depicted in FIG. 11A. It is a ring shaped element with at its outer surface the bayonet elements 1683, 1685 as well as the protruding part 1687 for activating the micro switch. It may be connected to the coffee brewing apparatus in the same way as a coffee bean packaging cartridge, i.e. by placing the bayonet elements in the corresponding openings 58 in the side wall 54 of the recess 50 in a initial position and then rotate the insert piece over 50 degrees until reaching the final position. When the insert piece is connected to the coffee brewing apparatus, the corresponding activation of the micro switch by the protruding part 1687 signals to the controller that a device is connected to the coffee brewing apparatus. The controller does not know if the activation of the micro switch is caused by a cartridge or by an insert piece. Therefore, when the insert piece 1100 is connected to the coffee brewing apparatus in the final position, as shown in FIG. 11B, the controller will activate the grinding and brewing and optionally the dosing processes, as if there were a coffee bean packaging cartridge connected to the brewing apparatus. So, the insert piece of the first type 1100 may be used to 'unlock' the coffee brewing apparatus.

In an alternative embodiment the insert piece may be a ring shaped element as described above which is integrally provided with a funnel which, when the insert piece is connected to the brewing apparatus, allows a user to manually feed coffee beans or ground coffee into the funnel.

Figure 12A:
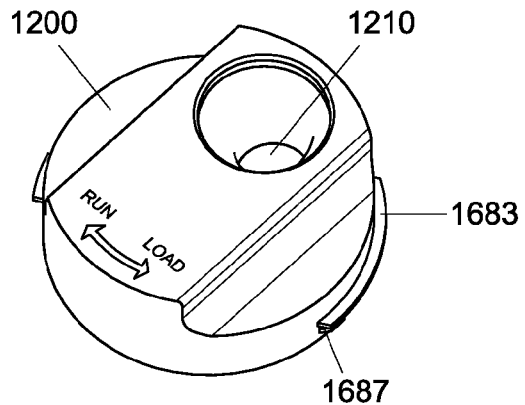
FIG. 12A shows an insert piece of a second type.
Figure 12B:
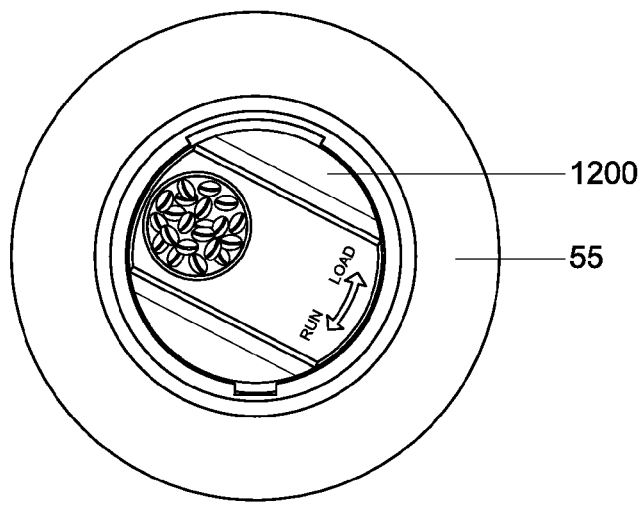
FIG. 12B shows the insert piece of FIG. 12A connected to the coffee brewing apparatus in an entry position.
Figure 12C:
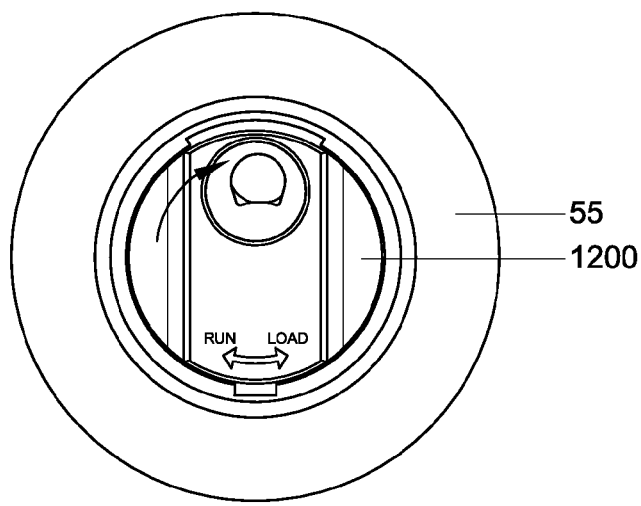
FIG. 12C shows the insert piece of FIG. 12A connected to the coffee brewing apparatus in a final position.
Figures 14C, 14D:
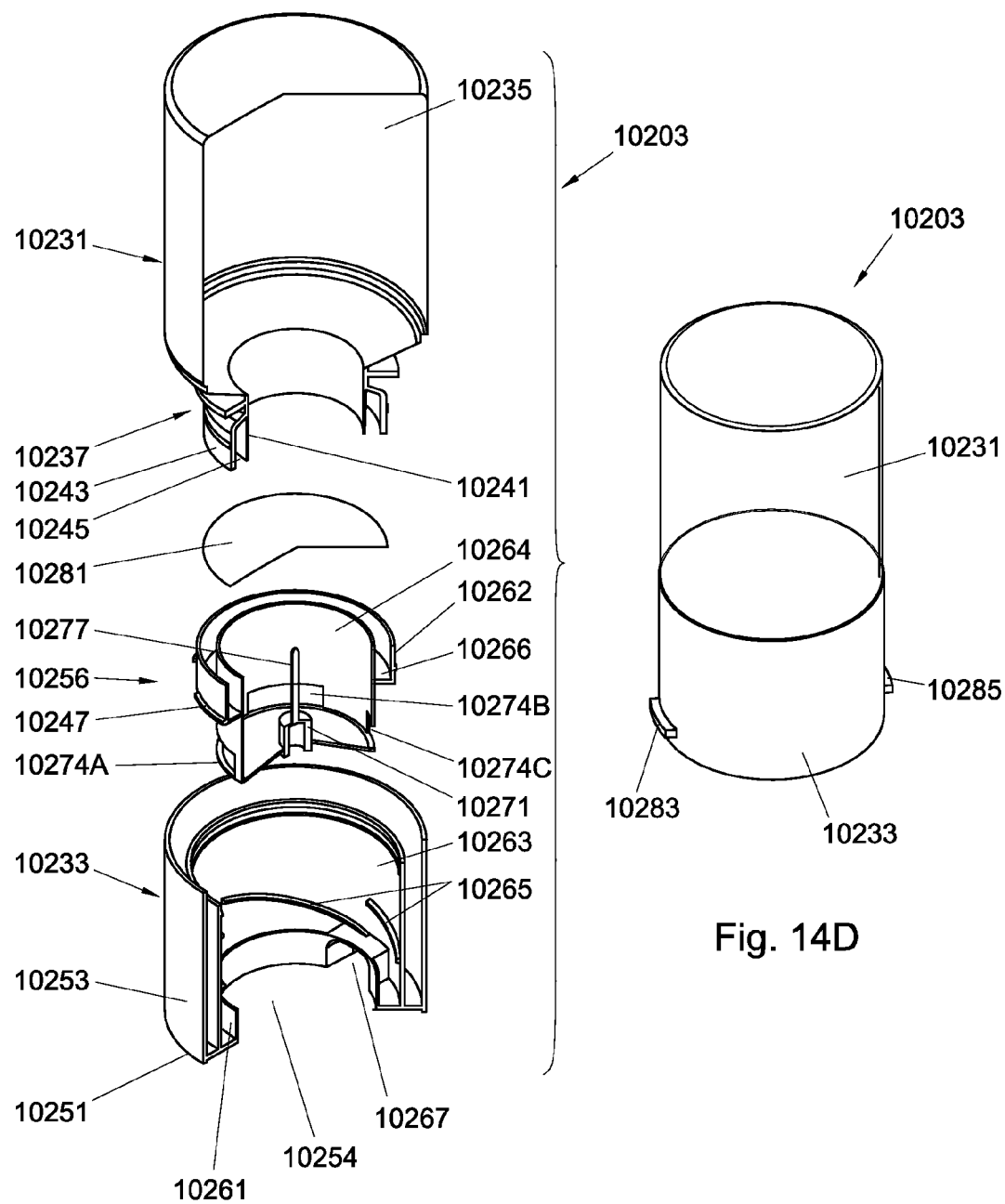
FIG. 14C shows the component of the coffee bean cartridge of FIGS. 14A and 14B in half and in an exploded arrangement.
FIG. 14D is a perspective view of the cartridge of FIG. 14A in a condition ready for use.

FIG. 12A shows a second type of insert piece 1200 that can be connected to the coffee brewing apparatus. It comprises a cavity 1210 with a size corresponding to a single dose of coffee beans. The insert piece comprises a closure member and closure disk arranged in the same way as in the coffee bean packaging cartridge, as described herein above with reference to FIGS. 7A-C, 8 and 9. When the insert piece is placed in the recess with the bayonet elements in the initial position as shown in FIG. 12B, the cavity 1220 is closed at its bottom. In this position the user fills the cavity with coffee beans, preferably with round compressed beans or coated compresses ground beans, because the flow easily. Then the insert piece 1200 is rotated by the user to its final position as shown in FIG. 12C, thereby opening the coffee bean outlet of the cavity and aligning it with the coffee bean entry of the coffee brewing apparatus. As a result, the single dose of coffee beans falls into the coffee brewing apparatus and can be ground. In this situation, the system need not be operated to provide a dosing, since the dose of coffee beans is, for example manually, provided in the cavity. For not actuating the dosing function of the system the controller may be connected to a sensor acting as a detection means for detecting an identification element such as a barcode or a RFID label of the insert piece. Thereby the control device unit can receive information that it need not activate or control the dosing but only the grinding and the brewing (including water supply) in dependence on the identifier that was is read by means of the sensor.

In FIGS. 13-16 first coffee bean packaging cartridges with possible embodiments of transportation or conveyor means will be described. The system of such first coffee bean packaging cartridges and the coffee brewing apparatus provide a dosing device for transporting a predetermined amount of coffee beans from the first cartridge into the coffee brewing apparatus. The coffee beans leave the first cartridge via an exit opening and enter the coffee brewing apparatus via a coffee bean inlet. Alternatively the dosing device may be part of the coffee brewing apparatus alone or completely be arranged in a cartridge (to be described later). The coffee brewing apparatus is as described above provided with a grinding mechanism for grinding coffee beans which are transported from the first cartridge into the coffee brewing apparatus. A coffee bean transport path extends between the coffee bean inlet and a coffee bean supply opening of the grinder mechanism. The grinding mechanism supplies ground coffee to a coffee brewing device. A ground coffee transport path extends between a ground coffee exit opening of the grinding mechanism and the coffee beverage brewing device. The coffee brewing device is arranged to receive a supply of water to extract a coffee beverage from the ground coffee. The coffee beverage is discharged from a coffee beverage exit from the coffee brewing apparatus into a cup or like household receptacle. A water supply can be arranged to supply water to the coffee brewing device under pressure for espresso type coffee beverages or may provide a drip feed to the extraction system formed by coffee brewing device.

In this example of the first cartridge shown in FIG. 13A coupling means 10171 are provided which are adapted for drivingly coupling a conveyor or transportation means of the first cartridge to rotating motive means of the coffee brewing apparatus. The conveyor means 10169 are adapted to be rotatably driven exteriorly of the first cartridge for transporting the coffee beans towards the coffee bean exit opening 10111 of the first cartridge 10103. The conveyor means thus forms part of the dosing device.

In this example the coupling means 10171 comprises a driving hub 10171 being attached to the bean conveyor means 10169 and extending through a central opening 10173 in the bottom 10151 of the first cartridge 10103. The driving hub 10171 can be coupled to and rotated by a drive shaft 10172 extending from or into the beverage system and which can be rotated by means of the first motor. The coffee bean cartridge 10103 includes a bottle-like container 10131 and a closure member 10133. The closure member 10133 is provided with an exit opening defining a coffee bean outlet 10111 for cooperation with a beverage system, such as disclosed in reference to FIG. 1. The container 10131 defines an interior volume 10135 and a neck portion 10137 bounding a neck opening 139 to the container 131. The neck portion 137 includes a cylindrical inner sleeve 10141 and a cylindrical outer sleeve 10143, defining an annular groove 10145 there between. The outer cylindrical sleeve 10143 is provided with an outer male screw thread 10147. Between the outer cylindrical sleeve 10143 and the major portion of the container 10131 there is provided a radially extending annular ridge 10149.

The closure member 10133 includes a substantially planar bottom 10151 and a circumferential outer wall 10153. The circumferential outer wall 10153 is provided with a circumferential tear strip 10155 that is connected to the outer wall 10153 by a circumferential line of weakening 10157. The tear strip 10155 is further provided with a pull tab 10159 that can be manually gripped.

The closure member 10133 further includes a first cylindrical inner wall 10161 and a second inner cylindrical wall 10163 concentrically between the inner cylindrical wall 10161 and the circumferential outer wall 10153. The second inner cylindrical wall 10163 is slightly lower than the circumferential outer wall 10153, but higher than the first inner cylindrical wall 10161. As best seen in FIG. 13C, the second inner cylindrical wall 10163 has a female screw thread 10165 on an inner surface thereof adapted to cooperate with the male screw thread 10147 of the container neck portion 10137. The first inner cylindrical wall 10161 is provided with a perimeter aperture 10167 in its inner surface that is in communication with the coffee bean outlet 10111. The perimeter aperture 10167 is in communication with the coffee bean outlet 10111 by a cavity that is radially outwardly offset with respect to column of coffee beans above the bottom 10151 of the first cartridge. This arrangement prevents the coffee beans from finding their way to the bean outlet 10111 in an uncontrolled manner.

Within a chamber defined by the bottom 10151 of the closure member 10133 and the first inner cylindrical wall 10161, a bean conveyor means embodied as a conveyor disc 10169 is rotatably arranged. The first cartridge is provided with a coupling means 10171 adapted for drivingly coupling the conveyor means 10169 to the first motor of the coffee brewing apparatus. In this example the coupling means comprises a driving hub 10171 being attached to the bean conveyor disc and extending through a central opening 10173 in the bottom 10151. The driving hub 10171 can be coupled to and rotated by a drive shaft 10172 extending from the beverage system of FIG. 1 and which can be rotated by means of the motor. While such drive shafts and their connections are well known to the skilled person, no further explanation is deemed necessary. The conveyor disc 10169 is further provided with a closing flap 10175 on its outer periphery for closing the perimeter aperture 10167 in at least one rotational position. The closing flap 10175 embodies relatively movable closing means. The driving hub 10171 may further be provided with an axially and upwardly extending piercing pin 10177. Further the conveyor disc may be given a upwardly convex shape to assist in conveying the coffee beans towards the periphery of the conveyor disc. Such a shape, however, is optional and other suitable forms are conceivable as well. For the closing flap 10175 to close the perimeter aperture 10167 it is merely necessary to prevent the passage of coffee beans, which may already be achieved when the perimeter aperture 10167 is only partly blocked by the flap 10175. However to be able to take the bean cartridge from the apparatus for an interval of time, it is preferred that the closure of the aperture 10167 by the flap 10175, at least to some extend, delays deterioration of the remaining coffee bean contents. Hence the flap forms part of the closing member 10133 wherein the closure member has relatively movable closing means in the form of the flap for selectively opening and closing the exit opening by means of closing the aperture 10167, wherein in the closed condition it is prevented that the coffee beans escape from the cartridge and preferably it is counteracted that content of the coffee bean in the form of gasses escape to surrounding air.

Further, as best seen again in FIG. 13C, the second inner cylindrical wall 10163 is provided with an inner peripheral ridge 10179 on its free end. The open end 10139 of the neck portion 10137 of the container 10131 may be closed by a sealing means formed by sealing membrane 10181. Further, as best seen in FIG. 13D, the closure member 10133 may be provided with radially extending bayonet elements 10183, 10185 for connecting it to the coffee brewing apparatus. Hence the bayonet elements form part of connecting means for connecting the first cartridge to the coffee brewing apparatus. The skilled person will understand that any conceivable means, other than a bayonet type connection (such as 10183, 10185), may be suitable as connecting means for connecting the first cartridge 10103 to a coffee brewing apparatus.

Reverting now to FIGS. 13A and 13B there are shown two axial positions of the closure member 10133 with respect to the container 10131. In FIG. 13A the cartridge 10103 is shown in a condition in which it is supplied to a user. In this condition of purchase the interior volume 10135 will be completely filled with roasted coffee beans of a selected variety. The properties of such contents may be communicated by an identification element attached to the exterior of cartridge 10103. The neck opening 10139 will be hermetically closed by the sealing membrane 10181 to protect the contents of the container 10131 from deterioration by ambient air. The sealing membrane 10181 is attached, preferably only to the outer cylindrical sleeve 10143. When a user wants to bring the cartridge 10103 into a condition of use, as shown in FIG. 13B, the tear strip 10155 should first be removed by gripping the pull tab 10159. Through the line of weakening 10157 the tear strip 10155 can be completely removed from the closing member 10133. This can be done with the cartridge 10103 already connected to the coffee brewing apparatus. With the tear strip 10155 removed, the container 10131 can be rotated with respect to the closure member 10133. Such rotation, i.e. in a clock wise direction, has the effect that the male and female screw thread 10147, 10165 act together to move the container 10131 and closure member 10132 closer together in an axial direction. By this axial movement the piercing pin 10177 may penetrate the sealing membrane 10181 and allow it to tear across the opening 10139, while the first inner cylindrical wall 10161 pushes it into the annular groove 10145 of the neck portion 10137 as shown in FIG. 13B. This movement of the sealing membrane 10181 by the means for disrupting and displacing embodied by the first inner cylindrical wall 10161 is assisted by attachment of its perimeter to only the outer cylindrical sleeve 10143. It may further be beneficial to prepare the sealing membrane 10181 to tear open along predefined tear lines. Such predefined tear lines can be conveniently created by partial laser cutting of the sealing membrane foil. Removal of the sealing membrane 10181 allows the coffee beans to be gravity fed onto the conveyor disc 10169. With the first cartridge 10103 thus having been activated to the condition of use, as shown in FIG. 13B, and connected to the brewing, the control device may cause rotation of the conveyer disc 10169. During moments of rotation, when the closing flap 10175 does not cover the perimeter aperture 10167 (see FIG. 13C), coffee beans are conveyed radially outwardly to pass through the coffee bean outlet 10111 into the metering chamber of the coffee brewing apparatus, or directly into the grinding mechanism. This metering chamber, conveyer disc and flap in combination form a dosing device. The dosing device includes the metering chamber for receiving a portion of coffee beans corresponding to a dosed amount of coffee beans which is preferably necessary for preparing a single serving of coffee beverage wherein the system is arranged for transporting the coffee beans from the cartridge into the metering chamber. The dosing device may further comprise emptying means for emptying the metering chamber.

In case the beans are transported from the first cartridge directly into the grinder mechanism the conveyor means and the flap of the first cartridge form the dosing device in combination with a timer of the control unit. In that case the control unit may comprise the timer for transporting during a predetermined length of time coffee beans into the coffee brewing apparatus. In case the amount of coffee beans which are transported per second, in use, are known the total amount of coffee beans which is transported can be predetermined. Hence in such an embodiment the dosing device comprises at least one of the conveyor means and the relatively movable closing means. The control means comprises timing means wherein the control unit is arranged such that, in use, the control unit operates the motive means a predetermined length in time for transporting a predetermined amount of coffee beans from the first cartridge into the coffee brewing apparatus wherein preferably the predetermined amount of coffee beans corresponds with a dosed amount of coffee beans for preparing a drink.

The skilled person will readily understand that in variations of the brewing apparatus the metering chamber may alternatively be positioned downstream of the grinding mechanism. In the latter case, the coffee beans will directly enter the grinding mechanism from the cartridge bean outlet 10111.

It is further seen that in the activated condition shown in FIG. 13B, the inner peripheral ridge 10179 has snap-fitted behind the radially extending annular ridge 10149 of the container neck portion 10137. In this position also the male and female screw threads 10147, 10165 have completely disengaged. It is thereby prevented that the container 10131 and closure member 10133 are accidentally moved back to the position of FIG. 13A. There is thereby also a clear distinction between cartridges that are still fresh and unused, as opposed to cartridges that have been activated for use on a coffee brewing apparatus. FIGS. 13A-13D thus show an embodiment of the first coffee bean packaging cartridge, with a closure cap 10133, provided with conveyor disc 10169, and a sealing membrane 10181 directly on the bottle-like container 10131. Upon removal of a tamper evident tear strip 10155, with the first cartridge 10103 already connected to the system, the packaging cartridge can be manually activated by rotation (180 degrees). The seal, which can be a laser pre-cut foil, tears open in a controlled manner when activating and is pushed out of the way into a groove 10145 in a ring of the bottle. At the end of its movement an inner ring 10163 of the closure cap 10133 snaps over a thick edge, formed by annular ridge 10149, of the bottle, and can no longer be removed therefrom because the screw threads 10147, 10165 have disengaged. Reverse unscrewing is thereby inhibited.

FIGS. 14A to 14D show a further embodiment of a first coffee bean cartridge 10203 that again includes a container 10231 and a closure member 10233. The closure member 10233 has an annular bottom 10251, provided with a bean outlet 10211. The annular bottom 10251 defines a central bore 10254 for the accommodation of a relatively movable auxiliary closure member 10256. The bottle-like container 10231 defines an interior volume 10235 and a neck portion 10237 defining an opening 10239 on one end of the container 10231. Similar to the first embodiment, the neck portion 10237 is composed of concentrically arranged inner and outer cylindrical sleeves 10241, 10243 to define annular groove 10245 there between. As the open end 10239 of the container 10231 is again sealed by a sealing membrane 10281, the annular groove 10245 is again serving to collect the sealing membrane 10281 upon its removal from the opening 10239. Again the sealing membrane 10281 is preferably attached with its outer periphery to only the outer cylindrical sleeve 10243.

The closure member 10233 is further provided with a first inner cylindrical wall 10261 and a second inner cylindrical wall 10263. The second inner cylindrical wall has an inner peripheral ridge 10279 at its upper free end. The closure member 10233 is connected to the container 10231 by the inner peripheral ridge 10279 snap-fitting onto a radially extending annular ridge 10249 on the neck portion 10237 of container 10231. The snap-fit connection is such that it cannot be easily disconnected and thereby prevents the closure member 10233 to be accidentally removed from the container 10231. Further, the closure member 10233 includes within its central bore 10254 a perimeter aperture 10267 in its first inner cylindrical wall 10261 giving radial access to a cavity in communication with the axially arranged coffee bean outlet 10211. Again the cavity between the radial perimeter aperture 10267 and the axial bean outlet 10211 is offset with respect to the column of coffee beans, or particles, within the cartridge 10203 to allow control over the beans, or particles that find their way to the outlet 10211. On its inner cylindrical wall 10263 the closure member 10233 also is provided with female screw thread formations 10265 to cooperate with male screw thread formations 10247 on an annular outer wall 10262 on the auxiliary closure member 10256. The auxiliary closure member is generally formed as a cup-like element having a bean conveyor means in the form of conveyor disc 10269 at its bottom and a cylindrical perimeter wall 10264. The cylindrical perimeter wall 10264 carries the annular outer wall 10262, so as to form an upwardly open perimeter groove 10266 for a purpose to be described later. The auxiliary closure member 10256 is further provided with a driving hub 10271 for coupling with a drive shaft of a beverage preparing apparatus and forming coupling means (not shown, but conventional). The driving hub 10271 can also be provided with a piercing pin to engage and puncture the sealing membrane 10281. The cylindrical perimeter wall 10264 of the auxiliary closure member 10256 is further provided with a number, like three of four, perimeter windows 10274A, 10274B, 10274C, adapted to align with the perimeter aperture 10267. The perimeter windows 10274A, 10274B, 10274C are spaced from one another by interrupting wall sections, which thereby represent the movable closing means.

In use, the first cartridge 10203 will be provided to the end user in a condition illustrated in FIG. 14A, with the sealing membrane 10281 fully intact and protecting the contents in the interior volume 10235. The auxiliary closure member 10256 is partially projecting from the opening 10254 in bottom 10251. To activate the cartridge 10203 for use it is simply connected to the coffee brewing apparatus by connecting means configured as bayonet elements 10283, 10285 projecting laterally from the closure member 10233. The driving hub 10271 will engage a resiliently mounted drive shaft in the apparatus and will push this resiliently into a retracted position. Upon operation of the brewing apparatus the drive shaft will rotate the auxiliary closure member 10256 which will thereby move upwardly by the male and female screw thread formations 10247, 10265 to the position shown in FIG. 14B. The drive shaft will be resiliently biased to follow the driving hub 10271 and remain in engagement therewith. When the auxiliary closure member 10256 has reached its uppermost position as shown in FIG. 14B the screw thread formations 10247, 10265 will have disengaged and not allow reverse movement of the auxiliary closure member 10256 to the position of FIG. 14A. During movement of the auxiliary closure member 10256 from the inactive position of FIG. 14A to the activated position of FIG. 14A, the piercing pin 10277 and the perimeter wall 10264 of the auxiliary member 10256 has pushed the sealing membrane 10281 aside into the annular groove 10254 provided in the neck portion 10237 of the container 10231. The piercing pin 10277 and the perimeter wall 10264 thereby form a means for disrupting and displacing the sealing element. By gravity the coffee beans can now be fed on to the conveyor disc 10269 and be conveyed to the perimeter aperture through any one of perimeter windows 10274 A, B or C, as these align during rotation. Once the dosing device and/or the control device has determined that dosing is sufficient, the rotation of the auxiliary member 10256 and thereby its conveyor disc 10269 will be interrupted. Thereby a means to interrupt the supply of beans is provided. The operating mechanism of the brewing apparatus ensures that rotation of the auxiliary member 10256 is always with a section of the perimeter wall 10264 between two adjacent ones of the perimeter windows 10274A, B, C in overlap with the perimeter aperture 10267. Not only does this prevent any further transport of coffee beans through the coffee bean outlet 10211, but it also protects the contents of the container 10231 from contact with the ambient environment. It is conceivable and preferred that the cartridge 10203 in its activated condition of FIG. 14B can be safely removed from the brewing apparatus. This may be desirable to allow intermediate use of a cartridge with a different quality of variety of coffee beans, to enable variation of the brewed beverage.

One noticeable difference of the coffee bean packaging cartridge according to this embodiment, with that of the previous embodiment, is that its conveyor disc is integral with a part of the closure member. Conceivably in another variation the entire bean packaging cartridge could rotate together with the conveyor disc.

A still further embodiment of a first coffee bean packaging cartridge 10303 is shown in FIGS. 15A to 15D. The first coffee bean cartridge 10303 again includes a bottle-like container 10331 and a closure member 10333. The closure member 10333 at a bottom 10351 thereof is provided with a coffee bean outlet 10311, for cooperation with the brewing apparatus. The container defines an interior volume 10335 which is or will be filled with coffee beans (not shown but conventional). The container 10331 is further provided with a neck portion 10337 defining a neck opening 10339. The neck opening 10339 defines an open end of the container 10331 and is bounded by an inner cylindrical sleeve 10341 and a concentrically arranged outer cylindrical sleeve 10343. Formed between the inner and outer cylindrical sleeves 10341, 10343 is again an annular groove 10345. As such, the container 10331 of this embodiment 10303 is substantially similar to the containers of the two previous embodiments, without being strictly identical.

The neck portion 10337 is provided with a radially extending annular ridge 10350 extending from the outer cylindrical sleeve 10143 at a location adjacent its free end.

The closure member 10333 includes a circumferential outer wall 10353 which projects axially from its bottom 10352. Also projecting axially from the bottom 10351 is a first inner cylindrical wall 10361 and a second inner cylindrical wall 10363 concentrically between the first inner cylindrical wall 10361 and the circumferential outer wall 10353. The second inner cylindrical wall 10363 is provided with an inwardly projecting peripheral ridge 10379 for snap-fittingly engaging the radially extending annular ridge 10350 to attach the closure member 10333 to the container 10331.

Figure 15B:
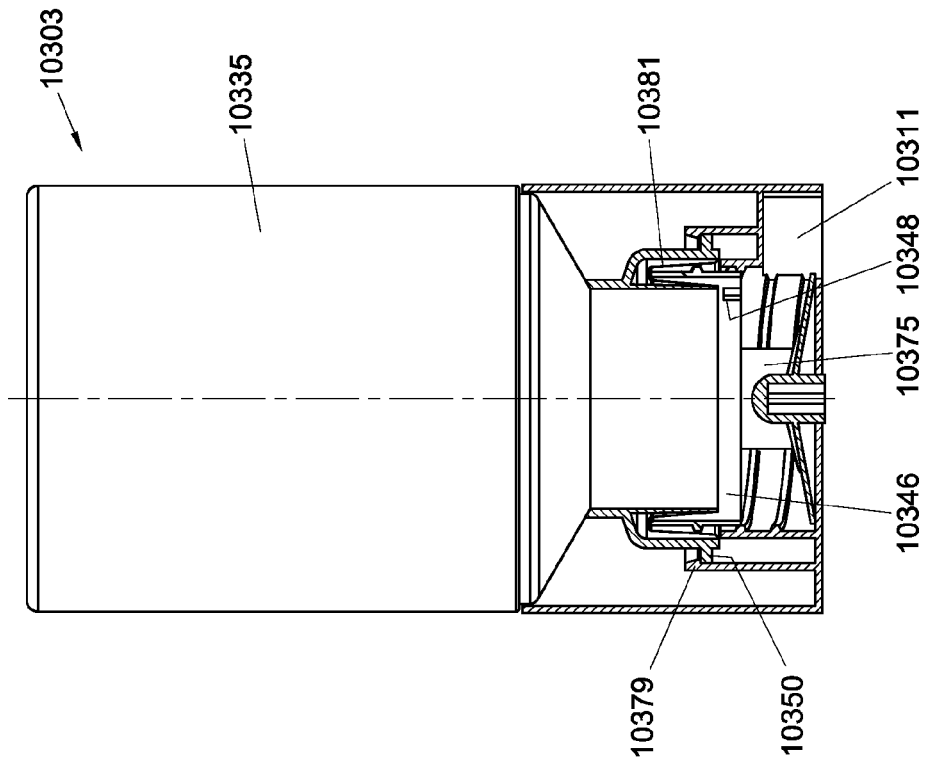
FIG. 15B is a cross-section similar to FIG. 15A but with the bean cartridge activated for use.
Figure 15A:
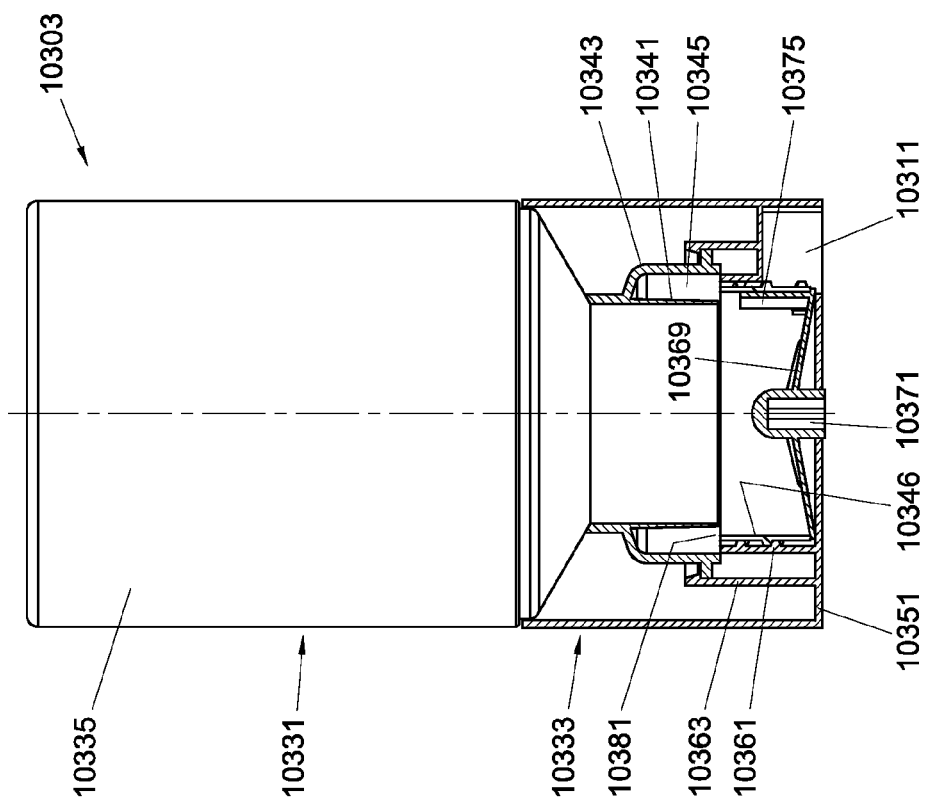
FIG. 15A is a cross-section through a still further embodiment of coffee bean packaging cartridge in a condition prior to use.
Figures 15C, 15D:
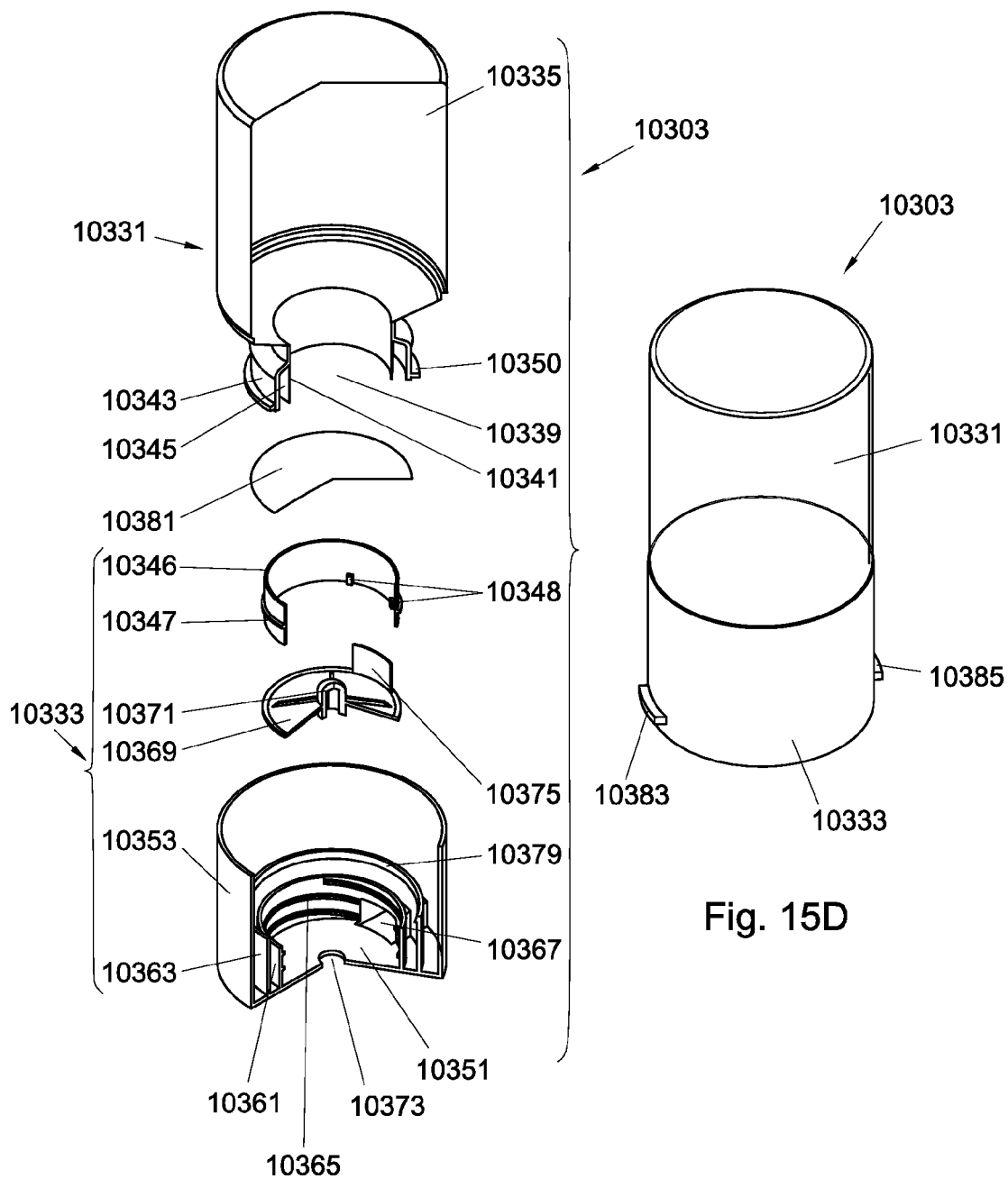
FIG. 15C is an exploded view of the components of the cartridge shown in FIGS. 15A and 15B, shown in half.
FIG. 15D is a perspective view of the bean cartridge of FIG. 15A in its assembled form.

Rotatably received on the bottom 10351 is a bean conveyor disc 10369 that has a driving hub 10371 that can be drivingly engaged through central opening 10373 in the bottom 10351. The rotatable bean conveyor disc 10369 includes an upstanding closing flap 10375 for closing a perimeter aperture 10367 in the first cylindrical inner wall 10361. The perimeter aperture 10367 communicates with the bean outlet 10311 via a cavity that is offset with respect to column of coffee beans within the interior volume 10335, for a purpose already explained. The closing flap 10375 functions as the movable closing means. As seen in FIG. 15C the conveyor disc 10369 may be provided, as part of the conveyor means and guiding means, with a number of radially extending ridges in addition to an upwardly convex shape. These features, which are optional, may be employed to assist conveyance of the coffee beans towards the periphery of the conveyor disc 10369 by forming an agitating and guiding means for the coffee beans. In an alternative arrangement the rotatable bean conveyor may be formed by a paddle wheel with radially extending paddles or vanes. To prevent bean jamming it may be advantageous not to have these paddles or vanes extend the entire radial distance to the perimeter edge of the paddle wheel or impeller. Alternatively or additionally the vanes may be formed in a flexible material. More in particular the entire impeller may be made from an elastic material, in particular in a plastic material having an E-modulus in the range of 150 to 1200 N/mm2, more in particular 175 to 800 N/mm2, and preferably between 175 and 300 N/mm2. Further it is possible to vary the number of vanes in relation to the area of the perimeter aperture to block the escape of beans with the impeller at rest.

Surrounding the bean conveyor disc 10369, coextensive with the first cylindrical inner wall 10361, is a movable sleeve 10346. The movable sleeve is provided on its exterior with a male screw thread 10347, which engages a female screw thread formation on an interior surface of the first cylindrical inner wall 10361. The movable sleeve 10346 is further provided with inwardly projecting notches, which each engage one of the opposite upstanding sides of closing flap 10375.

In operation, the bean cartridge 10303 will be connected to a coffee brewing machine by means of bayonet formation 10383, 10385. To activate the cartridge the coffee brewing machine initiates a control signal to drive the driving hub 10371 and thereby the conveyor disc 10369 and upstanding closing flap 10375. The closing flap 10375 will thereby engage a relevant one of the notches 10348 to move the movable sleeve 10346 along the engaged screw thread formations 10347, 10365 in an upward direction towards a sealing membrane 10381 that is attached with its periphery to the outer cylindrical sleeve 10343 of container 10331 and thereby forming the sealing means. This movement will rupture the sealing membrane 10381 and push it into the annular groove 10345. Thereby the movable sleeve 10346 forms a means for disrupting and displacing the sealing element. In particular the sealing membrane 10381 may have been prepared to tear open along predefined weakened lines. Once the upward movement of the movable sleeve 10346 is completed the notch 10348 engaged by the closing flap will disengage there from as best shown in FIG. 15B. It will be clear to the skilled person that for activating the cartridge 10303 it will only be necessary to provide a single notch 10348 on the inner circumference of movable sleeve 10346. In this embodiment the second notch engaging a trailing vertical edge of closing flap 10375 is merely provided for ease of assembling.

The latter two embodiments can both be automatically activated by a driving means in of the system. Continued rotation of the driving hub will start conveyance of the coffee beans once the sealing membrane has been moved out of the way of the container opening.

FIG. 16A to 16E show a still further embodiment of a first coffee bean packaging cartridge 10403. Packaging cartridge 10403 includes a bottle-like container 10431 defines an interior volume 10435, and has a neck portion 10437 and an outer collar 10442. Received within an open end 10439 defined by the outer collar 10442 is a closure member 10433, which preferably is non-detachably attached to the container 10431. The outer circumference of the outer collar 10442 may be provided with bayonet formations 10483, 10485 or other suitable connecting means for connection to a coffee brewing apparatus.

Figures 16C, 16D:
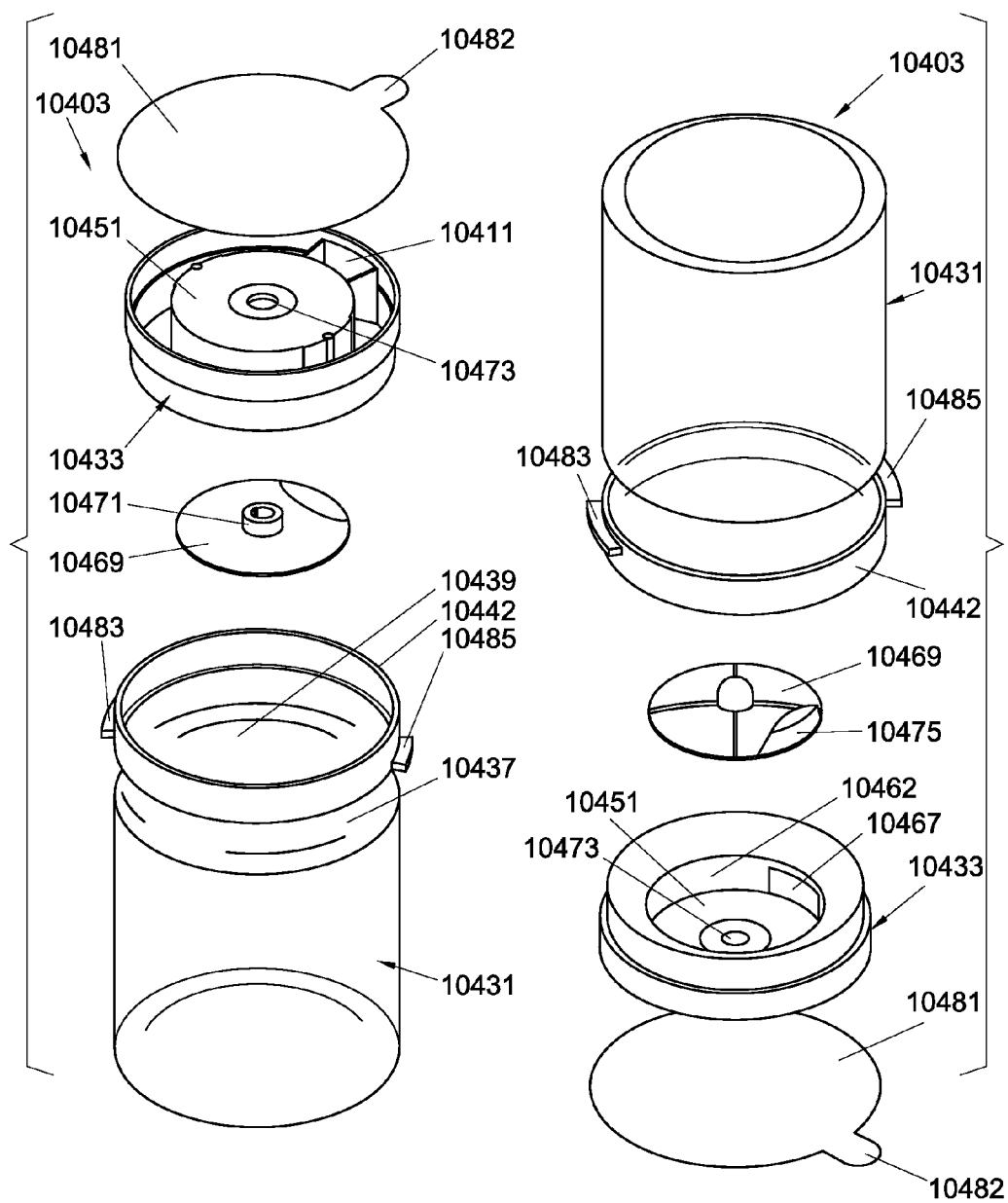
FIG. 16C is a first perspective exploded view of the embodiment of the bean cartridge of FIG. 16A showing the parts in an inversed arrangement.
FIG. 16D is a second perspective exploded view of this embodiment in an arrangement normal to the position of use.
Figure 16E:
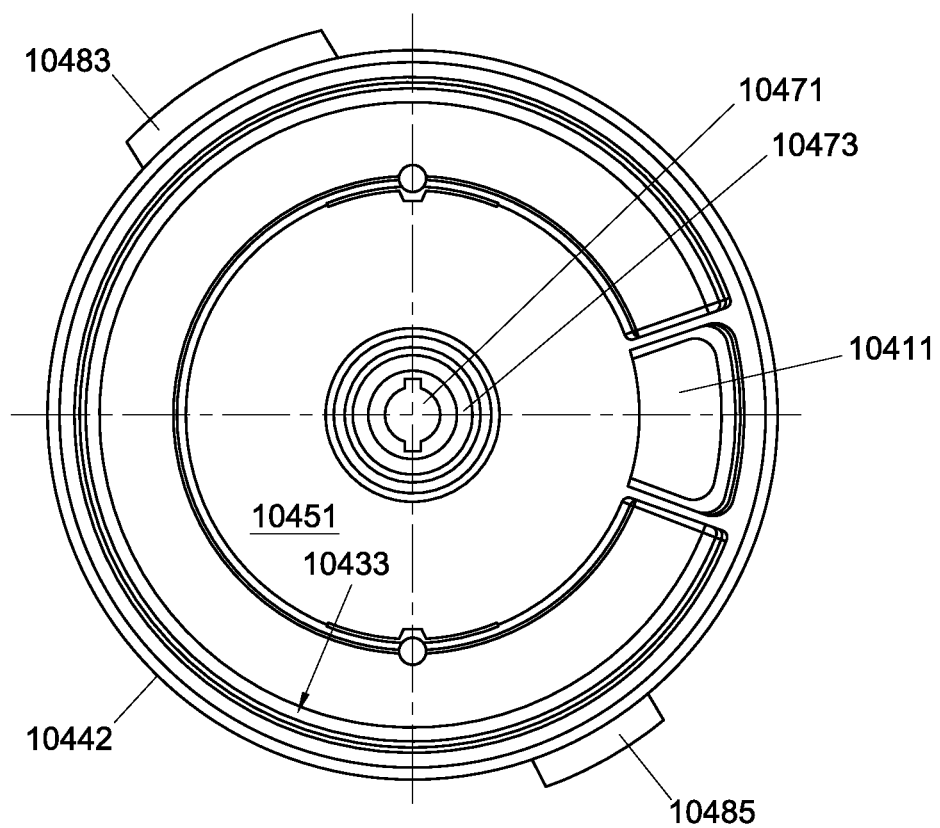
FIG. 16E is a bottom view of this embodiment of the bean cartridge with its sealing membrane removed.

The closure member 10433 fits snugly into the open end 10439 as defined by the neck 10437 and outer collar 10442 of the container 10431 and may be attached by adhesive or weld bonding. An axial outer edge of the closure member 10433 is slightly recessed from the outer axial edge of the outer collar 10442 as shown in FIGS. 16A and 16B. The closure member 10433 also has a bottom 10451 with a coffee bean outlet 10411. As best seen in FIGS. 16C and 16D, the closure member 10433 defines a central cavity wall 10462 with a perimeter aperture 10467. The perimeter aperture communicates with the coffee bean outlet 10411 via a cavity that is again radially offset from the column of coffee beans held in the interior volume 10435. Received in a central cavity defined by cavity wall 10462 and bottom 10451 is a rotatable bean conveyor disc 10469. Axially extending from the conveyor disc 10469 is a closing flap 10475 configured to form a movable closing means for the perimeter aperture 10467. The bean conveyor disc has a driving hub 10471 protruding through a central opening 10473 in the bottom 10451. It will be clear to the skilled person that conceivably the closure member 10433 of this embodiment may also be designed to engage the outside of the container 10431, in a similar fashion as in the previously described embodiments. In such an alternative arrangement the bayonet formations 10483, 10485 will be part of the closure member 10433 rather than the container 10431.

To protect the bean contents of cartridge 10403, prior to its activation for use is a coffee brewing machine, a sealing membrane 10481 is hermetically attached to the axial free edge of the outer collar 10442. In this embodiment the sealing membrane 10481, forming the sealing means, is not automatically removed by the coffee brewing machine but will be removed by the user. For this purpose a manual pull tab 10482 may be provided as a configuration of the means for disrupting and displacing the sealing element. The arrangement of the bayonet formations 10483, 10485 on the exterior of the container 10431 with the closure member 10433 recessed in its open end allows the barrier foil or sealing membrane 10481 to be sealingly attached to the outer edge of the container 10431. Thereby the sealing barrier 10481 also covers the joint between the container 10431 and the closure member 10433. The sealing membrane or barrier foil 10481 can keep the bean contents fresh and protected from ambient air during shipping and stock keeping prior to the cartridge being put to use. However freshly roasted coffee beans may still emanate gases, such as $CO_2$. To enable roasted beans to be freshly packed the sealing membrane, or barrier foil such as 10481, may additionally be provided with a one-way pressure relief venting valve (not shown in the drawing, but conventional).

In operation the cartridge 10403 of this embodiment, after manual removal of its sealing membrane 10481 can be coupled to the brewing machine by the bayonet formations 10483, 10485 or like suitable connecting means. The operation of conveying coffee beans into the coffee brewing apparatus is similar to the other embodiments. Once the brewing apparatus is activated to produce a coffee brew the control unit/device initiates rotation of the conveyor disc 10469 and the closing flap 10475 will rotate away from the perimeter aperture 10467. The rotation of conveyor disc 10469 will be continuous and the closing flap 10475 will only line up with the perimeter aperture 10467 once per revolution. During the time that closing flap 10475 is not aligned with the perimeter aperture 10467, coffee beans may exit towards the coffee bean outlet 10411 and into the grinding or metering unit of the brewing machine. As soon as the required amount of coffee beans to be ground is withdrawn from first cartridge 10403, the bean conveyor disc 10469 will stop its rotation in the exact position that the closing flap 10475 aligns with the perimeter aperture 10467. A means to interrupt the supply of beans is thereby provided. Preferably the rotative power and the sturdiness of the components comprising the closing flap 10475 and the perimeter aperture 10467 is such that any coffee beans that may be in the way of closing are cut or crushed, so that these do not present an obstacle to the closing of perimeter aperture 10467.

Figure 16F:
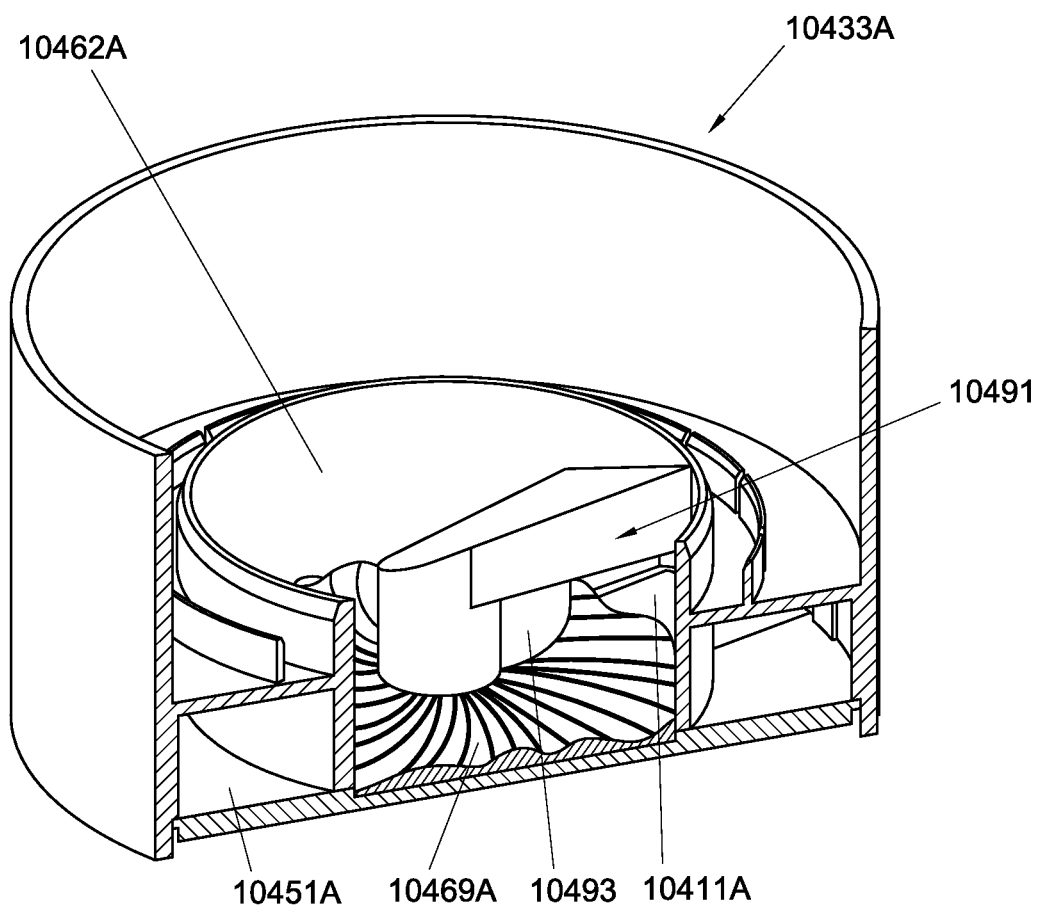
FIG. 16F is a partially cross-sectioned perspective view of a modified closure member for use with this embodiment of bean cartridge.

FIG. 16F shows a modified alternative closure member for use with the bean cartridge of FIGS. 16A to 16D. Closure member 10433A of FIG. 16F is adapted to be non-detachably attached to the open end of the container 10431 of FIGS. 16A-D. The axial outer edge of the closure member 10433A may thereby again be slightly recessed from the outer axial edge of the outer collar of the container 10431 as shown in FIGS. 16A and 16B to allow a sealing membrane only to be attached to the axial free edge of the outer collar of the container. The closure member 10433A also is provided with a bottom 10451A through which a coffee bean outlet 10411A extends. The closure member 10433A defines a central cavity wall 10462A with a perimeter aperture communicating with the coffee bean outlet 10411A. Accommodated in the central cavity defined by cavity wall 10462A and the bottom 10451A is a rotatable bean conveyor disc 10469A. Guiding means include a plurality of generally radially extending alternating ridges and grooves on an upper surface of the conveyor disc 10469A that in use confronts the interior of container 10431.

The plurality of generally radially extending alternating ridges and grooves of the conveyor disc 10469A assist in transporting the coffee beans towards the periphery thereof, by forming an agitating and guiding means for the coffee beans. Alternatively a flat upper surface on the conveyor disc 10469A may be used when it is rotated at a higher speed. In addition the guiding means of the embodiment of FIG. 16F includes a stationary guide arm 10491 overlying a portion of the upper surface of the conveyor disc 10469A to guide coffee beans from the conveyor disc 10469A along a generally radially extending guide surface 10493 toward the exit opening 10411A.

In reference to FIGS. 17 to 21 several metering devices will now be described that are suitable for use in conjunction with the first coffee bean cartridges previously described.

Figure 17:
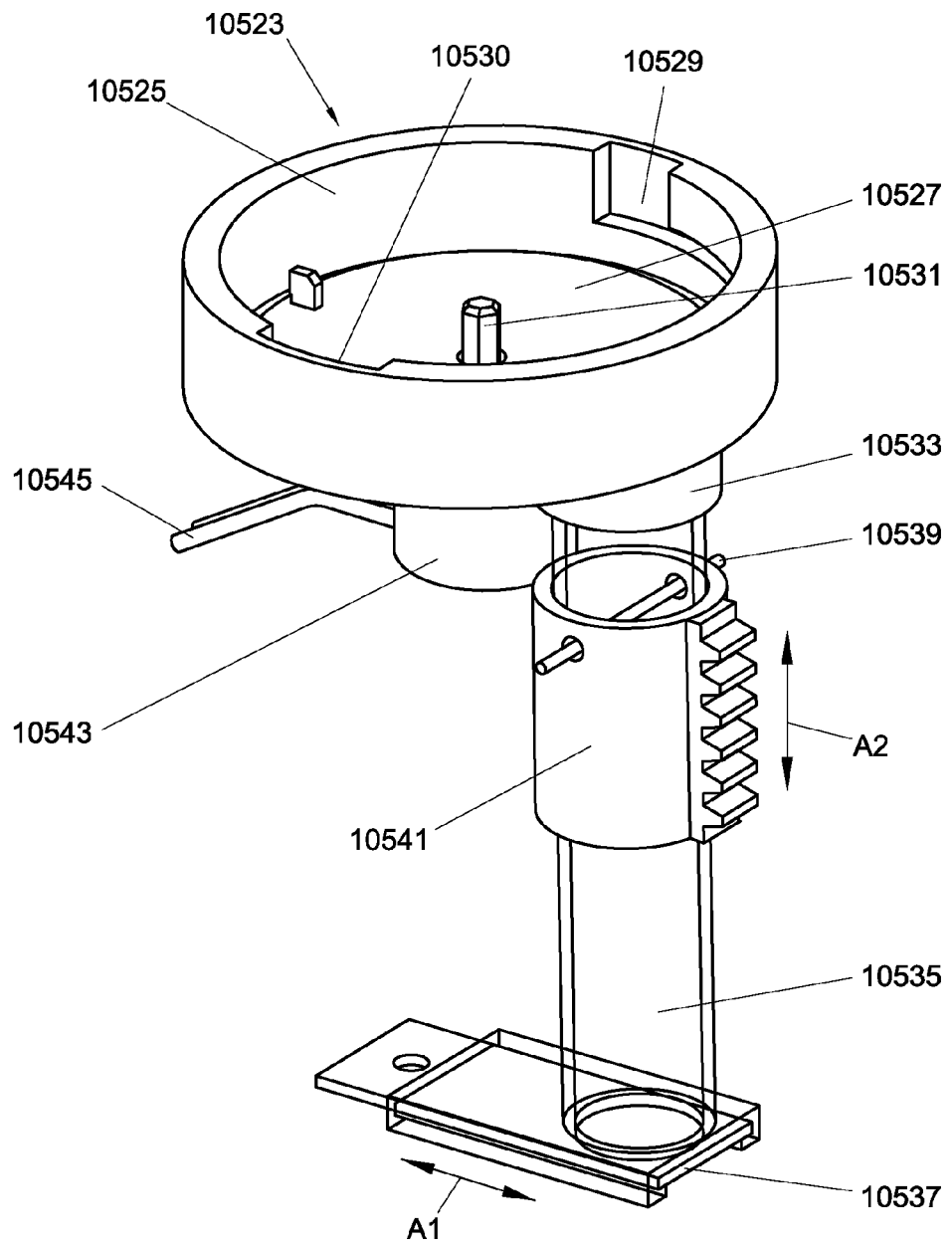
FIG. 17 shows components of a dosing device for metering coffee beans discharged from the packaging cartridge.

In FIG. 17 some principal components of a dosing unit 10523, embodying the means for dosing coffee beans, are shown. The dosing unit 10523 forms part of the coffee apparatus as shown in FIG. 1 and is positioned within the coffee beans transport path. A explained above, the conveyor means of the first cartridge also forms part of the dosing device in this embodiment. Hence the dosing unit 10523 of the coffee brewing apparatus and the conveyor means of the first cartridge in combination form part of the dosing device of the system. A machine interface 10525 has a cavity 10527 and bayonet formations 10529, 10530 to cooperate with bayonet formation such as provided on the bean cartridges previously described. Protruding from a bottom of cavity 10527 is a rotatable drive shaft 10531 for drivingly engaging a driving hub of a conveyor disc of the described cartridges. Also provided in the bottom of cavity 10527 is a metering entrance 10533, with line up when connected to the machine interface 10525.

The metering entrance 10533 gives access to the metering chamber, also be referred to as dosing chamber 10535. The dosing chamber 10535 at a lower end thereof is provided with a movable release lid 10537 as a configuration of an emptying means. In the example illustrated the movable release lid 10537 is a slidable gate, but it may conceivably also be in the form of a rotatable shutter of like. The release lid 10537 may be automatically operated to move in either of two opposite directions as indicated by double headed arrow A1.

The metering chamber, when having a transparent or translucent outer wall as shown in FIG. 17, may be governed by optical sensor detection means 10539, also referred to as a first sensor or first sensor means, such as a cooperating light emitting diode (LED) and an infrared (IR) sensor. The optical sensor detection means may be carried on a preferably adjustable detection carrier 10541. The detection carrier 10541 may have means for its vertical positioning along the height of dosing chamber 10535, in accordance with the double headed arrow A2.

It is further seen in FIG. 17 that a drive motor 10543 may be directly attached tot the underside of the machine interface 10525 to drive the rotatable drive shaft 10531. Electrical cables 10545 are provided to feed motor 10543. Drive motor 10543 generally embodies the driving or motive means of the system of FIG. 1. The electrical cables 10545 may be fed with electrical energy under control of the control unit of the system. The control unit of the system may act in response to the first sensor.

In operation, coffee beans will be discharged via the metering entrance 10533 into the dosing chamber 10535, by action of the drive shaft 10531 driving the bean conveyor disc of any one of the previously described bean packaging cartridges. The sensor detection means 10539 in advance will have been positioned at the proper height of the dosing chamber 10535, so that the sensor detection means 10539 will detect the volume in coffee beans that corresponds to the proper dosage. When interruption of the IR-beam of the optical sensor detection means 10539 exceeds a period of time longer than a predetermined time interval this means that the beans permanently block the IR-beam and that thus the level of beans in the chamber has reached the height of the first sensor. In that case this event is communicated to the control unit. The control unit will control the motive means of the coffee apparatus such that conveyor means stop transporting beans form the cartridge into the metering chamber. Also the control unit will operate the motive means such that the drive shaft 10531 will return the conveyor disc in the cartridge into a position where it closes the communication with its coffee bean outlet. The movable release lid 10537, which has kept close the bottom of the metering chamber 10535 can now be commanded by control unit to discharge the exact dosing to coffee grinder mechanism, wherein the system is provided with a first sensor for measuring the amount of coffee beans that are transported from the cartridge into the coffee brewing apparatus for preparing coffee. It further holds that the first sensor 10539 is connected to the control unit wherein the control unit is arranged to control the motive means to stop upon detection by means of the first sensor of a predetermined amount of coffee beans being transported from the cartridge into the coffee brewing apparatus wherein preferably the predetermined amount of coffee beans corresponds with a dosed amount of coffee beans for preparing a drink. and wherein the control unit is arranged to control the relatively movable closing means (for example the flap 10375) to close the exit opening of the cartridge upon detection by means of the first sensor of a predetermined amount of coffee beans being transported from the cartridge into the coffee brewing apparatus wherein preferably the predetermined amount of coffee beans corresponds with a dosed amount of coffee beans for preparing a drink.

It holds that the first sensor means is arranged to detect coffee beans in a selected portion of the metering chamber (in this case the portion of the metering chamber located at the height of the first sensor) wherein the system is arranged to select a portion of the metering chamber wherein coffee beans will be detected by the first sensor means to select an corresponding amount of coffee beans in the metering chamber that will be detected by the first sensor means.

Instead of adapting the distance between the first sensor 10539 and a bottom of the metering chamber as discussed above, the metering chamber 10535 itself may be varied in volume, such as by telescoping wall sections. Such an arrangement may also be used to eliminate the sensor means 10539 and obtain dosing by simply limiting the volume that can be contained in the metering chamber. In this example emptying means include a removable arranged bottom of the metering chamber. Alternatively the emptying means include tipping means for tipping the metering chamber. The emptying means are adapted to be controlled by the control unit. In this example it thus holds that the first sensor means generates a signal when a predetermined amount of coffee beans are detected that corresponds to a certain level in the metering chamber wherein preferably the predetermined amount of coffee beans corresponds with the dosed amount of coffee beans.

Figure 18:
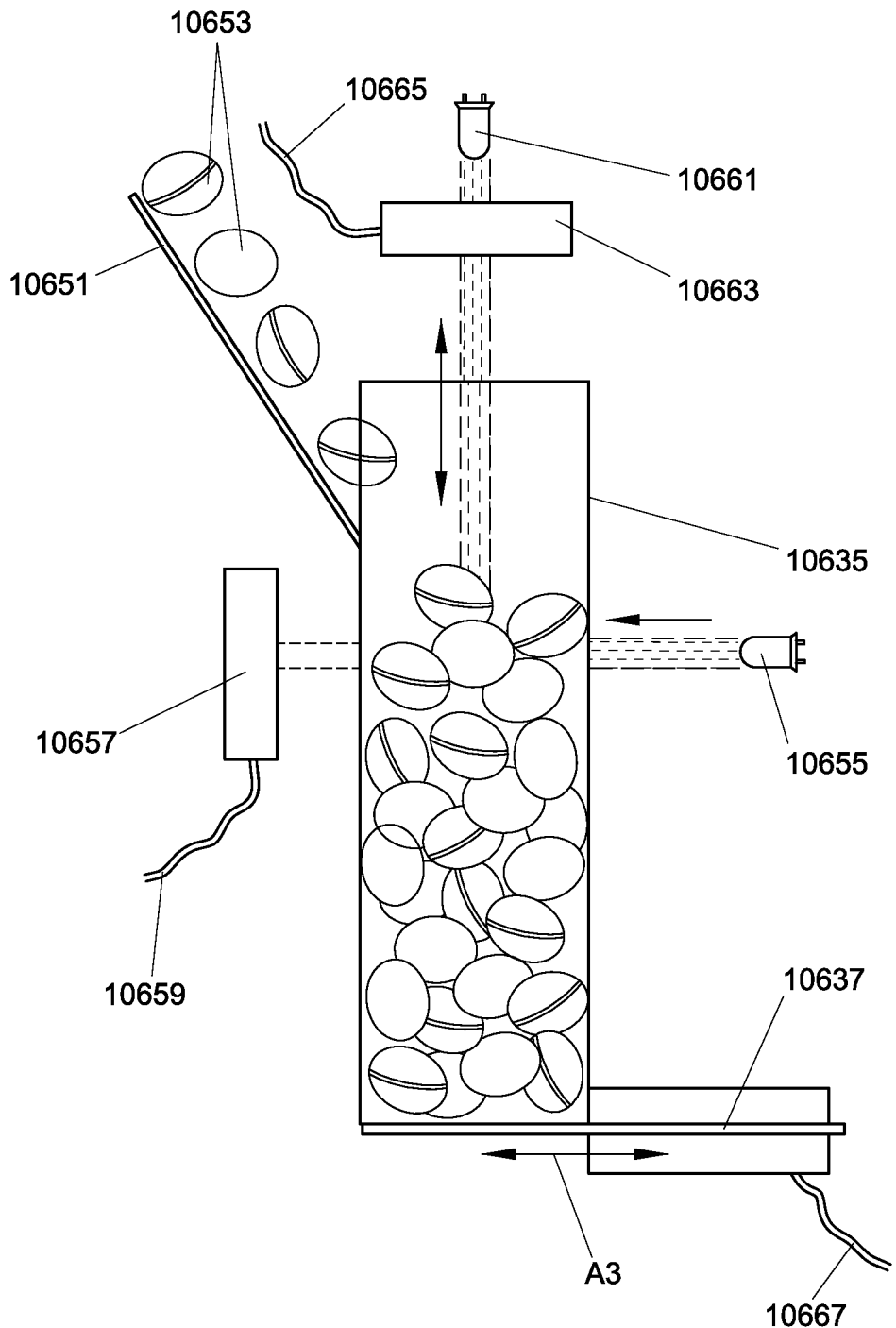
FIG. 18 is a schematic representation of a first modification of a metering principle suitable for use in a coffee bean dosing device.

FIG. 18 illustrates a slightly modified metering mechanism for incorporation in the dosing device 10523 of FIG. 17. A chute 10651 is employed to lead coffee beans 10653 from the dosing entrance (shown as 10533 in FIG. 17) to the metering chamber 10635. Traversing the translucent or transparent metering chamber 10635 is again a horizontal beam IR optical detection system comprising a horizontal LED-beam generator 10655 and an IR detection sensor 10657. By cable 10659 the IR sensor 10657 can be connected to a control unit of the brewing apparatus. The metering mechanism of FIG. 18 is additionally provided with a further substantially vertically directed optical IR detection system comprising a vertical LED-beam generator 10661.

Interruption of the horizontal IR-beam between LED 10655 and sensor 10657 may happen repeatedly when individual coffee beans interrupt the beam when falling into the metering chamber 10635. The control unit therefore only generates a metering chamber full signal, when the interruption of the horizontal beam exceeds a predetermined period of time. As a double check for the horizontal optical detection system the vertical optical detection system is provided. The beam generated by LED-beam generator 10661 is slightly slanted with respect to the vertical direction and an IR detection sensor 10663 is positioned to detect a reflection of the IR beam only when it coincides with the metering level defined by the horizontal optical detection system. Alternatively the IR detection sensor 10663 may detect a reflection of the IR beam, generated by the LED-beam generator 10661, over a wider angle and register the time necessary for the reflection. The delay of the reflection will become shorter as the metering chamber 10635 fills. Via a cable 10665 this reference signal can be communicated to the control unit for comparison with the signal received from the horizontal sensor 10657.

A bottom end of the metering chamber 10635 is again provided with emptying means in the form of a movable release lid 10637 which can be electrically operated through a cable connection 10667 with the control unit for sliding or rotating movement in accordance with bi-directional arrow A3.

Figure 19:
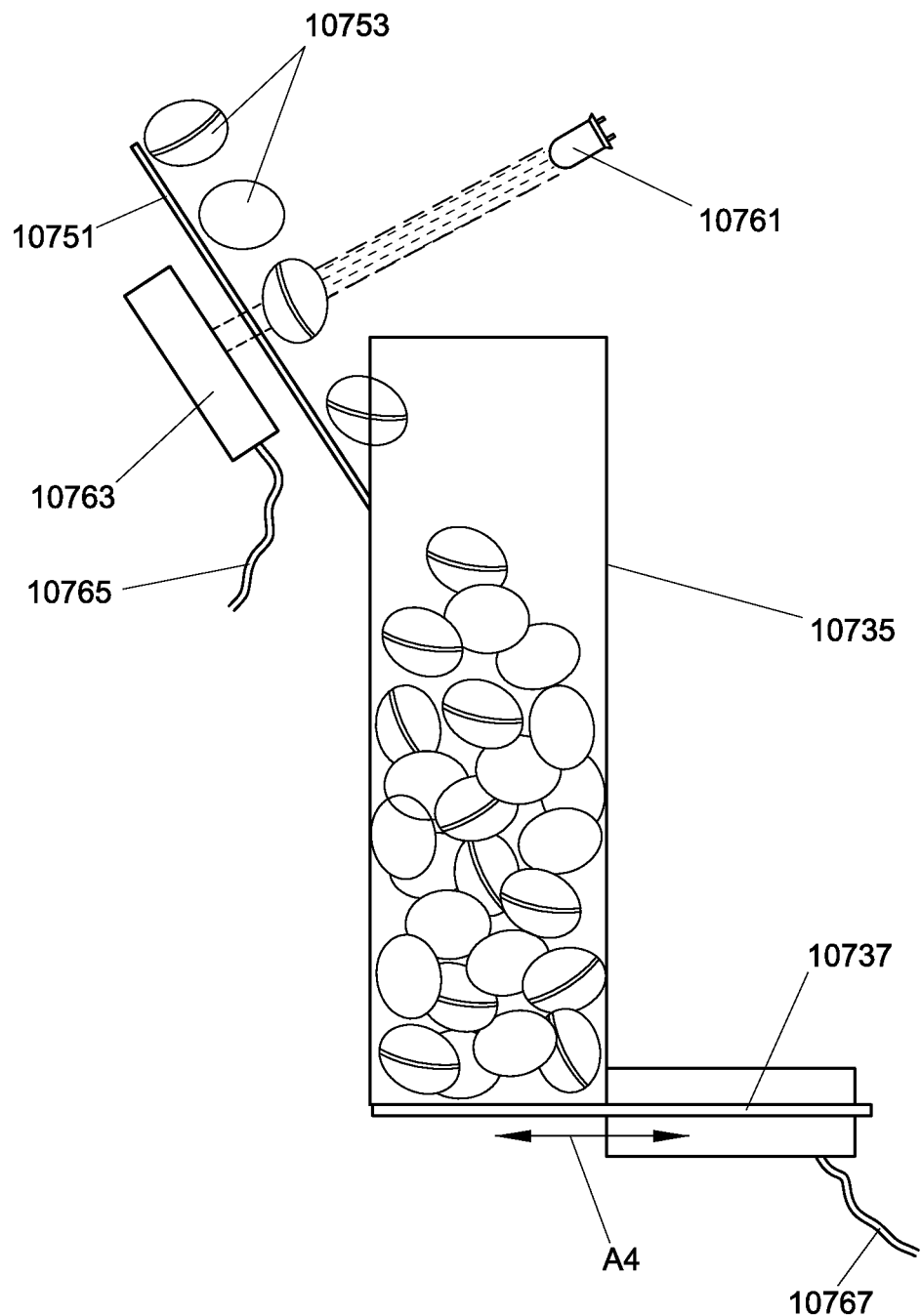
FIG. 19 is a schematic representation of a second modification of a metering principle for use in a coffee bean dosing device.

In FIG. 19 a further modification of metering mechanism is shown that is also suitable for incorporation in the dosing device 10523 of FIG. 17. A chute 10751 for coffee beans 10753 coming from a dosing entrance (shown as 10533 in FIG. 17), is translucent or transparent to IR-light. An IR-beam generator 10761, of the LED-type, communicates through chute 10751 with an IR detection sensor 10763 to count coffee beans 10753 interruption the IR-beam. A cable 10765 can communicate these interruptions to a control unit to count the amount of coffee beans.

Once the predetermined number of beans 10753 for one dosage has been counted the control unit will control the drive motor 10543 (FIG. 17) to return to its stop position and thereby no further beans 10753 will enter the chute 10751 and metering chamber 10735. At the same time emptying means embodied as a movable release lid 10737 may be operated through electrical lead 10767 to open the lid 10737 in the relevant direction of doubled headed arrow A4. Everything may be controlled by the control unit.

In this example the metering chamber may also be a flat plate wherein the counted beans will drop until a predetermined amount of beans are on the plate. The coffee brewing apparatus is further arranged to tilt the plate once the predetermined amount of beans is on the plate and so that the beans are transported into the grinder mechanism. It is also possible that the metering chamber is deleted so that counted beans are directly fed into the grinder mechanism of the coffee brewing apparatus. Transport of beans is stopped by the control unit if a number of beans are counted which correspond with the predetermined amount of beans.

Figure 20:
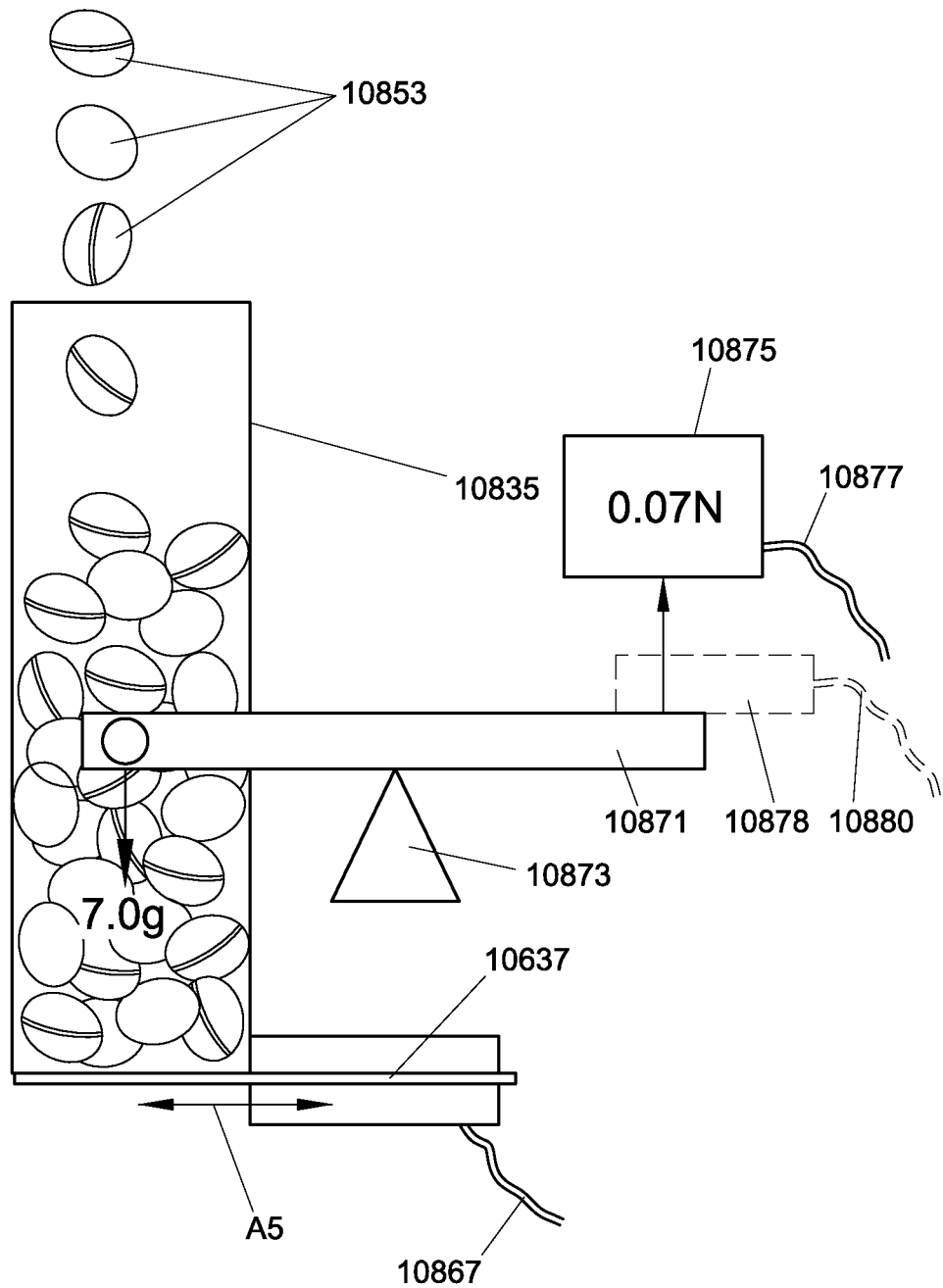
FIG. 20 is a schematic representation of a third principle of metering for use in a coffee bean dosing device.

In FIG. 20 a third alternative of the metering mechanism is illustrated in a schematic manner. Like the example illustrated in FIG. 17 the metering chamber 10835 of third alternative metering mechanism does not use a chute and coffee beans 10853 fall directly into the metering chamber 10835. Protruding into metering chamber 10835 is a basculating load support 10871 which is pivotally balanced on a low friction bearing 10873. When an amount of coffee beans 10853 that is fallen down on the portion of the basculating load support 10871 that protrudes into the metering chamber 10835 reaches the weight of a predetermined dosage the basculating load supports tips about its low friction bearing 10873 and activates a load detection sensor 10875. The load detection sensor 10875 may be arranged to be activated as soon as a weight of 7 grams of coffee beans has been reached. However, this is but an example and conceivably other weight amounts may be predefined. Upon activation the load detection sensor communicates a signal to control unit via electrical lead 10877. The control unit thereupon may initiate stopping motor 10543 (FIG. 17) and the opening of an electrically actuated release lid 10837, through electrical connection 10867, to open in the appropriate direction of double headed arrow A5 and empty the metering chamber. Thereby the predetermined dosage of coffee beans 10853 may pass to the grinding mechanism. Alternatively the load support carries the metering chamber having a known predetermined weight when being empty. Unit 10875 is deleted. If beans are transported into the metering chamber the weight of the chamber will increase and may be measured by means of a first sensor in the form of a force measuring unit 10878 which measures the force of the bearing acting on the bearing. Also unit 10878 stabilizes the bearing 10871. The measuring results are communicated to the control unit by means of a signal generated by means unit 10878 via a cable 10880. Hence this force corresponds with the weight of the metering chamber including the beans in the chamber. When the increased of weight of the metering chamber corresponds with the predetermined amount of coffee beans the control unit will stop the motive means and it will active the emptying means for emptying the metering chamber. In this example the system is thus arranged to generate by means of the first sensor means a signal corresponding with the amount of coffee beans which is present in the metering chamber.

Figure 21:
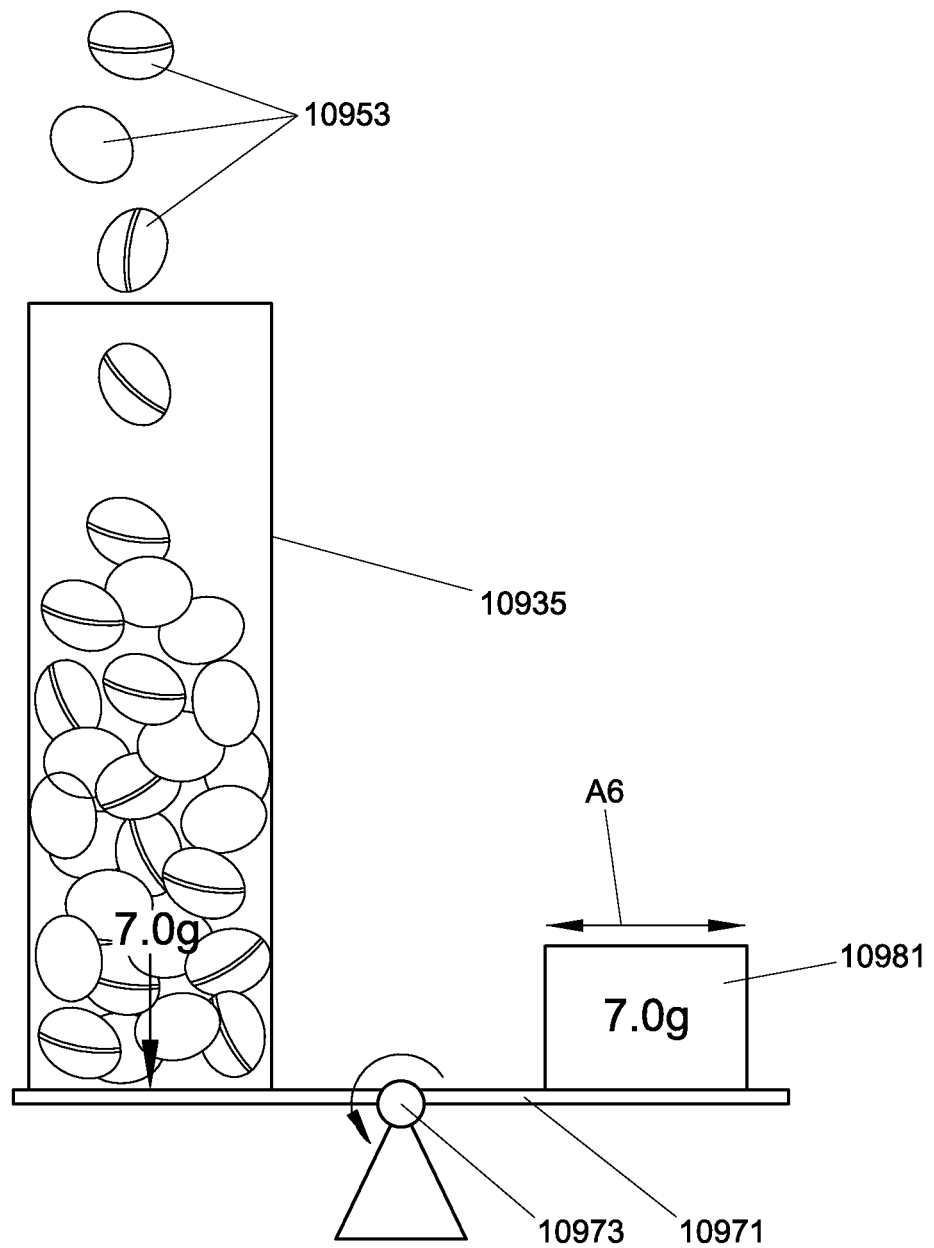
FIG. 21 is a schematic representation of a fourth metering principle for use in a coffee bean dosing device.

A fourth alternative and further simplified metering mechanism is schematically shown in FIG. 21. Like in the previous embodiment coffee beans 10953 enter the metering chamber 10935 in a vertical direction from above by gravity. In this simplified embodiment only mechanical means are used for metering the dosage and the functions of emptying, such as by means of a release lid, and load detection are combined into a basculating release lid 10971 that is pivotally arranged about low friction bearing 10973. A portion of the basculating release lid 10971 coincides with metering chamber 10935 and functions as its bottom. Once a predefined load of coffee beans 10953 has been accumulated on this portion of the basculating release lid 10971, it tilts about the low friction bearing 10973 to free the passage for the dosage to a grinding mechanism. To this end the portion of the basculating release lid 10971 opposite the metering chamber 10935 is provided with a preset counterweight 10981 of 7 grams, or like dosage weight. The counterweight 10981 may be exchangeable with weights of other values, for different dosages. As further shown in FIG. 21, the weight 10981 may also be adjustable in the directions of double headed arrow A6 to adjust or fine-tune the exact metering weight of coffee beans. Clearly the mechanical metering as the means for dosing of FIG. 21 should preferably cooperate with additional means to interrupt the supply of coffee beans 10953 to the metering chamber 10935. Such means can include any additional electric switch operated by the release lid 10971 to allow the control unit to return the drive motor 10543 (FIG. 17) to its inactive position in response to appropriate timing and/or sensor means. If the lid 10971 tilts to free the passage as explained above there may be means to keep the lid tilted other than the beans falling out of the chamber such as an electromagnet which is activated by the control unit. After a sufficient time for emptying the chamber the control unit may deactivate the electromagnet so that the lid will close the chamber again. Rather than using the basculating release lid 10971, it is also conceivable to allow the entire metering chamber 10935 to tip over, once a predefined dosing amount has been reached. Such tipping over of an entire metering chamber conceivably can also be controlled by electric means actuated by the control unit. In each of the embodiments as explained above the control unit may be arranged to effect a short reverse rotation of the motive means, prior to interrupting the drive, to ensure that no bean is interfering with the exit opening. Hence in that case the conveyor means are operated shortly in reverse and if such conveyor means is provided with a closing flap as discussed above the closing flap may subsequently close the exit opening of the cartridge.

It is thus explained that the inventive system comprises a first coffee bean packaging cartridge and a coffee brewing apparatus for dosing and/or grinding coffee beans. The system is thereby provided with a first coffee bean packaging cartridge with at least a single wall member, which surrounds an interior space for multiple dosages of coffee beans, and with a coffee bean outlet for delivering coffee beans. The apparatus is further provided with a coffee bean grinding mechanism, with a coffee bean inlet for a supply of coffee beans from the coffee bean packaging cartridge to the grinding mechanism. Connecting means are provided for connecting coffee bean packaging cartridges to the apparatus, so that the coffee bean outlet of the packaging cartridge connected to the coffee bean inlet of the apparatus that can provide a dosing unit with a single predefined amount of coffee beans from the coffee bean exit to the coffee bean inlet. The connecting means can be provided with a coupling element for coupling and uncoupling of the first coffee beans packaging to and from the apparatus. The coffee beans packaging cartridge prior to use is sealed such that exposing of coffee beans to environmental air is prevented.

In the system the coffee brewing apparatus comprises a brewing device for brewing coffee on the basis of ground coffee beans and water wherein the brewing means is controlled by the control unit. The control unit may be arranged to start operation of the brewing device and/or grinder only upon verifying occurrence of at least one of the relatively movable closing means having closed the exit opening or the conveyor means having interrupted. The coupling means may comprises a rotating element such as a drive shaft, which drives the conveyor means upon being rotated wherein the rotating element is arranged to be rotated by the first motor of the coffee brewing apparatus.

Figure 22:
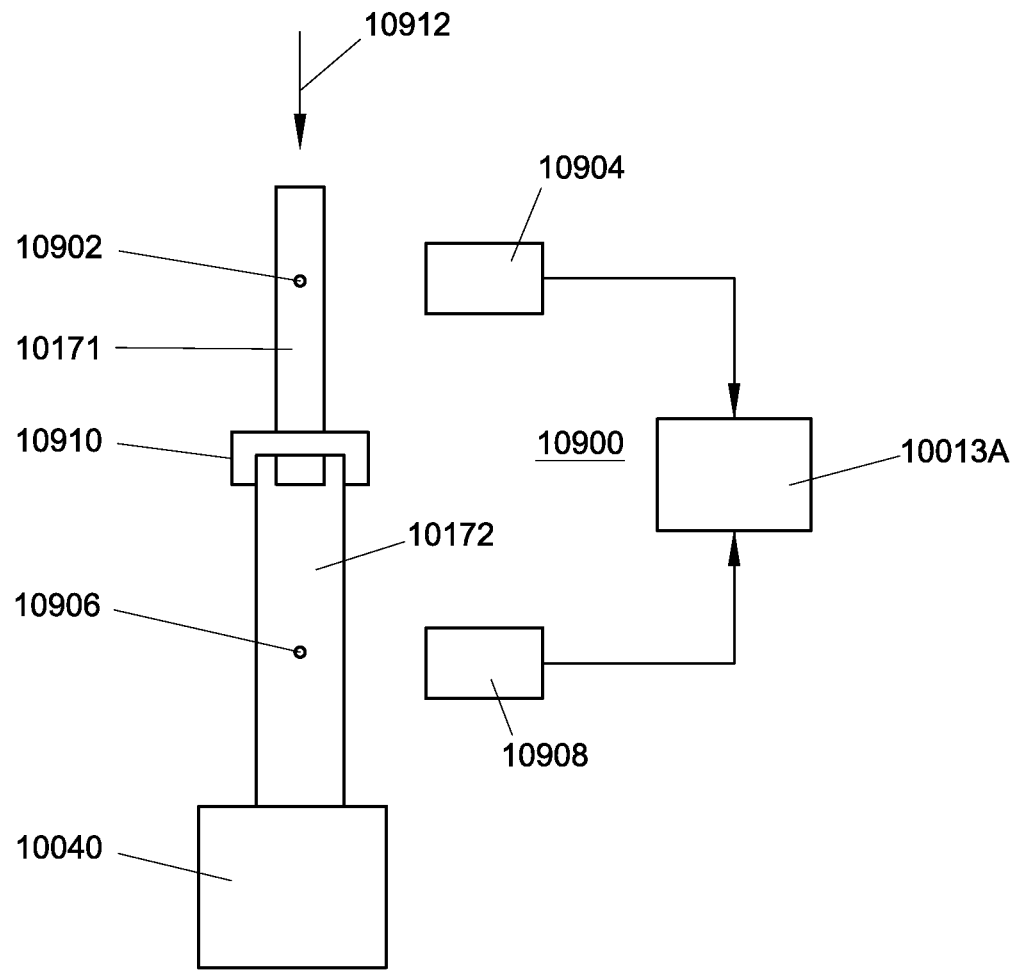
FIG. 22 a portion of a special embodiment of the system according to FIG. 1.

The system (see FIG. 22) may further comprise detection means 10900 for detecting a rotational speed and/or a phase of the rotating element 10171 as well as of the motor 10040 of the coffee brewing apparatus. The rotating element 10171 may for example be provided with an optical mark 10902 which may be detected by an optical sensor or detector 10904 which is connected to the control unit 10013A. If the rotating element 10171 rotates the optical mark 10902 will rotate too and the moments in time on which the mark is detected by means the detector 10904 represent in combination the rotational speed and rotational phase of the rotating element 1171. The motor 10040 may similarly provided with an optical mark 10906 wherein by means of another optical detector 10908 which is connected with the control unit 10013A the rotating speed and rotating phase of the motive means is measured. In this example the rotating element 10171 is connected to a drive shaft 10172 which is connected with the motor. The connection 10910, between the rotating element 10171 and the drive shaft 10172, is in this example such that connection can only be carried out in known rotative positions of the rotating element 10171 relative to the shaft 10172 if the mark 10902 and the mark 10906 are vertically seen above each other (in line in vertical direction 10912). The control unit 10013A may be arranged to only start the brewing means and/or the grinding mechanism if the detected rotational speed of the rotating element 10171 is the same as the detected rotational speed of the motor 10040 and/or if the detected phase of the rotating element 10171 is the same as the detected phase of the motor 10040 and the drive shaft 10172.

Figure 23:
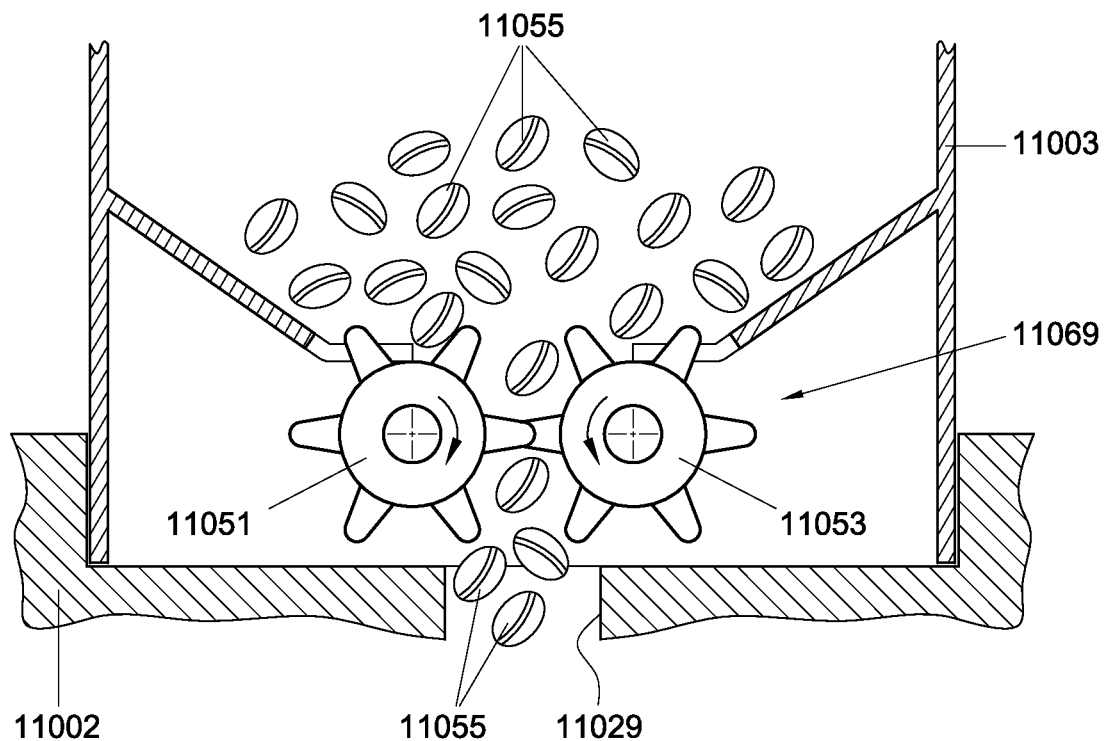
FIG. 23 in cross section shows an alternative form of conveyor or transportation means for use with the invention.
Figure 24:
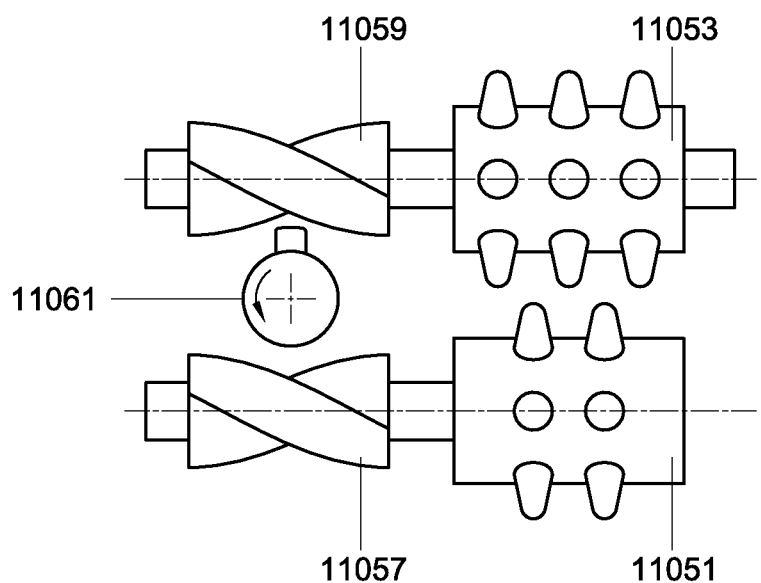
FIG. 24 is a plan view of a portion of the conveyor means of FIG. 23.

In FIGS. 23 and 24 conveyor means 11069 is part of the first cartridge 11003 and includes a part of counter rotating first and second rubber bean wheels 11051, 11053. The first and second rubber bean wheels 11051, 11053, each have a plurality of flexible radial protrusions extending from their circumferences. Coffee beans 11055 are conveyed between the rubber bean wheels 11051, 11053 when in motion, but the exit of the cartridge 11003 is effectively closed to prevent beans form falling out, when the rubber wheels 11051, 11053 are held stationary, by the radially extending protrusions. As seen in FIG. 23 the cartridge 11003 is positioned on top of a coffee brewing appliance 11002 and coffee beans 11055 conveyed by the conveyor means 11069 will be allowed to enter a bean supply opening 11029 of the brewing appliance 11002. As seen in the plan view arrangement of FIG. 24, the first rubber bean conveyor wheel 11051 has a first helical drive gear 11057. Similarly the second rubber conveyor wheel 11053 has a second helical drive gear 11059. Both the first and second helical drive gears 11057, 11059 are driven by an appliance drive 11061, which is part of the appliance 11002, rather than of the cartridge 11003. It is clear that the drive coupling here is not in the form of a common shaft coupling, or the like, but rather accomplished through the drive engagement of complementary gear members.

Figure 25:
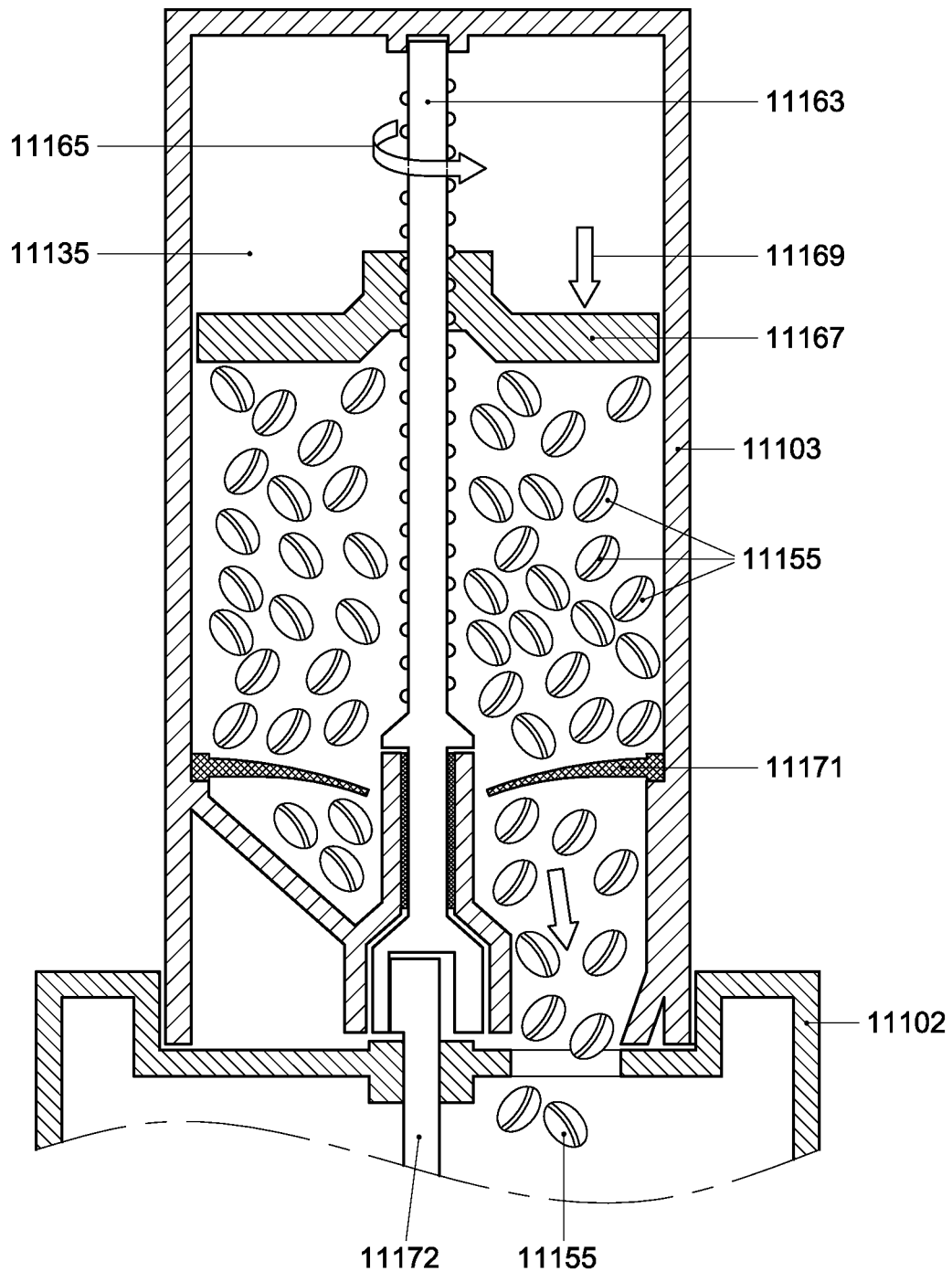
FIG. 25 is a cross section through another cartridge according to the invention employing yet another form of conveyor means.
Figure 26:
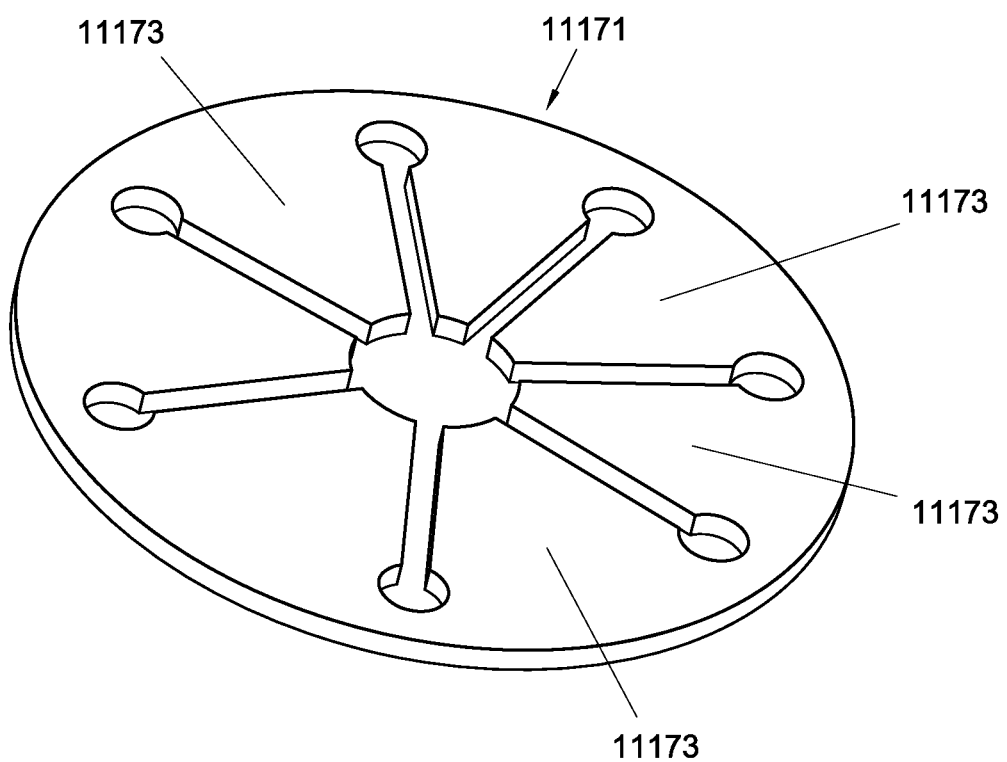
FIG. 26 is an isometric view of a flexible valve for use in the embodiment of FIG. 25.
Figure 27:
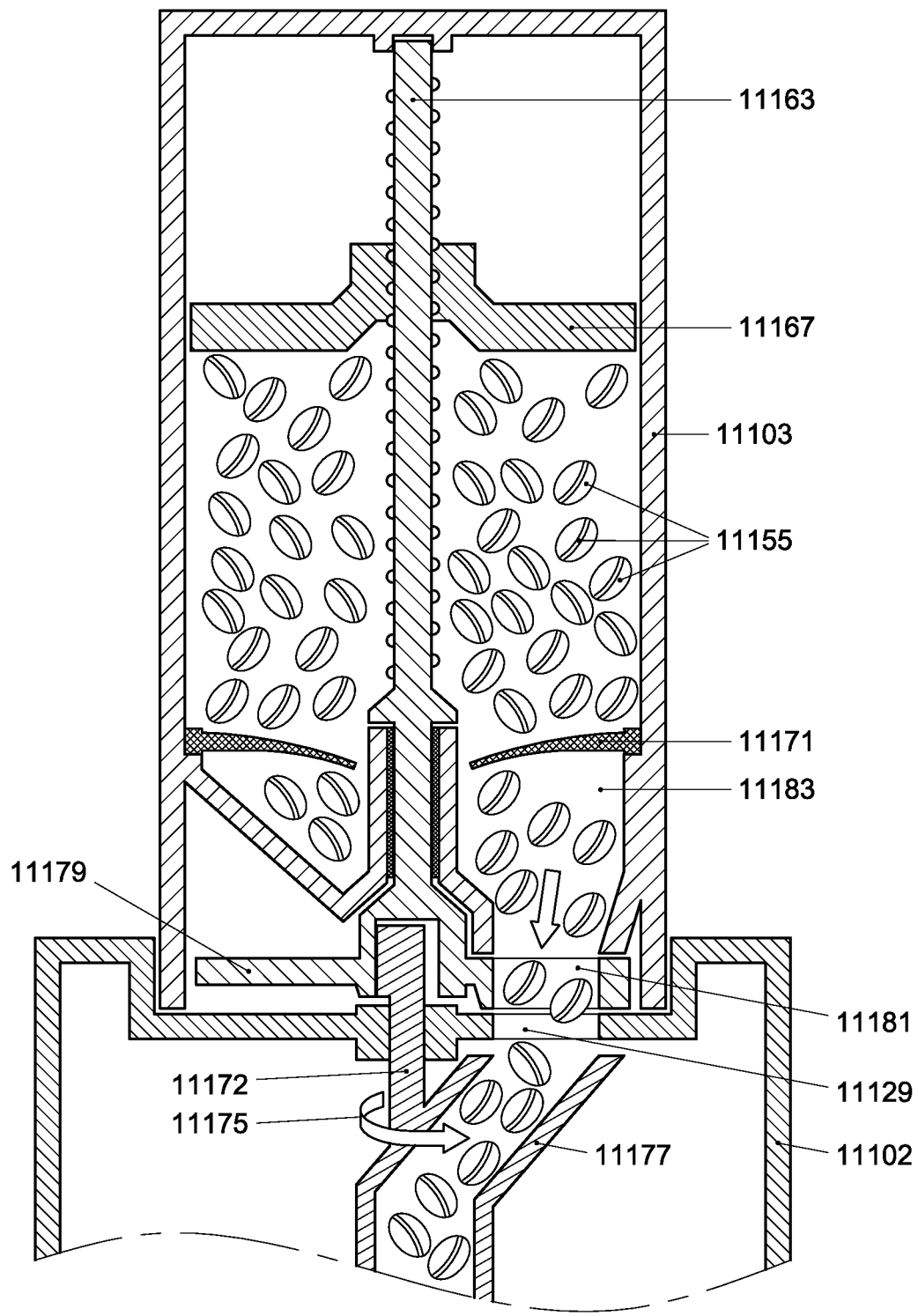
FIG. 27 is a variation on the embodiment of FIG. 25 using an additional synchronizing means in the coffee brewing appliance.

The embodiments illustrated in FIGS. 25 to 27 use a rotative drive from the appliance 11102, which is converted into a linear movement in the interior volume 11135 of the cartridge 11103. Drive shaft 11172 rotatably engages lead screw 11163 in accordance with arrow 11165 and moves a conveyor piston 11167 in a downward direction, as indicated by arrow 11169. This forces coffee beans 11155 past a flexible valve 11171. The flexible valve 11171, which is shown separately in FIG. 26, is of a relatively stiff resilient material and is radially slotted to form a number of deflectable individual flaps 11173. The stiffness given by the material of the valve 11171, to the individual flaps, separated by the radial slots, is sufficient to support a filling of coffee beans 11155 in the cartridge 11103. It is only by the force exerted by the conveyor piston 11167 that coffee beans 11155 are forced through the radial slits between the yieldable flaps 11173. Conveniently the flexible valve 11171 can be made from a plastic material. Without pressure being exerted on the flexible valve 11171, through the conveyor piston 11167 and the intervening coffee beans 11155, the beans 11155 will be prevented from falling out of the cartridge 11103. It will thereby be clear that with the cartridge 11103 engaged with a grinding and/or brewing appliance 11102 upon rotation of drive means 11172. Interruption of the rotation of drive means 11172 will stop the supply of coffee beans 11155 through the flexible valve 11171.

In the alternative of FIG. 27 a rotating chute 11177 is associated with drive shaft 11172 for rotation therewith in a direction indicated by arrow 11175. Internally of the cartridge 11103 the variation of FIG. 27 has a rotating closure member 11179 which rotates together with the lead screw 11163, when driven by the drive shaft 11172. The rotatable closure member 11179 has an exit aperture 11181 that registers with the rotating chute 11177. By stopping the drive shaft 11172 in a position where the chute 11177 is out of register with the bean supply opening 11129 of the appliance, also the exit aperture 11181 will be out of register with an internal chute 11183, formed in the cartridge 11103. Thereby and additional closure of the cartridge 11103 will be obtained, when beans 11155 are not withdrawn there from by the appliance 11102. To enable the exchange of unemptied cartridges 11103 from the appliance 11102 it would merely suffice when beans are prevented from falling out. However to enable stocking of partly emptied cartridges for prolonged periods of time it is certainly beneficial to counteract the entrance of air into the cartridge, at least limit exposure to ambient air. For this purpose the additional closure member 11179 may be very useful.

Figure 28A:
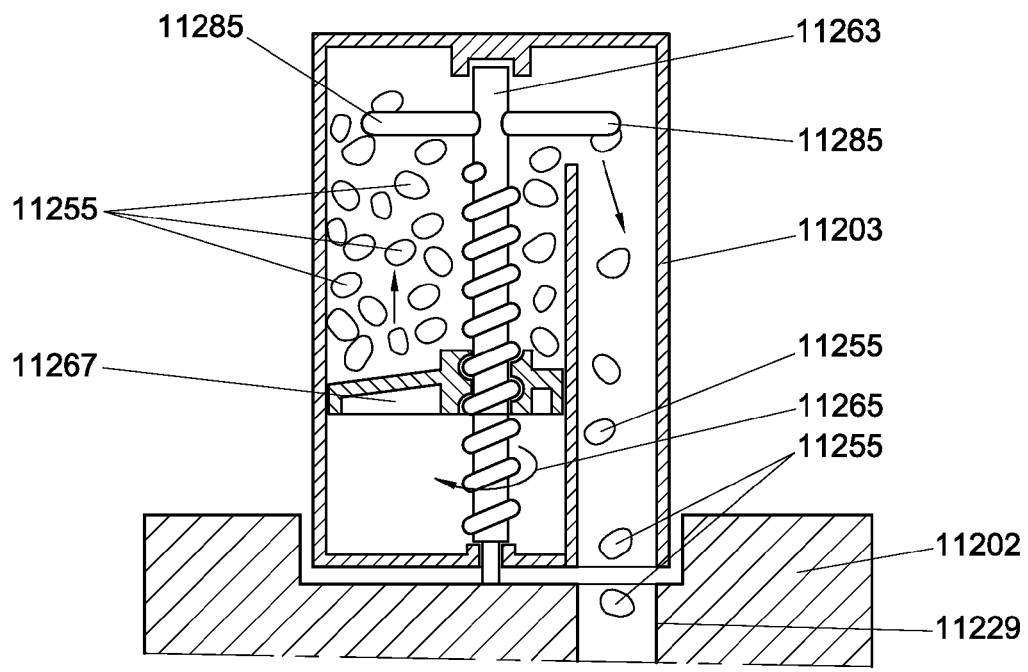
FIG. 28A in cross section shows a further embodiment of conveyor means as part of a cartridge.
Figure 28B:
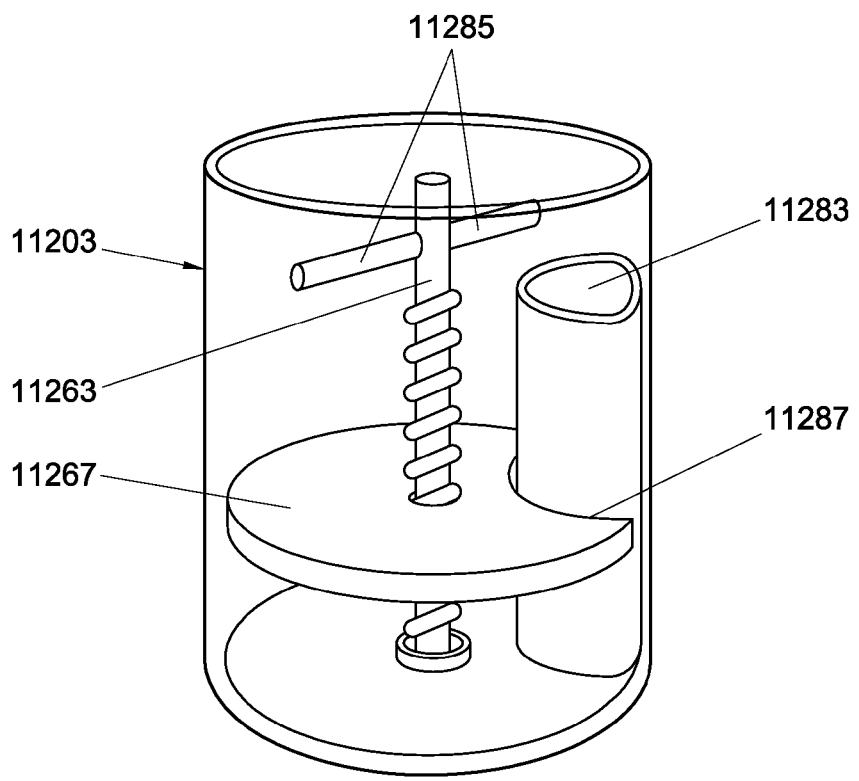
FIG. 28B is an isometric ghost view of the cartridge of FIG. 28A.

Another variation of cartridge 11203 is illustrated in FIGS. 28A and 28B. The cartridge 11203 has again a rotatable lead screw 11263, which is arranged to be driven from a coffee preparing appliance 11202 similar to the previously described embodiments. Rotation of the lead screw 11263 in the direction of arrow 11265 raises a floor forming piston 11267. Raising the floor forming piston 11267 raises coffee beans 11255 resting on top of the floor forming piston 11267 to a level above internal chute 11283. Arms 11285 rotate together with the lead screw 11263 and assist in sweeping coffee beans 11255 at the upper surface into the internal chute 11283. It is further seen in FIG. 28B that the floor forming piston 11267 is formed with a recess 11287 that snugly fits around the internal chute 11283. When the cartridge 11203 is in the form of a cylindrical container, as represented in FIG. 28B, then the recess 11287 effectively prevents relative rotation between the floor forming piston 11267 and the remainder of cartridge 11203, without the need for other rotation preventing means. The beans 11255 that have been transferred into the chute 11283 will enter the appliance 11202 through supply opening 11229, as shown in FIG. 28A.

Yet another form of conveyor means in a cartridge 11303 is shown in FIGS. 29A to 29D. Cartridge 11303 is adapted to be connected to an appliance 11302 and to be drivingly connected to a drive shaft 11372 of the appliance 11302. The cartridge 11303 has a primary bottom 11389 having a coffee bean outlet 11311, that lines up with the bean supply opening 11329 of the appliance 11303. The cartridge 11303 is further provided with a secondary bottom 11391 that is generally funnel shaped with a lowermost position being interrupted for communication with a shuttle slider 11393.

Figure 29A:
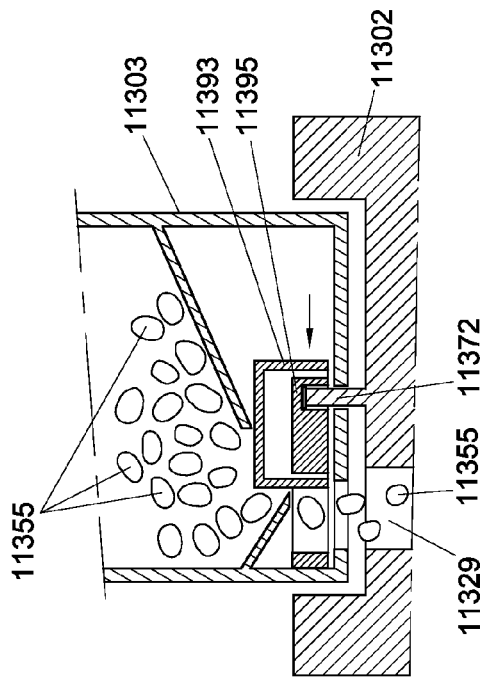
FIG. 29A is a cross sectional view through another conveyor means in a first position.
Figure 29B:
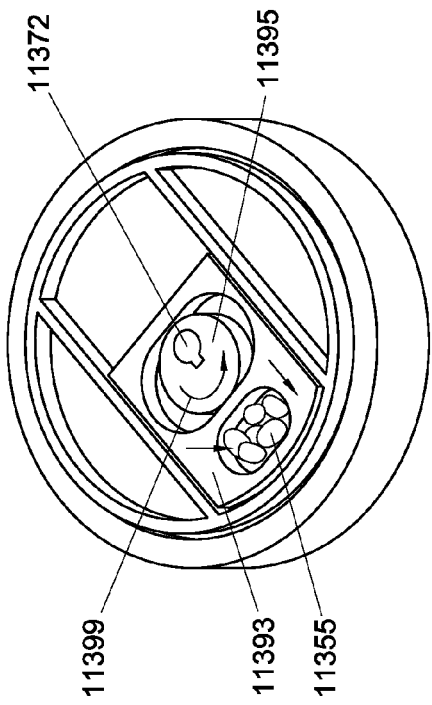
FIG. 29B is an isometric view of the conveyor means of FIG. 29A in the first position.
Figure 29C:
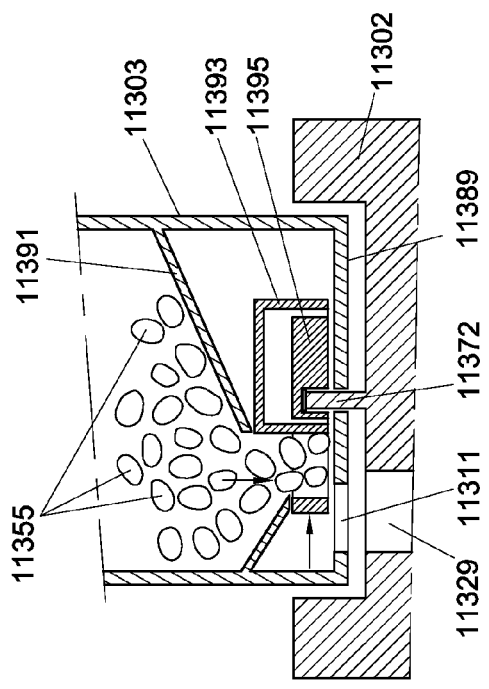
FIG. 29C is a cross sectional view of the conveyor means of FIG. 29A in a second position.
Figure 29D:
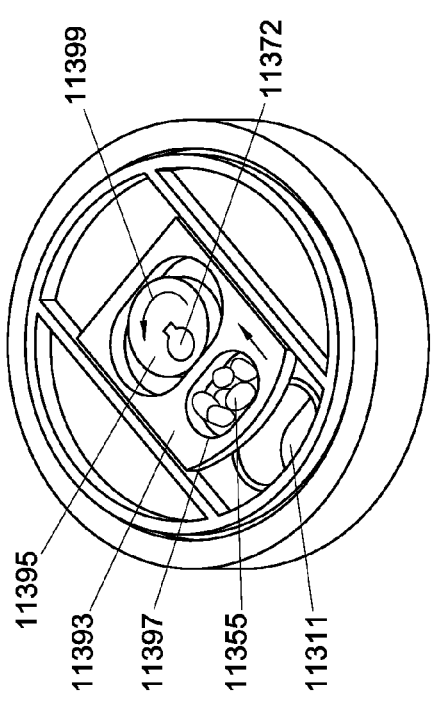
FIG. 29D is an isometric view of the conveyor means of FIG. 29A in the second position.

The shuttle slider 11393 is guided for reciprocating movement by an eccentric 11395, rotatably by drive shaft 11382. See in particular FIGS. 29B and 29D. As shown in FIGS. 29A and 29B the shuttle slider 11393 has a dosing cavity 11397 holding a predefined quantity of coffee beans 11355. In a first position as shown in FIGS. 29A and 29B, the shuttle slider 11393 has its dosing cavity 11397 in communication with the supply of coffee bean 11355 supported by the secondary bottom 11391. Rotation of the eccentric 11395 in the direction of arrow 11399 will move the shuttle slider 11393 from the first position shown in FIGS. 29A en 29B, into a second position shown in FIGS. 29C and 29D. Into the second position the dosing cavity 11397 aligns with the exit opening 11311 and beans are allowed to pass through the supply opening 11329 of the appliance 11302. It will be clear to the skilled person that the embodiment of FIGS. 29A to 29D may be used for both conveyance and dosing of beans to an appliance. The number of rotations of drive shaft 11372, together with the capacity of the dosing cavity 11397 may provide an accurate dosing for a selected number of beverage servings. Also it will be clear that with the shuttle slider 11393 in either one of the first and second positions the cartridge 11303 will be closed, as communication between the supply of beans 11355 within the cartridge 11303 is not possible with an immobilized shuttle slider 11395.

Figure 30A:
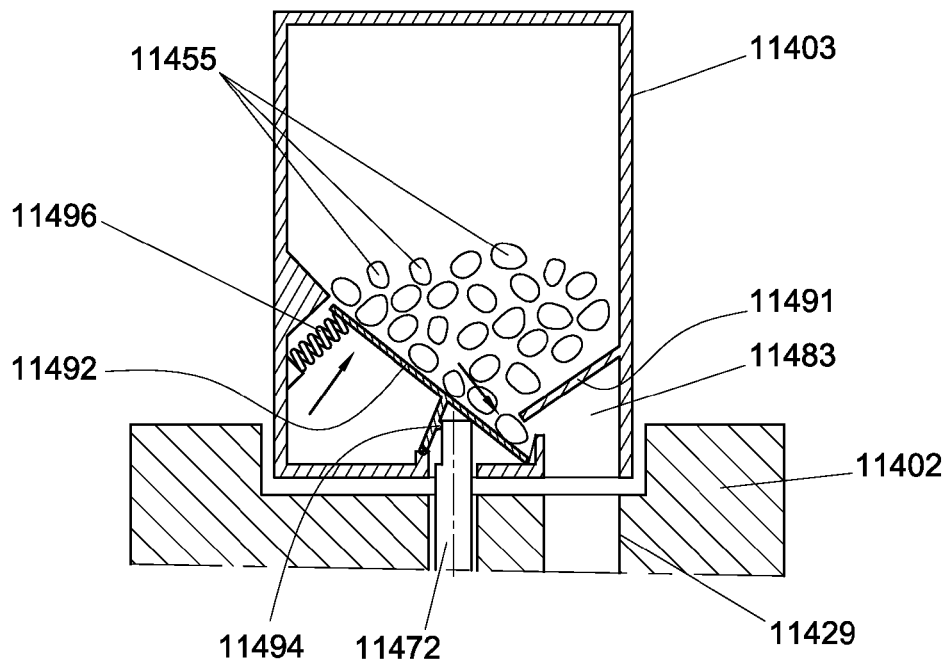
FIG. 30A in cross section shows another alternative form of conveyor means in a first position.
Figure 30B:
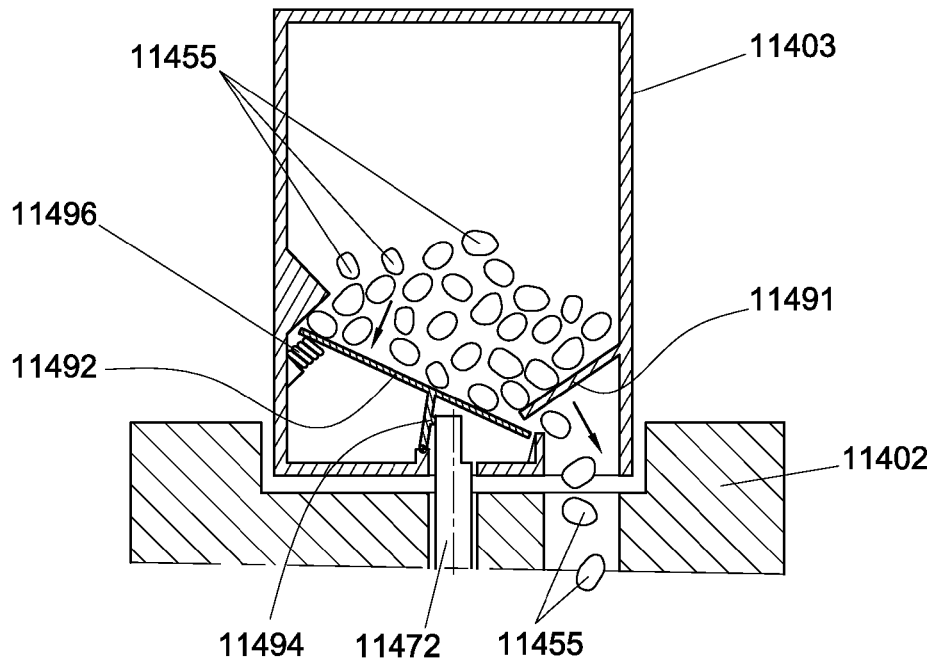
FIG. 30B shows the alternative form of conveyor means of FIG. 30A in a second position.

The conveying means illustrated in FIGS. 30A and 30B has again a secondary bottom 11491, which is completed by a tipping section 11492. Tipping section 11492 is pivoted in the vicinity of drive shaft 11472, which protrudes from appliance 11402. A top end of drive shaft 11472 is formed as an eccentric and a follower 11494 is biased against the eccentric top end of drive shaft 11472 by a spring 11496. The rotating speed of the drive shaft 11472 can be configured such that a vibrating movement is induced into the tipping section 11492. The geometry may be chosen to effect that only a single coffee bean 11455 may be admitted into a chute 11483 every time the tipping section 11492 tips, i.e. upon each rotation of the drive shaft 11472. Clearly still other arrangements will be conceived by the skilled person. While the embodiment of FIGS. 30A and 30B is shown to be biased to an open position of its tipping section 11492, it is indeed easily conceivable to arrange the tipping section in a manner that it will be biased into the closed position of the secondary bottom, so that coffee beans will not fall out when the cartridge is removed from the appliance.

Figure 31:
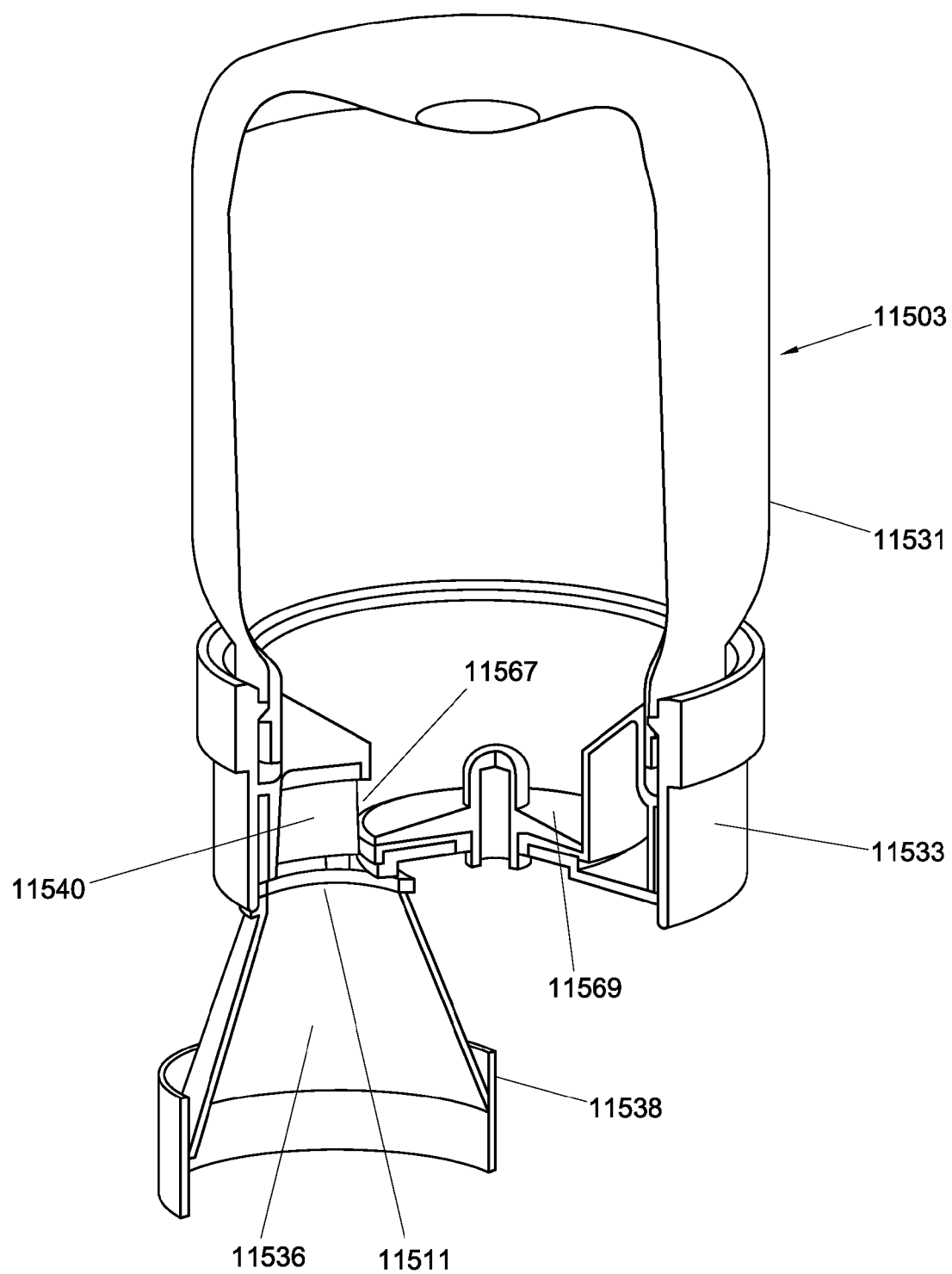
FIG. 31 partly in cross section shows a variation of the cartridge of the invention in combination with a volumetric dosing chamber of an appliance.

FIG. 31 shows a coffee bean cartridge 11503 for cooperation with a volumetric dosing chamber 11536 forming part of a coffee preparing appliance. As illustrated in FIG. 31 the cartridge 11503 is shown in a position in which it is in use on an appliance and the dosing chamber 11536 is the only element of the actual appliance that is being shown. The rest of the appliance is deleted in FIG. 31 for clarity. With the cartridge 11503 in position on the appliance, exit opening 11511 lines up with an upper open end of the dosing chamber 11536 of the appliance.

Figure 32:
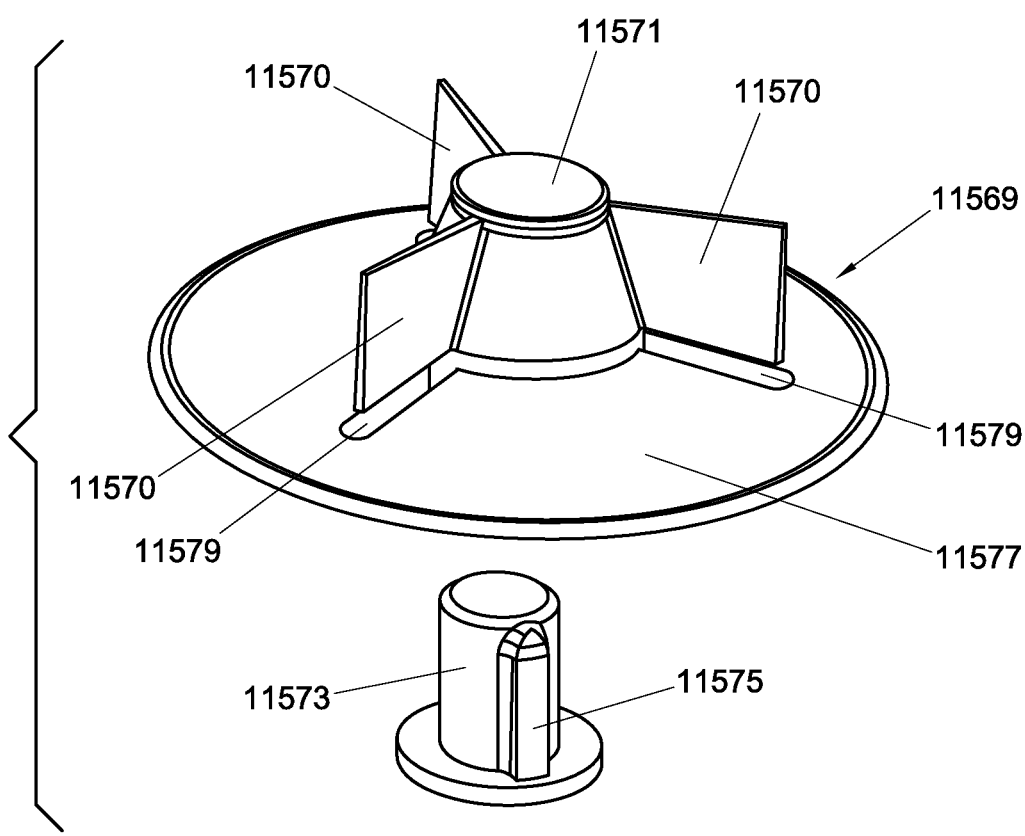
FIG. 32 is an isometric exploded view of an alternative form of conveyor disc together with a drive shaft coupling end.

Between the exit opening 11511 and a perimeter aperture 11567, a portion of the dosing volume is accommodated, in a cavity 11540. The cavity 11540 is formed in a closure member 11533 that together with a container 11531 forms the cartridge 11503 and corresponds to the communication cavity between the radially directed perimeter aperture 11567 and the axially directed exit opening 11511 as in the embodiments of FIGS. 13A to 16E. The dosing chamber 11536 may either be of a fixed volume, or may be adjustable in volume by a telescoping portion 11538, but this is optional. It is also conceivable and advantageous when the lower end of the dosing chamber 11536 is formed by a coffee bean grinder. Such a measure in combination with accommodating a portion of the dosing volume in cavity 11540 can reduce the total height of the appliance and cartridge that form a system for preparing beverages. In this particular example the dosing chamber 11536 has been given a fluted shape, like an inversed funnel. With such a shape the cross sectional area in the downstream direction of the bean path gradually increases. As an example the upstream top end of the dosing volume can have a cross-section of 25 mm2, while the downstream lower end can be 400 mm2 in cross-section. Filling the dosing volume formed by the dosing chamber 11536 and the cavity 11540 in the embodiment of FIG. 31 is accomplished purely mechanically by conveyor means formed as an impeller 11569. One suitable form of impeller 11569 is shown in somewhat more detail in FIG. 32. To prevent the impeller 11569 to get jammed by coffee beans that become locked between the perimeter aperture and radially extending vanes 11570, such vanes 11570 are preferably made from a resilient material. It is also possible to make the entire impeller 11569 from a yieldable resilient material. The impeller 11569 has a hollow hub portion engageable by a drive shaft end 11573 of a coffee preparing appliance. The drive shaft end 11573 may have a number of keys 11575 for engagement with corresponding protrusions, or keys (not visible in FIG. 32, but conventional), in the interior of hollow hub 11571. To facilitate engagement of the impeller 11569 and the drive shaft end upon placing of the cartridge on the appliance the number of keys may differ between the drive shaft end 11573 and the hollow hub 11571. As illustrated in FIG. 32 the vanes 11570 do not extend to the perimeter edge of the impeller 11569, which may prevent beans from becoming jammed between the vanes 11570 and the perimeter aperture 11567 (FIG. 31). As indicated hereinabove the vanes may also be of a flexible material and to provide more flexibility to the vanes the vanes are conveniently also unattached to the impeller base 11577, by leaving a gap 11579.

In a practical embodiment about 20% of the dosing volume can be accommodated in the cavity 11540 and about 80% of the dosing volume will then be accommodated in the dosing chamber 11536. To fill the dosing volume some fifteen revolutions of the impeller 11569 will normally suffice. However, to ensure filling under even adverse conditions, it may be convenient to allow for some extra revolution such as thirty or twenty-five in total. For filling of the dosing volume the conveying impeller 11569 is rotated with a rotational speed in the range of 100 to 500 rpm, and preferably between 250 and 300 rpm. Once the filling of the dosing volume has been accomplished, the appliance will switch from driving the impeller 11569 to driving its grinder. With the impeller 11569 immobilized the dosing chamber 11536 and cavity 11540 will gradually empty into the grinder (not shown, but conventional). Because the impeller 11569 is inactive, no beans will escape from container 11531 through the perimeter aperture 11567. To ensure that vibration of the appliance from operation of the grinder does not allow any beans to escape, it is also possible to provide the impeller 11569 with an upstanding closing flap. Such a closing flap as described in reference to the embodiments of FIGS. 15A-15D and FIGS. 16A-16D then closes the perimeter aperture 11567 when the impeller 11569 is stopped in a predetermined position.

According to the present invention the coffee beverage system is further provided with second coffee bean packaging cartridge, said second coffee bean packaging cartridge being arranged for holding and supplying coffee beans and being also removably connectable to the coffee brewing apparatus. This second coffee bean packaging cartridge includes a second dosing device which is separate from the first dosing device of the brewing apparatus and is adapted for independently of the coffee brewing apparatus preparing and supplying a dose of coffee beans to the entrance opening of the coffee brewing apparatus.

The second dosing device in general includes a container or housing comprising an interior volume and at least one exit opening defining a coffee bean outlet, the interior volume being arranged for holding coffee beans and transportation means adapted for enabling transportation of the coffee beans from the interior volume towards the exit opening of the dosing device and the second coffee bean packaging cartridge. Furthermore the second coffee bean packaging cartridge is adapted to the coffee brewing apparatus so that, if the second coffee bean packaging cartridge is connected to the coffee brewing apparatus, coffee beans which are transported with the aid of the dosing device, in particular the transportation means thereof towards the exit opening of the second coffee bean packaging cartridge can be received by the coffee brewing apparatus via the entrance opening for preparing coffee. Although some of the embodiments of coffee bean packaging cartridges given above can prepare and supply o dose of coffee beans independently from the brewing apparatus, now further embodiments of such second coffee bean packaging cartridges will be described.

A first embodiment of such a second coffee bean packaging cartridge 21102 will be described now with reference to FIGS. 33A-36B.

The second coffee bean packaging cartridge is specifically adapted to be connected to the coffee brewing apparatus 4. Thereto, the second coffee bean packaging cartridge is provided with connection elements (such as e.g. bayonet elements) similarly to the first coffee bean packaging cartridge. However, the second coffee bean packaging cartridge can in addition be connected to another external apparatus, e.g. a coffee grinder apparatus only used for grinding coffee beans but not for brewing coffee. In view of this the description which follows refers to an external apparatus to which the second coffee bean packaging apparatus can be connected rather than to the coffee brewing apparatus.

Figure 33A:
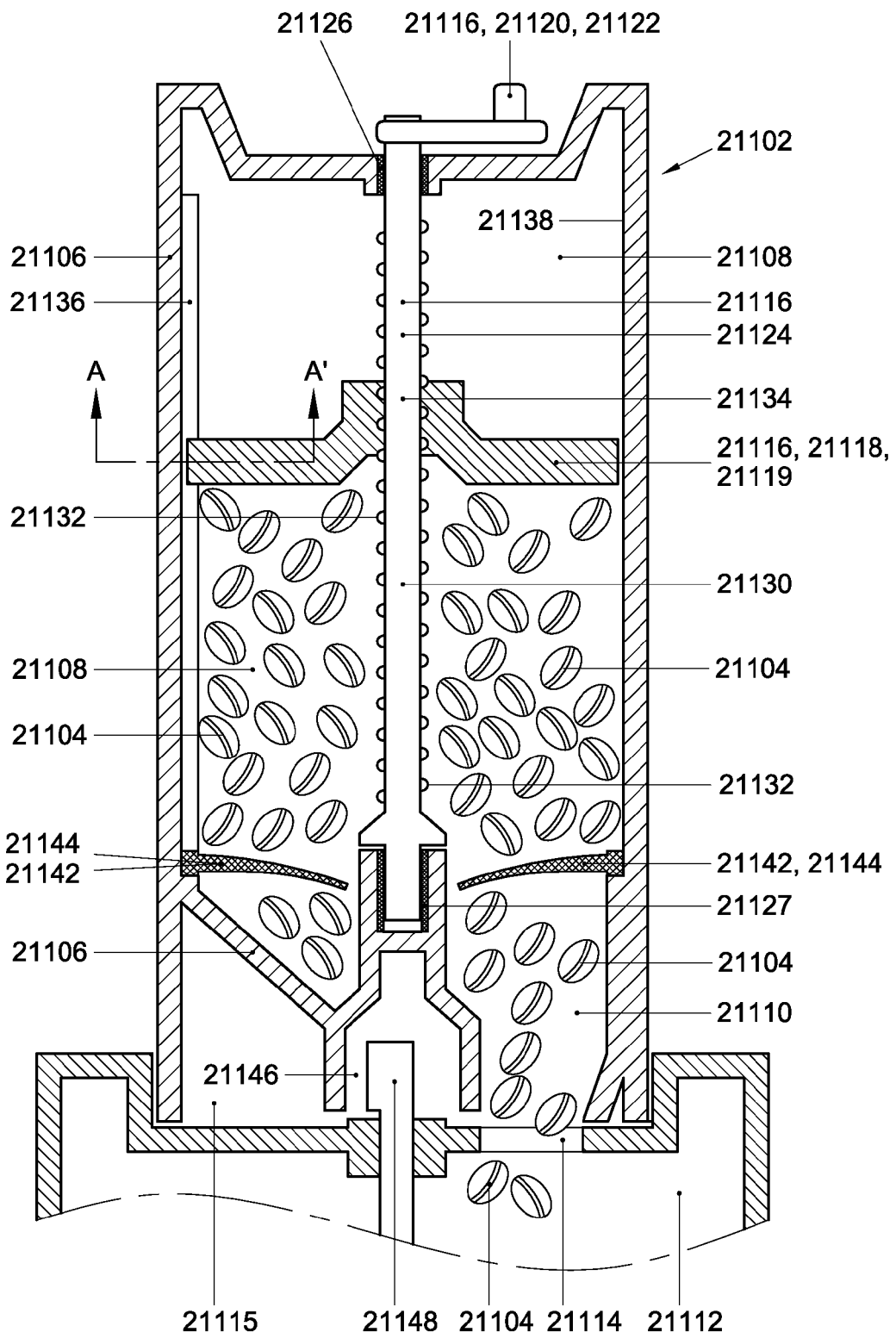
FIG. 33A shows in cross-section a second coffee bean packaging cartridge for holding and supplying coffee beans according to a first aspect of a first embodiment of the invention.

FIG. 33A shows in cross-section of the second coffee bean packaging cartridge 21102 for holding and supplying coffee beans according to a first aspect of the first embodiment. In this example, the cartridge 21102 is filled with roasted coffee beans 21104, being an example of coffee beans. However, alternatively or additionally to the coffee beans 21104, the cartridge 21102 can be filled with other types of coffee beans, such as broken roasted coffee beans, or ground roasted coffee beans.

The second cartridge 21102 includes a container or housing 21106 that encloses an interior volume 21108 of the cartridge 21102. The container or housing 21106 may e.g. have a cylindrical shape. In the interior volume 21108, the coffee beans 21104 can be held. The housing 21106 has an outlet 21110 for releasing the coffee beans 21104 from the interior volume 21108. From the outlet 21110, the coffee beans 21104 can be supplied to a hosting external apparatus 211112. The external apparatus 211112 may be arranged for hosting the second cartridge 211102 by means of a cavity 211115. The cavity 21115 may be present in a, in use, top part of the external apparatus 21112. The external apparatus 21112 may have an inlet 21114 through which the coffee beans 21104 can be received. The inlet 21114 of the external apparatus 21112 may be positioned in the cavity 21115.

The cartridge 21102 further includes transportation means 21116 for transporting the coffee beans 21104 towards the outlet 21110. The transportation means 21116 include a moveable structure 21118 for contacting the coffee beans 21104. As a result of such contacting, a force may be applied to the coffee beans 21104. However, alternatively, as a result of such contacting, movement of coffee beans can be blocked. Then, the force applied by the moveable structure 21118 may be a reaction force caused by another force that works on the coffee beans, such as gravity force. Thus, the contacting element can be used for actively transporting the coffee beans, and/or can be used for blocking the coffee beans and realizing transport of the coffee beans by releasing the blockage of the coffee beans. The moveable structure 21118 is at least partly, and in this example completely, present in the interior volume 21108. In this example, the moveable structure 21118 may form a plunger 21119.

The transportation means 21116 further include manually operable actuation means 21120, in this example a crank handle 21122, for manually actuating the moveable structure 21118. The manually operable actuation means 21120 are at least partly, and in this example completely, provided outside of the interior volume 21108. Their position outside the interior volume 21108 enables that the manually operable actuation means 21120 can be reached by hand by a user.

In the first example, the transportation means 21116 may further include a rotatable element, such as a rotatable axle 21124. The rotatable axle 21124 may be located at least partly, in this example completely, inside the interior volume 21108. Here, the rotatable axle 21124 in use rotates in a first bearing 21126 provided through the housing 21106, and in a second bearing 21127. The rotatable axle 21124 may be coupled, e.g. outside the housing 21106, to the crank handle 1122. In this way the crank handle 1122 may be arranged for rotating the rotatable axle 21124.

In the first example, the rotatable axle 21124 may be partly formed as a conveyor screw 21130, provided with screw thread 21132. Additionally, the plunger 21119 may includes a threaded bore 21134 through which the conveyor screw 21130 may be engaged. By rotating the conveyor screw 21103 by means of the crank handle 21122, the plunger 21119 may be moved downwards or upwards through the interior volume 21108. As a result of moving the plunger 21119 downwards, a downward force can be applied on the coffee beans 21104.

Figure 33B:
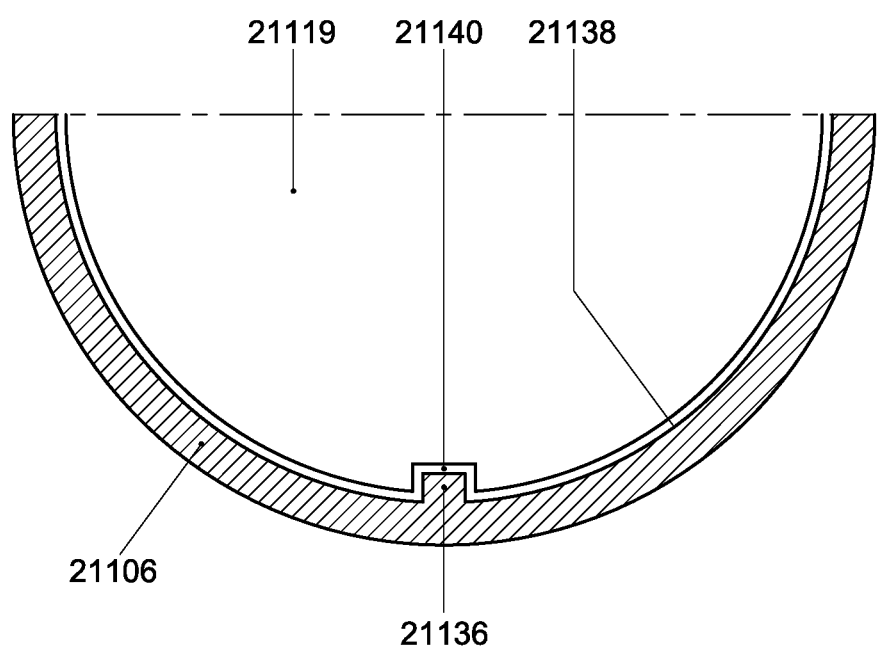
FIG. 33B shows a notch, a plunger, a ridge, and a container a cross-section.
Figure 33C:
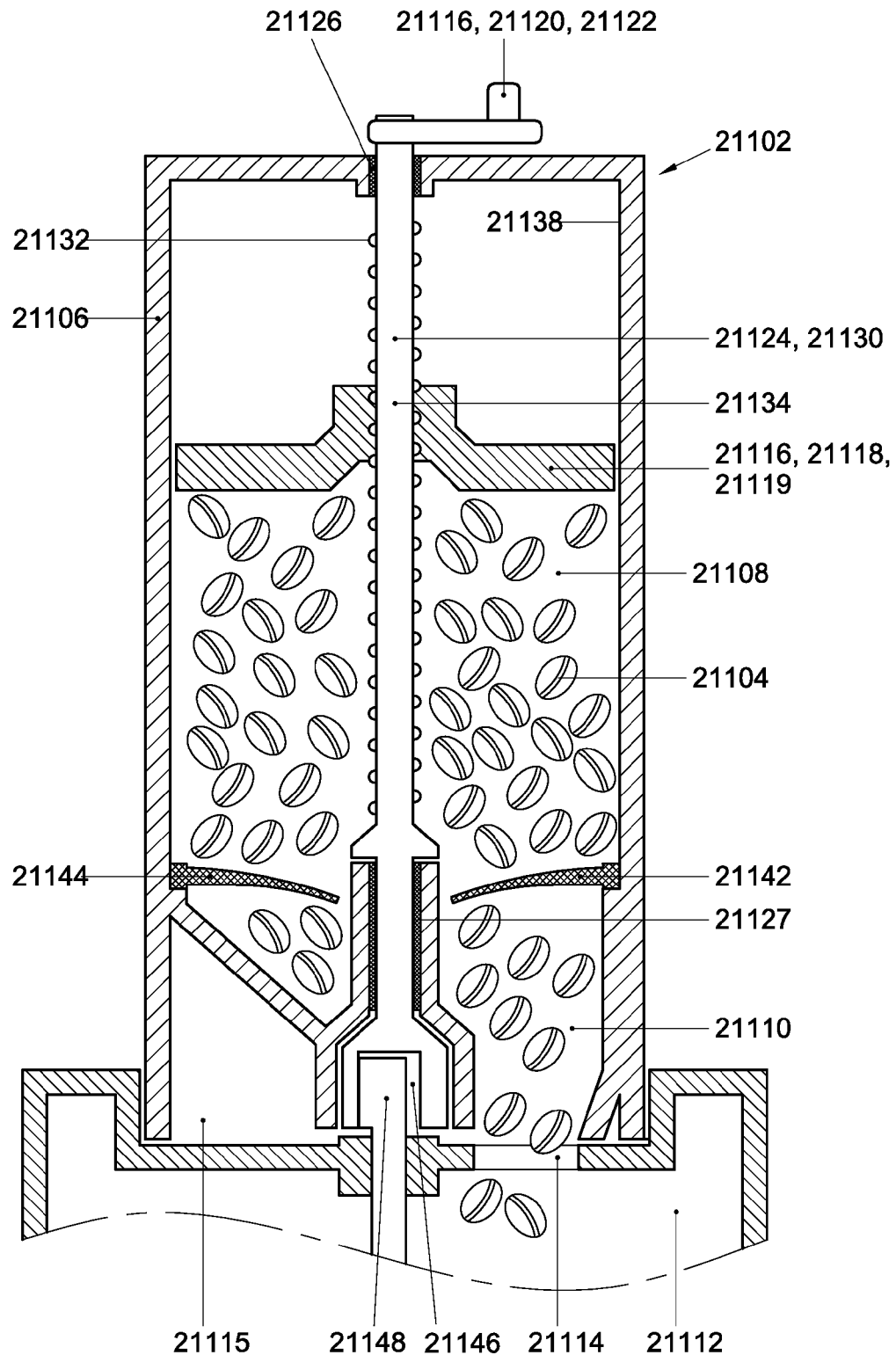
FIG. 33C shows a variation of the second coffee bean packaging cartridge according to the first aspect.

The second coffee bean packaging cartridge 21102 may further include a blocking element, such as a ridge, 21136 for substantially preventing movement of the moveable structure 21118 inside the interior volume 21108 in a direction transverse to an axis of rotation of the rotatable element. In this example, the blocking element is formed as the ridge 21136 that is rigidly attached to an interior side 21138 of the housing 21106. The ridge 21136 may extend along the interior side 21138 of the housing 21106, in a direction approximately parallel with the rotatable axle 21124. In use the ridge 21136 may engage with a notch 21140 in the plunger 21119. FIG. 33B shows the notch 21140, the plunger 21119, and the ridge 21136, and the housing 21106 in a cross-section A-A'. It may be clear however that the blocking element can be left out if the housing 21106 and the plunger 21119 have a rectangular shape, or if, more in general, the moveable structure 21118 and the housing 21106 are shaped for preventing movement of the moveable structure 21118 with respect to the housing 21106 in a direction transverse to a direction in which the conveyor screw 21130 extends.

The second coffee bean packaging cartridge 21102 may be provided with a valve 21142 for forming a barrier that hinders passage of the coffee beans 21104 towards the outlet 21110. The valve 21142 may be located inside the interior volume 21108. The valve 21142 may include one or more, e.g. a plurality of, flexible elements 21144 that are deformed when the valve 21142 is opened. The flexible elements 21144 may include an elastic material, for example rubber. By means of the valve 21142, the downward force that can be applied on the coffee beans 21104 by means of the plunger 21119, can in use at least partly be counteracted. The valve 21142 thus increases possibilities for control of the supply of the coffee beans 21104, as the valve 21142 may prevent uncontrolled movement of the coffee beans 21104 towards the outlet 21110.

The second coffee bean packaging cartridge 21102 may be provided with a recess 21146 in the housing 21106 for receiving an external drive member 21148 of the external apparatus 21112. In the first example, the housing 21106 is closed in the recess 21146. In FIG. 33A, the external drive member 21148 is received in the recess 21146. From FIG. 33A, it may be clear that the recess 21146 may be dimensioned for preventing mechanical contact between the second coffee bean packaging cartridge 21102, in particular the housing 21106 of the second coffee bean packaging cartridge 21102, and the external drive member 21148. In this way it is enabled that the second coffee bean packaging cartridge 21102 may be used in combination with the external apparatus 21112 that is provided with the external drive member 21148, while the second coffee bean packaging cartridge 21102 can also be used in combination with another external apparatus that is not provided with the external drive member 21148.

FIG. 33A also shows that the transportation means 21116, in particular the rotatable axle 21124, may be positioned for preventing, in use, mechanical contact with the external drive member 21148. E.g. in FIG. 33A an end of the rotatable axle 21124, which in this example is located in the second bearing 21127, is spaced apart from the recess 21146. In this way driving of the transportation means 21116 by means of the external drive member 21148 may be prevented. However, in a variation of the second coffee bean packaging cartridge 21102 in the first example shown in FIG. 33C, the transportation means 21116, in particular the rotatable axle 21124, may be positioned for establishing, in use, driving of the transportation means 21116 by means of the external drive member 21148. In the variation shown in FIG. 33C, the rotatable axle 21124 and the external drive member 21148 in use make mechanical contact. This enables driving of the rotatable axle 21124 by means of both the manually operable actuation means 21120 and the external drive member 21148.

Figure 34:
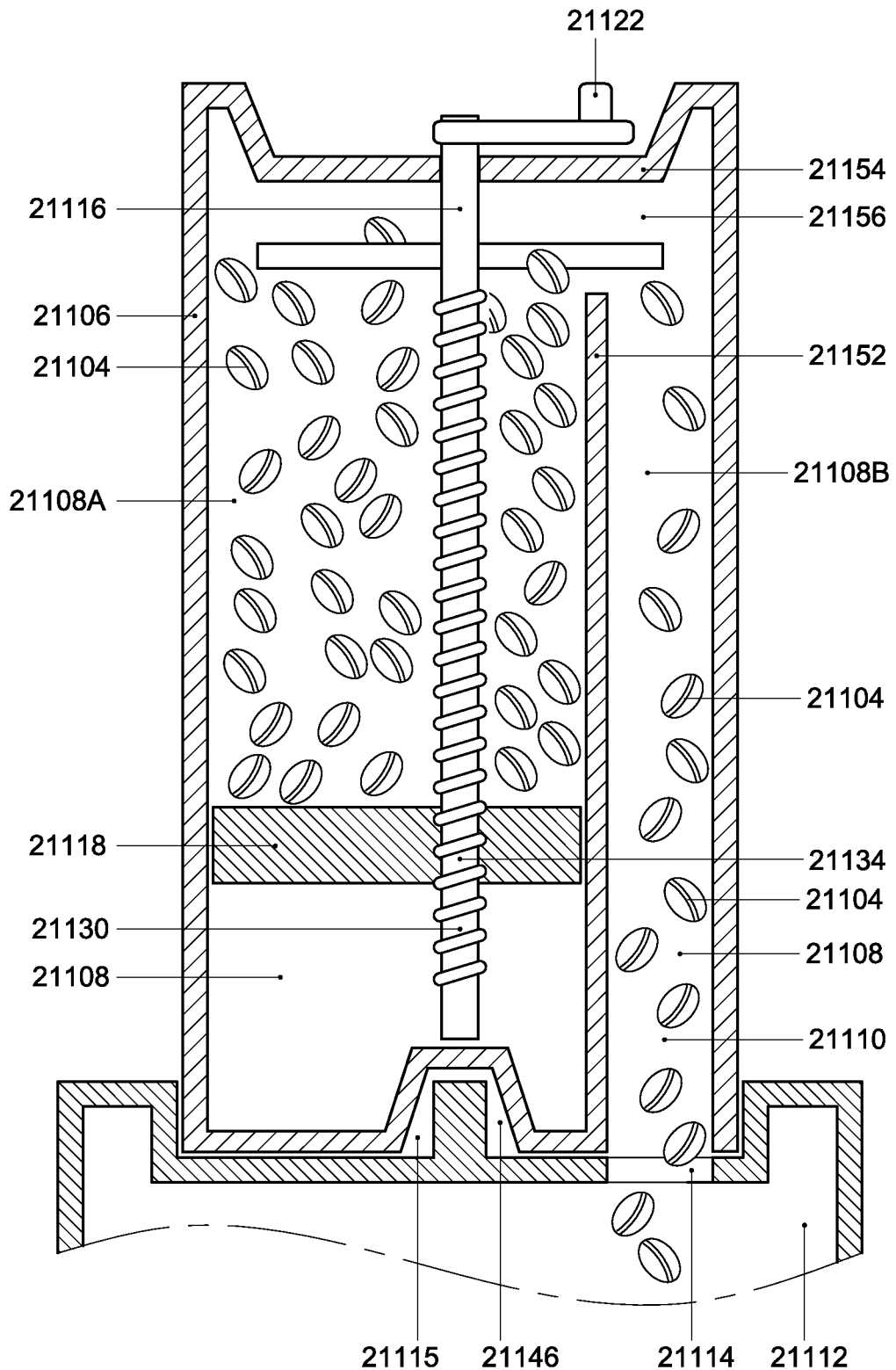
FIG. 34 shows in cross-section a second coffee bean packaging cartridge for holding and supplying coffee beans according to a second aspect of the first embodiment of the invention.

FIG. 34 shows in cross-section a second coffee bean packaging cartridge 21102 for holding and supplying coffee beans, e.g. the coffee beans 21104, according to a second aspect of the first embodiment with a dosing independent from the brewing apparatus. The second coffee bean packaging cartridge 21102 is provided with the housing 21106, the transportation means 21116, the moveable structure 21118, and the outlet 21110.

In the second example, the second coffee bean packaging cartridge 21102 may be provided in the interior volume 21108 with an internal wall 21152. The internal wall 21152 may be spaced apart from, in use, a top part 21154 of the housing 21106. Similar to the first example, the transportation means 21116 are provided with the conveyor screw 21130 provided in the threaded bore 21134 of the moveable structure 21118. By rotating the conveyor screw 21130 by means of the crank handle 21122, the moveable structure 21118 can be moved, in use, upwards. The transportation means 1116 are thus arranged for moving the coffee beans 21104 through a space 21156 between the, in use, top part 21154 of the housing 21106 and the internal wall 21152. Such moving through the space 21156 may occur if the coffee beans 21104 are lifted high enough by means of the moveable structure 21118. As a result of vibrations or sideward instability of the lifted pile of coffee beans 21104 that are not supported anymore by the internal wall 21152, coffee beans 21104 may move sideward over the internal wall 21152.

FIG. 34 further illustrates that the internal wall 21152 may separate a first part 21108A of the interior volume 21108 from a second part 21108B of the interior volume 21108. The moveable structure 21118 may be arranged in the first part 21108A of the interior volume 21108. The outlet 21110 may be accessible via the second part 21108B of the interior volume 21108.

Figure 35:
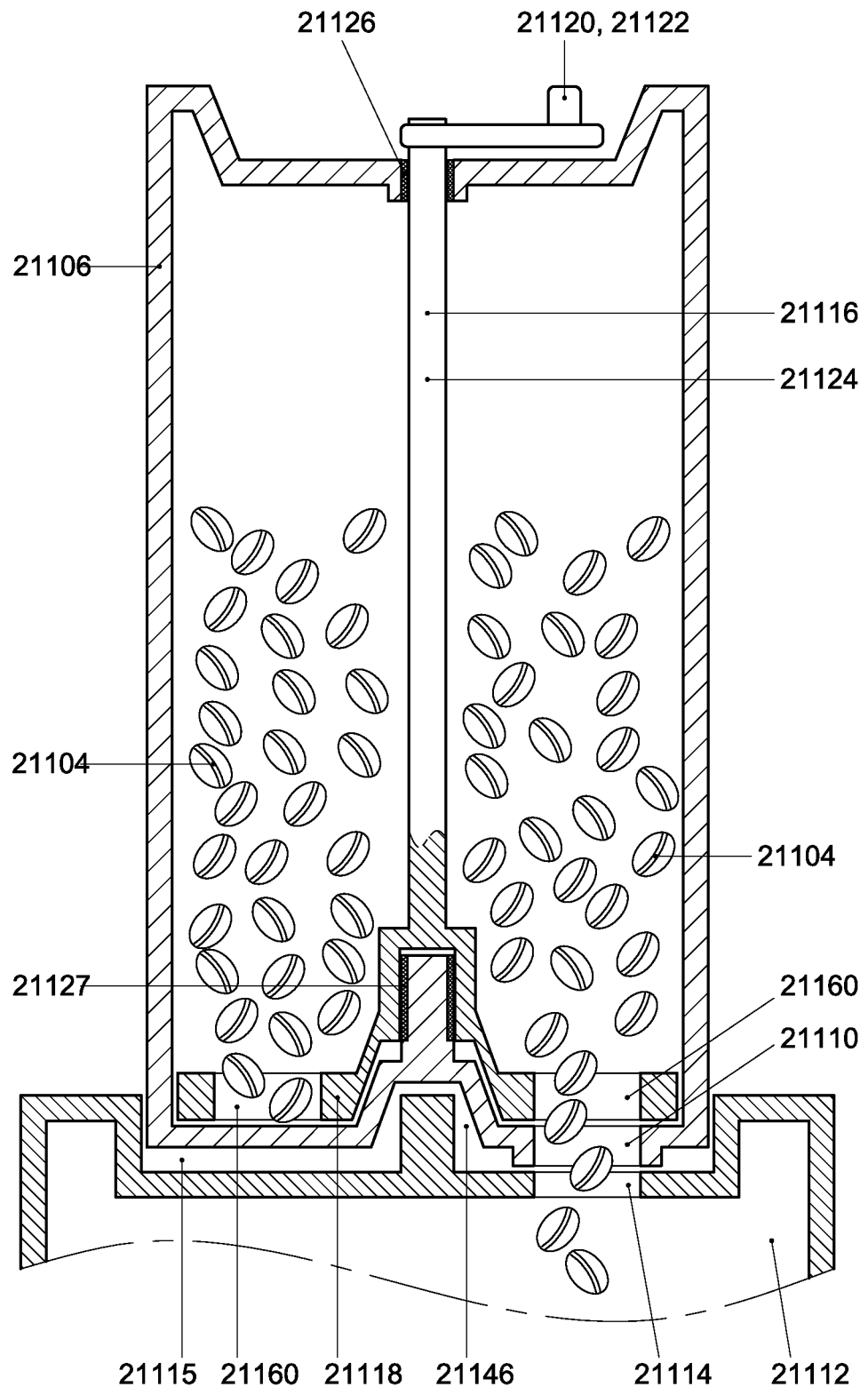
FIG. 35 shows in cross-section a second coffee bean packaging cartridge for holding and supplying coffee beans according to a third aspect of the first embodiment of the invention.

FIG. 35 shows in cross-section a second coffee bean packaging cartridge 21102 for holding and supplying coffee beans, e.g. the coffee beans 21104, according to a third aspect of the first embodiment with a dosing independent from the brewing apparatus. The second coffee bean packaging cartridge 21102 is provided with the housing 21106, the transportation means 21116, the moveable structure 21118, and the outlet 21110.

In the third example, the moveable structure 21118 may be rigidly connected to the rotatable element, e.g. the rotatable axle 21124. The moveable structure 21118 may e.g. be shaped like a disk. The moveable structure 21118 may be provided with at least one first aperture 21160 for letting the coffee beans 21104 pass there through. In FIG. 35, two first apertures 21160 are visible. A total amount of first apertures 21160 may be in a range from 1 to 6, in a range from 7 to 15, and/or larger than 15.

The second coffee bean packaging cartridge 21102 may be provided with at least one second aperture that is positioned, in use, above or below the at least one first aperture 21160 and that offers entrance to the outlet 21110. As a result of rotating the rotatable axle 21124, the at least one aperture can be aligned with the at least one second aperture. Then, coffee beans 21104 can fall through both the at least one first and the at least one second aperture. By further rotating the rotatable axle 21124, alignment of the at least first and the at least second apertures can, at least partly be cancelled. In this way supply of the coffee beans 21104 can be stopped. Thus, rotating the rotatable axle 21124 enables control of the supply of the coffee beans 21104.

In this example, the second aperture is formed by the outlet 21110, in use located below the first apertures 21160. However, alternatively, the at least one second aperture may be spaced apart from the outlet 21110. More in general, a total amount of the second apertures may be approximately equal to a total amount of the first apertures 21160. It may thus be clear that the outlet 21110 may include a plurality of apertures, which may or may not be mutually interconnected.

Figure 36A:
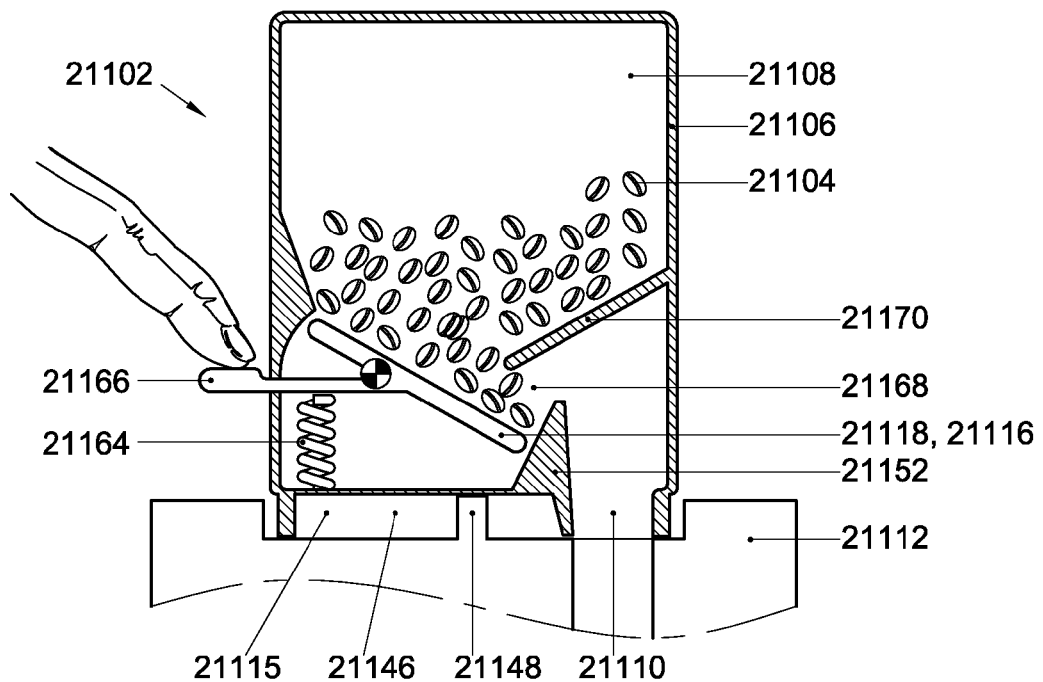
FIG. 36A shows in cross-section a second coffee bean packaging cartridge for holding and supplying coffee beans according to a fourth aspect of the first embodiment of the invention, with a moveable structure in a first position.
Figure 36B:
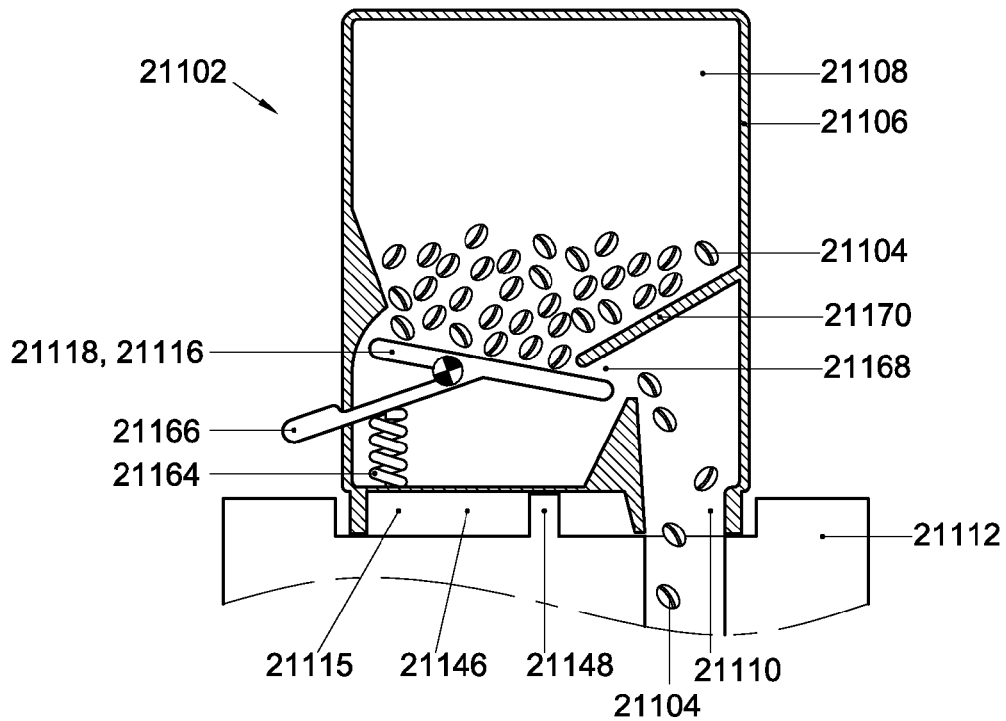
FIG. 36B shows in cross-section the second coffee bean packaging cartridge for holding and supplying coffee beans according to the fourth aspect of the first embodiment of the invention, with the moveable structure in a second position.

FIGS. 36A and 36B shows in cross-section a second coffee bean packaging cartridge 1102 for holding and supplying coffee beans, e.g. the coffee beans 1104, according to a fourth aspect of the first embodiment with a dosing independent from the brewing apparatus. The second coffee bean packaging cartridge 21102 is provided with the housing 21106, the transportation means 21116, the moveable structure 21118 of the transportation means 21116, and the outlet 21110.

In the fourth example, the moveable structure 21118 is resiliently attached to the second coffee bean packaging cartridge 21102 by means of a resilient member, here an elastic spring 21164. The moveable structure 21118 is moveable by means of the manually operable actuation means 21120, here comprising a lever 21166, repeatably from a first position to a second position and vice versa.

FIG. 36A shows the second coffee bean packaging cartridge 21102 in the fourth example with the moveable structure 21118 in the first position. FIG. 36B shows the second coffee bean packaging cartridge 21102 in the fourth example with the moveable structure 21118 in the second position. It may thus be clear that, by moving the moveable structure 21118 from the first position to the second position, the spring 21164 may be resiliently deformed.

The second coffee bean packaging cartridge 21102 in FIGS. 36A and 36B is provided in the interior volume 21108 with a passage 21168 for the coffee beans towards the outlet 21110. The passage 21168 may be formed by the internal wall 21152 and an additional wall 21170 that extends from the housing 21106 into the interior volume 21108. In this example, in the second position the passage 21168 is at least partly obstructed, in this example substantially completely obstructed, i.e. substantially blocked, by the moveable structure 21118. In this example, in the first position the passage 21168 is obstructed less by the moveable structure 21118 than in the second position. In this example, in the first position the passage 21168 is not obstructed by the moveable structure 21118. In a variation however, the first and second position may be reversed, so that in the first position the passage 21168 is at least partly obstructed by the moveable structure 21118 and in the second position the passage 21168 is obstructed less by the moveable structure 21118 than in the first position or is not obstructed by the moveable structure 21118.

In the fourth example, the first position is located, in use, below the second position. In addition, at least part of the coffee beans 21104 is located, in use, above the moveable structure 21118. As a result, repeatedly moving the moveable structure 21118 from the first position to the second position and vice versa, may result in a shaking motion of at least part of the coffee beans 21104 that are located above the moveable structure 21118. Such a shaking motion may promote movement of the coffee beans through the interior volume 21108.

The second coffee bean packaging cartridge 21102 in one of the first, second, first, and fourth examples can be used in a method. The method includes supplying coffee beans, e.g. the coffee beans 21104, from the second coffee bean packaging cartridge 21102 to the external apparatus 21112. The method further includes holding the coffee beans 21104 in the housing 21106 that encloses the interior volume 21108 of the second coffee bean packaging cartridge 21102. The method further includes preparing transporting a predetermined dose of coffee beans 21104 by means of the transportation means 21116 towards the outlet 21110 of the housing 21106. The method further includes releasing the dose of coffee beans through the outlet 21110 from the interior volume 21108. In the method, transporting the coffee beans 21104 includes contacting the coffee beans 21104 by means of the moveable structure 21118 of the transportation means 21116. Here, the moveable structure 21118 is, at least partly, present in the interior volume 21108. The method further includes actuating the moveable structure 21118 by means of the manually operable actuation means 21120 of the transportation means 21116. Here, the manually operable actuation means 21120 are, at least partly, provided outside of the interior volume 21108. It may be clear however that the method can also be carried out by other embodiments of the second coffee bean packaging cartridge 21102. Alternatively, the method may be carried out without making use of the second coffee bean packaging cartridge 21102 in one of the example or variations described.

Figure 37A:
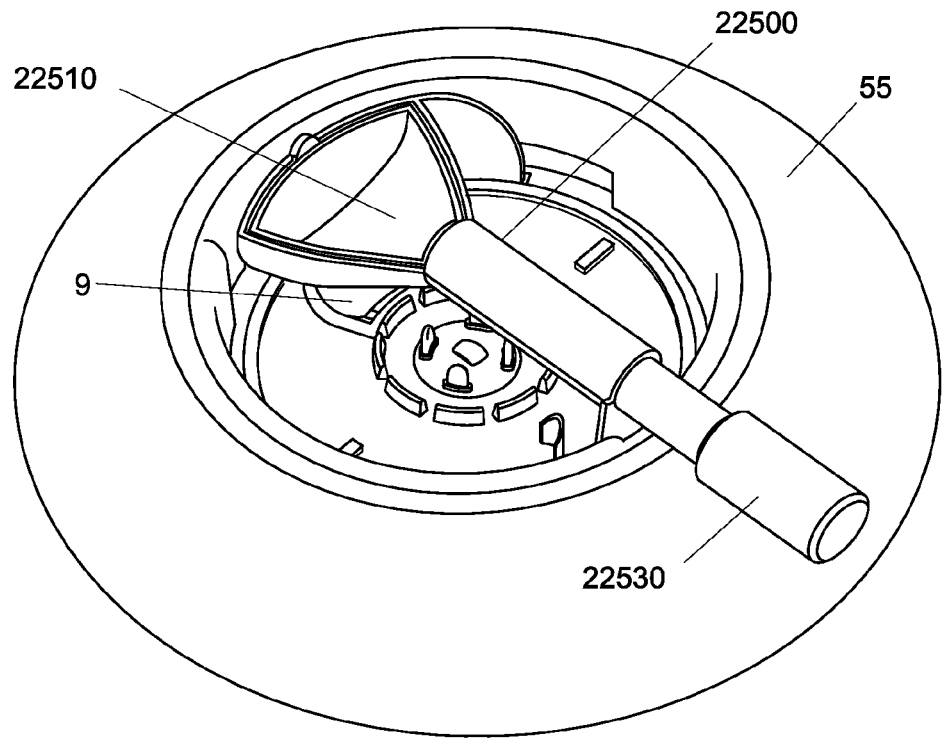
FIG. 37A shows a perspective view of a second coffee bean packaging cartridge according to a second embodiment of the invention mounted to the coffee brewing apparatus.
Figure 37B:
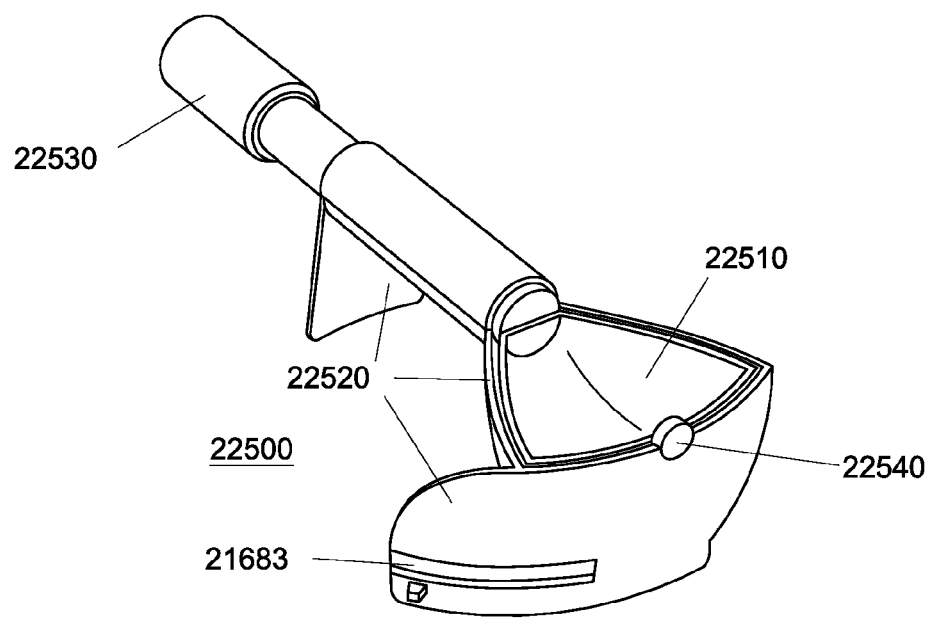
FIG. 37B shows a perspective view of the second coffee bean packaging cartridge shown in FIG. 37A disconnected from the coffee brewing apparatus.

The second embodiment of a second coffee bean packaging cartridge with a dosing independent from the brewing apparatus that can be connected to the coffee brewing apparatus (or in addition another external apparatus) will be described now with reference to FIGS. 37A-37D. As shown in FIGS. 37A and 37B the second coffee bean packaging cartridge 22500 comprises a scooper 22510 for holding and supplying the coffee beans 21140. The second coffee bean packaging cartridge 22500 comprises furthermore a body 22520 having bayonet elements (only one bayonet element 21683 is shown) for connecting the second coffee bean packaging cartridge 22500 to the coffee brewing apparatus 4 by placing the bayonet elements in the openings 58 in the side wall 54 of the recess 50 and rotating the second coffee bean packaging cartridge 22500 to its final position. In this final position, the scooper 22510 is aligned with the entrance opening 9 of the coffee brewing apparatus 4. The second coffee bean packaging cartridge 22500 comprises a handle 22530 for manually turning the scooper. The scooper 22510 is connected to the body by means of a pivot 22540, enabling the scooper 22510 to rotate around a horizontal axis by actuating the handle 22530. Please note that throughout this description cartridge is intended to also encompass 'holder' so that the scooper which can hold an amount of coffee beans is also identified as cartridge.

Figure 37C:
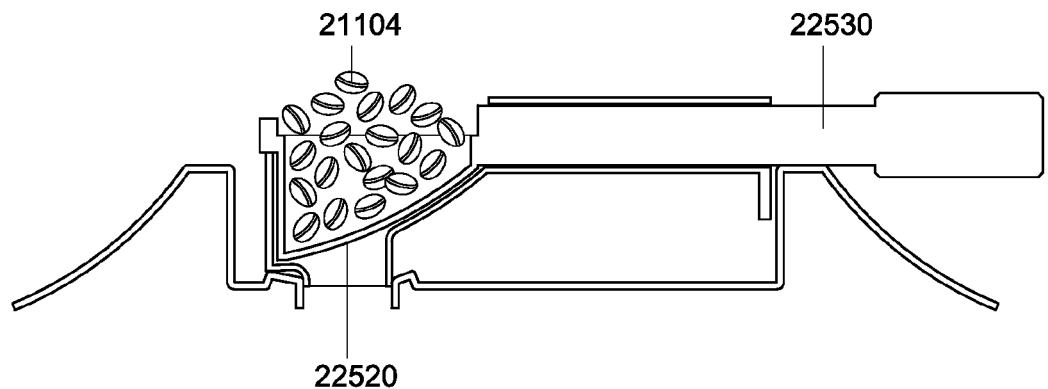
FIG. 37C shows in cross section the second coffee bean packaging cartridge shown in FIG. 37A holding coffee beans.
Figure 37D:
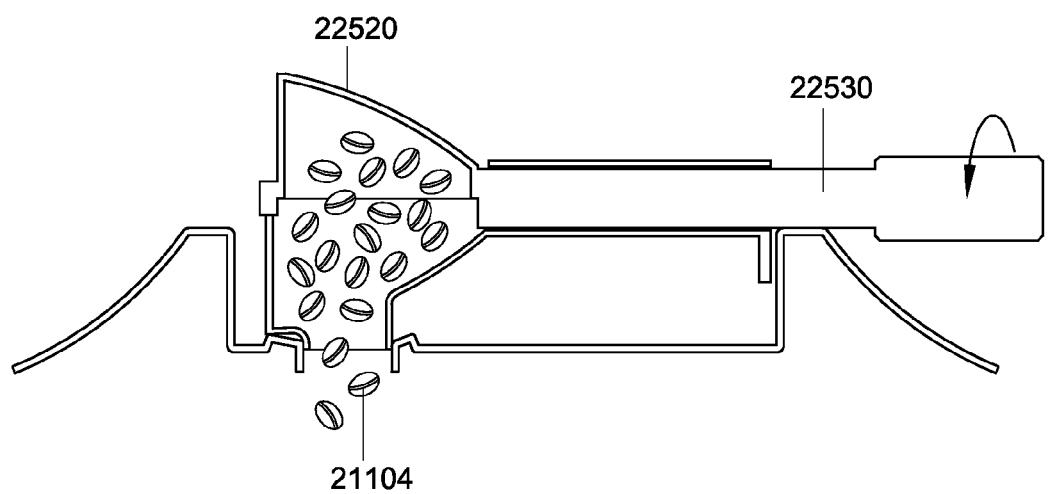
FIG. 37D shows in cross section the second coffee bean packaging cartridge shown in FIG. 37A supplying coffee beans to the coffee brewing apparatus.

FIG. 37C shows the scooper 22510 in its upright position holding a dose of coffee beans 21104. The user may supply the coffee beans to the coffee brewing apparatus 4 by simply turning the handle 22530 half, thereby emptying the scooper 22510 as shown in FIG. 37D. So, the scooper works also as transportation means for transporting the coffee beans towards the coffee bean entrance 9 of the brewing apparatus 4.

Figure 38A:
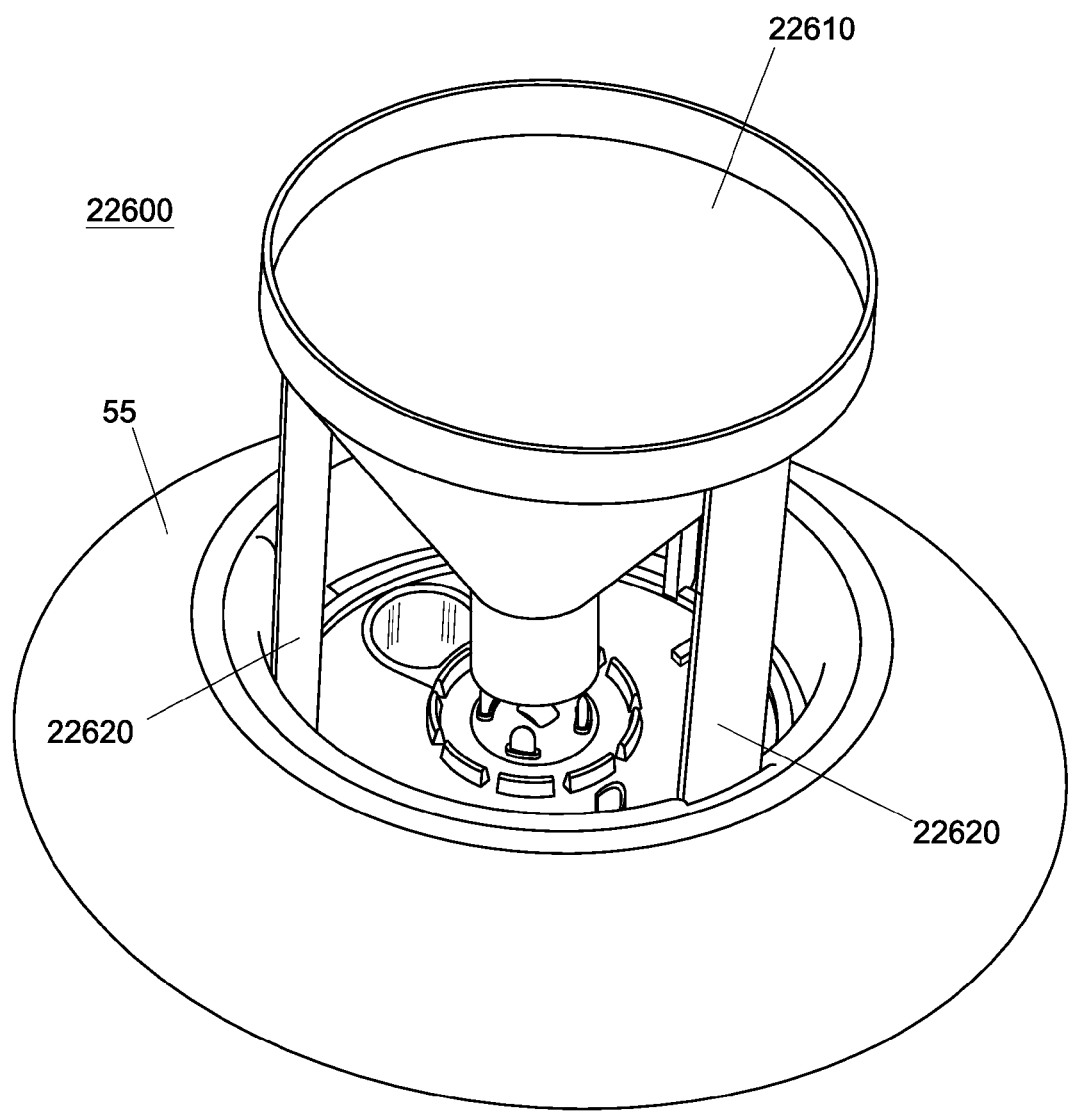
FIG. 38A shows a perspective view of a second coffee bean packaging cartridge according to a third embodiment of the invention mounted to the coffee brewing apparatus.
Figure 38B:
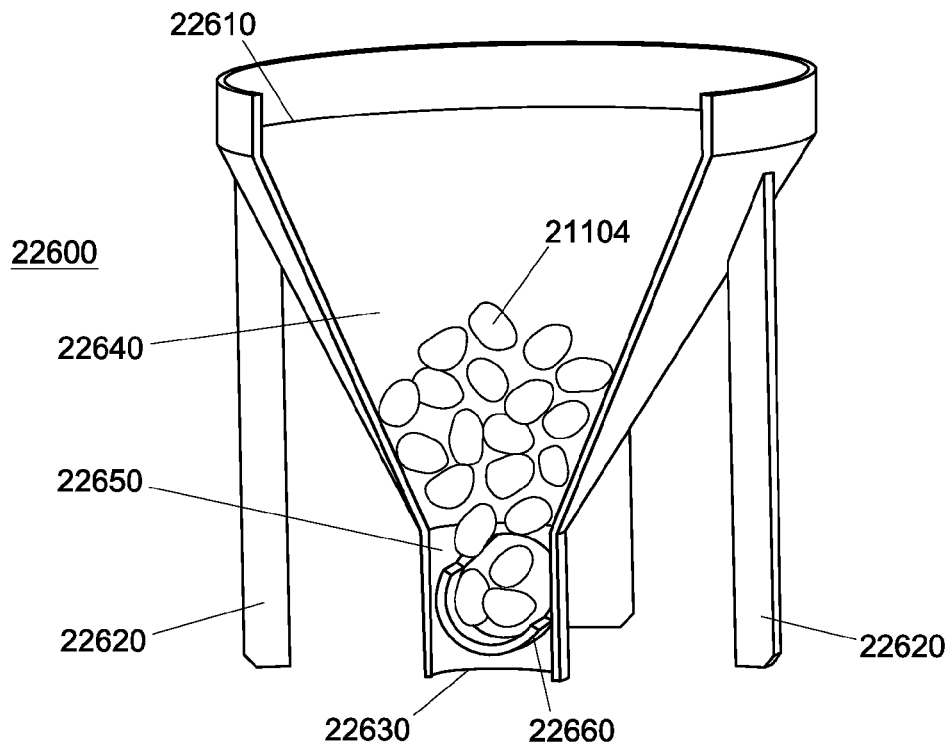
FIG. 38B shows the second coffee bean packaging cartridge shown in FIG. 38A holding coffee beans.
Figure 38C:
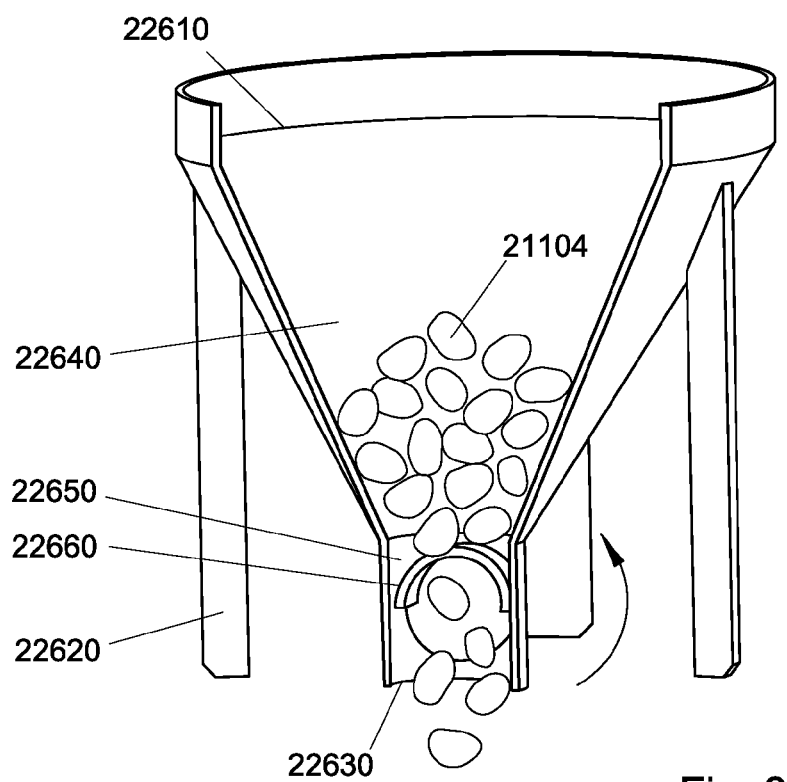
FIG. 38C shows the second coffee bean packaging cartridge shown in FIG. 38A supplying coffee beans to the coffee brewing apparatus.

A third embodiment of a second coffee bean packaging cartridge that can be connected to the coffee brewing apparatus will be described now with reference to FIGS. 38A-38C. As shown in FIG. 38A, the second coffee bean packaging cartridge 22600 comprises a hopper 22610 for holding a predetermined dose of coffee beans 21104 inserted by a user. To determine the amount the funnel can on the inside surface thereof be provided with markings indicating the amount or strength of the final beverage to be produced, so that the user can choose the amount of beans to put into the hopper. The second coffee bean packaging cartridge 22600 comprises a plurality of legs 22620. Some or all of the legs are provided with a bayonet element (not shown) for connecting the second coffee bean packaging cartridge 22600 to the coffee brewing apparatus 4 by placing the bayonet elements in the openings 58 and subsequently rotating the second coffee bean packaging cartridge, as described herein above. When the second coffee bean packaging cartridge 22600 is in its final position an outlet 22630 of the hopper 22600, as shown in FIGS. 38B and 38C is aligned with the coffee bean entrance 9 of the coffee brewing apparatus 4. The transportation means comprise a closure plate 22660, which is manually rotatable around a horizontal axis by means of manually operable actuation means, such as a handle 22670. The closure plate forms a part, of a virtual cylinder, preferably approximately half of it. The other part of the virtual cylinder is open. In a first position as shown in FIG. 38B, the closure plate closes or substantially closes the outlet 22630, thereby hindering the passage of coffee beans 21104 from the hopper 22610 to the coffee brewing apparatus 4. In a second position as shown in FIG. 38C, the closure plate 22660 delimits or substantially delimits a first broader part 22640 of the interior volume of the hopper 22610 from a second narrower part 22650 of the interior volume of the hopper 22610. Thereby the passage of the coffee beans 21104 from the first part 22640 to the second part 22650 is hindered.

By rotating the closure plate between the first and the second positions the user can supply doses of coffee beans to the coffee brewing apparatus 4. Indeed, when the closure plate 22660 is in its first position as shown in FIG. 38B due to the gravity the coffee beans 21104 will enter the second part 22650 of the hopper. When the closure plate 22660 is rotated to its second position as shown in FIG. 38C, the coffee beans in the second part 22650 of the hopper due to the gravity will fall into the coffee brewing apparatus 4. So, one dose of coffee beans 21104 corresponds to the coffee beans that are held in the second part 22650 of the interior volume of the hopper 22610.

Figure 39A:
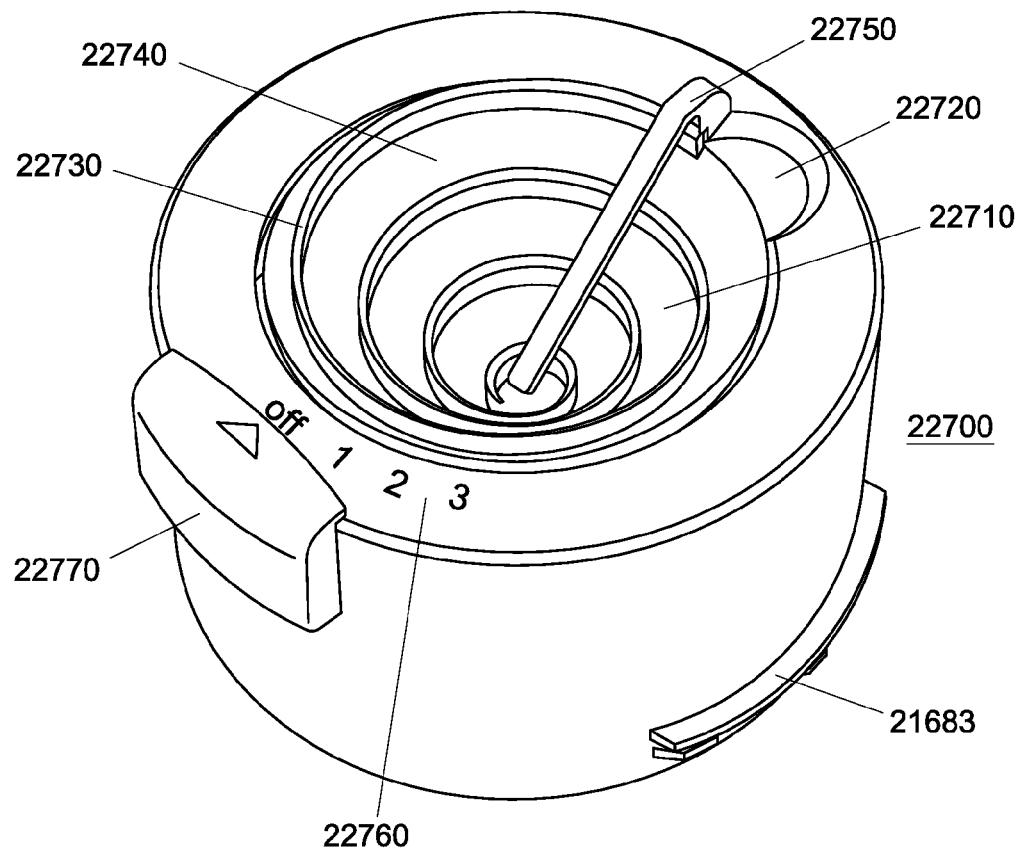
FIGS. 39A and 39B show two different perspective views of a second coffee bean packaging cartridge according to a fourth embodiment of the invention.
Figure 39B:
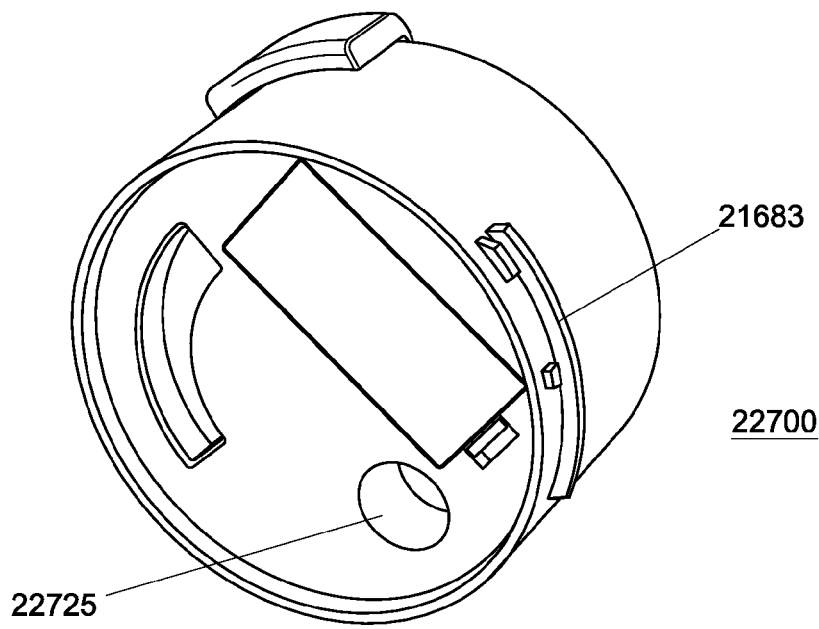
Figure 39C:
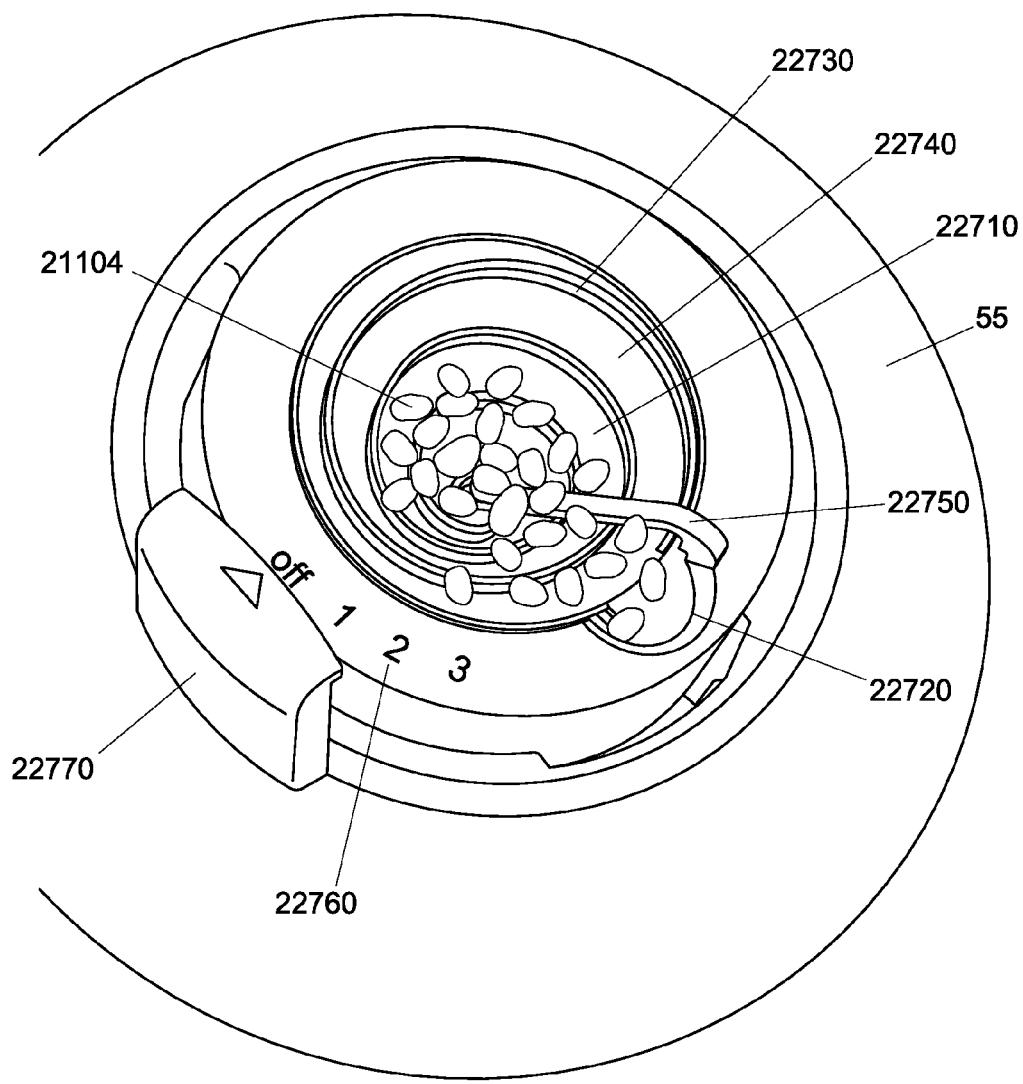
FIG. 39C shows how, in use, the coffee beans are supplied by the second coffee bean packaging cartridge shown in FIGS. 39A and 39B to the coffee brewing apparatus.

A fourth embodiment of a second coffee bean packaging cartridge that can be connected to the coffee brewing apparatus will be described now with reference to FIGS. 39A-39C. As shown in FIG. 39A, the second coffee bean packaging cartridge 22700 comprises a funnel shaped holder 22710 for holding the coffee beans. The second coffee bean packaging cartridge comprises an upper outlet 22720 at the upper end of the funnel shaped holder 22710, which upper outlet is connected by a tube (not shown) to a lower outlet 22725 (see FIG. 39B) for releasing a dose of coffee beans 21104 from the holder. The second coffee bean packaging cartridge 22700 can be connected to the coffee brewing apparatus 4 by placing the bayonet elements (only one of them 21683 is shown in FIG. 39B) in the openings 58 and subsequently rotating the second coffee bean packaging cartridge, as described herein above. When the second coffee bean packaging cartridge 22700 is in its final position, the outlets 22720 and 22725 are aligned with the coffee bean entrance opening 9 of the coffee brewing apparatus 4. The transportation means consist of a spiral-shaped trajectory 22740 on the inner wall of the funnel shaped holder. The spiral shaped trajectory 22740 is obtained by a spiral-shaped edge 22730 protruding from the inner wall. The funnel shaped holder 22710 is, in use, rotated, as shown in FIG. 39C. A non-moving block element 22750 impedes the coffee beans to continue rotating on the inner wall. As a result, because the spiral shaped trajectory continues to be rotated, the coffee beans are driven to follow the spiral shaped trajectory 22740 upwards towards the outlet 22720.

Preferably, the actuation means for rotating the holder 22710 are formed by a battery operated motor, although in principle also manually operable actuation means may be used. The rotation of the holder may be initiated by moving the drive clutch 22770 to a position 22760, corresponding to the desired rotation speed. For example, by selecting the rotation speed, the user can select the amount of coffee beans supplied to the coffee brewing apparatus and thereby adjust the coffee strength.

Alternatively, the operation of the motor may be initiated and ended, automatically by detecting the start and stop of the grinder in the coffee brewing apparatus 4. The detection may be implemented by means, known per se detecting the sound of the grinder or the vibration thereof. In this way, the coffee brewing apparatus is supplied with coffee beans as long as the grinder thereof is working.

According to a fifth embodiment of the invention, the first and/or the second coffee bean packaging cartridge comprises a first module, which is a coffee bean package and a second module, which comprises a motor. The first module is removably connectable to the coffee brewing apparatus and the second module is removably connectable to the first module, when the first module is connected to the coffee brewing apparatus. This embodiment will now be described with reference to the second coffee bean packaging cartridge as shown in FIGS. 40A-40F, but is also with suitable adaptation applicable to a first coffee bean packaging cartridge.

Figure 40A:
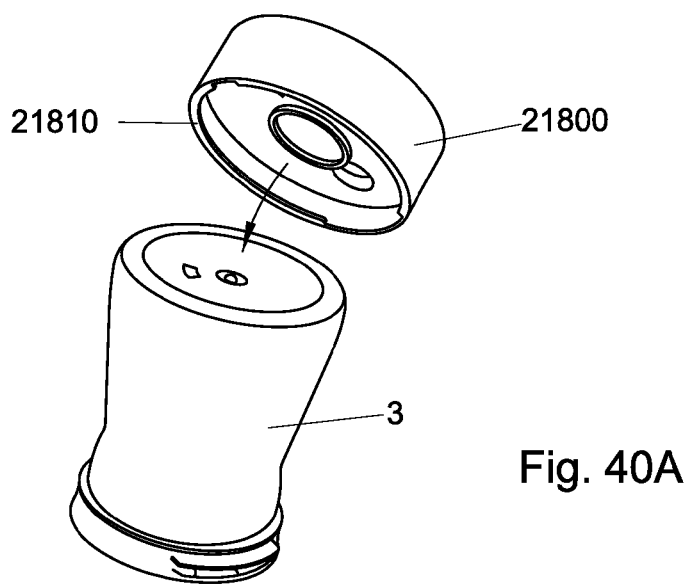
FIG. 40A shows in perspective view how a first module and a second module of a second coffee bean packaging cartridge according to a fifth embodiment of the invention should be connected to each other in a coffee bean supply mode.
Figure 40B:
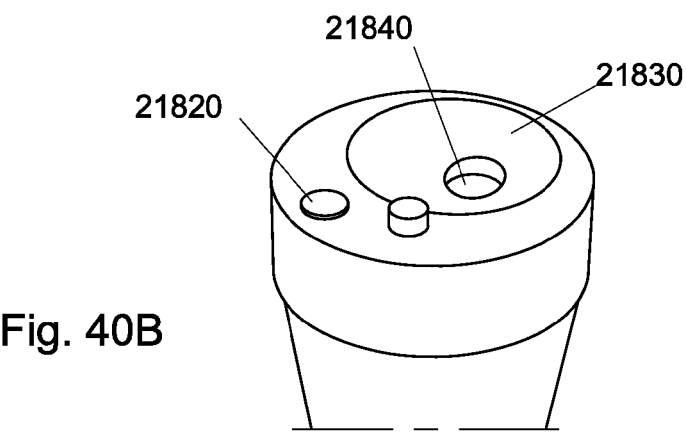
FIG. 40B shows a perspective view of the second coffee bean packaging cartridge shown in FIG. 40A with the first and the second module thereof connected to each other in the coffee bean supply mode.
Figure 40C:
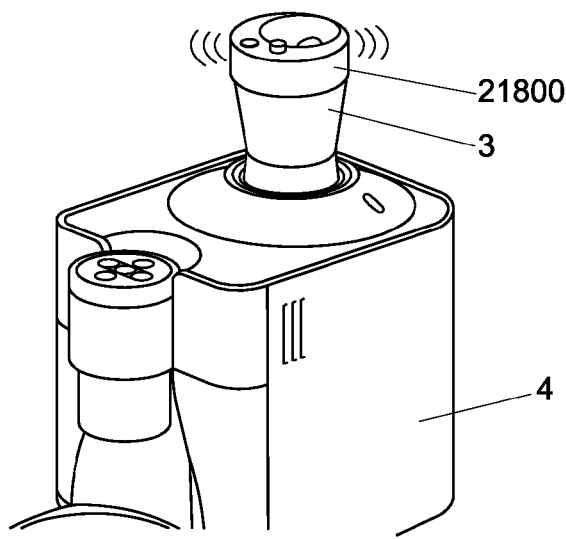
FIG. 40C shows a perspective view of the second coffee bean packaging cartridge shown in FIG. 40A mounted to the coffee brewing apparatus.

As shown in FIG. 40A, a second coffee bean packaging cartridge comprises a first module 22203 being a coffee bean package or container. The second module 21800 is removably connectable to the upper side of the first module 22203 by attaching an element 21810 thereto. When the second module 21800 is connected to the upper side of the first module 22203, the second coffee bean packaging cartridge is in a coffee bean supply mode. The second module comprises a batter driven unit with a vibration motor, similar to the ones used in mobile telephones. When the second module 21800 is placed on the first module 22203 as shown in FIG. 40B, the motor may be switched on by means of button 21820. The shaking or vibration of the second module encourages the coffee beans present in the first module 22203 to flow towards the outlet thereof, resulting in the supply of the coffee beans to the coffee brewing apparatus 4, as shown in FIG. 40C.

Figure 40D:
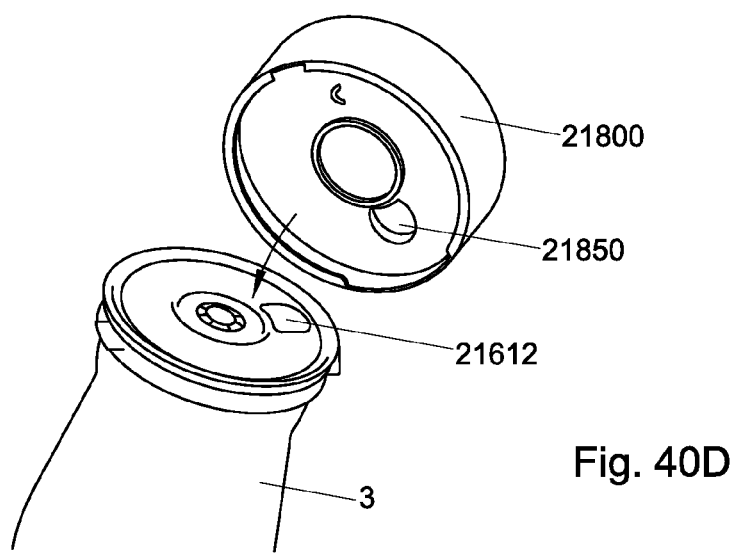
FIG. 40D shows in perspective view how the first module and the second module of a second coffee bean packaging cartridge shown in FIG. 40A should be connected to each other in a coffee bean refill mode.
Figure 40E:
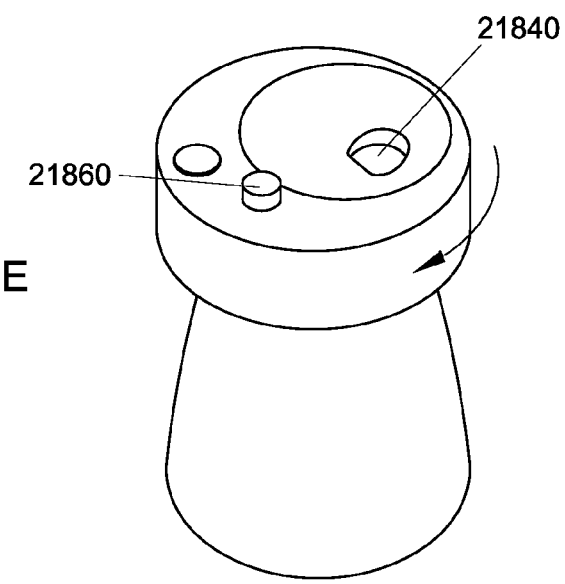
FIG. 40E shows a perspective view of the second coffee bean packaging cartridge shown in FIG. 40A with the first and the second module thereof connected to each other in the coffee bean refill mode.
Figure 40F:
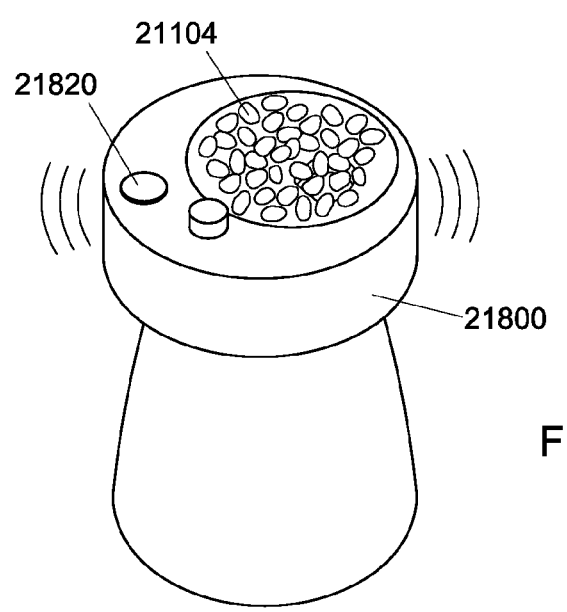
FIG. 40F shows how the second coffee bean packaging cartridge is refilled with coffee beans.

In order to bring the second coffee bean packaging cartridge in a coffee bean refill mode, the first module 22203 should be detached from the coffee brewing apparatus 4 and the second module should be connected to the bottom side of the first module, as shown in FIG. 40D. As described herein above, the outlet 21612 of the first module 22203 is open, when it is connected to the coffee brewing apparatus 4 and closed when it is disconnected. By connecting the second module in the coffee beans refill mode to the first module in the same or a similar way as the coffee brewing apparatus, the outlet of the first module 22203 may be opened and used as inlet for refilling the cartridge with coffee beans. Thereto, the second module 21800 comprises a funnel shaped part 21830, for supplying the coffee beans by the user and a coffee bean inlet 21840. It furthermore comprises a coffee bean outlet 21850, which when the second module is connected to the first module 22203 in the coffee bean refill mode, is aligned with the outlet 21612 of the first module, which here has the function of coffee bean inlet. In order to connect the second module 21800 to the first module 22203, the user has to press button 21860 to engage a latch opener, as shown in FIG. 40E. By turning the motor on, the coffee beans 21104 in the funnel shaped part 21830 are assisted into the first module 22203, as shown in FIG. 40F.

Figure 41A:
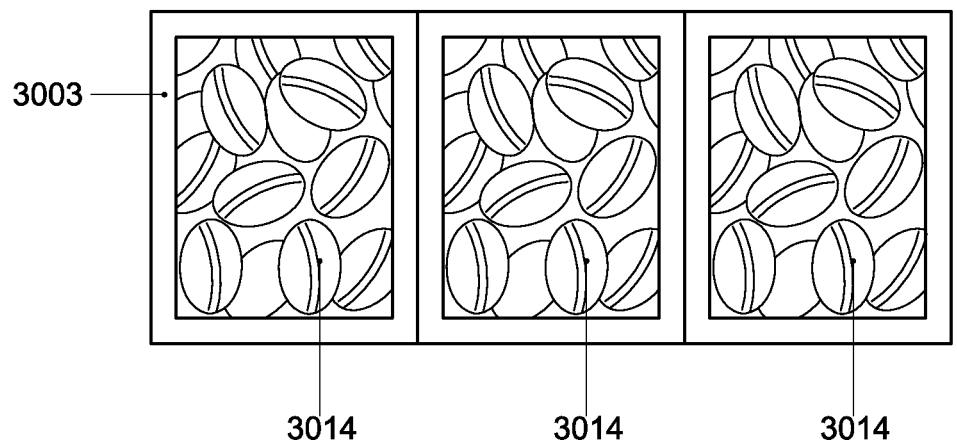
FIG. 41A schematically shows a section of a second coffee bean package with multiple compartments in side elevation.
Figure 41B:
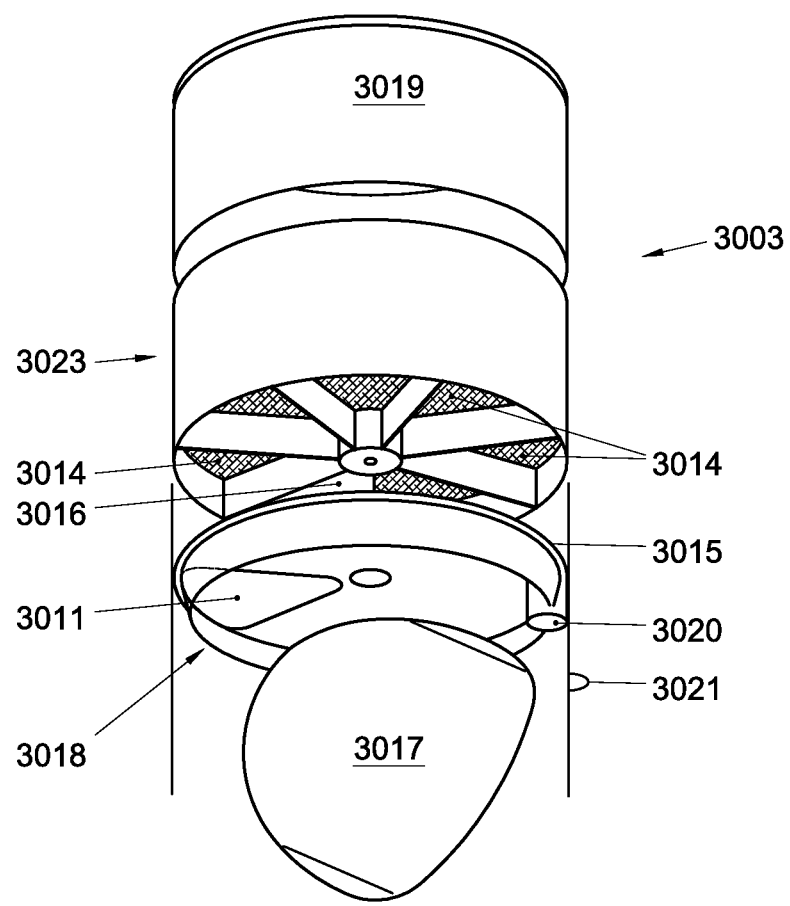
FIG. 41B shows an explosion drawing of a coffee bean package with multiple compartments and dosing device in perspective view.

In FIG. 41A, there is schematically shown a section of a second coffee bean packaging cartridge 3003 with multiple compartments 3014 according to another embodiment of the invention having a second dosing device which is independent from the first dosing device. In FIG. 41B the coffee bean packaging cartridge or coffee bean package 3003 with multiple compartments is shown in a perspective view which clearly depicts the second dosing device 3023. To this end, the package 3003, in particular the dosing device 3023, is arranged with multiple compartments 3014 which are each filled with one dose of coffee beans. The package 3003, in particular the dosing device 3023, can for instance comprise a displaceable dosing element 3015, being a rotary part in the embodiment shown, which displaceable dosing element 3015 is provided with a coffee bean outlet 3011. The dosing element 3015 can be e.g. displaced manually by means of actuating element which acts on the outer wall of the element 3015 and which e.g. can move along a straight line for rotating the element 3015. An example will be provided hereinafter with reference to FIG. 42. The second packaging cartridge according to FIG. 41B may be further provided, under the displaceable dosing element 3015, with a bayonet connection as discussed above for connection to a coffee brewing apparatus. In this embodiment, a displaceable dosing element 3015 may be understood to cover an element which, through displacement, doses an amount of coffee beans for supply to the brewing apparatus in particular the grinder thereof. By placing the coffee bean outlet 3011 under one of the compartments 3014, the coffee beans from the respective compartment 3014 can move through the coffee bean outlet 3011 towards the grinder. For instance, the coffee beans fall through the coffee bean outlet 3011 by gravity. For instance, at least one parking position 3016 may be provided approximately at the location of which the coffee bean outlet 3011 can park, so that no coffee beans flow out undesirably through the coffee bean outlet 3011. Furthermore, the second coffee bean packaging cartridge 3003 may be provided with a closing strip 3017 or the like which closes off an exit side 3018 of the coffee bean package 3003 before use, and which is to be removed for instance by the user prior to placement of the package 3003 in the coffee brewing apparatus. In this way, the exit side 3018 of the coffee bean package 3003 is hygienically covered before use. Also, a shell 3019 may be provided, which encloses the compartments 3014, for instance for providing information and/or advertising on the outside of the second coffee bean packaging cartridge 3003.

Figure 42:
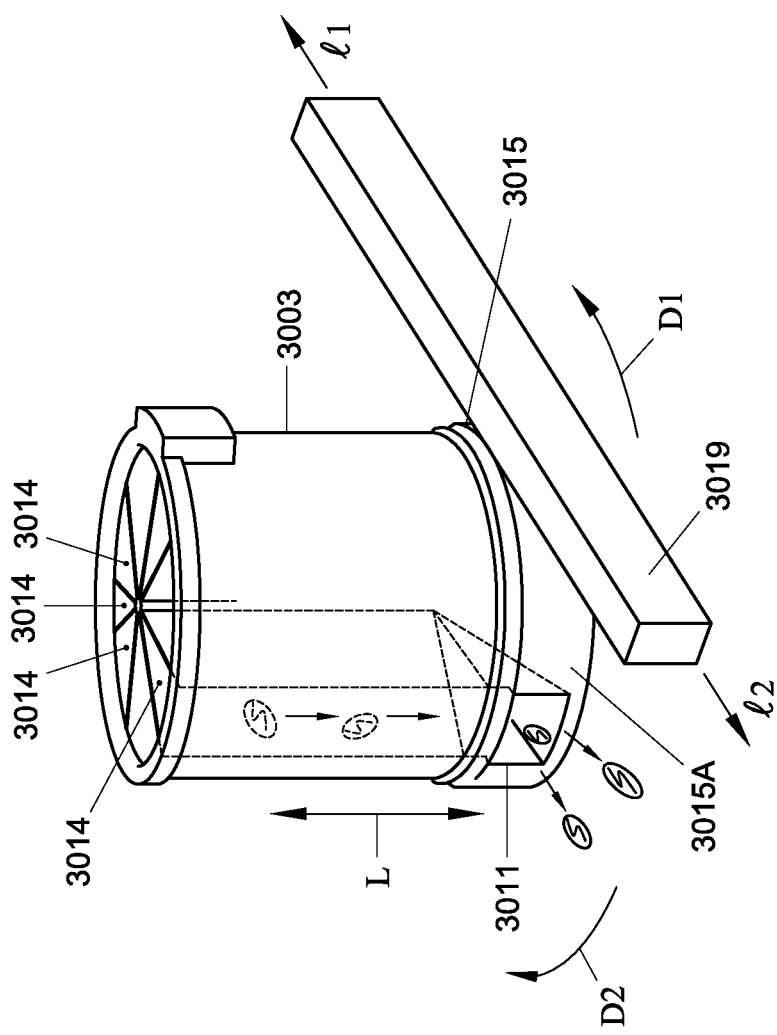
FIG. 42 shows a coffee bean package with multiple compartments, a dosing device, and a corresponding activation element.

In an embodiment, as discussed above with reference to FIG. 41, the dosing device 3023 can be activated by an activation element 3019, schematically shown in FIG. 42. For instance, the activation element 3019 is embodied as a longitudinal flat element which can be manually moved along a straight line in two opposite directions 11 and 12 respectively. If the element moves along a straight line in the direction 11 the dosing element 3015 rotates in the direction D1. If the element moves along a straight line in the direction 12 the dosing element 3015 rotates in the direction D2.

The activation element 3019 may be arranged for operating the displaceable dosing element 3015, being a rotary part in the embodiment shown, for placing the coffee bean outlet 3011 opposite one of the compartments 3014, for supplying the dose of coffee beans to the grinder. The displaceable dosing element 3015 is for instance rotatable in a rotational direction D1 and D2 for displacing the coffee bean outlet 3011 under and/or opposite the desired compartment 3014. Thus the element 3019 acts as an opening means 12A. In addition the element 3019 can be provided with teeth which engage corresponding teeth positioned at the outside of the second cartridge.

Figure 44B:
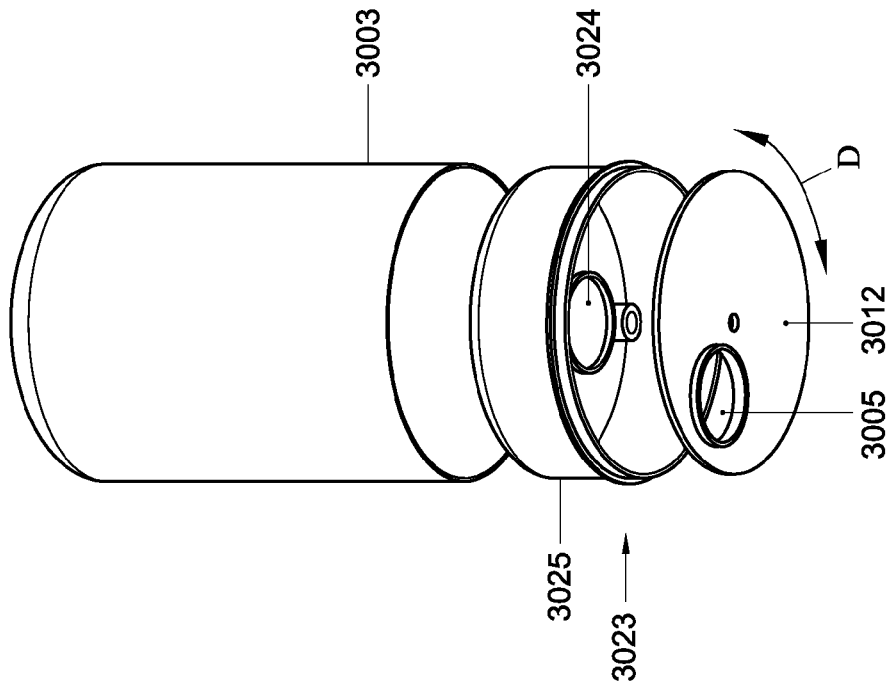
FIG. 44B shows an explosion drawing of a coffee bean package and a dosing device in perspective view.

Also, the displaceable dosing element 3015 may be arranged as closing means 3012A and/or be provided with closing means 3012A (see FIG. 44B). When the dosing element 3015 is rotated such that it only releases an empty compartment, the other compartments are for instance closed off such that the exposure of the coffee beans in the second coffee bean packaging cartridge to ambient air is prevented. Thus the element 3019 acts as a closure mechanism.

Figure 43:
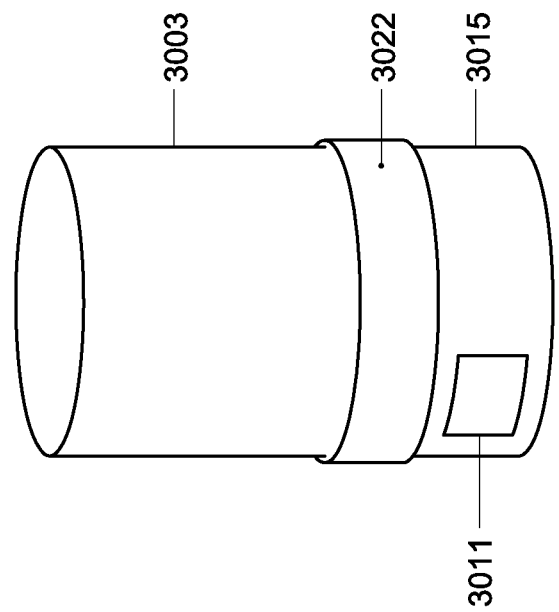
FIG. 43 shows a coffee bean package with a closure.

As shown in FIG. 42 and FIG. 43, the displaceable dosing element 3015 may be displaceable in the direction L of the compartments 3014. For instance, the displaceable dosing element 3015 can be moved relative to the rest of the packaging cartridge 3003 so that the coffee bean outlet 3011 is released, for instance in a downwardly moved condition, or so that the coffee bean outlet 3011 is closed, for instance in an upwardly moved condition (see FIG. 42). As can be seen, the outlet 3011 may be arranged on the side of the packaging cartridge 3003, in particular the displaceable dosing element 3015.

In FIG. 43 an alternative embodiment is shown, where by moving a ring 3022, which is part of closing means, upwards, the coffee bean outlet 3011 is released. The second coffee bean packaging cartridge 3003 may be provided with multiple compartments 3014. Under the closing means 2A a rotatable dosing element 3015 may be provided, for instance provided with one outlet 3011. The outlet 3011 can then, for instance, release one compartment 3014 with coffee beans, if the outlet 3011 is placed opposite that compartment 3014, at least if the closing means release the outlet. The closing means 3022 may be arranged for closing off and releasing the coffee bean outlet 3011. For instance, the second coffee bean packaging cartridge 3003 is arranged such that the coffee bean outlet 3011 is released upon connection of the second coffee bean packaging cartridge 3003 on the coffee brewing. For instance, the closing means 3022 slide upwards if the second coffee bean packaging cartridge 3003 is placed in the connecting device of the coffee brewing apparatus. The rotatable dosing element can place the coffee bean outlet 3011 opposite the respective compartment 3014, for instance with the aid of the activation element 3019, and for instance through rotation, so that the coffee beans flow out of the respective compartment 3014.

In another embodiment, the second coffee bean packaging cartridge 3003 is provided with multiple coffee bean outlets 3011, for instance all compartments 3014 are provided with an outlet 3011, while the coffee brewing apparatus is provided with one coffee bean inlet.

In another embodiment, the second coffee bean packaging cartridge 3003 can have multiple outlets 3011 corresponding to multiple compartments 3014, with all outlets 3011 comprising closing means 3022. For instance, the activation element 3019 is then arranged to open or break-through a closure 3022 for supplying a dose of coffee beans. The closing means can for instance comprise a breakable, tearable and/or cuttable foil. Thus the user operates the dosing device 3023 of the second coffee bean packaging cartridge 3003, for instance by releasing the respective outlet 3011, and/or for instance by displacing the dosing element 3015 e.g. by actuating the element 3019.

Figure 44A:
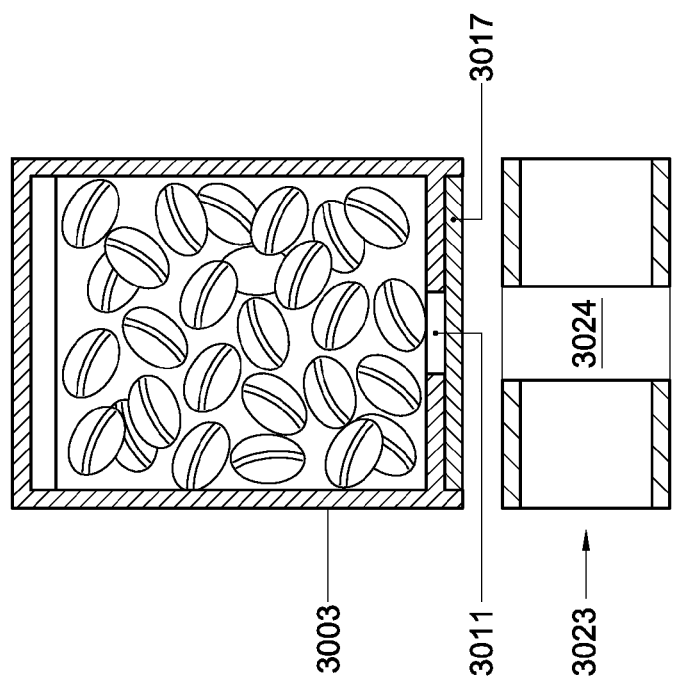
FIG. 44A schematically shows a section of a coffee bean package and a dosing device separately from the package, in side elevation.

In FIG. 44A, 44B another embodiment is shown, where a dosing device 3023 is included in the second coffee bean packaging cartridge 3003. The dosing device 3023 can comprise a rotary and/or sliding mechanism. The dosing device 3023 may be provided with a housing 3025 with a chamber 3024, and a closure 3012 with a coffee bean outlet 3005. The coffee bean outlet 3005 can be moved relative to the chamber 3024, so that the chamber 3024 is either released or is closed off by the closing means 3012A, for instance by rotating the closing means 3012A and/or the housing 3025 in a rotational direction D.

The second coffee bean packaging cartridge 3003 is for instance provided with an aperture 3011 and a sealing strip 3017. By removing the sealing strip 3017 at least locally, the aperture 3011 can be released. For instance, the sealing strip 3017 can be locally or wholly removed by pulling a pulling tab (not shown) protruding from the packaging cartridge so that it can be grasped by a user, so that the aperture 3011 is released. By placing the chamber 3024 under the aperture 3011, coffee beans can end up in the chamber 3024. Preferably, the volume of the chamber 3024 is sufficient for temporarily storing one dose of coffee beans. After filling of the chamber 3024 with one dose of coffee beans, the chamber 3024 and the aperture 3011 are displaced relative to each other, so that the aperture 3011 is closed off, for instance by the upper surface of the housing 3025. By placing the coffee bean outlet 3005 under the chamber 3024, the dose of coffee beans in the chamber 3024 can be released and be passed to the grinder. As the aperture 3011 and the chamber 3024 are not connected to each other anymore, no further coffee beans from the second coffee bean packaging cartridge 3003 will be passed via the chamber 3024 to the grinder, and therefore one dose of ground coffee beans can be supplied to the coffee brewing device.

Figure 45B:
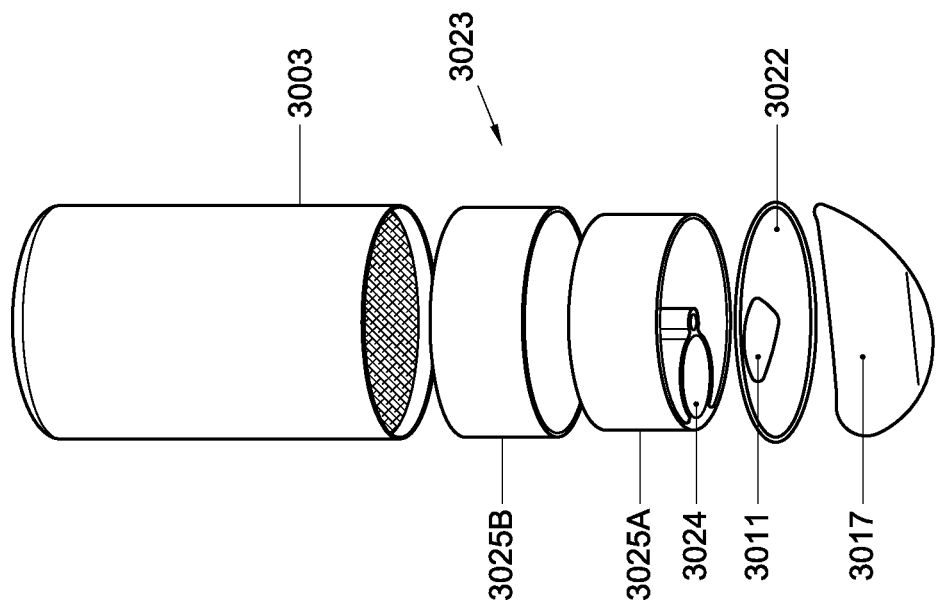
FIG. 45B shows an explosion drawing of a coffee bean package with dosing device in perspective view.
Figure 45A:
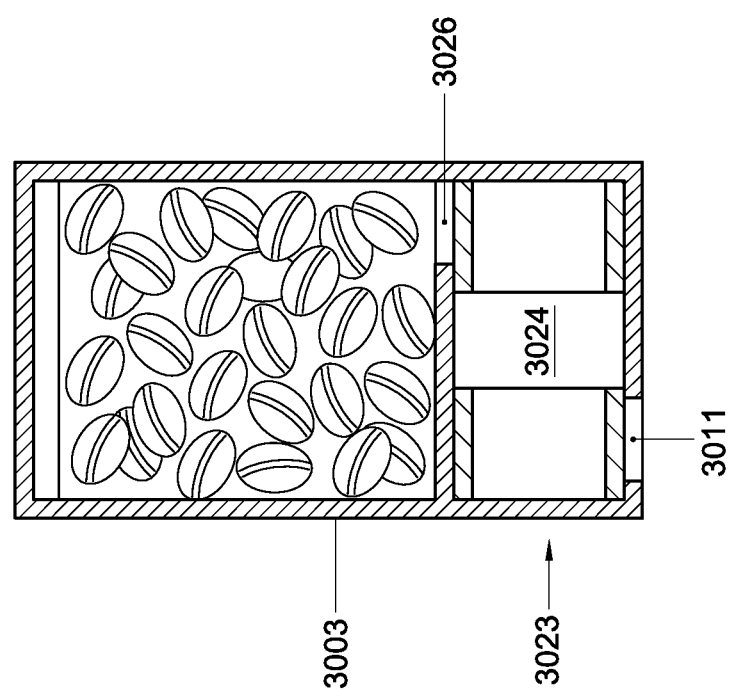
FIG. 45A schematically shows a section of a coffee bean package with dosing device in side elevation.

In FIGS. 45A, 45B an embodiment is shown in which the dosing device 3023 is provided in and at the bottom of the second coffee bean packaging cartridge 3003. Here, the second coffee bean packaging cartridge 3003, in particular the dosing device 3023, is for instance provided with a chamber 3024 for temporarily storing and/or passing a dose of coffee beans. The chamber 3024 may be provided in a first housing part 3025A, while the first housing part 3025A and the chamber 3024 can rotate in and relative to a receiving second housing part 3025B, for instance about a central axis 3025C of the first housing part 3025A. In the explosion drawing of FIG. 45B, the first housing part 3025A and the chamber 3024 have been rotated, for instance, 90° about the central axis 3025C, with respect to the position in FIG. 45A. The housing parts 3025A, 3025B may be parts of one housing 3025. The housing 3025 is a part of the dosing device 3023. Furthermore, in the second coffee bean packaging cartridge 3003, above the housing 3025, a space filled with coffee beans is provided. The space comprises for instance only one compartment, and is filled with multiple dosages of coffee beans. Furthermore, a coffee bean aperture 3026 may be provided at the bottom of the space, under the space with coffee beans, and above the dosing device 3023, for supplying the coffee beans to the dosing device 3023 under the influence of gravity. The first housing part 3025A may be arranged movably, in particular rotatably, relative to the aperture 3026, while the receiving housing part 3025B may be arranged fixedly with respect to the passage 3026. The first housing part 3025A may be rotated by means of for example an activation element 3019 which acts on the outer wall of the first housing part 3025A via an opening in the second housing part 3025B and which moves along a straight line in directions 11 and 12 as discussed above for rotating the housing part 3025A. Other ways of controlling are also possible. Under the chamber 3024, closing means 3012A, with a coffee bean aperture 3011, may be provided. For instance, the closing means 3012A are rotatable with respect to the housing 3025. By rotating the first housing part 3025A relative to the receiving housing part 3025B, the chamber 3024 can be placed under the coffee bean passage 3026, and a part of the coffee beans, preferably approximately equal to one dose, descends into the chamber 3024. The chamber 3024 can thereupon be displaced again so that it is not connected to the aperture 3026, for instance the upper side of the chamber 3024 is closed off by a bottom part 3026A of the second coffee bean packaging cartridge 3003. By thereupon placing the coffee bean aperture 3011 under the chamber 3024, the dose of coffee beans is supplied to the grinder, via the coffee bean aperture or outlet 3011. For instance, the dosing of the coffee beans is operated through the activation element 3019, which can be provided integral with the second coffee bean packaging cartridge 3003.

The second coffee bean packaging cartridge 3003 can for instance comprise right angles and/or be made of substantially rectangular or cylindrical shape. In an embodiment, the inner space of the second coffee bean packaging cartridge may be arranged for holding multiple dosages of coffee beans, for instance, when this inner space is wholly filled with coffee beans, at least 20 grams, more particularly at least 50 grams, still more particularly at least 70 grams and still more particularly at least 200 grams of coffee beans. In another embodiment, the second coffee bean packaging cartridge 3003 may comprise only one dose of coffee beans, so that the system after each connection of the second coffee bean packaging cartridge 3003 processes one dose of coffee beans, for instance for one cup of coffee beverage. Also, a dose can for instance correspond to multiple cups of coffee beverage, or larger cups of coffee beverage, while the user can choose from smaller or larger second coffee bean packaging cartridges 3003, which in use are placed in their entirety on the coffee brewing apparatus. Different second coffee bean packaging cartridges 3003 within the system can involve multiple volumes. Such second coffee bean packaging cartridges 3003 can for instance after one dosage be exchanged and/or thrown away.

Figure 46D:
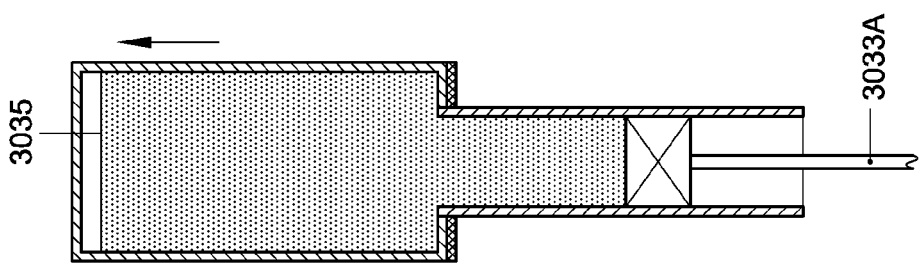
FIG. 46A-V schematically show steps in a dosing method.
Figure 46C:
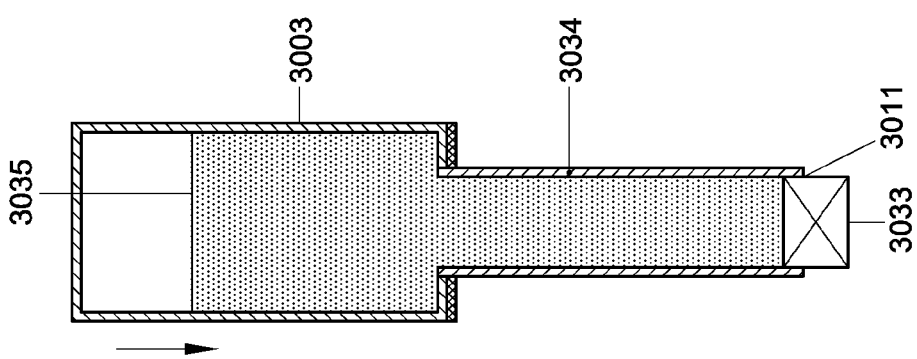
Figure 46B:
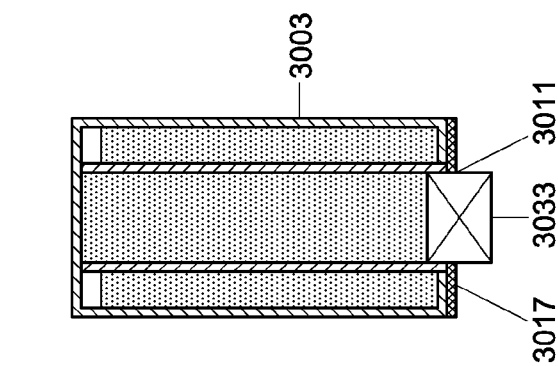
Figure 46A:
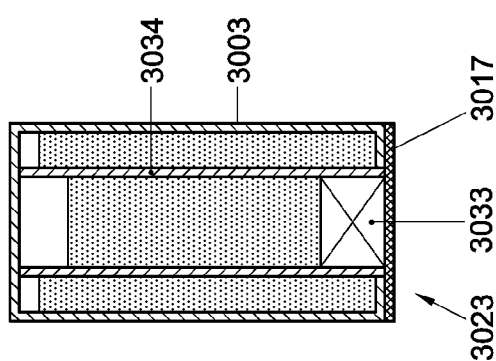
Figure 46H:
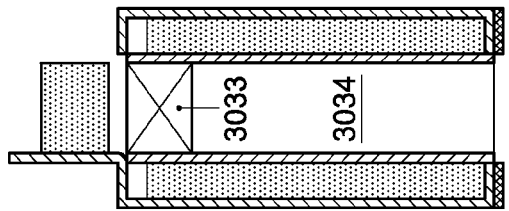
Figure 46G:
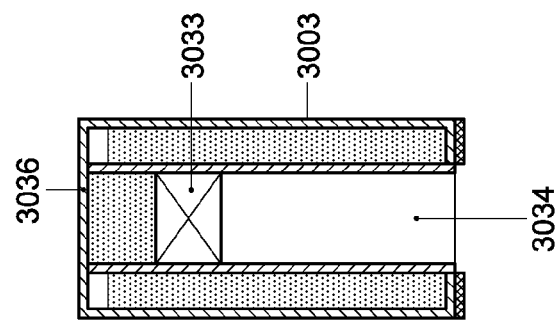
Figure 46F:
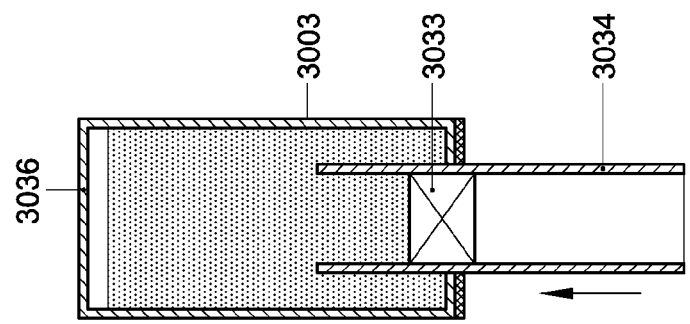
Figure 46E:
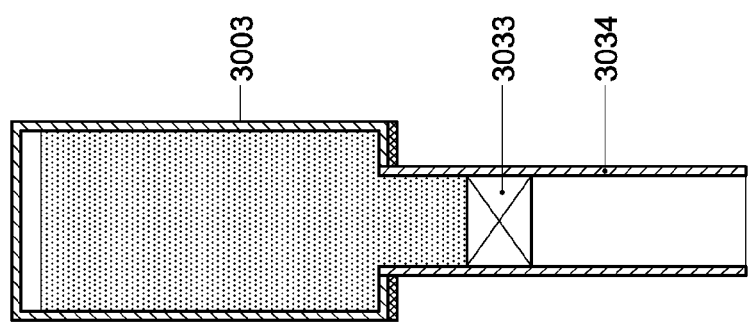
Figure 46L:
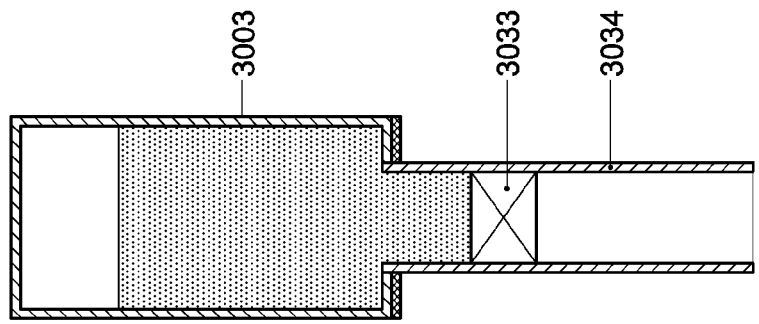
Figure 46K:
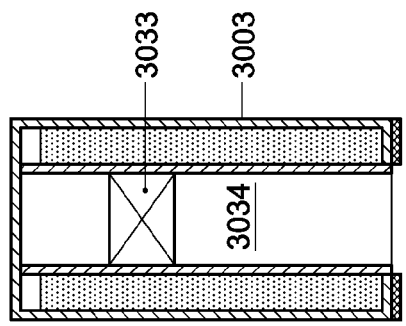
Figure 46J:
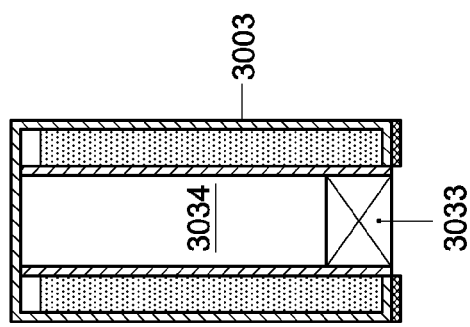
Figure 46I:
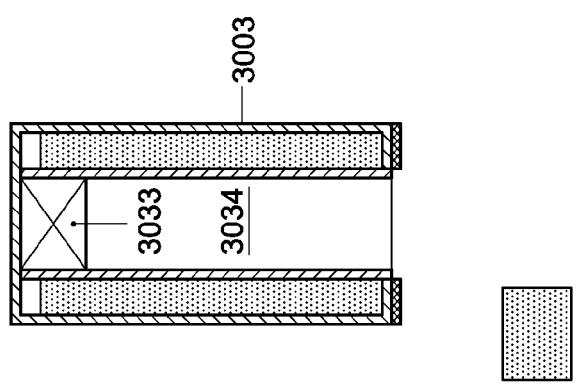
Figure 46T:
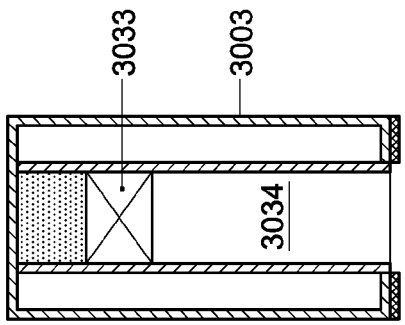
Figure 46S:
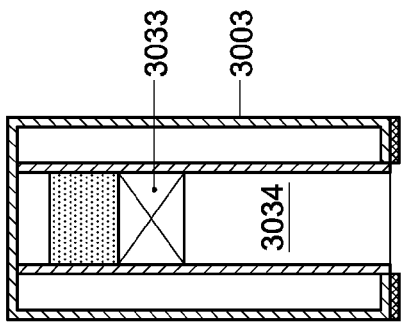
Figure 46R:
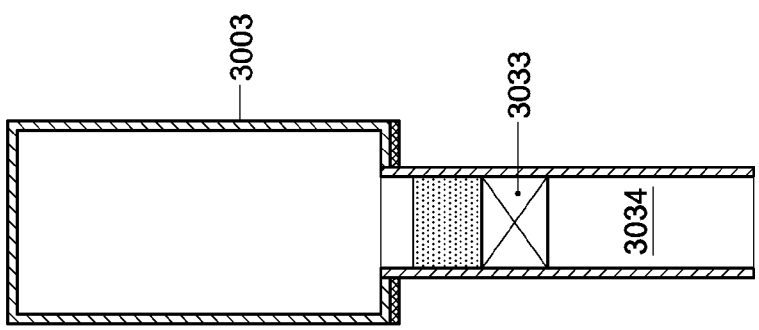
Figure 46Q:
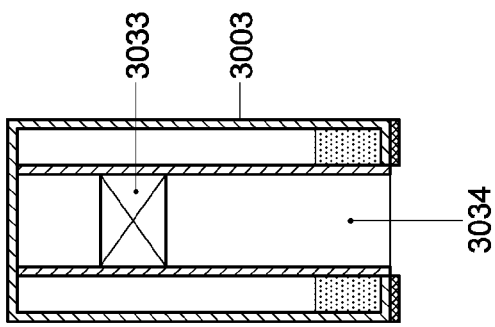
Figures 46U, 46V:
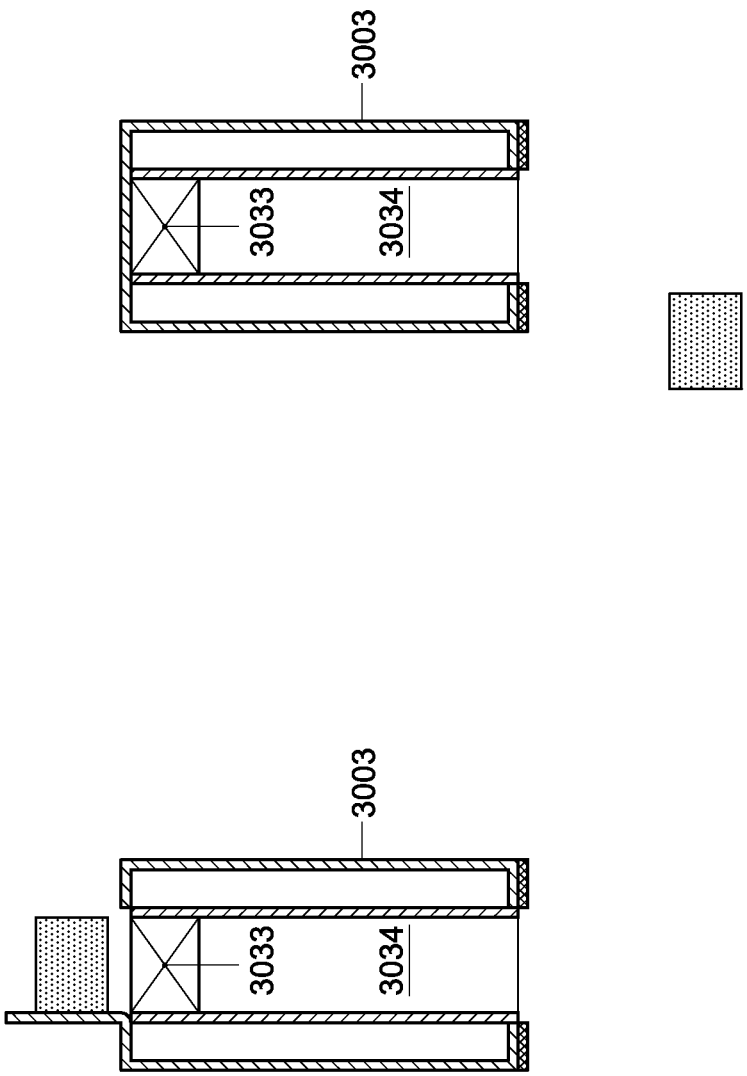

FIGS. 46A-V show in chronological order, by way of example, possible steps for a method with a dosing device 3023 for a second coffee bean packaging cartridge 3003 with coffee beans. The dosing device 3023 is arranged to enable a predetermined dose of coffee beans to be supplied from the second coffee bean packaging cartridge 3003 to the coffee brewing apparatus, in particular the grinder. The dosing device 3023 comprises for instance a piston 3033, which may be a displaceable, in particular slidable, dosing element, in the form of a corresponding tube 3034 with coffee bean outlet 3011. The tube 3034 may be provided in the second coffee bean packaging cartridge 3003. The piston 3033 and the tube 3034 can for instance have a circular cross section or an angular cross section. The tube 3034 is preferably filled with at least a part of the coffee beans from the second coffee bean packaging cartridge 3003.

In a first step (FIG. 46A) the second coffee bean packaging cartridge 3003 is closed. For instance, the second coffee bean packaging cartridge 3003 is provided with a sealing strip 3017 which preferably closes off the second coffee bean packaging cartridge 3003 substantially airtight and/or under vacuum. In the second coffee bean packaging cartridge 3003 enough coffee beans can be present for multiple dosages of coffee beans for multiple cups of coffee beverage. Preferably, the second coffee bean packaging cartridge 3003 is substantially wholly filled with coffee beans. In the second coffee bean packaging cartridge 3003 a user moveable piston 3033 is positioned.

In a second step, by the user the piston 3033 is pulled out through the coffee bean outlet 3011, for instance by pulling on a rod 3033A (only shown in FIG. 46D) attached to the piston 3033 so that at least a part of the sealing strip 3017 is ripped away (FIG. 46B). The piston 3033 here closes off the outlet 3011, so that no coffee beans get out of the second coffee bean packaging cartridge 3003. Preferably, the piston 3033 is provided at an end of the tube 3034, so that a considerable part of the tube 3034 is still filled with coffee beans. In a next step, the piston 3033, the tube 3034 and coffee beans in the tube 3034 are partly moved out of the second coffee bean packaging cartridge 3003 (FIG. 46C), while the piston 3033 continues to close off the outlet 3011. This can e.g. be realized by providing a stop on the inside of the tube 3034 for the piston 3033. The upper surface 3035 of the coffee beans in the second coffee bean packaging cartridge 3003 can thereby come down, so that there is space for the piston 3033 to slide further into the second coffee bean packaging cartridge 3003, whereby said upper surface 3035 will rise (FIG. 46D). The piston 3033 continues to rise until the part of the coffee beans that is still in the tube 3034 is approximately equal to a predetermined dose of coffee beans (FIG. 46E). This can e.g. be identified by user readable marks on the surface of the tube 3034. The piston 3033 can be moved to a particular height in the tube 3034, which height determines the dose of coffee beans to be supplied to the grinder.

Thereupon the tube 3034 and the piston 3033 can be moved up together to a top wall 3036, or at least an opposite wall, of the second coffee bean packaging cartridge 3003 (FIGS. 46F, 46G), with the tube 3034 and the piston 3033 remaining in an approximately equal position relative to each other, so that said dose of coffee beans is confined in the tube 3034, between the piston 3033 and the top wall 3036, disallowing any further coffee beans to come to the piston 3033. As can be seen, the piston 3033 extends between a bottom wall 3037 and the top wall 3036 of the second coffee bean packaging cartridge 3003; for instance the position of the piston 3033 is approximately equal to the initial position (FIG. 46A). The top of the second coffee bean packaging cartridge can now e.g. partly be opened, for instance by a hingeable cover, and the piston 3033 can now be individually pushed up further beyond the tube 3034, while the dose of coffee beans can lift up along with it (FIG. 46H). The dose of coffee beans can now be transferred by the user to the coffee brewing apparatus, and the cover can be closed (FIG. 46I).

If the dose of coffee beans has been carried off (FIG. 46J), the piston 3033 can be moved back into the tube 3034 towards the stop again, but also to any other height within the tube 3034 (FIG. 46K). Thereupon the piston 3033 and the tube 3034, in equal position relative to each other, can be moved down again whereby the part of the tube 3034 above the piston 3033 is filled with coffee beans (FIG. 46L). The piston 3033 and the tube 3034 can thereupon slide towards the opposite wall 3036, so that the predetermined dose of coffee beans is confined (FIG. 46M), which predetermined dose in turn can be released by the 30 piston 33 coming up and the cover being pivoted upwards (FIGS. 46N-P). The above steps can be repeated until the second coffee bean packaging cartridge 3003 is empty (FIGS. 46Q-V). Please note that the hingeable cover can also be used to refill the second coffee bean packaging cartridge.

In a further embodiment, the second coffee bean packaging device 3003, may be manufactured substantially from disposable or recyclable materials, such as for instance cellulose, paper, cardboard, or other materials, or for instance from plastic. The second coffee bean packaging cartridge may be adapted such as to only hold a single dose of coffee beans. The transportation means of this packaging cartridge are then only used to transport to dose out of the cartridge. The dose can then be inserted into the coffee brewing apparatus by hand, e.g. using the insert piece as disclosed in FIG. 11. Optionally the transportation means may be used to transport the dose into the entrance opening of the coffee brewing apparatus. Alternatively, the second coffee bean packaging cartridge can comprise more than one dose of coffee beans, and then the dosing device thereof, e.g. formed by the transportation means, prepares or makes the dose of coffee beans which dose is then transported by the transportation means out of the cartridge and optionally into the coffee brewing apparatus. In this latter case the dose is prepared independent of the coffee brewing apparatus, but the transportation of this dose into the coffee brewing apparatus may optionally be controlled by the brewing device.

By the inventive system as described above a number of advantageous methods for preparing a (coffee) beverage may be performed. In an embodiment of such a method in an emptying and grinding step the grinding device is activated for emptying the metering chamber and for grinding coffee beans collected in the metering chamber. Preferably the grinding device is activated longer than is required for emptying or at least substantially completely emptying the metering chamber and for grinding all the coffee beans collected in the metering chamber. The metering chamber can be filled with coffee beans previous to the emptying and grinding of the coffee beans collected in the metering chamber. The metering chamber can be completely filled with coffee beans or at least substantially completely filled with coffee beans. The transportation means can be driven longer than is required for completely filling or at least substantially completely filling the metering chamber with coffee beans.

In another embodiment of such a method in a first step the transportation means can be driven longer than is required for filling the metering chamber with coffee beans; and in a second step which follows after the completion of the first step the grinding device is activated longer than is required for emptying the metering chamber and for grinding all the coffee beans which were collected in the metering chamber during the first step. The method then further preferably comprises in a third step which follows after that the second step is completed that the brewing device is brewing coffee based on the ground coffee and on heated water.

In a still further embodiment of such a method for brewing coffee a cartridge is filled with coffee beans and is then coupled to a coffee brewing apparatus. By means of the coupling between the cartridge and the coffee brewing apparatus a metering chamber is formed The metering chamber is filled with coffee beans from the cartridge and is subsequently emptied by means of activation of a grinder. The coffee beans of the metering chamber are ground by the activation of the grinder and subsequently coffee is brewed with the coffee brewing apparatus based on the ground beans and heated water. Then preferably use is made of a metering chamber with a bottom that is at least partly formed by a rotating part of the grinder. Due to driving the grinder the rotating part rotates around a vertical axis, and by means of the rotation of the part, the metering chamber is emptied and the beans of the metering chamber are ground with the grinder. Filling the metering chamber with coffee beans can be performed for a longer time than needed for completely or substantially completely filling the metering chamber with the coffee beans. In addition or alternatively the grinder can be activated longer than is required for emptying or at least substantially completely emptying the metering chamber and for grinding all the coffee beans which were collected in the metering chamber during the filling step.

In another method for preparing a beverage by means of the inventive system in a first step the metering chamber is filled with coffee beans. Then in a second step which follows after the completion of the first step the grinding device is activated for emptying the metering chamber and for grinding coffee beans which were collected in the metering chamber during the first step. In the first step the metering chamber can be completely filled with coffee beans or at least substantially completely filled with coffee beans. In the first step the transportation means is preferably driven longer than is required for filling the metering chamber with coffee beans. In the second step the grinder can be activated longer than is required for completely emptying or at least substantially completely emptying the metering chamber and for grinding all or at least substantially all the coffee beans which were collected in the metering chamber during the first step.

In addition an alternative method of preparing a beverage by means of an inventive coffee beverage system can be performed in which the first coffee bean packaging cartridge is connected to the coffee brewing apparatus. Then the vertically extending drive shaft is rotated with the motor means thereby driving and moving the transportation means of the first coffee bean packaging cartridge for preparing and transporting a dose the coffee beans towards the exit opening of the first coffee bean packaging cartridge. There after coffee beans which have entered the coffee brewing apparatus via the entrance opening thereof are ground to produce ground coffee, which is used for brewing coffee. Thereafter a second coffee bean packaging cartridge is connected to the coffee brewing apparatus. The second dosing device of the second coffee bean cartridge is actuated for preparing and transporting a dose of coffee beans towards the exit opening of the second coffee bean packaging cartridge independently from the coffee brewing apparatus. Coffee beans which have entered the coffee brewing apparatus via the entrance opening thereof are ground to produce ground coffee, which is used to brew coffee. Actuating the second dosing device of the second coffee bean cartridge for preparing and transporting a dose of coffee beans towards the exit opening of the second coffee bean packaging cartridge can be carried out prior to the step of connecting the second coffee bean packaging cartridge to the coffee brewing apparatus. Is discussed above the second dosing device is actuated manually. In this alternative the transportation means can be actuated for filling the metering chamber, and in a subsequent step which follows after the completion of the step of filling the metering chamber with coffee beans, the grinding device can be activated for emptying the metering chamber and for grinding coffee beans which were collected in the metering chamber during the filling step. During the filling step the grinding device can be activated longer than is required for emptying or at least substantially completely emptying the metering chamber and for grinding all the coffee beans which were collected in the metering chamber during the filling step.

Furthermore coffee beans can be supplied from a second coffee bean packaging cartridge as described above in the following manner. The coffee beans are hold in a housing that encloses an interior volume of the second coffee bean packaging cartridge. The second dosing device is manually activated for providing a dose of coffee beans. The coffee beans are released from the interior volume through the outlet of the housing, and are transported by means of the transportation means towards the outlet. Transporting the coffee beans includes contacting the coffee beans by means of the moveable structure of the transportation means. The moveable structure is actuated by means of manually operable actuation means of the transportation means.

It is thus believed that the operation and construction of the present invention will be apparent from the foregoing description. The invention is not limited to any embodiment herein described and, within the purview of the skilled person; modifications are possible which should be considered within the scope of the appended claims. For example the top wall 31 of the metering chamber may be located well above the highest part of the inlet opening 21 of the metering chamber. This means that if in the first step the transportation means is activated longer than required for filling the metering chamber, the metering chamber will always be filled up until about the highest part of the inlet opening.

Also, for example, the transportation means for transporting the coffee beans from the container to the metering chamber may be implemented as passive means not driven by a motor, for example by means of a downwardly extending bottom wall for transporting the coffee beans towards the exit opening and into the metering chamber under the influence of gravity only. A special means may in that case be required to close the inlet opening of the metering chamber once it is filled with coffee beans.

Similarly all kinematic inversions are considered inherently disclosed and to be within the scope of the present invention. The term "comprising" when used in this description or the appended claims should not be construed in an exclusive or exhaustive sense but rather in an inclusive sense. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Features which are not specifically or explicitly described or claimed may be additionally included in the structure according to the present invention without deviating from its scope.

The invention claimed is:

1. A coffee beverage system, including a coffee brewing apparatus and a first coffee bean packaging cartridge, wherein the first coffee bean packaging cartridge is removable connected to the coffee brewing apparatus, the first coffee bean packaging cartridge being arranged for holding and supplying coffee beans, the first coffee beans packaging cartridge including:

a container comprising an interior volume and at least one exit opening defining a coffee bean outlet, the interior volume holding coffee beans;

transportation means adapted for enabling transportation of the coffee beans from the interior volume towards the exit opening of the first coffee bean packaging cartridge; wherein the coffee brewing apparatus comprises an entrance opening for receiving coffee beans which are transported with the aid of the transportation means towards the exit opening, a grinder for grinding coffee beans which have entered the coffee apparatus via the entrance opening and a brewing device for brewing coffee on the basis of ground coffee obtained by means of the grinder, wherein the system is further provided with a metering chamber for receiving coffee beans which are transported with the aid of the transportation means into the metering chamber wherein the metering chamber comprises a bottom portion which forms a part of the grinder, said bottom portion being arranged in the coffee brewing apparatus for rotating around a first axis extending in a vertical direction wherein the system is arranged such that upon activation of the grinder the bottom portion is rotating around the vertical axis for transporting the coffee beans from the metering chamber into the grinder and for grinding the coffee beans, wherein the system comprises a first dosing device for providing and supplying a predetermined dose of coffee beans from the first coffee bean packaging cartridge to the grinder, said first dosing device at least for a portion thereof being formed by the coffee brewing apparatus and comprising the metering chamber of the system when the first coffee bean packaging cartridge is or has been connected to the coffee brewing apparatus;

a second coffee bean packaging cartridge, said second coffee bean packaging cartridge being arranged for holding and supplying coffee beans and preferably being also removably connectable to the coffee brewing apparatus, said second coffee bean packaging cartridge including a second dosing device separate from the first dosing device of the brewing apparatus and the first coffee bean packaging cartridge for independently of the first dosing device preferably preparing a dose of coffee beans and/or supplying a dose of coffee beans to the entrance opening of the coffee brewing apparatus if the second bean packaging cartridge is connected to the coffee brewing apparatus.

2. The system according to claim 1, wherein the bottom portion has a conical shape such that the bottom portion extends downwardly in a direction extending perpendicular to and away from the first vertical axis.

3. The system according to claim 1, wherein the metering chamber is divided in a first chamber portion which is part of the first coffee bean packaging cartridge and a second chamber portion which is part of the coffee brewing apparatus wherein the second chamber comprises the bottom portion which forms a part of the grinder, said bottom portion being arranged in the coffee brewing apparatus for rotating around a first axis extending in a vertical direction.

4. The system according to claim 3, wherein the first chamber portion comprises the exit opening and the second chamber portion comprises the entrance opening wherein preferably the first chamber portion is located above the second chamber portion wherein the exit opening extends above the entrance opening.

5. The system according to claim 1, wherein the system is arranged such that after having received the coffee beans the metering chamber will hold a portion of coffee beans and/or in that the metering chamber is arranged for receiving a portion of coffee beans corresponding to a dosed amount of coffee beans which is preferably necessary for preparing a single serving of coffee beverage, such as a single cup coffee comprising 80-160 ml of coffee.

6. The system according to claim 1, wherein the transportation means comprise a part which is movable relative to the metering chamber for transporting the coffee beans towards and into the metering chamber upon driving of said transportation means.

7. The system according to claim 6, wherein the coffee brewing apparatus is provided with a first motor and a vertically extending drive shaft wherein said drive shaft is releasable connected with the transportation means of the first coffee bean packaging cartridge for driving and thereby moving the transportation means upon rotation of the drive shaft by means of the motor.

8. The system according to claim 6, wherein the movable part comprises a bottom and/or a plurality of vanes which rotate around a second vertical axis upon driving the transportation means.

9. The system according to claim 1, wherein the transportation means comprise a downwardly extending bottom wall such as a funnel of the container for transporting the coffee beans towards the metering chamber under the influence of gravity.

10. The system according to claim 9, wherein the transportation means comprise a part which is movable relative to the metering chamber for transporting the coffee beans towards and into the metering chamber upon driving of said transportation means; and wherein the transportation means comprise the funnel of the container and the part which is movable relative to the metering chamber.

11. The system according to claim 1, wherein the transportation means comprise a downwardly extending bottom wall for transporting the coffee beans towards the metering chamber under the influence of gravity only.

12. The system according to claim 3, wherein the first chamber portion is provided with a top wall which limits the volume of the metering chamber in an upwardly vertical direction wherein the bottom portion of the second chamber portion limits the volume of the metering chamber in a downwardly vertical direction.

13. The system according to claim 3, wherein the first chamber portion and the second chamber portion are each provided with at least one upstanding side wall limiting the volume of the metering chamber.

14. The system according to claim 3, wherein the first chamber portion is provided with an upstanding side wall comprising an inlet opening for entering the coffee beans by means of the transportation means into the metering chamber.

15. The system according to claim 1, wherein the transportation means are arranged for transporting the coffee beans at least in a horizontal direction for transporting the coffee beans into the metering chamber.

16. The system according to claim 14, wherein the transportation means are arranged for transporting the coffee beans at least in a horizontal direction for transporting the coffee beans into the metering chamber; and wherein the transportation means are arranged for transporting the coffee beans at least in a horizontal direction towards the inlet opening of the metering chamber.

17. The system according to claim 16, wherein the transportation means comprise a part which is movable relative to the metering chamber for transporting the coffee beans towards and into the metering chamber upon driving of said transportation means; and wherein the movable part of the transportation means is arranged for transporting the coffee beans at least in a horizontal direction.

18. The system according to claim 1, wherein the first coffee bean packaging cartridge comprises closing means for closing the coffee bean outlet when the first coffee bean packaging cartridge is not connected to the coffee brewing apparatus.

19. The system according to claim 18, wherein the closing means are configured for opening the coffee bean outlet when the first coffee bean packaging cartridge is connected to the coffee brewing apparatus.

20. The system according to claim 18, wherein the closing means comprises a closure member at the bottom side of the container comprising the coffee bean outlet and a rotatable closing disk having an opening.

21. The system according to claim 20, wherein the first coffee bean packaging cartridge comprises closing means for closing the coffee bean outlet when the first coffee bean packaging cartridge is not connected to the coffee brewing apparatus; wherein the closing means are configured for opening the coffee bean outlet when the first coffee bean packaging cartridge is connected to the coffee brewing apparatus; and wherein in order to connect the first coffee bean packaging cartridge to the coffee brewing apparatus the opening of the rotatable closing disk is brought in a position aligned with the coffee bean outlet.

22. The system according to claim 21, wherein the closure member comprises a pair of fletching arms and the closure disk comprises a detent, which in the closed position is caught behind the fletching arms.

23. The system according to claim 1, wherein the exit opening is associated with a removable sealing element sealing the interior volume prior to activation of the first coffee bean packaging cartridge wherein preferably said sealing element prevents gasses to escape from the first coffee bean packaging cartridge.

24. The system according to claim 23, further including means for disrupting and displacing the sealing element.

25. The system according to claim 23, wherein the sealing element is a sealing membrane.

26. The system according to claim 24, wherein the means for disrupting and displacing is a pull tab.

27. The system according to claim 3, wherein the grinder is positioned centrically with respect to the metering chamber and/or in that the grinder is positioned centrically with respect to the second chamber portion.

28. The system according to claim 27, wherein the bottom part with the conical shape lies in the direction of the first vertical axis, wherein the conical part rotates around the first vertical axis upon driving the grinder.

29. The system according to claim 28, wherein the grinder comprises the bottom portion, a lower grinding disk extending around the bottom portion and an upper grinding disk extending above the lower grinding disk.

30. The system according to claim 29, wherein the grinder is rotationally driven by a second motor, resulting in the rotation of the bottom part with the conical shape and the lower grinding disk.

31. The system according to claim 30, wherein upon driving the bottom portion and lower grinding disk coffee beans are moved in an outwardly extending radial direction between the lower grinding disk and the upper grinding disk and in that the coffee beans are crunched and cut into ground coffee, because a vertical distance between the lower grinding disk and the upper grinding disk decreases in the outwardly extending radial direction.

32. The system according to claim 1, wherein the grinder is a no contamination grinder, comprising an exit location for ground coffee out into a ground coffee chute, which is a funnel pointing downwards into the brewing device of the coffee brewing apparatus.

33. The system according to claim 2, wherein the first vertical axis runs centrally through the bottom portion of the metering chamber and in that the bottom portion extends downwardly in a direction extending perpendicular to and away from the vertical axis all around the vertical axis and/or in that the first vertical axis runs centrally through the bottom portion of the second chamber portion and in that the bottom portion extends downwardly in a direction extending perpendicular to and away from the vertical axis all around the vertical axis.

34. The system according to claim 1, wherein the coffee brewing apparatus is provided with a control device.

35. The system according to claim 7, wherein the coffee brewing apparatus is provided with a control device; and wherein the control device is arranged for controlling the first motor and/or the grinder.

36. The system according to claim 35, wherein the control device is arranged such that, in use, in a first step the transportation means is driven for filling the metering chamber with coffee beans and that in a second step which follows after the completion of the first step the grinding device is activated for emptying the metering chamber and for grinding coffee beans which were collected in the metering chamber during the first step.

37. The system according to claim 36, wherein the control device is arranged such that, in use, in the first step the transportation means is driven longer than is required for filling the metering chamber with coffee beans and/or that in the second step the grinding device is activated longer than is required for emptying or at least substantially completely emptying the metering chamber and for grinding all the coffee beans which were collected in the metering chamber during the first step.

38. The system according to claim 37, wherein in the first step the transportation means is driven longer than is required for completely filling or at least substantially completely filling the metering chamber with coffee beans.

39. The system according to any preceding claim 37, wherein the volume of the metering chamber is such that if it is filled with coffee beans in the first step the amount of beans corresponds with one dose of coffee beans for preparing a cup of coffee.

40. The system according to claim 36, wherein the coffee brewing apparatus is arranged such that the control device controls the brewing device wherein the control device is arranged such that, in use, in a third step which follows after that the second step is completed the brewing device is brewing coffee based on the ground coffee and heated water heated by a heating device of the coffee brewing apparatus.

41. The system according to claim 1, wherein the respective coffee bean packaging cartridges are filled with coffee beans.

42. The system according to claim 41, wherein the first coffee bean packaging cartridge and/or the second coffee bean packing cartridge is filled with one dose of coffee beans.

43. The system according to claim 41, wherein the first coffee bean packaging cartridge is filled with multiple servings of coffee beans.

44. The system according to claim 1, wherein the second dosing device is arranged for holding and supplying a predetermined dose of coffee beans which dose amounts to an amount of a single serving of coffee beans which is intended for preparing a magnitude of one cup of coffee beverage.

45. The system according to claim 1, wherein the second dosing device comprises multiple compartments each of the multiple compartments being filled with a predetermined dose of coffee beans.

46. The system according to claim 45, wherein each compartment is arranged for holding a dose of coffee beans which dose amounts to an amount of a single serving of coffee beans which is intended for preparing a magnitude of one cup of coffee beverage.

47. The system according to claim 44, wherein each dose has a weight of approximately 50 grams or less, in particular 20 grams of less, more particularly 15 grams or less.

48. The system according to claim 44, wherein the second dosing device of the second coffee bean packaging cartridge includes a housing comprising an interior volume and at least one exit opening defining a coffee bean outlet, the interior volume being arranged for holding a predetermined dose of coffee beans, wherein said coffee bean outlet can be placed in communication with the entrance opening of the coffee brewing apparatus when the second coffee bean packaging cartridge is connected to the coffee brewing apparatus.

49. The system according to claim 48, wherein the second dosing device comprises multiple compartments each of the multiple compartments being filled with a predetermined dose of coffee beans; and wherein each compartment has at least one exit opening defining a coffee bean outlet.

50. The system according to claim 49, wherein the connection of the second coffee bean packaging cartridge to the coffee brewing apparatus is such that the housing is rotatable with respect to the entrance opening of the coffee brewing apparatus.

51. The system according to claim 44, wherein the coffee beverage system is arranged such that coffee beans are transported from the second coffee bean packaging cartridge to the coffee brewing apparatus by gravity.

52. The system according to claim 48, wherein the second dosing device of the second coffee bean packaging cartridge comprises transportation means arranged for enabling transportation of a predetermined dose of coffee beans from the interior volume towards the at least one exit opening of the second dosing device.

53. The system according to claim 52, wherein the transportation means forms a displaceable dosing element.

54. The system according to claim 53, wherein the second coffee bean packaging cartridge is adapted to the coffee brewing apparatus so that, if the second coffee bean packaging cartridge is connected to the coffee brewing apparatus, coffee beans which are transported with the aid of the transportation means of the second dosing device towards the exit opening of the second dosing device can be received by the coffee brewing apparatus via the entrance opening for preparing coffee.

55. The system according to claim 54, wherein the transportation means of the second dosing device are configured to be actuated independently from the coffee brewing apparatus.

56. The system according to claim 55, wherein the transportation means are configured to be actuated manually.

57. The system according to claim 55, wherein the transportation means of the second dosing device include a moveable structure that is, at least partly, present in the interior volume for contacting the coffee beans, and wherein the transportation means further include manually operable actuation means that are, at least partly, provided outside of the interior volume for manually actuating the moveable structure.

58. The system according to claim 57, wherein the transportation means of the second dosing device include a rotatable element, such as a rotatable axle, that is at least partly located inside the interior volume.

59. The system according to claim 58, wherein the rotatable element is at least partly formed as a conveyor screw.

60. The system according to claim 58, wherein the moveable structure is rigidly connected to the rotatable element, and wherein the moveable structure is provided with at least one first aperture for letting coffee beans pass there through, wherein the second coffee bean packaging cartridge is provided with at least one second aperture that is positioned, in use, above or below the at least one first aperture and that offers entrance to the outlet, wherein, as a result of rotating the rotatable element, the at least one aperture can be aligned with the at least one second aperture.

61. The system according to claim 60, wherein the moveable structure includes a plunger.

62. The system according to claim 58 further provided with a barrier in the interior volume arranged for hindering passage of coffee beans towards the outlet.

63. The system according to claim 62, wherein the barrier includes a valve for hindering passage of the coffee beans towards the outlet.

64. The system according to claim 63, wherein the valve includes a flexible element that is deformed when the valve is opened.

65. The system according to claim 64, wherein the barrier includes an internal wall spaced apart from, in use, a top part of the housing, wherein the transportation means are arranged for moving coffee beans through a space between the, in use, top part of the housing and the internal wall.

66. The system according to claim 65, wherein the internal wall separates a first part of the interior volume from a second part of the interior volume, wherein the moveable structure is arranged in the first part of the interior volume, and wherein the outlet can be reached via the second part of the interior volume.

67. The system according to claim 58, wherein the moveable structure of the second dosing device of the second coffee bean packaging cartridge is resiliently attached to the second coffee bean packaging cartridge by means of a resilient member, so that the moveable structure is moveable by means of manually operable actuation means repeatably between a first position and a second position while deforming the resilient member.

68. The system according to claim 67, provided in the interior volume with a passage for the coffee beans towards the outlet, wherein in the second position the passage is at least partly obstructed by the moveable structure and in the first position the passage is obstructed less by the moveable structure than in the second position and optionally is not obstructed by the moveable structure.

69. The system according to claim 68, provided in the interior volume with a passage for the coffee beans towards the outlet, wherein in the first position the passage is at least partly obstructed by the moveable structure and in the second position the passage is obstructed less by the moveable structure than in the first position and optionally is not obstructed by the moveable structure.

70. The system according to claim 68, wherein the first position is located, in use, above or below the second position.

71. The system according to claim 70, wherein at least part of the coffee beans is located, in use, above the moveable structure of the second dosing device.

72. The system according to claim 48, wherein the second coffee bean packaging cartridge is provided with a recess in the housing for receiving the drive shaft of the coffee brewing apparatus.

73. The system according to claim 72, wherein the container is closed in the recess.

74. The system according to claim 72, wherein the recess is dimensioned for preventing mechanical contact between the second coffee bean packaging cartridge and the drive shaft.

75. The system according to claim 72, wherein the transportation means are positioned for preventing, in use, driving of the transportation means by means of the drive shaft of the coffee brewing apparatus.

76. The system according to claim 44, wherein the second dosing device comprises a scooper for holding and supplying coffee beans, the scooper, when connected to the coffee brewing apparatus, being aligned with the entrance opening thereof, the scooper being configured to work also as transportation means by turning around its axis, thereby emptying coffee beans into the entrance opening.

77. The system according to claim 76, wherein the second coffee bean packaging cartridge comprises a handle for manually turning the scooper.

78. The system according to claim 44, wherein the second dosing device comprises a hopper for holding a predetermined dose of coffee beans, the hopper having an outlet, which is aligned with the entrance opening of the coffee brewing apparatus, when the second coffee bean packaging cartridge is connected thereto, wherein the transportation means comprise a closure plate, which in a first position at least to a large extent and preferably entirely closes the outlet, thereby hindering passage of coffee beans towards the entrance opening and in a second position does not obstruct or not substantially obstruct the outlet and wherein the transportation means further include manually operable actuation means for actuating the closure plate from the first to the second position and vice versa.

79. The system according to claim 78, wherein the closure plate in the second position at least substantially delimits a first part of the interior volume of the hopper from a second part of the interior volume of the hopper, thereby hindering the passage of coffee beans from the first part to the second part.

80. The system according to claim 78, wherein the closure plate forms the first part of a virtual cylinder, the other part of the cylinder being open, wherein the manually operable actuation means are configured for rotating the closure plate to the first and second position, respectively.

81. The system according to claim 44, wherein the second coffee bean packaging cartridge comprises a funnel shaped holder for holding a predetermined dose of coffee beans and an outlet for releasing coffee beans from the holder, the outlet being positioned at an upper end of the funnel shaped holder and, when the second coffee bean packaging cartridge is connected to the coffee brewing apparatus being aligned with the entrance opening thereof, wherein the transportation means are spiral shaped conveyor means and, in use, rotatably actuated for driving a predetermined dose of coffee beans out of the funnel shaped holder towards the outlet.

82. The system according to claim 81, wherein the spiral shaped transportation means are formed by a spiral shaped trajectory for the coffee beans on the inner wall of the funnel, obtained by a spiral shaped protruding edge on the inner wall.

83. The system according to claim 81, wherein the spiral shaped transportation means comprise a non-moving block element, impeding the coffee beans to continue rotating on the inner wall, thereby driving the coffee beans to follow the spiral shaped trajectory upwards towards the outlet.

84. The system according to claim 44, wherein the second coffee bean packaging cartridge is configured for shaking or vibrating coffee beans to encourage flow thereof towards an outlet of the second coffee bean packaging cartridge for releasing a predetermined dose of coffee beans.

85. The system according to claim 84, wherein the second coffee bean packaging cartridge comprises a first module, which is a container comprising the dosing device and for holding a predetermined dose of coffee beans and a second module, which comprises a motor, the first module being removably connectable to the coffee brewing apparatus and the second module being removably connectable to the first module, when the first module is connected to the coffee brewing apparatus.

86. The system according to claim 84, wherein the outlet of the second dosing device of the second coffee bean packaging cartridge is open when it is connected to the coffee brewing apparatus and closed when it is disconnected, and wherein the second module, preferably in a coffee bean refill mode, is connectable to the first module in lieu of the coffee brewing apparatus.

87. The system according to claim 86, wherein, preferably in coffee bean refill mode, the second module is connected in a same or similar way to the first module as the coffee brewing apparatus, resulting in the outlet of the first module being open.

88. The system according to claim 1, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively.

89. The system according to claim 88, wherein the side wall protrudes from the upper side of the coffee brewing apparatus.

90. The system according to claim 88, wherein the side wall comprises openings for receiving bayonet elements of the respective coffee bean packaging cartridge.

91. The system according to claim 90, wherein the first coffee bean packaging and the second coffee bean packaging cartridge comprise the bayonet elements.

92. The system according to claim 90, wherein the respective coffee bean packaging cartridge should be inserted into the recess such that the bayonet elements are inserted in the openings and then rotated in order to be connected to the coffee brewing apparatus, wherein the side wall comprises blocking elements for impeding a further rotation of the respective coffee bean packaging cartridge, when it has reached its final position.

93. The system according to claim 92, wherein the respective coffee bean packaging cartridge should be rotated approximately 50 degrees in order to reach its final position.

94. The system according to claim 7, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively, wherein the recess comprises rotatable protruding edges at its center, which are fixed at the driving shaft wherein the transportation means of the first coffee bean packaging cartridge is provided with recesses for receiving the protruding edges such that upon rotation of the drive shaft the rotating protruding edges drive the transportation means.

95. The system according to claim 89, wherein the coffee brewing apparatus comprises a housing surrounding the protruding side wall.

96. The system according to claim 48, wherein the second coffee bean packaging cartridge comprises closing means for closing the coffee bean outlet when the second coffee bean packaging cartridge is not connected to the coffee brewing apparatus.

97. The system according to claim 96, wherein the closing means are configured for opening the coffee bean outlet when the second coffee bean packaging cartridge is connected to the coffee brewing apparatus.

98. The system according to claim 96, wherein the closing means comprises a closure member at the bottom side of the container comprising the coffee bean outlet and a rotatable closing disk having an opening.

99. The system according to claim 98, wherein the closing means are configured for opening the coffee bean outlet when the second coffee bean packaging cartridge is connected to the coffee brewing apparatus, wherein in order to connect the second coffee bean packaging cartridge to the coffee brewing apparatus the opening of the rotatable closing disk is brought in a position aligned with the coffee bean outlet.

100. The system according to claim 99, wherein the closure member comprises a pair of fletching arms and the closure disk comprises a detent, which in the closed position is caught behind the fletching arms.

101. The system according to claim 48, wherein the exit opening is associated with a removable sealing element sealing the interior volume prior to activation of the second coffee bean packaging cartridge wherein preferably said sealing element prevents gasses to escape from the second coffee bean packaging cartridge.

102. The system according to claim 101, further including means for disrupting and displacing the sealing element.

103. The system according to claim 101, wherein the sealing element is a sealing membrane.

104. The system according to claim 103, wherein the means for disrupting and displacing is a pull tab.

105. The system according to claim 1, wherein it further comprises a sensor arranged for detecting if the respective coffee bean packaging cartridge is connected to the coffee brewing apparatus.

106. The system according to claim 34, wherein it further comprises a sensor arranged for detecting if the respective coffee bean packaging cartridge is connected to the coffee brewing apparatus, and wherein the sensor is configured to signal a result of the detection to the control device.

107. The system according to claim 105, wherein the sensor is a switch.

108. The system according to claim 107, wherein the switch is a micro switch.

109. The system according to claim 107, wherein the respective coffee bean packaging cartridge comprises a protruding part for activating the switch when it is connected to the coffee brewing apparatus.

110. The system according to claim 109, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively;

wherein the side wall protrudes from the upper side of the coffee brewing apparatus;

wherein the side wall comprises openings for receiving bayonet elements of the respective coffee bean packaging cartridge;

wherein the first coffee bean packaging and the second coffee bean packaging cartridge comprise the bayonet elements;

wherein the protruding part is located below or above one of the bayonet elements.

111. The system according to claim 108, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively;

wherein the side wall comprises openings for receiving bayonet elements of the respective coffee bean packaging cartridge;

wherein the respective coffee bean packaging cartridge should be inserted into the recess such that the bayonet elements are inserted in the openings and then rotated in order to be connected to the coffee brewing apparatus, wherein the side wall comprises blocking elements for impeding a further rotation of the respective coffee bean packaging cartridge, when it has reached its final position;

wherein the protruding part activates the switch when the respective coffee bean packaging cartridge reaches its final position.

112. The system according to claim 107, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively;

wherein the side wall comprises openings for receiving bayonet elements of the respective coffee bean packaging cartridge;

wherein the switch is located in an opening in the sidewall surrounding the recess at the upper side of the coffee brewing apparatus, the protruding part activating the switch through the opening.

113. The system according to claim 112, wherein the switch is hidden behind horizontal wall segments in the side wall and in that the opening is a slit between the horizontal wall segments, the protruding part fitting in the slit.

114. The system according to claim 105, wherein the coffee brewing apparatus is provided with a control device, and wherein the control device is arranged for controlling the first motor and the grinder so that they can be activated only if it has been detected that the first coffee bean packaging cartridge is connected to the coffee brewing apparatus.

115. The system according to claim 1, wherein it further comprises an insert piece that is removable connectable to the coffee brewing apparatus in lieu of the respective coffee bean packaging cartridge.

116. The system according claim 115, wherein the insert piece is connectable to the coffee brewing apparatus in a same or similar way as the respective coffee bean packaging cartridge.

117. The system according to claim 116, wherein the insert piece comprises bayonet elements.

118. The system according to claim 108, wherein it further comprises an insert piece that is removable connectable to the coffee brewing apparatus in lieu of the respective coffee bean packaging cartridge, and wherein the insert piece comprises a protruding part for activating the switch when it is connected to the coffee brewing apparatus.

119. The system according to claim 108, wherein it further comprises an insert piece that is removable connectable to the coffee brewing apparatus in lieu of the respective coffee bean packaging cartridge;

wherein the insert piece is connectable to the coffee brewing apparatus in a same or similar way as the respective coffee bean packaging cartridge;

wherein the insert piece comprises bayonet elements;

wherein it further comprises an insert piece that is removable connectable to the coffee brewing apparatus in lieu of the respective coffee bean packaging cartridge, and wherein the insert piece comprises a protruding part for activating the switch when it is connected to the coffee brewing apparatus;

wherein the protruding part is located below or above one of the bayonet elements.

120. The system according to claim 118, wherein the coffee brewing apparatus comprises connection means for the removable connection to the first coffee bean packaging cartridge as well as the second coffee bean packaging cartridge, the connection means comprising a recess at an upper side of the coffee brewing apparatus, the recess being surrounded by a side wall and being configured for receiving a corresponding part protruding from a lower side of the first coffee bean packaging cartridge and the second coffee bean packaging cartridge, respectively;

wherein the side wall comprises openings for receiving bayonet elements of the respective coffee bean packaging cartridge;

wherein the respective coffee bean packaging cartridge should be inserted into the recess such that the bayonet elements are inserted in the openings and then rotated in order to be connected to the coffee brewing apparatus, wherein the side wall comprises blocking elements for impeding a further rotation of the respective coffee bean packaging cartridge, when it has reached its final position;

wherein the protruding part activates the switch when the insert piece reaches its final position.

121. The system according to claim 115, wherein the insert piece comprises a cavity having an interior volume and at least one exit opening defining a coffee bean outlet, the interior volume being arranged for receiving coffee beans, the insert piece further comprising closing means for closing the coffee bean outlet when the insert piece is not connected to the coffee brewing apparatus or not connected to the coffee brewing apparatus in its final position.

122. The system according to claim 121, wherein the closing means are configured for opening the coffee bean outlet when the insert piece is connected to the coffee brewing apparatus in its final position.

123. The system according to claim 120, wherein the closing means comprises a closure member at the bottom side of the cavity comprising the coffee bean outlet and in that the closing means furthermore comprises a rotatable closing disk having an opening.

124. The system according to claim 123, wherein when the insert piece is connected to the coffee brewing apparatus in its final position, the opening of the rotatable closing disk is in a position aligned with the coffee bean outlet.

125. The system comprising the coffee brewing apparatus and the second coffee bean packaging cartridge according to claim 1.

126. The system according to claim 1, wherein the system is arranged such that upon activation of the grinder the bottom portion is rotating around the first vertical axis for transporting the dose of coffee beans from the metering chamber into the grinder and for grinding the coffee beans.

127. The system according to claim 126, wherein the one dose of coffee beans comprises 5-11, preferably 6-8 grams of coffee beans.

128. The system according to claim 3, wherein the second chamber portion comprises about 100-X % of the volume of the metering chamber and the first chamber portion comprises about X % of the volume of the metering chamber wherein X is in the range of 2-50, preferably in the range of 5-40, more preferably in the range of 15-30.

129. The system according to claim 1, wherein the system is arranged such that, in use, the grinding device is activated for emptying the metering chamber and for grinding the coffee beans collected in the metering chamber.

130. The system according to claim 129, wherein the system is arranged such that in use the grinding device is activated longer than is required for emptying or at least substantially completely emptying the metering chamber and for grinding all the coffee beans collected in the metering chamber.

131. The system according to claim 129, wherein previous to the emptying of the metering chamber and the grinding of the coffee beans, in a first step the transportation means is driven for filling the metering chamber with coffee beans.

132. The system according to claim 131, wherein the transportation means is driven longer than is required for completely filling or at least substantially completely filling the metering chamber with coffee beans.

133. The system according to claim 1, wherein the coffee brewing apparatus comprises closing means which are configured for opening and/or closing the entrance opening of the coffee brewing apparatus, said closing means preferably are configured to be controlled by the coffee brewing apparatus and/or the (dis)connection of the cartridge (from) to the coffee brewing apparatus.

134. The second coffee bean packaging cartridge for use with a system according to claim 1, wherein said second coffee bean packaging cartridge being arranged for holding and supplying coffee beans, said second coffee bean packaging cartridge including a second dosing device for supplying a dose of coffee beans.

135. The second coffee bean packaging cartridge according to claim 134, wherein the second dosing device is arranged for holding and supplying a predetermined dose of coffee beans which dose amounts to an amount of a single serving of coffee beans which is intended for preparing a magnitude of one cup of coffee beverage.

136. The second coffee bean packaging cartridge according to claim 134, wherein the second dosing device comprises multiple compartments each of the multiple compartments being filled with a predetermined dose of coffee beans.

137. The second coffee bean packaging cartridge according to claim 136, wherein each compartment is arranged for holding a dose of coffee beans which dose amounts to an amount of a single serving of coffee beans which is intended for preparing a magnitude of one cup of coffee beverage.

138. The second coffee bean packaging cartridge according to claim 135, wherein each dose has a weight of approximately 50 grams or less, in particular 20 grams of less, more particularly 15 grams or less.

139. The second coffee bean packaging cartridge according to claim 134, wherein the second dosing device of the second coffee bean packaging cartridge includes a housing comprising an interior volume and at least one exit opening defining a coffee bean outlet, the interior volume being arranged for holding a predetermined dose of coffee beans, wherein preferably said coffee bean outlet can be placed in communication with an entrance opening of the coffee brewing apparatus when the second coffee bean packaging cartridge is connected to a coffee brewing apparatus.

140. The second coffee bean packaging cartridge according to claim 139, wherein the second dosing device comprises multiple compartments each of the multiple compartments being filled with a predetermined dose of coffee beans, and wherein each compartment has at least one exit opening defining a coffee bean outlet.

141. The second coffee bean packaging cartridge according to claim 139, wherein the second dosing device of the second coffee bean packaging cartridge comprises transportation means arranged for enabling transportation of a predetermined dose of coffee beans from the interior volume towards the at least one exit opening of the second dosing device.

142. The second coffee bean packaging cartridge according to claim 141, wherein the transportation means forms a displaceable dosing element.

143. The second coffee bean packaging cartridge according to claim 141, wherein the transportation means of the second dosing device are configured to be actuated autonomously.

144. The second coffee bean packaging cartridge according to claim 143, wherein the transportation means are configured to be actuated manually.

145. The second coffee bean packaging cartridge according to claim 143, wherein the transportation means of the second dosing device include a moveable structure that is, at least partly, present in the interior volume for contacting the coffee beans, and wherein the transportation means further include manually operable actuation means that are, at least partly, provided outside of the interior volume for manually actuating the moveable structure.

146. The second coffee bean packaging cartridge according to claim 145, wherein the transportation means of the second dosing device include a rotatable element, such as a rotatable axle, that is at least partly located inside the interior volume.

147. The second coffee bean packaging cartridge according to claim 146, wherein the rotatable element is at least partly formed as a conveyor screw.

148. The second coffee bean packaging cartridge according to claim 146, wherein the moveable structure is rigidly connected to the rotatable element, and wherein the moveable structure is provided with at least one first aperture for letting coffee beans pass there through, wherein the second coffee bean packaging cartridge is provided with at least one second aperture that is positioned, in use, above or below the at least one first aperture and that offers entrance to the outlet, wherein, as a result of rotating the rotatable element, the at least one aperture can be aligned with the at least one second aperture.

149. The second coffee bean packaging cartridge according to claim 148, wherein the moveable structure includes a plunger.

150. The second coffee bean packaging cartridge according to claim 146 further provided with a barrier in the interior volume arranged for hindering passage of coffee beans towards the outlet.

151. The second coffee bean packaging cartridge according to claim 150, wherein the barrier includes a valve for hindering passage of the coffee beans towards the outlet.

152. The second coffee bean packaging cartridge according to claim 151, wherein the valve includes a flexible element that is deformed when the valve is opened.

153. The second coffee bean packaging cartridge according to claim 152, wherein the barrier includes an internal wall spaced apart from, in use, a top part of the housing, wherein the transportation means are arranged for moving coffee beans through a space between the, in use, top part of the housing and the internal wall.

154. The second coffee bean packaging cartridge according to claim 153, wherein the internal wall separates a first part of the interior volume from a second part of the interior volume, wherein the moveable structure is arranged in the first part of the interior volume, and wherein the outlet can be reached via the second part of the interior volume.

155. The second coffee bean packaging cartridge according to claim 146, wherein the moveable structure of the second dosing device of the second coffee bean packaging cartridge is resiliently attached to the second coffee bean packaging cartridge by means of a resilient member, so that the moveable structure is moveable by means of manually operable actuation means repeatably between a first position and a second position while deforming the resilient member.

156. The second coffee bean packaging cartridge according to claim 155, provided in the interior volume with a passage for the coffee beans towards the outlet, wherein in the second position the passage is at least partly obstructed by the moveable structure and in the first position the passage is obstructed less by the moveable structure than in the second position and optionally is not obstructed by the moveable structure.

157. The second coffee bean packaging cartridge according to claim 156, provided in the interior volume with a passage for the coffee beans towards the outlet, wherein in the first position the passage is at least partly obstructed by the moveable structure and in the second position the passage is obstructed less by the moveable structure than in the first position and optionally is not obstructed by the moveable structure.

158. The second coffee bean packaging cartridge according to claim 156, wherein the first position is located, in use, above or below the second position.

159. The second coffee bean packaging cartridge according to claim 158, wherein at least part of the coffee beans is located, in use, above the moveable structure of the second dosing device.

160. The second coffee bean packaging cartridge according to claim 139, wherein the second coffee bean packaging cartridge is provided with a recess in the housing for receiving a drive shaft of a coffee brewing apparatus.

161. The second coffee bean packaging cartridge according to claim 160, wherein the container is closed in the recess.

162. The second coffee bean packaging cartridge according to claim 160, wherein the recess is dimensioned for preventing mechanical contact between the second coffee bean packaging cartridge and the drive shaft.

163. The second coffee bean packaging cartridge according to claim 160, wherein the transportation means are positioned for preventing, in use, driving of the transportation means by means of the drive shaft of a coffee brewing apparatus.

164. The second coffee bean packaging cartridge according to claim 134, wherein the second dosing device comprises a scooper for holding and supplying coffee beans, the scooper, when connected to a coffee brewing apparatus, being aligned with the entrance opening thereof, the scooper being configured to work also as transportation means by turning around its axis, thereby emptying coffee beans into the entrance opening.

165. The second coffee bean packaging cartridge according to claim 164, wherein the second coffee bean packaging cartridge comprises a handle for manually turning the scooper.

166. The second coffee bean packaging cartridge according to claim 134, wherein the second dosing device comprises a hopper for holding a predetermined dose of coffee beans, the hopper having an outlet, which is aligned with the entrance opening of a coffee brewing apparatus, when the second coffee bean packaging cartridge is connected thereto, wherein the transportation means comprise a closure plate, which in a first position at least to a large extent and preferably entirely closes the outlet, thereby hindering passage of coffee beans towards the entrance opening and in a second position does not obstruct or not substantially obstruct the outlet and wherein the transportation means further include manually operable actuation means for actuating the closure plate from the first to the second position and vice versa.

167. The second coffee bean packaging cartridge according to claim 166, wherein the closure plate in the second position at least substantially delimits a first part of the interior volume of the hopper from a second part of the interior volume of the hopper, thereby hindering the passage of coffee beans from the first part to the second part.

168. The second coffee bean packaging cartridge according to claim 167, wherein the closure plate forms the first part of a virtual cylinder, the other part of the cylinder being open, wherein the manually operable actuation means are configured for rotating the closure plate to the first and second position, respectively.

169. The second coffee bean packaging cartridge according to claim 134, wherein the second coffee bean packaging cartridge comprises a funnel shaped holder for holding a predetermined dose of coffee beans and an outlet for releasing coffee beans from the holder, the outlet being positioned at an upper end of the funnel shaped holder and, when the second coffee bean packaging cartridge is connected to a coffee brewing apparatus being aligned with the entrance opening thereof, wherein the transportation means are spiral shaped conveyor means and, in use, rotatably actuated for driving a predetermined dose of coffee beans out of the funnel shaped holder towards the outlet.

170. The second coffee bean packaging cartridge according to claim 169, wherein the spiral shaped transportation means are formed by a spiral shaped trajectory for the coffee beans on the inner wall of the funnel, obtained by a spiral shaped protruding edge on the inner wall.

171. The second coffee bean packaging cartridge according to claim 169, wherein the spiral shaped transportation means comprise a non-moving block element, impeding the coffee beans to continue rotating on the inner wall, thereby driving the coffee beans to follow the spiral shaped trajectory upwards towards the outlet.

172. The second coffee bean packaging cartridge according to claim 134, wherein the second coffee bean packaging cartridge is configured for shaking or vibrating coffee beans to encourage flow thereof towards an outlet of the second coffee bean packaging cartridge for releasing a predetermined dose of coffee beans.

173. The second coffee bean packaging cartridge according to claim 172, wherein the second coffee bean packaging cartridge comprises a first module, which is a container comprising the dosing device and for holding a predetermined dose of coffee beans and a second module, which comprises a motor, the first module being removably connectable to a coffee brewing apparatus and the second module being removably connectable to the first module, when the first module is connected to a coffee brewing apparatus.

174. The second coffee bean packaging cartridge according to claim 172, wherein the outlet of the second dosing device of the second coffee bean packaging cartridge is open when it is connected to a coffee brewing apparatus and closed when it is disconnected, and wherein the second module, preferably in a coffee bean refill mode, is connectable to the first module in lieu of the coffee brewing apparatus.

175. The second coffee bean packaging cartridge according to claim 174, wherein, preferably in coffee bean refill mode, the second module is connected in a same or similar way to the first module as a coffee brewing apparatus, resulting in the outlet of the first module being open.

176. The coffee beverage system comprising the coffee brewing apparatus as defined in claim 1, wherein the second coffee bean packaging cartridge is configured to be arranged for holding and supplying coffee beans, said second coffee bean packaging cartridge including a second dosing device for supplying a dose of coffee beans.

* * * * *